US005579478A

United States Patent [19]

Heiserman et al.

[11] Patent Number: 5,579,478

[45] Date of Patent: Nov. 26, 1996

[54] SYSTEM ADMINISTRATION MODULE FOR AN OPERATING SYSTEM AFFORDS GRADED RESTRICTED ACCESS PRIVILEGES

[75] Inventors: Tammy A. Heiserman; Aland B. Adams, both of Ft. Collins, Colo.

[73] Assignee: Hewlett-Packard Company, Palo Alto, Calif.

[21] Appl. No.: 441,892

[22] Filed: May 16, 1995

[51] Int. Cl.[6] .......... G06F 11/00

[52] U.S. Cl. .......... 395/186

[58] Field of Search .......... 395/187.01, 186, 395/188.01, 726, 728, 731, 732, 490, 600; 380/4, 3

[56] References Cited

U.S. PATENT DOCUMENTS

| | | | |
|---|---|---|---|
| 5,032,979 | 7/1991 | Hecht et al. | 364/200 |
| 5,305,456 | 4/1994 | Boitana | 395/700 |
| 5,361,359 | 11/1994 | Tajalli et al. | 395/700 |
| 5,414,852 | 5/1995 | Kramer et al. | 395/700 |
| 5,423,034 | 6/1995 | Cohen-Levy et al. | 395/600 |
| 5,432,934 | 7/1995 | Levin et al. | 395/650 |

*Primary Examiner*—Robert W. Beausoliel, Jr.
*Assistant Examiner*—Joseph E. Palys
*Attorney, Agent, or Firm*—Edward L. Miller

[57] ABSTRACT

Graded restricted access to a System Administration Manager program is provided by equipping that System Administration Manager program with the ability to interpret certain classes of configuration files when it is started by a user desiring to obtain graded restricted access. One class of files identifies the various activities that the System Administration Manager program is to perform, graded restricted access or not. This class of files identifies activity names, icons and information about what to call or execute to perform the activity once it has been selected for running, and may collect activities into hierarchial groups. Another class of files associates selected users with selected activities. If the user running the System Administration Manager program is one who has activities associated with his user id, a menu screen for proceeding with those activities (and only those activities) is presented to the user. A menu of operations is also used for assisting the super user in establishing graded restricted access to the System Administration Manager program for the non super users selected to have it. Various security safeguards are incorporated into the System Administration Manager to prevent a user from surreptitiously promoting himself to super user.

1 Claim, 4 Drawing Sheets

SYSTEM ADMINISTRATION MODULE FOR AN OPERATING SYSTEM AFFORDS GRADED RESTRICTED ACCESS PRIVILEGES

BACKGROUND OF THE INVENTION

Unix system administration has never been an easy task. Hewlett-Packard Co's version (HP-UX) includes a subsystem called SAM, for System Administration Manager. Contemporary versions of SAM include a graphical user interface arranged to make as friendly as possible the various system administration activities that are available with SAM. Examples of these activities include, but are not limited to, such things as adding and deleting users, maintaining groups of users, kernel maintenance, and configuration issues concerning peripheral devices. In a conventional unix system the user performing such administration activities must be the root user, who is also known as the super user, or "su". The super user has unlimited privileges with regard to the reading and writing of files, and with regard to what commands he or she may execute.

In large systems where there are many users, even routine system administration can be an onerous task for a super user. It would be desirable if certain collections of routine system administration tasks could be handled by those more closely concerned with using the system after it is modified. Unfortunately, however, it is most unwise to promote a large number people to super user; not only would it be bad for system security (in a privacy sense), but it could also compromise the operational integrity of the system. That is, an unskilled super user could inadvertently damage the configuration of the system or harm some data important to a user.

It would be desirable if there were an easy to use and general purpose way of designating users who are to have system administration privileges in varying degrees. That is, if there were an easy and general purpose way of specifying that users A, B and C are, for example, each able to do activity X, while B can also do activity Y and C alone can do activity Z. In general, it would be desirable to be able to grant the privilege of accessing, or executing, any particular collection of SAM activities to any particular user. Since some users may be granted more extensive privileges than others, we shall refer to this as graded access to system administration activities. Since we also strongly desire that there be no way that a devious user can parlay limited access into a more complete access, or even into full super user privileges, we shall term this "restricted access": a user should have the graded access he is given and be restricted to that and no more.

Finally, it would be desirable if such graded restricted access to the system administration activities afforded by SAM could be extended to other activities not presently found in SAM. That is, for other, perhaps more general purpose activities provided by third party software developers, or even end users themselves.

Naturally, the ability to create such graded restricted access must remain with the super user exclusively, and it must be easier to set up and maintain than the home brew alternatives already possible using the conventional capabilities of unix (e.g., creating a special setuid script for each user).

SUMMARY OF THE INVENTION

Graded restricted access to a System Administration Manager program is provided by equipping that System Administration Manager program with the ability to interpret certain classes of configuration files when it is started by a user desiring to obtain graded restricted access. One class of files identifies the various activities that the System Administration Manager program is to perform, graded restricted access or not. This class of files identifies activity names, icons and information about what to call or execute to perform the activity once it has been selected for running, and may collect activities into hierarchial groups. Another class of files associates selected users with selected activities. If the user running the System Administration Manager program is one who has activities associated with his user id, a menu screen for proceeding with those activities (and only those activities) is presented to the user. A menu of operations is also used for assisting the super user in establishing graded restricted access to the System Administration Manager program for the non super users selected to have it. Various security safeguards are incorporated into the System Administration Manager to prevent a user from surreptitiously promoting himself to super user.

DESCRIPTION OF A PREFERRED EMBODIMENT

Figure 1:
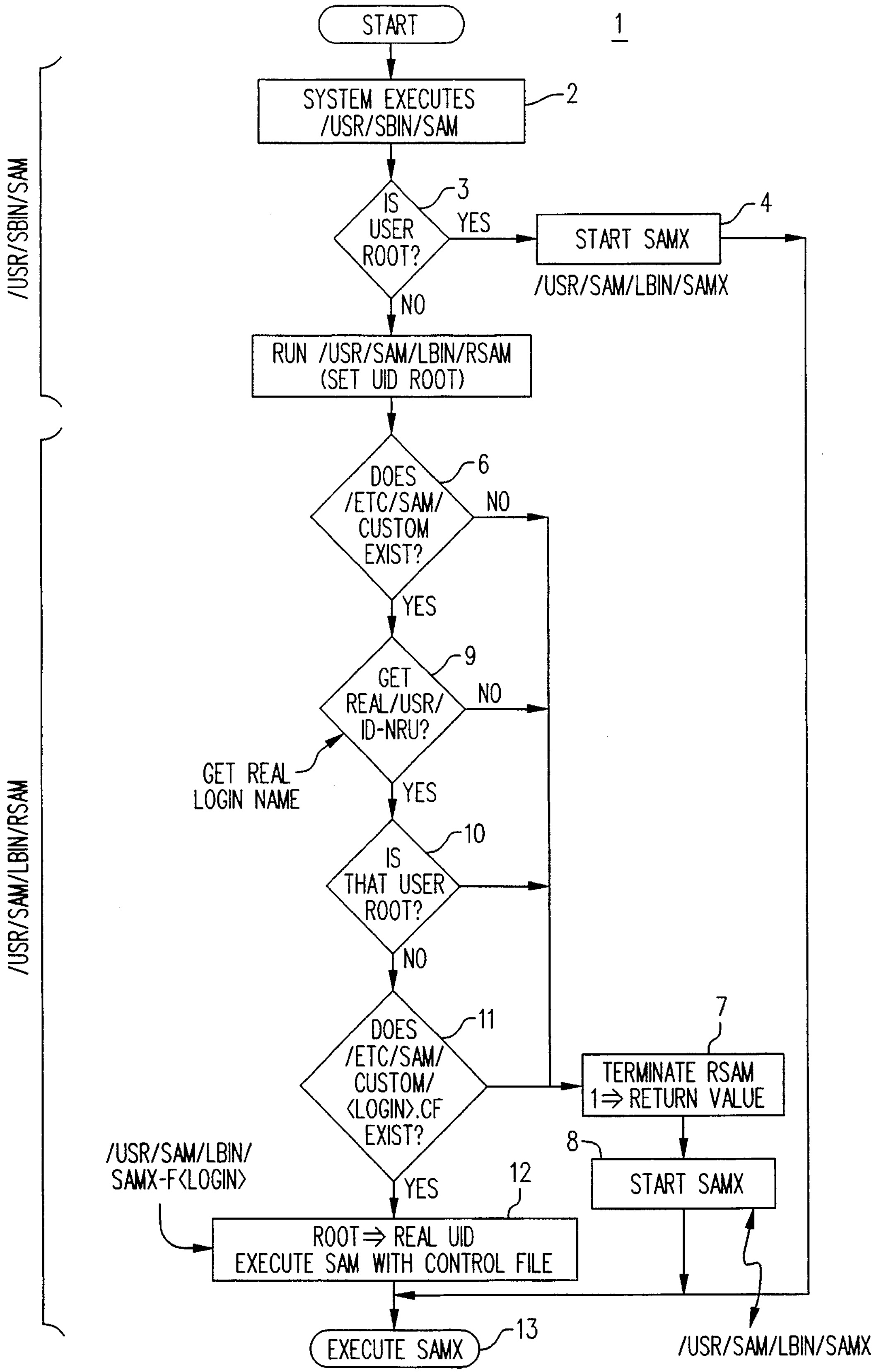
FIG. 1 is a simplified flow chart of certain actions that occur when a software tool for operating system maintenance and administration named SAM (System Administration Manager) is started.

Refer now to FIG. 1, wherein is shown a flow chart 1 of a software mechanism that has been added to the System Administration Manager (SAM) in HP-UX 10.0 to allow graded restricted access to non super users for allowing them to execute privileged commands, applications and utilities that are part of SAM. As an aid to brevity, we shall use the term "SAM activities" or simply "activities", depending upon the context, to refer to the commands, applications and utilities that are either originally part of SAM, or that are subsequently made a part of SAM.

The flow chart 1 depicts what happens when any user starts SAM. The flow chart 1 begins at step 2 when the script/usr/sbin/sam is presented to the operating system for execution. This can arise either by typing that script at a command line interface or by clicking with a pointing device (such as a mouse) on an icon in a graphical user interface that produces it (i.e., a user interface such as VUE—Hewlett-Packard Company's Visual User Environment).

At step 3 the script/usr/sbin/sam checks the user id to see if it is root (the super user, "su"). If the answer is "yes", then the user can already have unrestricted access to SAM, and at step 4 the command "samx" is issued with the path/usr/sam/lbin/. The idea here is that since the user is su already, he can already do anything he wants and there is no need for the graded restricted access that is afforded by the invention.

If, on the other hand, the user is not su, then a SAM utility "rsam" (restricted SAM) is run with the path/usr/sam/lbin/. The utility rsam is a command that is owned by root and whose setuid bit has been set, so that the user is temporarily promoted to root for the duration of rsam.

At step 6 rsam checks to see if the directory/etc/sam/custom/exists. If it doesn't, then the user is not allowed graded restricted access to SAM, and at step 7 rsam is terminated and a return is made to sam (started at step 2) with a return value of one. That return value indicates to sam that it should continue (and rely on samx to abort the attempt to begin a graded restricted access session). What sam then does at step 8 is to start samx with the path/usr/sam/lbin/. At this point it is known that samx will issue an error message, since the user is not root.

If at step 6 the answer was "yes", then an attempt is made at step 9 to obtain the real user login name using the id command. Under normal circumstances this will not fail, but if it does, then some irregularity is indicated, and for security reasons the same exit (as at steps 7 and 8) from rsam to samx via sam is performed.

On the other hand, if the answer at step 9 was "yes" a check at step 10 determines if the user is root. If the user is root then the attempt to initiate the graded restricted access session is aborted via the step 7/8 transition to samx described above. The reason for this is that, since the user is indeed root it makes no sense to begin a graded restricted access session for a user that is supposed to have unrestricted full access. However, if at step 10 the user is not root, then commencement of a graded restricted access session continues at step 11.

Step 11 determines whether or not the user has previously been granted graded restricted access privileges by the system administrator. This is done by checking the directory etc/sam/custom/for existence of a control file of name <login>.cf . This is a very tightly controlled directory; even root has (initially) only read permissions, and the existence of the sought for control file is a secure and reliable indicator that the user has indeed been granted graded restricted access to sam. At a later time it will become clear how the control file is placed into the directory/etc/sam/custom/. If at step 11 the control file does not exist, then the initiation of the graded restricted access session is aborted via the step 7/8 transition to samx, as described above.

Continuing at step 12, once it has been verified that the user has been given graded restricted access to sam, the real user id is set to zero (root) and the command samx –f <login> is executed with the path/usr/sam/lbin/. Owing to the setuid done at step 5 the samx executed at step 12 has su privileges. However, even though the user is now really su, he can't do anything except those graded restricted access privileges listed in the user's control file.

Figure 2:
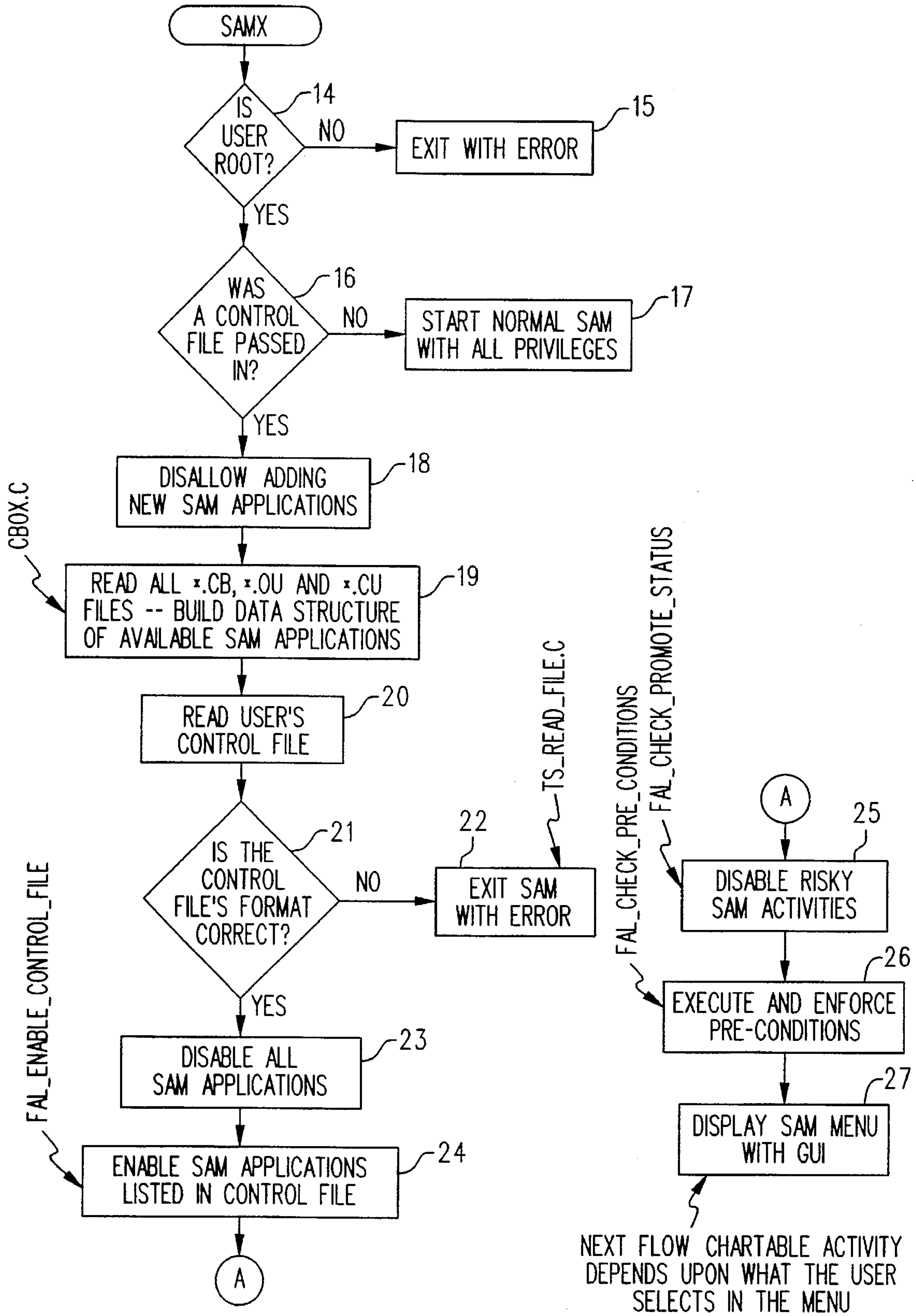
FIG. 2 is a simplified flow chart of certain preliminary actions that occur within SAM once it has determined that a user is entitled to graded restricted access.

Refer now to FIG. 2, which is a simplified flow chart of internal software activity caused by samx -f <login>. The activity represented by this flow chart takes place once it has been decided that a graded restricted access session is to commence. What needs now to be done is to determine the totality of any and all utilities, applications, commands, etc., that are the SAM activities to be launchable from SAM. These will include things that are available from the factory, as it were, as well as third party and customer developed applications. Next, these SAM activities are all disabled. After that, exactly the subset of the totality (of SAM activities) that properly corresponds to or have been granted to the user, is enabled. Finally, SAM is started for that user with just the enabled subset. The user won't even see what utilities, applications, commands, etc., that he does not have access to.

At step 14 samx checks to see if the user is root. If he is not, then at step 15 an exit from samx occurs, accompanied by an error message. The exit at step 15 is part of what is relied upon back at steps 7 and 8 in FIG. 1. If the user is root step 16 checks to see if a control file is associated with this instance of executing samx. This is done by determining if the –f option was used when samx was started. If there is no control file ("no" at step 16) then at step 17 a completely unfettered instance of SAM is started. If the answer at step 16 was "yes" then certain security issues are addressed at step 18 before proceeding. These include turning off the ability to add new utilities, applications and commands, etc., to SAM. The shell escape is also disabled. Also disabled is the ability to directly traverse from one area of SAM to a related area. A keyboard input filter is also enabled.

Now, one purpose of SAM is to launch certain utilities, applications and commands. The security features described in the preceding paragraph must also be enforced by each utility, application or command so launched. Ones that are provided by the manufacturer (Hewlett-Packard) already incorporate these security features. Any such utilities, applications and commands that are provided by other developers or users must include them, as well.

At step 19 a limited search of the file system is undertaken to find the totality of activities that can be launched from SAM. There is a file (say, . . . /sam_dir_activities ) that SAM maintains that includes a list of directory names where descriptions of these SAM activities comprising the totality can be found. (We say that an activity "X" is "registered to SAM" when the file sam_dir_activities contains the name of a directory that describes "X".) It is these directories that are searched. In each such directory samx searches for files whose names end in .cb or in .ou. These will be located in an intermediate directory corresponding to the language (e.g., English or Spanish) in use. Based upon the files found, and their contents, a data structure fal_areas is constructed. The data structure fal_areas is created by a program in C (samx) and is a tree-structured multiply linked list built in RAM. This dam structure represents everything that SAM is, in principle, capable of doing (i.e., has been set up to do) in the particular system that it is running on.

At step 20 the user's control file is read in order to build another (temporary) data structure user_areas that describes what subset of the totality the user is entitled to execute. (The name user_areas does not appear in the source listings included in the appendices. Instead, there is an object named "handle" in the routine fal_ts_read_control_file, among others.)

If there are any abnormalities that are detected while reading the control file (e.g., it isn't there, or the syntax of the information in the file is incorrect, etc.,) then step 21 transitions to step 22, where an error message is issued and samx is terminated.

If there are no abnormalities then step 23 disables all items contained in the data structure fal_areas. Following step 23, at step 24 those items in fal_areas that are matched by an item in user areas are enabled.

To appreciate the activity at step 25 it is useful to know that, despite having a mechanism that allows su to delegate graded restricted access of SAM's functions to non super users, it is nevertheless felt that there are some things that even the root user should not be able to delegate. For example, it would be a serious security issue if su were able to grant to a non super user the ability to edit root's crontab file or initiate a non restricted SAM session on a remote system. Accordingly, despite the fact that such activities may have been enabled at step 24, they are expressly disabled at step 25. (Such enablement never should happen anyway; the mechanism that built the control file should have refused to enable those activities. The disablement at step 25 is a precaution aimed at a surreptitious attempt to modify a control file.)

There are things that SAM can do that don't make sense to perform unless certain preexisting conditions obtain. For example, it makes no sense to adjust the audit sub system if it has not been installed. What step 26 represents is a generalized indication of a check of each activity enabled by the control file at step 24 (and not subsequently disabled at step 25) to see if it has an associated pre-condition. For any that do, the associated pre-condition check is executed. An activity is disabled if it has an unmet associated pre-condition.

Following that, at step 27 the remaining enabled SAM activities are displayed in a menu within a graphical user interface, so that the user may select which of those he wishes to perform. It may be desirable during the execution of an activity to reinstate an original user id for the duration of that activity. The reason for this is so that certain activities that are sensitive to the user's id, such as some application supplied by a third party, for example, will execute correctly. A related desirable feature is the ability to simply change the user's id for the duration of the activity's execution. For example, a spooler management utility may require that its user id be "lp". In either case, after execution is concluded, the user id is set back to root. The flow chart 28 of FIG. 3 explains this in more detail.

Figure 4:
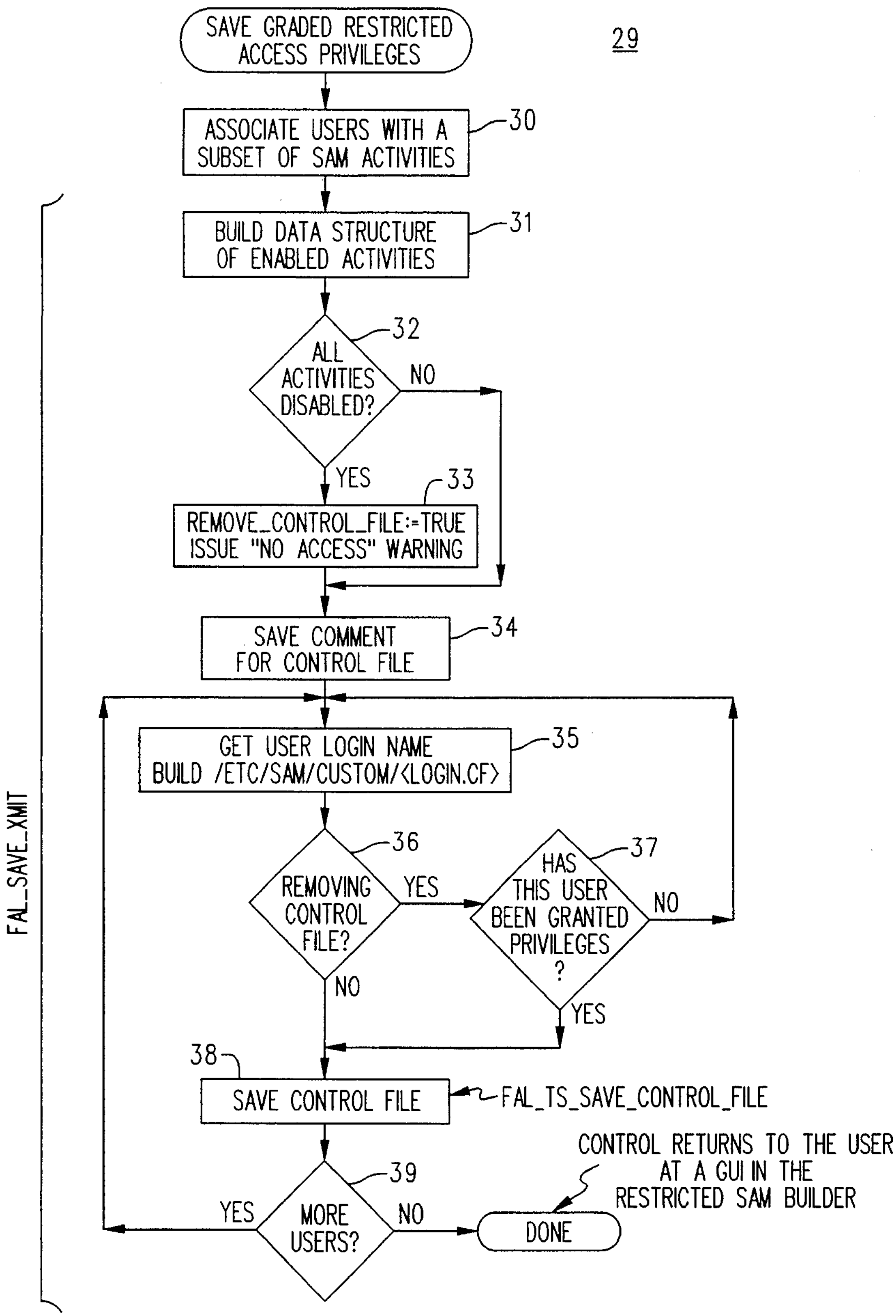
FIG. 4 is a simplified flow chart of how the super user interacts with SAM to grant graded restricted access privileges to a non super user.

Up to this point our discussion has been directed to what happens in SAM when a user invokes his graded access privileges. We now turn our attention to the process by which the super user assigns, or grants, those graded access privileges to non super users. FIG. 4 is a simplified flow chart 29 of that process.

The flow chart activity at step 30 represent the following things. The super user tells SAM to display a complete list of activities that SAM is capable of doing (done with the command usr/sbin/sam–r , which starts something called the "Restricted SAM Builder"). The super user then associates one or more users with all or a subset of those activities. This constitutes specifying what collection of privileges to grant those users. The flow chart activity at steps 31–39 then captures that information and makes a control file for each user associated with that collection of privileges. The entire process may then be repeated as necessary to grant different collections of privileges to other users, as desired.

At step 31 the collection of privileges is saved as a (temporary) data structure user_privileges that describes what collection of privileges the user is entitled to execute. (The name user_privileges does not appear in the source listings included in the appendices. Instead, there is an object named "handle" in the routine fal_save_xmit, among others.)

At steps 32 and 33 checks are undertaken to warn the super user that, if there are no privileges in the collection, then this is equivalent to denying that user the right to run SAM.

At step 34 the super user is allowed to append a descriptive comment to the data structure user_privileges.

The flow chart activity from steps 35 to 39 builds a control file/usr/sam/custom/<login>.cf for each user.

The activity we have described to this point depends upon being able to describe ahead of time to SAM exactly what activities it is able to launch. A way to think of SAM is as a mechanism that can launch activities provided they are supplied; none are "part of" SAM at the fundamental, built-in level. This means, for example, that to accomplish the building of the dam structure fal_areas (see 19 in FIG. 2) some tabular representation of the various SAM activities must be available. Such a representation would need to include the name of each activity, each activity's icon, the text describing the command used to execute each activity, and any pre-conditions needed to accomplish each activity. Information about HELP files may also be included.

This information is contained as text in files whose names end in .cb, .cu or .ou and that are located in known directories (as explained above). Generally speaking, the names of the files do not matter, so long as they meet the conditions set out; SAM finds them all and merges their content into one logical construct used in the building of the data structure fal_areas. For this to work, the content of the various files is assumed to conform to a pre-defined format. Appendix I includes a description of that format; see pages 8–12 (according to the local pagination within Appendix I).

Appendix I is a portion of a document created for internal use within Hewlett-Packard Co. during the project that developed the graded restricted access privileges mechanism of SAM. The portions that are included are Chapter 2, which describes the user interface employed by the functional area launcher. That is, it includes depictions of the various screens encountered by a user as he/she interacts with SAM to invoke graded restricted access to SAM's activities; the screens associated with those activities themselves are not included in Chapter 2. It also includes application integration information for various other software developers.

Chapter 3 of Appendix I includes a similar type of information, except that it relates to something called the "Restricted SAM Builder". The Restricted SAM Builder does the activity of FIG. 4, including that at step 30. That is, it is the mechanism that associates subsets of users with subsets of SAM activities, to create the capability of having graded restricted access privileges. The result of that process is a control file associated with each user who is to enjoy graded restricted access privileges.

Appendix II is a depiction of the contents of a default proposal for a control file that is recommended by the system (in the absence of an existing control file for that user) and is either saved, or edited and saved, as desired. The file contents of Appendix II are included here to illustrate the format of a user's control file. That format includes instances of a four-line structure that describes each application the user is allowed to execute. The first line identifies the label of the activity, as seen on the graphical user interface when interacting with SAM. The second line locates where that activity resides in the hierarchy of groups and single applications described below in connection with Appendix III. The third line is the name of the file (*.cb, *.ou or *.cu) that describes the activity. The fourth line is a time stamp on the *.cb, *.ou or *.cu file, and is used in version matching (*.cu files describe activities that have been added interactively, as opposed to having been "registered" to SAM by a developer). This four-line structure is repeated as needed to describe each activity the user has access to.

Appendix III is seven pages of example *.cb files that are supplied to SAM by Hewlett-Packard. These are the "factory supplied activities" that SAM can perform. In the case of Appendix III the information is contained all in one file named sam.cb. Note that the file contains hierarchical levels of abstraction. Following the header are either groups of applications (the class of activities defined earlier) or single applications. A group can be contained in another group. An icon and a HELP file are associated with each group or single application. Each group, application within a group, and single application, is described in the files text according to conventions set out in Appendix I. Those conventions include, for each level in the hierarchy, specifying the associated icon and HELP file. Thus, Appendix III is an exemplary instance of an actual *.cb file.

Appendix IV is the text of various programs in C, data files, HELP files, makefile's and scripts. These various items are included to provided definitive information about the operation of those aspects of SAM that are of interest in this Patent. It will be understood, however, that these listings are not all of SAM itself; for brevity, only the portion relevant to the present invention has been included.

Although the present embodiment has been presented in the context of an HP-UX operating system, those skilled in the art will readily appreciate that the notion of graded restricted access for a software tool that assists in system administration is not limited to just the HP-UX operating system. It could applied as well to other implementation of the Unix operating system, as well as to completely different types of operating systems that provide something akin to the notion of a super user.

APPENDIX I

Chapter 2 SAM Functional Area Launcher

2.1 Introduction

This chapter describes the SAM Functional Area Launcher (FAL), which is the first screen that is displayed when SAM is executed. The FAL contains a hierarchical list of all applications that can be executed from SAM. The FAL is very similar to the 9.0 SAM Control Box. In addition to executing applications, system administrators can add, modify and remove their own custom utilities.

It is also possible to build a restricted version of SAM for a specified user. Executing SAM with a restricted option (-r) displays the Restricted SAM Builder (RSB). Like the FAL, the RSB contains a hierarchical list of all applications that can be executed from SAM. System administrators can enable specific areas of SAM to be used by a specified user. See the Restricted SAM Builder chapter for more details.

If SAM is executed by a non-superuser, then SAM will check to see if the user has any SAM privileges. If so, then the user is promoted to superuser and the FAL contains only those applications that were enabled for the user via the RSB. All other SAM applications are not listed in the FAL. In addition, the add, modify and remove custom utility actions are not available. Since the user was promoted to superuser to only execute selected SAM applications, it is a potential security problem to allow the user to add, modify and remove custom utilities to SAM.

The table below summarizes the features under consideration for inclusion and indicates their priority.

Table 1: Functional Area Launcher Features

| Feature | Priority | Status |
|---|---|---|
| Maintain existing (9.X) control box functionality | must | In |
| Add UI for add/modify/remove custom utilities | must | In |
| Start the SAM log viewer | must | In |
| Support other partners integrating into SAM | must | In |
| Support non-root access to SAM FAs | high want | In |
| Support iconic view of SAM applications | high want | In |
| Support cluster-wide custom utilities | want | Opportunistic |

2.1.1 Glossary

The following terms are used frequently in this chapter.

1. Application

An executable on the object list screen. Applications do not contain subitems. SAM functional areas, custom utilities and other utilities are all considered applications.

2. Custom Utility

An application that has been added to SAM via the "Add Custom Utility" action item.

3. FAL Description Files

These files describe the applications and groups so the FAL can list them in the object list screen. SAM functional areas, custom utilities and other utilities are all defined in the various FAL description files.

4. Functional Area

An application that is delivered as part of the SAM product. SAM functional areas can be shipped in the SAM fileset or registered into SAM from other filesets.

5. Group

An item on the object list screen that contains subitems. Groups are not executables.

6. Other Utility

An application that is installed on the system and registered to SAM. Other utilities can be other HP or third-party applications. Other utilities are not considered part of the SAM product.

7. Source

Every application or group has a source. The source describes where the application or group came from. SAM functional areas have a source of "SAM". Custom utilities have a source of "Custom". Other utilities can define their own source in their FAL description file or use the default of "Other".

2.2 SAM Menu Hierarchy

SAM functional areas are shipped in a menu hierarchy that cannot be modified by customers. Customers can create new groups and applications within the hierarchy, but they cannot remove any component of the SAM hierarchy.

The menu hierarchy for all SAM areas is listed below. Core-SAM Functional Areas contain a "*" beside them. All other entries are registered to SAM as either SAM functional areas or other utilities.

Auditing and Security* -->
    Audited Events*
    Audited System Calls*
    Audited Users*
    System Security Policies*
Backup and Recovery* -->
    Automated Backups*
    Interactive Backup and Recovery*
Cluster Configuration*
Disks and File Systems* -->
    Disk Devices*
    File Systems*
    Logical Volumes*
    Swap*
    Volume Groups*
Kernel Configuration* -->
    Configurable Parameters*
    Drivers*
    Dump Devices*
    Subsystems*
Networking and Communications* -->
    Bootable Devices*

- Internet Addresses*
- Networked File Systems* ->
    - Exported Local Directories*
    - Mounted Remote Directories*
- Network Interface Cards*
- Network Services*
- System Access* ->
    - Internet Services*
    - Remote Logins*
- UUCP* -->
    - UUCP Devices*
    - UUCP Remote Systems*

Peripheral Devices* -->

- Cards*
- Device List*
- Disks and File Systems* -->
    - Disk Devices*
    - File Systems*
    - Logical Volumes*
    - Swap*
    - Volume Groups*
- Instruments*
- Printers and Plotters* -->
    - Print Requests*
    - Printers and Plotters*
    - Save/Restore Printer Configuration*
- Tape Drives*
- Terminals and Modems*
- Uninterruptable Power Supplies*

Printers and Plotters* -->

- Print Requests*
- Printers and Plotters*
- Save/Restore Printer Configuration*

Process Management* -->

- Performance Monitors* -->
    - sar*
    - top*
- Process Control*
- Scheduled Cron Jobs*

Routine Tasks* -->

- Backup and Recovery* -->
    - Automated Backups*
    - Interactive Backup and Recovery*
- Selective File Removal*
- System Log Files*
- System Shutdown*

Run SAM on Remote Systems*

Time* -->

- System Clock*
- XNTP Broadcasting*
- XNTP Local Clock*
- XNTP Network Time Sources*

Users and Groups* -->

- Groups*

Users*

ISSUE: This list is subject to change as more projects integrate into SAM. This ES will be updated periodically to reflect any changes.

2.3 FAL Object List Screen

The FAL object list screen contains a hierarchical list of all SAM functional areas, custom utilities, and other utilities. Only one item can be selected at a time on the object list screen. In graphical environments, users can control whether they see an iconic or textual view of the items in the list. All SAM functional areas and other utilities can supply their own icons. If an icon is not specified, a default icon is displayed. SAM displays a default icon for all custom utilities.

When viewing the textual version of the object list screen, the following columns are displayed:

- ❑ Source - lets the system administrator know where the application came from. For SAM functional areas, this is set to "SAM". For customer-added utilities, the source is "Custom". Other HP or third-party applications can set their own source value. If none is specified, "Other" will be used.
- ❑ Area - Describes the type of application or group. If the entry is a group (ie, contains a list of sub-items), then a "->" is appended to the area name.

When SAM is first executed, the following object list screen is displayed.

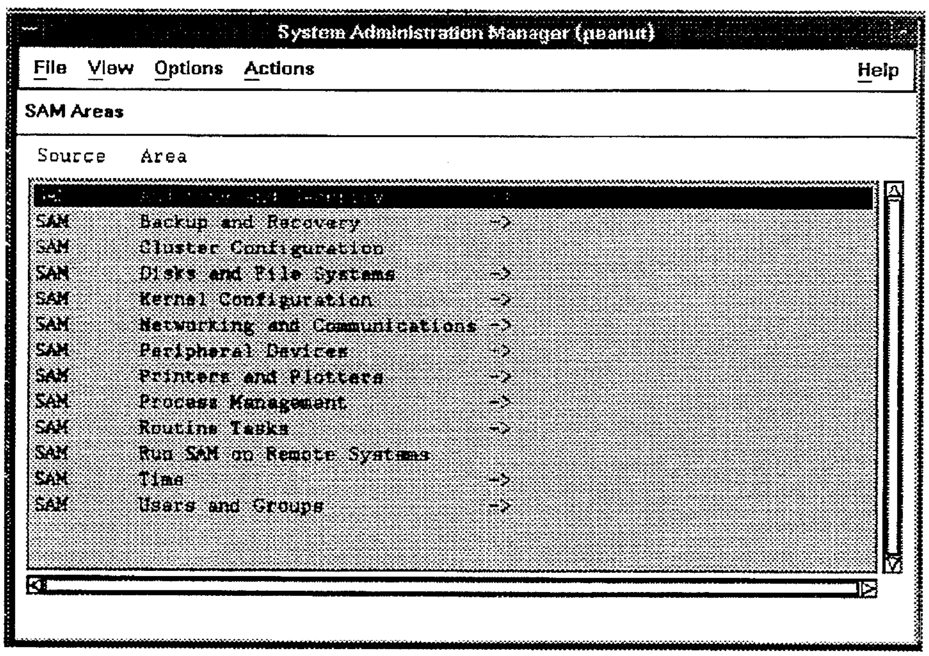

FIGURE 1. FAL Object List Screen

ISSUE: Need to display an iconic view when we have our SAM icons available

System administrators can navigate the FAL much like the SAM Control Box in 9.0. They can use the up and down arrow keys to highlight the desired item and press return to execute the default action. In Motif, the default action is also executed if the system administrator double-clicks on an item. For a more detailed description of the Actions menu, see Actions Menu on page 13.

For applications, the default action is to execute it. Applications can also be executed by highlighting the application and selecting the Run action.

The default action for groups is to open the group. When a group is opened, the contents of the object list screen are replaced with the subitems in the group. Groups can also be opened by highlighting the group and selecting the Open action. Suppose the system administrator opened the Auditing and Security item. The resulting object list screen is pictured next.

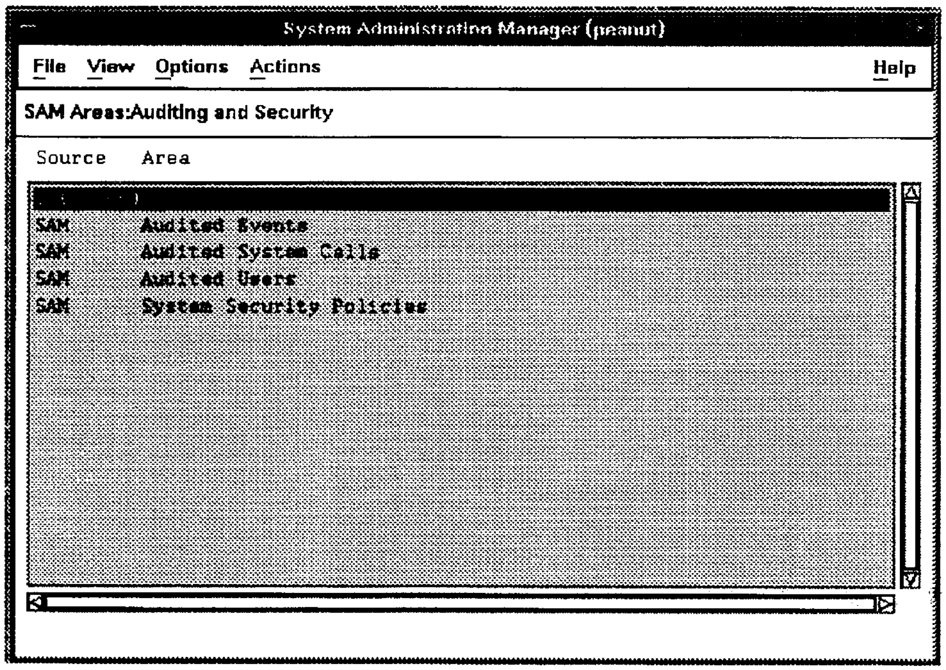

FIGURE 2. FAL Object List Screen after Selecting Group

2.4 FAL Initialization

SAM determines the applications to display in the FAL based on data stored in the FAL description files. An FAL description file contains definitions of one or more of the applications that are listed in the FAL. Each application can reside in a unique FAL description file. Several applications can also be defined in the same FAL description file.

When a SAM application is added to the system, its customize script registers it into SAM. Part of the registration process involves telling SAM the directory where its FAL description file resides. When SAM is invoked, it searches the list of registered directories for any FAL description files and merges them together to form the list of SAM areas displayed in the FAL.

If SAM is executed with a -f option (ie, /usr/sbin/sam -f <login_name>), then SAM only displays the applications that the specified user has been given access to. In addition, SAM disables the add, modify and remove custom utility actions. The List menu is disabled on all SAM functional area object list screens since the user may not have access to all subareas in a SAM functional area. On terminals, SAM does not allow the user to escape to a shell.

When the FAL is invoked, it also checks for multiple versions of SAM running on the same system. If there are other versions of SAM running, SAM displays a warning message that problems can arise if more than one version of SAM is executing at the same time.

2.4.1 FAL Description File Syntax

There are three types of FAL description files. Each of these types uses the same FAL description file syntax which is described in this section. See SAM Description Files (*.cb) on page 11, SAM Custom Utilities Description File (sam_custom.cu) on page 12, and SAM Other Utilities Description Files (*.ou) on page 12 for details on the various types of description files.

The FAL description file syntax is backwards compatible with the syntax used to generate *.cb & *.ou files in 9.X SAM with a few exceptions. The new features that have been added are:

- ❑ source <string>

The system administrator needs a way of distinguishing SAM applications from custom utilities and other utilities. The source of an application tells the system administrator where the application came from. All SAM functional areas have a source of "SAM". All custom utilities have a source of "Custom". Other utilities can specify their own source in the FAL description file. The default source for other utilities is "Other".

- ❑ command gui/gui_only <command string>

In 9.X SAM, all other utilities were executed using an hpterm. It was not possible to execute a graphical version of an application without getting an hpterm. In 10.0, SAM supports executing applications with a graphical user interface. There are three ways to define an application to execute. "command <string>" defines the command for both terminal and Motif environments. The command is executed in an hpterm in the Motif environment. "command gui <string>" defines the command for both terminal and Motif environments. The command is executed without an hpterm in the Motif environment. Finally, "command gui_only <string>" defines the command for the Motif environment only. The command does not appear on the FAL if running on a terminal.

- ❑ pre-condition <command string>

In 9.X SAM, all SAM applications were always displayed in the Control Box. If a functional area only applied to a certain architecture, then cpp defines were used around the functional area's definition in the *.cb file. In 10.0, the FAL needs to turn off functional areas for other reasons. If a pre-condition is specified, the FAL executes the pre-condition command when building SAM's main menu. If the pre-condition command returns zero, then the application is listed in the FAL. If the command returns non-zero, then the application is not listed in the FAL. The pre-condition is optional. If there is no pre-condition, the application is always displayed. For example, some of the peripheral devices subareas are only valid on NIO systems. The pre-condition can determine if the system is NIO so the FAL knows whether or not to display the subarea.

SAM applications should use a pre-condition if access to the application requires a specific type of system or peripheral device. If the application has a fileset dependency, then the application should be listed in the FAL. When the user selects the application, it should tell the user about the fileset dependency.

- promote_access <true|false>

If promote_access is true, then the SAM application can be enabled for a non-superuser via the RSB. If promote_access is false, then the SAM application is marked "Inaccessible" on the RSB and can never be enabled for non-superusers. Note that non-superusers will be given superuser privileges to access SAM applications. By default, all SAM applications have a promote_access of true. An application should only set promote_access to false if there is a security problem with allowing non-superusers access to the application. For example, the SAM functional area "Remote Administration" has a promote_access of false because the non-superuser could get unlimited superuser privileges on the remote system.

- icon_path <path>

This specifies the icon to use in the iconic view of the FAL. It must be an absolute path to the icon. Icons should be stored in localizable directories, and "%L" can be used to represent the LANG variable in the directory path. If an icon path is not specified, a default icon will be displayed.

- execute_as <user_login | _user>

This specifies who to execute the application as. By default, SAM executes all applications as "root". If an application needs to be executed using the UID of the user that ran SAM, then the application can specify to execute as user "_user". This tells the FAL to switch both real and effective UIDs back to the values of the user that executed SAM. This is useful when a non-superuser is granted access to SAM. Applications can also tell the FAL to always execute them using a specified user login.

With the new way of defining commands, it is no longer necessary to support an alpha command as was in the old Control Box grammar. This was an unadvertised way of specifying different commands for terminal and Motif environments. SAM applications were the only ones that used this feature in 9.X. If an application needs to execute different commands on the Motif and terminal environments, then one of two things can be done:

- Write script around command

The script would determine which command to execute depending on the environment.

- Add application to FAL twice

The first entry is graphical only (command gui_only <string>) and the second one defines the terminal command (command <string>).

Note that in 10.0, ObAM applications do not need to supply different commands for terminal and Motif environments. It is anticipated that very few applications that are added to SAM will need to supply different commands for terminal and Motif environments. It was not worth the added complexity to the grammar and the user interface to adding custom utilities to support separate alpha commands.

The syntax for these description files is as follows. Words in `bold font` represent key words in the description file language.

Basic definitions:

*string* - arbitrary text inside double quotes
*path* - an absolute path inside double quotes Beginning of description file:

```
start:
        source_defs items
source_defs:
        source string                          /* Optional - default source is provided */
items:
        single                                 /* One or more of the following */
        submenu
single:
        label_defs pre_condition_defs promote_defs icon_defs command_defs execute_as_defs help_defs
submenu:
        label_defs { items } help_defs
label_defs:
        label string
pre_condition_defs:                            /* Optional */
        pre-condition path
promote_defs:                                  /* Optional */
        promote_access true | false
icon_defs:                                     /* Optional */
        icon_path path
command_defs:                                  /* One of the following */
        command path
        command gui path
        command gui_only path
execute_as_defs:
        execute_as "_user"                     /*Optional */
        execute_as "<user_login>"
help_defs:
        help string
```

TABLE 2. FAL Description File Syntax

Below is an example FAL description file.

```
# Lines which start with a '#' are comments
# Note that the source line applies to all applications defined in the FAL description file.
source "ABC Company"
label "Disk Quota Management"
{
    label "Quota Configuration"
    {
        label "Initial Setup"
        icon_path "/usr/disk_quota/help/%L/q_config.l.pm"
        command gui "/usr/quota/bin/setup"
        execute_as "_user"
        help "/usr/quota/help/setup"

        label "Quota Maintenance"
        command "/usr/quota/bin/qmaintain"
        execute_as "qmgr"
        help "/usr/quota/help/maintenance"
    }
    icon_path "/usr/disk_quota/help/%L/q_grp.l.pm"
    help "/usr/quota/help/configuration"
    label "Quota Statistics"
    {
        label "Quota Monitor"
        command "/usr/quota/bin/monitor"
        help "/usr/quota/help/monitor"
    }
    help "/usr/quota/help/statistics"
}
help "/usr/quota/help/quota"
```

TABLE 3. FAL Description File Example

2.4.2 SAM Description Files (*.cb)

The first type of FAL description files are those ending in ".cb". These are SAM functional area FAL description files.

The source for SAM functional areas is always "SAM". Any source specification in a *.cb file is ignored. SAM functional areas are launched without using an hpterm in the graphical environment. System administrators are not allowed to modify or remove SAM functional areas.

In order for a project to deliver an application in a *.cb file, the application must behave like SAM:

- ❑ The user interface must follow the SAM Style Guide and be reviewed by the core-SAM team for consistency.
- ❑ The application must log all activity to the SAM logfile.
- ❑ The application may or may not utilize the SAM architecture.

Contact sam_ui@hpfcrp.fc.hp.com for more information.

2.4.3 SAM Custom Utilities Description File (sam_custom.cu)

Whenever an application is added to SAM via the Add Custom Utility action item, SAM stores a description of this application in the custom utilities description file, /etc/sam/custom/sam_custom.cu. All custom utilities added via SAM's user interface are stored in this file.

The source for SAM custom utilities is always "Custom". If there is a source specification in the sam_custom.cu file, it is ignored. The system administrator can determine whether or not the custom utility is executed with an hpterm in a graphical environment (see Add Custom Utility on page 15 for details). Only custom utilities can be modified or removed from the SAM Main Menu.

2.4.4 SAM Other Utilities Description Files (*.ou)

Other HP or third-party applications may want to be launched from SAM. These applications are stored in "*.ou" description files which may be placed anywhere on the system. When the application is installed on the system, its customize script must register the application to SAM. This tells SAM where to find the FAL description file. These other utilities cannot be removed or modified from SAM via the interactive user interface. To remove these applications from SAM, the system administrator must remove the FAL description file by unregistering the application from SAM.

By default, the source for other utilities is "Other", although this can be specified in the FAL description file. These applications are executed in an hpterm unless the FAL description file says otherwise. For information on registering an application to SAM, see the samreg man page.

2.5 FAL Menus

This section describes the menu items in the FAL. Only menu items unique to the FAL are documented in this ES. Menu items that are common across all ObAM applications (ie, Exit in the File Menu) are not documented in this section.

2.5.1 Options Menu

The Options menu contains the items listed below. Descriptions of task dialogs that are displayed when a menu item is selected can be found in FAL Task Dialogs on page 14.

| Options Menu Items | Result |
|---|---|
| View SAM Log | option View SAM Log |
| Set SAM Log Options | taskdialog Set SAM Log Options |

2.5.1.1 View SAM Log

This option starts the SAM Log Viewer. System administrators may want to watch what gets written to the SAM log as they execute the various SAM applications. For more details on the SAM log viewer, see the SAM Logging chapter.

2.5.2 Actions Menu

The Actions menu contains all actions for manipulating the SAM areas. Descriptions of task dialogs that are displayed when a menu item is selected can be found in FAL Task Dialogs on page 14.

| Actions Menu Items | Selected Items | Result |
|---|---|---|
| Open | one group | action Open (default for groups) |
| Close | | action Close |
| Go to Top Level | | action Go to Top Level |
| Add Custom Menu Item | | taskdialog Add Custom Utility |
| Add Custom Menu Group | | taskdialog Add Custom Group |
| Run | one application | action Run (default for apps) |
| Modify | one custom utility | taskdialog Modify Custom Utility |
| Modify | one custom group | taskdialog Modify Custom Group |
| Remove from SAM | one custom utility/group | action Remove from SAM |

2.5.2.1 Open

Selecting the Open action on a group replaces the contents of the object list screen with the subitems stored in the group. The first item on lower-level object list screens is "..(go up)". If the selected item is "..(go up)", then the Open action returns the object list screen to the previous level. If the user double-clicks on a group, the Open action is performed.

2.5.2.2 Close

Selecting the Close action returns the object list screen to the previous level. This is the same behavior as selecting the Open action on the "..(go up)" item.

2.5.2.3 Go to Top Level

This action returns the hierarchical list to the top level. This provides a short-cut for returning to the top of SAM's main menu if the system administrator has navigated several levels down into SAM.

2.5.2.4 Run

Selecting the Run action on an application executes the application. The FAL will start an hpterm for the application if necessary. While the application is executing, the FAL is visible but locked. System administrators can only execute one application at a time. If the user double-clicks on an application, the Run action is performed.

2.5.2.5 Remove from SAM

The Remove from SAM action is only available if the system administrator selects a custom utility or group. The FAL confirms that the utility or group should be removed from SAM prior to removing it. Note that applications are not removed from the system. They are removed from sam_custom.cu so that SAM no longer lists them on the object list screen. If removing a group, SAM checks if the group is empty before removing it. If the group is not empty, SAM generates an error message telling the system administrator that they must remove all subitems before removing a group.

If an non-superuser is executing SAM, then the Remove from SAM action is never available. Non-superusers are not allowed to customize SAM's list of areas.

2.6 FAL Task Dialogs

This section describes the task dialogs that are used in the FAL.

2.6.1 Set SAM Log Options

The Set SAM Log Options task dialog allows the system administrator to set logging options. The system administrator can choose to have SAM automatically or never trim the SAM log file. If the log should be trimmed automatically, then the administrator can define a desired maximum log size. The size of the SAM log file is compared against this desired log size whenever the FAL is first started (before the SAM log file viewer is automatically started) or the FAL executes an application. If the SAM log is larger than the desired log size, then the existing log is moved to an old log file and a new SAM log file is started. Note that this trimming does not take place if a SAM log file viewer is currently running. See the SAM Logging ERS for details.

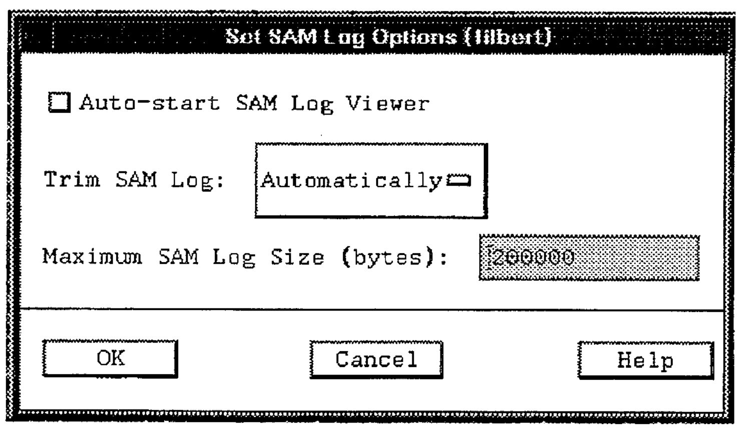

ISSUE: Need to recapture this screen -- there have been some minor wording changes.

Figure 3:
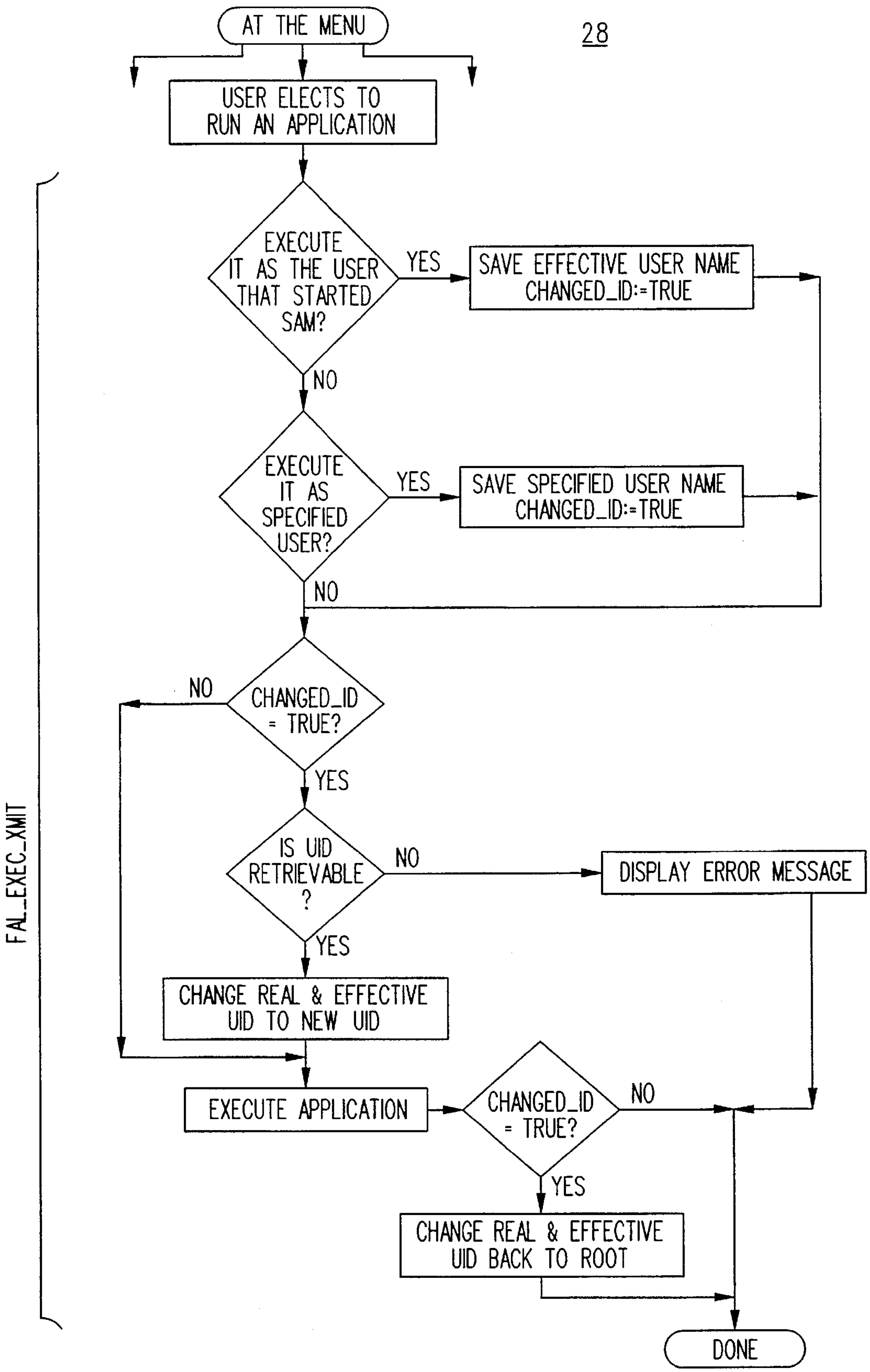
FIG. 3 is a simplified flow chart of how a user having graded restricted access privileges interacts with SAM once the preliminaries of FIG. 2 are over.

FIGURE 3. Set SAM Log Options Task Dialog

2.6.1.1 OK Button Operation

When the OK button is pressed, SAM saves the log options. In 9.X, logging options were saved in environment variables. In 10.0, SAM saves the logging options to the file /var/sam/preferences/app-preference.

2.6.2 Add Custom Group

The Add Custom Group task dialog allows the system administrator to add a new group to SAM's list of areas. This new group appears on the same level that is displayed in the object list screen when the action is selected.

The new group is displayed in the FAL object list screen every time SAM is executed by the superuser. It only appears when non-superusers access SAM if the system administrator gives the user access to a utility in the group.

On a clustered system, SAM only adds the custom group to the system SAM is executed on. In order forthe custom group to be available on all systems in the cluster, the system administrator must add the custom group to the rest of the systems.

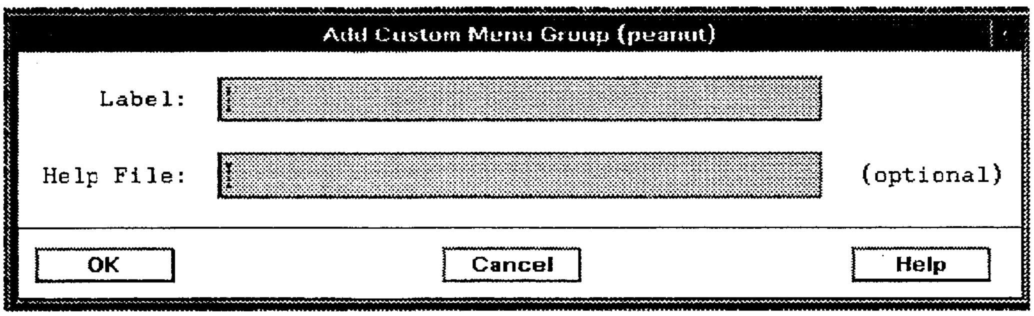

FIGURE 4. Add Custom Group Task Dialog

2.6.2.1 OK Button Operation

When the OK button is pressed, SAM writes the necessary information to the /etc/sam/custom/sam_custom.cu file. The custom utility appears on the object list screen immediately after it is added.

2.6.3 Add Custom Utility

The Add Custom Utility task dialog allows the system administrator to add a custom utility to SAM's list of areas. The new utility appears on the same level that is displayed in the object list screen when the action is selected.

The new utility is displayed in the FAL object list screen every time SAM is executed by the superuser. It only appears when non-superusers access SAM if the system administrator gives the user access to the utility.

On a clustered system, SAM only adds the custom utility to the system SAM is executed on. In order for the custom utility to be available on all systems in the cluster, the system administrator must add the custom utility to the rest of the systems.

The system administrator can specify the user to execute the command as. The choices are root, the user that started SAM, or a specified user.

The system administrator must describe the user interface support for the custom utility. The following table describes how the utility is executed in the various environments.

Table 4: Utility User Interface Options

| User Interface Supports: | Custom Utility Executed on Terminal | Custom Utility Executed in Motif |
|---|---|---|
| Graphical and Terminal Environments | Executes command | Executes command without hpterm |
| Graphical Environment | Not supported | Executes command without hpterm |
| Terminal Environment | Executes command | Executes command in hpterm |

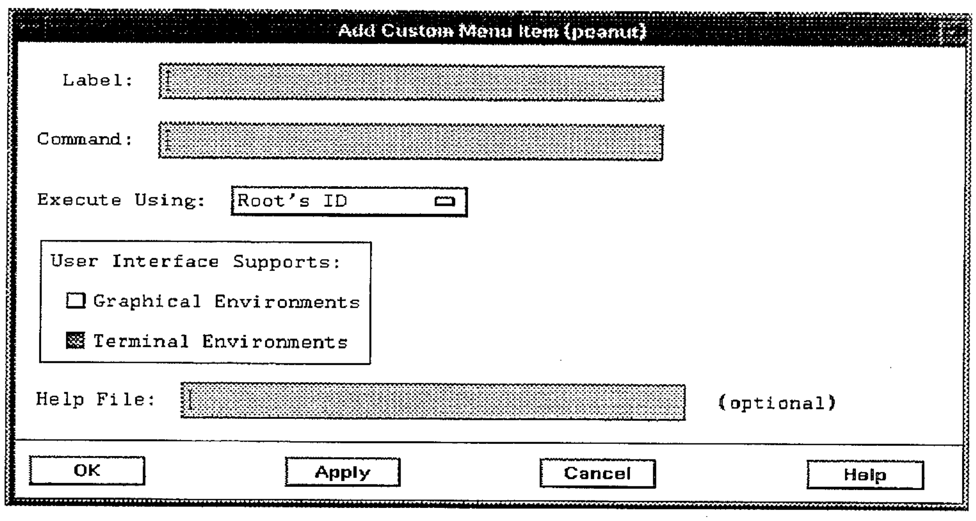

FIGURE 5. Add Custom Utility Task Dialog

2.6.3.1 OK Button Operation

When the OK button is pressed, SAM writes the necessary information to the /etc/sam/custom/sam_custom.cu file. The custom utility appears on the object list screen immediately after it is added.

2.6.4 Modify Custom Group

The Modify a Custom Group task dialog allows the administrator to modify an existing custom group in SAM. Administrators can modify the label, and help.

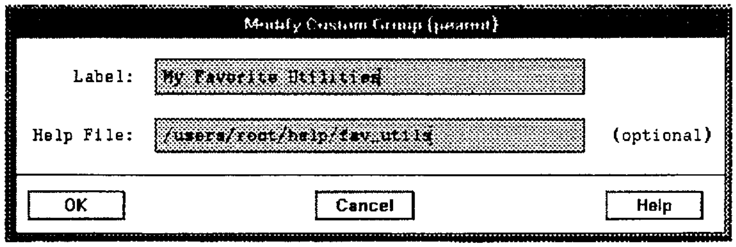

FIGURE 6. Modify Custom Group Task Dialog

2.6.5 Modify Custom Utility

The Modify a Custom Utility task dialog allows the administrator to modify an existing custom utility in SAM. Administrators can modify the label, help, and command that is executed. They can also update the user interface support for the command which affects how the command is executed. See Add Custom Utility on page 15 for details.

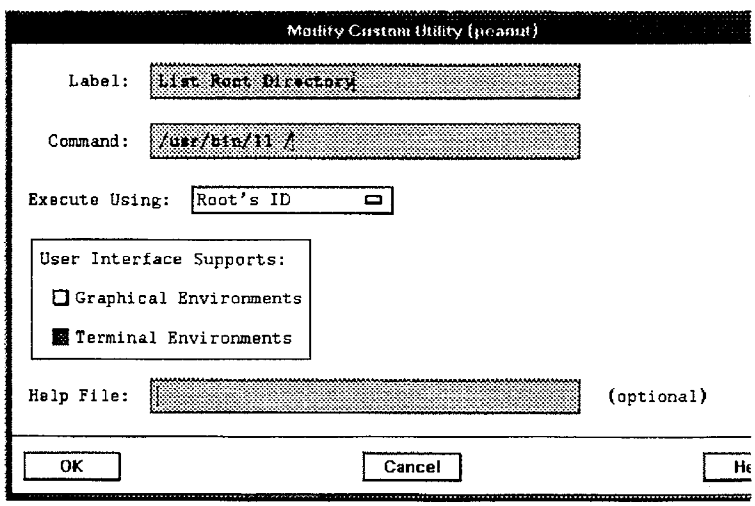

FIGURE 7. Modify Custom Utility Task Dialog

2.6.5.1 OK Button Operation

When the OK button is pressed, SAM removes the old information and writes the new information for this application in /etc/sam/custom/sam_custom.cu.

2.7 FAL Key Decisions

This section gives more explanation behind key decisions of the user interface to the FAL.

2.7.1 Control box vs. FAL

The SAM control box was well received by customers, so why change it for 10.0? There are several reasons why the SAM team decided to abandon the control box and develop the FAL. These reasons include:

- Extensibility -- It would be difficult to extend the control box to allow an interactive user interface for adding/modifying/removing other utilities, much less saving custom views of SAM. Post-10.0, we will explore setting policy information from the FAL as well.
- Maintainability -- The control box was built using Dialog Manager directly, but the SAM team no longer has anyone with Dialog Manager expertise. The FAL is based on ObAM.
- Icons -- In 10.0, the FAL may list SAM's functional areas and other utilities using an iconic representation, which is supported by ObAM. If we remained with the control box, we would have had to implement iconic support ourselves.

2.7.2 Custom Menu Design

Four alternative designs were considered for the custom menu functionality:

- Single subarea, custom view actions & file items appear if allowed
- Separate task dialog for saving a custom menu
- Two subareas, one for executing applications and another for customizing SAM menus
- Use SAM parameter to get Menu Builder, which is separate from the FAL The single subarea alternative was considered the least usable. The distinction between hiding a subarea and removing a custom utility was fuzzy. Also, the customization features seemed to get in the way of the administrator that just wanted to execute SAM's functionality.

The separate task dialog was briefly considered. This approach would have called for one subarea and a new action item for "Creating SAM Menus". This action would have lead to a task dialog where custom menus would be built and saved to a file. It would have required ObAM changes to support double clicking in listboxes so we could navigate hierarchical lists. We would have needed to prototype several alternatives of this task dialog to evaluate which one was the best. This would have required more development time for the FAL then our schedule allowed.

The two subarea approach was confusing. It was difficult to determine what happened when you switched subareas.

We decided to go with a separate Menu Builder & FAL.

Chapter 3 Restricted SAM Builder

3.1 Introduction

This chapter describes the Restricted SAM Builder (RSB), which is accessed by executing SAM with the restricted option (/usr/sbin/sam -r). Like the Functional Area Launcher (FAL), the object list screen contains a hierarchical list of all applications that can be executed from SAM. System administrators can allow non-superusers access to specific SAM areas by building a restricted version of SAM. In the RSB, the system administrator can disable SAM applications and save it for a specified user. The user can then execute SAM and only see the SAM applications that the system administrator gave the user access to. Note that the user is promoted to superuser while executing SAM.

The RSB is closely related to the FAL. It is recommended that the FAL ES chapter be read before reading this chapter.

The table below summarizes the features under consideration for inclusion and indicates their priority.

Table 5: RSB Features

| Feature | Priority | Status |
|---|---|---|
| Save and execute restricted SAM sessions | must | In |
| Allow non-superusers access to restricted SAM sessions via a setuid root executable | high want | In |
| Support iconic view of SAM applications | high want | Opportunistic |
| Support cluster-wide restricted SAM files | want | Opportunistic |
| Support non-superuser access to SAM FAs without promoting the user to superuser | want | Out |

3.2 RSB Object List Screen

This object list screen contains a hierarchical list of all SAM functional areas, customer utilities, and any other utilities. Multiple items can be selected on the object list screen. The columns on the object list screen that are visible by default are listed below:

- Source - lets the system administrator know where the application came from. For SAM functional areas, this is set to "SAM". For customer-added utilities, the source is "Custom". Other HP or third-party applications can set their own source value.
- Area - Describes the type of application or group. If the entry is a group (ie, contains a list of sub-items), then a "->" is appended to the area name.
- Access Status - contains whether the selected item is available. There are four possible states. The item can be enabled, disabled, partial or inaccessible. Items that are enabled when a user's privileges are saved are available when SAM is executed by that user. Items that are disabled do not appear in the FAL when SAM is executed by that user. A group can have a status of "partial" if some of its subitems are enabled and some are disabled. Finally, some applications can be inaccessible if they are deemed unsecure for non-superusers to access (ie, they can get more superuser privileges than expected).

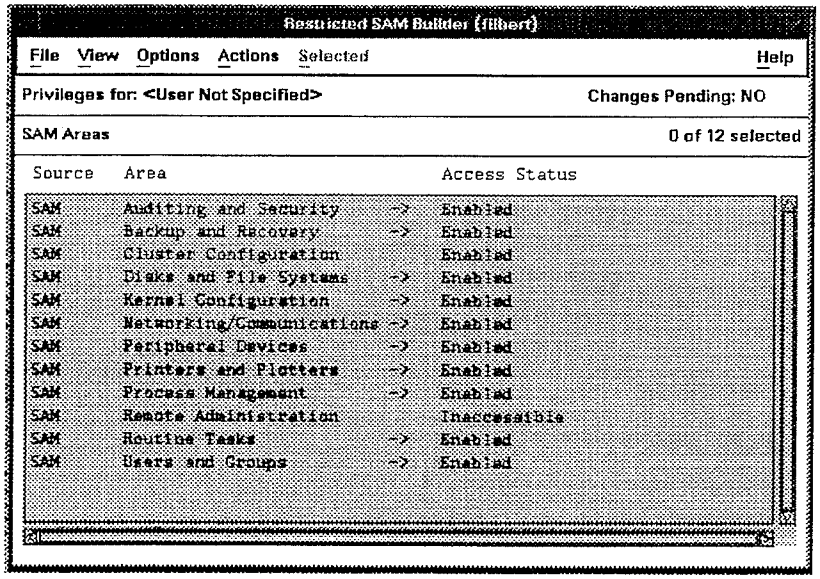

FIGURE 8. RSB Object List Screen

3.3 RSB Initialization

The RSB object list screen is initialized using the same process as the FAL. Refer to the FAL chapter for details. If the -f option is used in conjunction with the -r option (ie, /usr/sbin/sam -r -f <login_name>), then the RSB is displayed and the object list screen is initialized to user <login_name>'s privileges.

3.4 RSB Menus

This section describes the menu items in the RSB. Only menu items unique to the RSB are documented. Menu items that are common across all ObAM applications (ie, Exit in the File Menu) are not documented in this section.

3.4.1 Actions Menu

The Actions menu contains the items listed below. Descriptions of task dialogs that are displayed when a menu item is selected can be found in RSB Task Dialogs on page 22.

| Actions Menu Items | Result |
|---|---|
| Close | action Close |
| Save User Privileges | taskdialog Save User Privileges |
| Edit User Privileges | taskdialog Edit User Privileges |
| Enable All | action Enable All |
| Go to Top Level | action Go to Top Level |

3.4.1.1 Close

Selecting the Close action returns the object list screen to the previous level. This is the same behavior as selecting the Open action on the "..(go up)" item.

3.4.1.2 Enable All

This action resets the object list screen so that all accessible SAM applications are enabled. This is handy if the system administrator is setting up several different users to have SAM privileges. If the system administrator has made any changes that have not been saved, a confirmation message is displayed before enabling all areas.

3.4.1.3 Go to Top Level

This action returns the hierarchical list to the top level. This provides a short-cut for returning to the top of SAM's main menu if the system administrator has navigated several levels down into SAM.

3.4.2 Selected Menu

The Selected menu contains the items listed below.

| Selected Menu Items | Selected Items | Result |
|---|---|---|
| Open | one group | selected Open (default) |
| Zoom | one application | selected Zoom (default) |
| Enable | one/multiple | selected Enable |
| Disable | one/multiple | selected Disable |

3.4.2.1 Open

Selecting the Open action on a group replaces the contents of the object list screen with the subitems stored in the group. If the selected item is "..(go up)", then the Open action returns the object list screen to the previous level. If the user double-clicks on a group, the Open action is performed.

3.4.2.2 Zoom

The Zoom action displays all known information about the selected SAM area. This is the same information that is displayed in the Object List Screen. If the user double-clicks on an application, the Zoom action is performed.

3.4.2.3 Enable

The Enable action is always available. It changes the access status of the selected items to Enabled. If the system administrator selected any disabled or partial groups, SAM confirms enabling all subitems prior to performing the task.

3.4.2.4 Disable

The Disable action is always available. It changes the access status of the selected items to Disabled. If the system administrator selected any enabled or partial groups, SAM confirms disabling all subitems prior to performing the task.

3.5 RSB Task Dialogs

This section describes the task dialogs that are used in the RSB.

3.5.1 Save User Privileges

This task dialog allows the administrator to save the restricted SAM configuration for a specified user. There are two ways to run SAM with this restricted configuration. First, the specified user can execute SAM (/usr/sbin/sam). SAM determines that the user is not superuser and checks if the user has any SAM privileges. If so, SAM executes with only the SAM applications enabled that the user has access to. Note that the user is promoted to superuser while in SAM.The system administrator can force SAM to start with the specified user's restricted privileges by invoking SAM with the -f option (/usr/sbin/sam -f <login_name>.

Note that restricted access to SAM is only available on the system that the user's privileges were saved on in clustered environments. There is no way to create a restricted SAM session for a user and have it automatically available on all systems in a cluster.

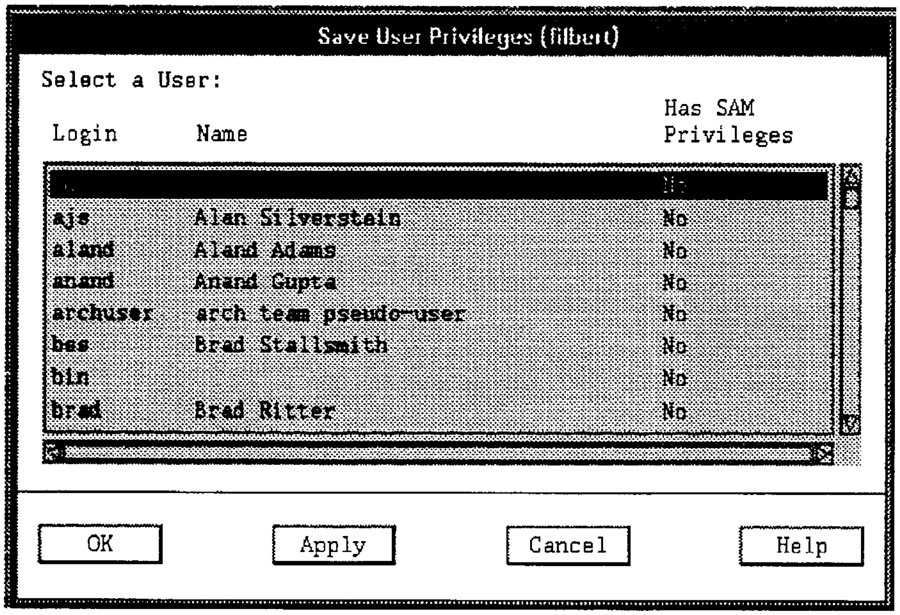

FIGURE 9. Save User Privileges Task Dialog

3.5.1.1 OK Button Operation

When the OK button is pressed, SAM writes the following information about every "enabled" or "partial" item listed in the object list screen to a file:

- The label of the item
- The FAL description file where it is defined
- The last modification time of the FAL description file The file that contains this information is /etc/sam/custom/<login_name>.cf. A file is created for every user with restricted access to SAM. When SAM is invoked with the -f <login_name> option, SAM only allows access to the applications listed in this file. If the specified user does not have any SAM privileges (ie, the file doesn't exist), then an error message is generated and SAM exits immediately. The -f option is only supported for superusers.

If a non-superuser runs SAM, then the user is promoted to superuser while SAM determines (via the real user name) if the user has any SAM privileges. If /etc/sam/custom/<real_username>.cf exists, then SAM's main executable, samx, is invoked with the -f option. This starts SAM with only those applications that the user has access to. Note that the user is promoted to superuser during the duration of the user's SAM session.

If SAM has trouble reading the control file /etc/sam/custom/<login_name>.cf and matching its contents to SAM's list of areas, then SAM checks if the modification time on any of the FAL description files is newer than the time recorded when the control file was last modified. If so, SAM displays an error message that the control file needs to be saved again due to a recent update of SAM.

3.5.2 Edit User Privileges

This task dialog allows the system administrator to edit a user's SAM privileges. All users with restricted access to SAM are listed in the task dialog. The system administrator selects the user they want to edit.

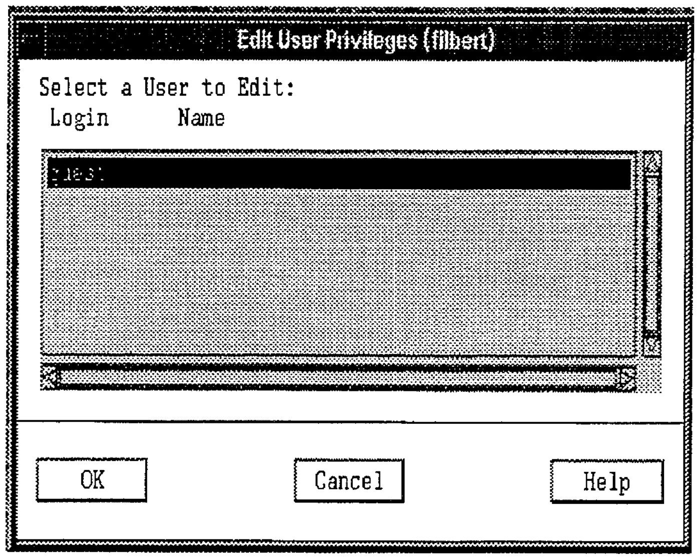

FIGURE 10. Edit User Privileges Task Dialog

3.5.2.1 OK Button Operation

When the OK button is pressed, SAM replaces the object list screen with the information contained in the control file for the selected user. This is just like the initialization process SAM uses when first executed with the -f option. The system administrator can then modify which SAM applications are enabled and disabled.

```
label: Printers and Plotters
parents:
file: /usr/sam/lib/C/sam.cb
time: 768549515
label: File Systems
parents: Disks and File Systems
file: /usr/sam/lib/C/sam.cb
time: 768549515
label: Printers and Plotters
parents: Peripheral Devices
file: /usr/sam/lib/C/sam.cb
time: 768549515
label: Tape Drives
parents: Peripheral Devices
file: /usr/sam/lib/C/sam.cb
time: 768549515
label: File Systems
parents: Peripheral Devices->Disks and File Systems
file: /usr/sam/lib/C/sam.cb
time: 768549515
label: Backup and Recovery
parents:
file: /usr/sam/lib/C/sam.cb
time: 768549515
label: Routine Tasks
parents:
file: /usr/sam/lib/C/sam.cb
time: 768549515
```

APPENDIX III

```
#   $Header: sam.cb,v 72.71 95/04/13 16:57:38 hmgr Exp $

label "Accounts for Users and Groups"
{
    label "Groups"
    icon_path "ug_grps"
    command gui "/usr/sam/lbin/samx -C -p %d -s groups /usr/sam/lib/%%L/ug.ui"
    help "ug/ug.hv:UG-HOME-GROUPS"

    label "Users"
    icon_path "ug_user"
    command gui "/usr/sam/lbin/samx -C -p %d -s users /usr/sam/lib/%%L/ug.ui"
    help "ug/ug.hv:UG-HOME-USERS"

}
icon_path "ug_grp"
help "ug/ug.hv:_hometopic"


label "Auditing and Security"
{
    label "Audited Events"
    pre-condition "/usr/bin/test -x /usr/sbin/audsys"
    icon_path "ts_evts"
    command gui "/usr/sam/lbin/samx -C -p %d -s ts_events /usr/sam/lib/%%L/ts.ui"
    help "ts/ts.hv:TS-HOME-EVENTS"

    label "Audited System Calls"
    pre-condition "/usr/bin/test -x /usr/sbin/audsys"
    icon_path "ts_scal"
    command gui "/usr/sam/lbin/samx -C -p %d -s ts_syscalls /usr/sam/lib/%%L/ts.ui"
    help "ts/ts.hv:TS-HOME-SYSCALLS"

    label "Audited Users"
    pre-condition "/usr/bin/test -x /usr/sbin/audsys"
    icon_path "ts_user"
    command gui "/usr/sam/lbin/samx -C -p %d -s ts_users /usr/sam/lib/%%L/ts.ui"
    help "ts/ts.hv:TS-HOME-USERS"

    label "System Security Policies"
    pre-condition  "/usr/bin/test -x /usr/sbin/audsys"
    icon_path "ts_gscp"
    command gui "/usr/sam/lbin/samx -C -p %d -w ts_gsecp_stepmenu /usr/sam/lib/%%L/
    help "ts/ts.hv:TS-HOME-GlobalSecPolicies"

}
icon_path "ts_grp"
help "ts/ts.hv:_hometopic"


label "Backup and Recovery"
{
    label "Automated Backups"
    icon_path "br_cron"
    command gui "/usr/sam/lbin/samx -C -p %d -s br_sa_autobckups /usr/sam/lib/%%L/b
    help "br/br.hv:BR-HOME-AutomatedBackups"

    label "Interactive Backup and Recovery"
    icon_path "br_devs"
    command gui "/usr/sam/lbin/samx -C -p %d -s br_sa_bdevs /usr/sam/lib/%%L/br.ui"
    help "br/br.hv:BR-HOME-INTERACTIVEBackupRecovery"
}
icon_path "br_grp"
help "br/br.hv:_hometopic"

label "Clusters"
```

```
{
    label "NFS Cluster Configuration"
    icon_path "cl_conf"
    command gui "/usr/sam/lbin/samx -C -p %d /usr/sam/lib/%%L/cl.ui"
    help "cluster/cl.hv:_hometopic"
}
icon_path "cl_grp"
help "cluster/cl.hv:_hometopic"

label "Disks and File Systems"
{
    label "Disk Devices"
    icon_path "fs_devs"
    command gui "/usr/sam/lbin/samx -C -p %d -s fs_sa_disk /usr/sam/lib/%%L/fs.ui"
    help "fs/fs.hv:FS-HOME-DISKS"

    label "File Systems"
    icon_path "fs_fsys"
    command gui "/usr/sam/lbin/samx -C -p %d -s fs_sa_mfs /usr/sam/lib/%%L/fs.ui"
    help "fs/fs.hv:FS-HOME-FILESYS"

    label "Logical Volumes"
    pre-condition "/usr/sam/lbin/fs_is_lvm_inst"
    icon_path "fs_lv"
    command gui "/usr/sam/lbin/samx -C -p %d -s fs_sa_lv /usr/sam/lib/%%L/fs.ui"
    help "fs/fs.hv:FS-HOME-LVOLS"

    label "Swap"
    icon_path "fs_swap"
    command gui "/usr/sam/lbin/samx -C -p %d -s fs_sa_swap /usr/sam/lib/%%L/fs.ui"
    help "fs/fs.hv:FS-HOME-SWAP"

    label "Volume Groups"
    pre-condition "/usr/sam/lbin/fs_is_lvm_inst"
    icon_path "fs_vg"
    command gui "/usr/sam/lbin/samx -C -p %d -s fs_sa_vg /usr/sam/lib/%%L/fs.ui"
    help "fs/fs.hv:FS-HOME-VOLGROUPS"

}
icon_path "fs_grp"
help "fs/fs.hv:_hometopic"


label "Kernel Configuration"
{
    label "Configurable Parameters"
    icon_path "kc_parm"
    command gui "/usr/sam/lbin/samx -C -p %d -s kc_sa_param /usr/sam/lib/%%L/kc.ui"
    help "kc/kc.hv:KC-HOME-ConfParams"

    label "Drivers"
    icon_path "kc_driv"
    command gui "/usr/sam/lbin/samx -C -p %d -s kc_sa_driver /usr/sam/lib/%%L/kc.ui
    help "kc/kc.hv:KC-HOME-Drivers"

    label "Dump Devices"
    icon_path "kc_dump"
    command gui "/usr/sam/lbin/samx -C -p %d -s kc_sa_dump /usr/sam/lib/%%L/kc.ui"
    help "kc/kc.hv:KC-HOME-DumpDevices"

    label "Subsystems"
    icon_path "kc_subs"
    command gui "/usr/sam/lbin/samx -C -p %d -s kc_sa_subsys /usr/sam/lib/%%L/kc.ui
    help "kc/kc.hv:KC-HOME-SubSystems"

}
```

```
icon_path "kc_grp"
help "kc/kc.hv:_hometopic"


label "Networking and Communications"
{
    label "Bootable Devices"
    {
        label "Fixed-Address Devices Booting From this Server"
        icon_path "nnc_bfa"
        command gui "/usr/sam/lbin/samx -C -n -p %d -s bootp_sa_fixed_server /usr/s

        label "DHCP Device Groups Booting From this Server"
        icon_path "nnc_bdg"
        command gui "/usr/sam/lbin/samx -C -n -p %d -s bootp_sa_dhcp_groups /usr/sa

        label "Devices for which Boot Requests are Relayed to Remote Servers"
        icon_path "nnc_bra"
        command gui "/usr/sam/lbin/samx -C -n -p %d -s bootp_sa_bootp_relay /usr/sa
    }
    icon_path "nnc_btd"
    help "nnc/nnc.hv:CB-NC-DEVCON-BOOTP"

    label "Internet Addresses"
    icon_path "nnc_adr"
    command gui "/usr/sam/lbin/samx -C -n -p %d -s nnc_sa_internet_connect /usr/sam
    help "nnc/nnc.hv:CB-NC-RSCON-IC"

    label "Networked File Systems"
    {
        label "Exported Local File Systems"
        pre-condition "/usr/bin/test -x /usr/sbin/nfsd && /usr/bin/test -x /usr/sbi
        icon_path "nnc_nfl"
        command gui "/usr/sam/lbin/samx -C -p %d -s nfs_server /usr/sam/lib/%%L/nfs
        help "nnc/nnc.hv:CB-NC-NFS-LOC"

        label "Mounted Remote File Systems"
        pre-condition "/usr/bin/test -x /usr/sbin/nfsd && /usr/bin/test -x /usr/sbi
        icon_path "nnc_nfr"
        command gui "/usr/sam/lbin/samx -C -p %d -s nfs_client /usr/sam/lib/%%L/nfs
        help "nnc/nnc.hv:CB-NC-NFS-REM"

    }
    icon_path "nnc_ngp"
    help "nnc/nnc.hv:CB-NC-NFS"

    label "Network Interface Cards"
    icon_path "nnc_cds"
    command gui "/usr/sam/lbin/samx -C -n -p %d -s nia /usr/sam/lib/%%L/nia.ui"
    help "nnc/nnc.hv:CB-NC-NETCONF"

    label "Network News"
    {
       label "Incoming Newsfeeds"
       pre-condition "/usr/bin/test -x /usr/local/news/bin/getlist"
       command gui "/usr/sam/lbin/samx -C -p %d -s NNTP_Incoming_Sources /usr/sam/l

       label "Outgoing Newsfeeds"
       pre-condition "/usr/bin/test -x /usr/local/news/bin/getlist"
       command gui "/usr/sam/lbin/samx -C -p %d -s NNTP_Outgoing_Sources /usr/sam/l

    }

    label "Network Information Service"
    command gui "/usr/sam/lbin/samx -C -n -p %d /usr/sam/lib/%%L/nis.ui"
```

```
    help "nnc/nnc.hv:CB-NC-SERV"

    label "Network Services"
    icon_path "nnc_srv"
    command gui "/usr/sam/lbin/samx -C -n -p %d -s nnc_sa_srv_status /usr/sam/lib/%
    help "nnc/nnc.hv:CB-NC-SERV"

    label "System Access"
    {
        label "Internet Services"
        icon_path "nnc_ais"
        command gui "/usr/sam/lbin/samx -C -p %d -s services /usr/sam/lib/%%L/secur
        help "nnc/nnc.hv:CB-NC-SEC-NET"

        label "Remote Logins"
        promote_access false
        icon_path "nnc_arl"
        command gui "/usr/sam/lbin/samx -C -p %d -s remote_login /usr/sam/lib/%%L/s
        help "nnc/nnc.hv:CB-NC-SEC-RLOGIN"

    }
    icon_path "nnc_agp"
    help "nnc/nnc.hv:NNC-HOME-SECURITY"

    label "UUCP"
    {
        label "UUCP Devices"
        icon_path "uu_devs"
        command gui "/usr/sam/lbin/samx -C -p %d -s uu_sa_devices /usr/sam/lib/%%L/
        help "uucp/uucp.hv:UUCP-HOME-DEV"

        label "UUCP Remote Systems"
        icon_path "uu_sys"
        command gui "/usr/sam/lbin/samx -C -p %d -s uu_sa_systems /usr/sam/lib/%%L/
        help "uucp/uucp.hv:UUCP-HOME-REMSYS"

    }
    icon_path "uu_grp"
    help "uucp/uucp.hv:_hometopic"

}
icon_path "nnc_grp"
help "nnc/nnc.hv:_hometopic"


label "Peripheral Devices"
{
    label "Cards"
    icon_path "pd_card"
    command gui "/usr/sam/lbin/samx -C -p %d /usr/sam/lib/%%L/pd.cards.ui"
    help "pd/pd.hv:PD-HOME-CARDS"

    label "Device List"
    icon_path "pd_devs"
    command gui "/usr/sam/lbin/samx -C -p %d /usr/sam/lib/%%L/pd.syshw.ui"
    help "pd/pd.hv:PD-HOME-DEVLIST"


    label "Disks and File Systems"
    {
        label "Disk Devices"
        icon_path "fs_devs"
        command gui "/usr/sam/lbin/samx -C -p %d -s fs_sa_disk /usr/sam/lib/%%L/fs.
        help "fs/fs.hv:FS-HOME-DISKS"

        label "File Systems"
```

```
    icon_path "fs_fsys"
    command gui "/usr/sam/lbin/samx -C -p %d -s fs_sa_mfs /usr/sam/lib/%%L/fs.u
    help "fs/fs.hv:FS-HOME-FILESYS"

    label "Logical Volumes"
    pre-condition "/usr/sam/lbin/fs_is_lvm_inst"
    icon_path "fs_lv"
    command gui "/usr/sam/lbin/samx -C -p %d -s fs_sa_lv /usr/sam/lib/%%L/fs.ui
    help "fs/fs.hv:FS-HOME-LVOLS"


    label "Swap"
    icon_path "fs_swap"
    command gui "/usr/sam/lbin/samx -C -p %d -s fs_sa_swap /usr/sam/lib/%%L/fs.
    help "fs/fs.hv:FS-HOME-SWAP"

    label "Volume Groups"
    pre-condition "/usr/sam/lbin/fs_is_lvm_inst"
    icon_path "fs_vg"
    command gui "/usr/sam/lbin/samx -C -p %d -s fs_sa_vg /usr/sam/lib/%%L/fs.ui
    help "fs/fs.hv:FS-HOME-VOLGROUPS"

}
icon_path "fs_grp"
help "fs/fs.hv:_hometopic"

label "Instruments"
pre-condition "/usr/sam/lbin/pd_instr0"
icon_path "pd_inst"
command gui "/usr/sam/lbin/samx -C -p %d /usr/sam/lib/%%L/pd.insts.ui"
help "pd/pd.hv:PD-HOME-INSTR"


label "Printers and Plotters"
{
    label "Print Requests"
    icon_path "lp_reqs"
    command gui "/usr/sam/lbin/samx -C -p %d -s lp_requests /usr/sam/lib/%%L/lp
    help "lp/lp.hv:LP-HOME-PrintRequests"

    label "Printers and Plotters"
    icon_path "lp_devs"
    command gui "/usr/sam/lbin/samx -C -p %d -s lp_printers /usr/sam/lib/%%L/lp
    help "lp/lp.hv:LP-HOME-PrintPlot"

    label "Save/Restore Spooler Configuration"
    icon_path "lp_conf"
    command gui "/usr/sam/lbin/samx -C -p %d -s lp_state /usr/sam/lib/%%L/lp.ui
    help "lp/lp.hv:LP-HOME-SpoolConfiguration"

}
icon_path "lp_grp"
help "lp/lp.hv:_hometopic"

label "Tape Drives"
icon_path "pd_tape"
command gui "/usr/sam/lbin/samx -C -p %d /usr/sam/lib/%%L/pd.tapes.ui"
help "pd/pd.hv:PD-HOME-TAPES"

label "Terminals and Modems"
icon_path "tm_devs"
command gui "/usr/sam/lbin/samx -C -p %d /usr/sam/lib/%%L/tm.ui"
help "pd/pd.hv:PD-HOME-TERMOD"


label "Uninterruptable Power Supplies"
```

```
    pre-condition "/usr/sam/lbin/pd_is_ups_inst"
    icon_path "pd_ups"
    command gui "/usr/sam/lbin/samx -C -p %d /usr/sam/lib/%%L/pd.ups.ui"
    help "pd/pd.hv:PD-HOME-UPS"

}
icon_path "pd_grp"
help "pd/pd.hv:_hometopic"


label "Printers and Plotters"
{
    label "Print Requests"
    icon_path "lp_reqs"
    command gui "/usr/sam/lbin/samx -C -p %d -s lp_requests /usr/sam/lib/%%L/lp.ui"
    help "lp/lp.hv:LP-HOME-PrintRequests"


    label "Printers and Plotters"
    icon_path "lp_devs"
    command gui "/usr/sam/lbin/samx -C -p %d -s lp_printers /usr/sam/lib/%%L/lp.ui"
    help "lp/lp.hv:LP-HOME-PrintPlot"

    label "Save/Restore Spooler Configuration"
    icon_path "lp_conf"
    command gui "/usr/sam/lbin/samx -C -p %d -s lp_state /usr/sam/lib/%%L/lp.ui"
    help "lp/lp.hv:LP-HOME-SpoolConfiguration"

}
icon_path "lp_grp"
help "lp/lp.hv:_hometopic"


label "Process Management"
{
    label "Process Control"
    icon_path "pm_proc"
    command gui "/usr/sam/lbin/samx -C -p %d -s pm_sa_control /usr/sam/lib/%%L/pm.u
    help "pm/pm.hv:PM-HOME-PROC"

    label "Scheduled Cron Jobs"
    promote_access false
    icon_path "pm_cron"
    command gui "/usr/sam/lbin/samx -C -p %d -s pm_sa_cron /usr/sam/lib/%%L/pm.ui"
    help "pm/pm.hv:PM-HOME-SCHED"

}
icon_path "pm_grp"
help "pm/pm.hv:_hometopic"


label "Routine Tasks"
{
    label "Backup and Recovery"
    {
        label "Automated Backups"
        icon_path "br_cron"
        command gui "/usr/sam/lbin/samx -C -p %d -s br_sa_autobckups /usr/sam/lib/%
        help "br/br.hv:BR-HOME-AutomatedBackups"

        label "Interactive Backup and Recovery"
        icon_path "br_devs"
        command gui "/usr/sam/lbin/samx -C -p %d -s br_sa_bdevs /usr/sam/lib/%%L/br
        help "br/br.hv:BR-HOME-InteractiveBackupRecovery"
    }
    icon_path "br_grp"
```

```
    help "br/br.hv:_hometopic"

    label "Selective File Removal"
    icon_path "rt_frem"
    command gui "/usr/sam/lbin/samx -C -p %d -s rt_sa_big /usr/sam/lib/%%L/rt.ui"
    help "rt/rt.hv:RT-HOME-SelectiveFileRemoval"


    label "System Log Files"
    icon_path "rt_logs"
    command gui "/usr/sam/lbin/samx -C -p %d -s rt_sa_log_files /usr/sam/lib/%%L/rt
    help "rt/rt.hv:RT-HOME-SystemLogFiles"

    label "System Shutdown"
    icon_path "rt_shut"
    command gui "/usr/sam/lbin/samx -C -p %d /usr/sam/lib/%%L/rt_restart.ui"
    help "rt/rt.hv:RT-HOME-SystemShutdown"

}
icon_path "rt_grp"
help "rt/rt.hv:_hometopic"


label "Run SAM on Remote Systems"
promote_access false
icon_path "ra_admn"
command gui "/usr/sam/lbin/samx -C -p %d /usr/sam/lib/%%L/ra.ui"
help "ra/ra.hv:_hometopic"


label "Time"
{

    label "System Clock"
    icon_path "tim_clk"
    command gui "/usr/sam/lbin/samx -C -p %d -w xntp_set_time_td /usr/sam/lib/%%L/x
    help "nnc/nnc.hv:XNTP-Set-System-Clock"

    label "NTP Broadcasting"
    icon_path "tim_brd"
    command gui "/usr/sam/lbin/samx -C -p %d -s XNTP_Broadcast_Sources /usr/sam/lib
    help "nnc/nnc.hv:NTP-Broadcast-Sources"

    label "NTP Network Time Sources"
    icon_path "tim_src"
    command gui "/usr/sam/lbin/samx -C -p %d -s XNTP_Peer_Server_Sources /usr/sam/l
    help "nnc/nnc.hv:XNTP-Peer-Server-Sources"

}
icon_path "tim_grp"
help "nnc/nnc.hv:CB-XNTP"
```

```
#!/usr/bin/sh
# @(#) $Revision: 72.33 $

###############################################################################
# (c)Copyright 1986-1992 Hewlett-Packard Co.
#
#                         RESTRICTED RIGHTS LEGEND
# Use, duplication, or disclosure by the U.S. Government is subject to
# restrictions as set forth in sub-paragraph (c)(1)(ii) of the Rights in
# Technical Data and Computer Software clause in DFARS 252.227-7013.
#
#                         Hewlett-Packard Company
#                         3000 Hanover Street
#                         Palo Alto, CA 94304 U.S.A.
#
# Rights for non-DOD U.S. Government Departments and Agencies are as set
# forth in FAR 52.227-19(c)(1,2).
###############################################################################

###############################################################################
#
# Description:   This script sets up environment variables needed by SAM
#                executables.
#
###############################################################################
# SAMROOT
#
# The SAMROOT and PATH environment variable tells SAM executables where to
# find data and other sub-executables.
#
###############################################################################

###############################################################################
# Until SAM is globalized set the LANG variable to "C".
#
LANG=C
export LANG

###############################################################################
# Now check if the user has an effective user id of superuser.  If not,
# we will need to execute rsam instead of samx.  rsam will enable only
# those privileges that the user has been given.
#
user_name=`id -nu`
if [ "$user_name" = "root" ]
then
    user_is_root=true
else
    user_is_root=false
fi

# Parse options. Check to see whether sam main menu should be called
# or just one of the functional area's menu.  Note that the options
# that are allowed are different for non-superusers and superusers.
#
ui_file=""
sam_main=true
wopt=""
sopt=""
fopt=""
rsb=false

if [ $user_is_root = true ]
then
    # This is a root user.  Parse the options that superuser is allowed
    # access to.
    #
    for i in $*; do
        case $i in
            -w)         wopt="-w $2"; shift 2;;
            -s)         sopt="-s $2"; shift 2;;
            -u)         ui_file=$2; sam_main=false; shift 2;;
            -display)   DISPLAY=$2; export DISPLAY; shift 2;;
            -r)         rsb=true; shift 1;;
            -f)         fopt="-f $2"; shift 2;;
            -*)         echo "illegal option: " $i; exit 1;;
        esac
    done

    if [ $sam_main = false ]
    then
        # If the -r option is given with a description file, give an error
        # message.  The Restricted SAM Builder cannot be executed using an
        # FA's description file.
        if [ $rsb = true ]
        then
            echo "Cannot use the -r and -u options at the same time."
            exit 1
        fi

        # If the -f option is given with a description file, give an error
        # message.  A restricted file can only be specified when running SAM
        # main.
        if [ -n "$fopt" ]
        then
            echo "Cannot use the -f and -u options at the same time."
            exit 1
        fi
    fi
else
    # This is a non-superuser.  Parse the options that non-superusers have
    # access to.
    #
    for i in $*; do
        case $i in
            -display)   DISPLAY=$2; export DISPLAY; shift 2;;
            -*)         echo "illegal option: " $i; exit 1;;
        esac
    done
fi

###############################################################################
# Force SAMROOT to /

SAMROOT=/
export SAMROOT

# Be sure log directory exists and is writable by root

logdir=/var/sam/log
if [ ! -d $logdir ]
then
    mkdir $logdir
    if [ $? != 0 ]
    then
        echo "$0: Couldn't make log directory: $logdir"
        echo "Cannot continue until this problem has been resolved."
        echo "Please resolve the problem and re-invoke $0."
        exit 1
    else
        chmod 775 $logdir
        chgrp bin $logdir
```

APPENDIX IV

```
        chown bin $logdir
    fi
fi

#
# Set up all environment variables and execute sam.
#
PATH=/usr/sam/lbin:/usr/sam/bin:/usr/bin:/usr/sbin:/sbin
export PATH

#
# Tell ps to display information in standard format even if fair share
# scheduler is running
#

FSS_PSBEHAVIOR=standard
export FSS_PSBEHAVIOR

if $sam_main
then
    #
    # Display SAM welcome screen. It will kill itself after the first
    # SAM screen appears or if a timeout limit is exceeded.
    # /usr/sam/lib/X11/app-defaults/Sam has a resource (welcome.limit)
    # that sets this time limit value.  If set to 0 the welcome screen
    # will not appear at all.
    #
    # When sxpm is run on a non-graphics display it will fail and
    # attempt to dump core.  We don't care that it won't work in these
    # situations but the core file and the time it takes to dump it is
    # not nice.  To avoid creating a core file a directory named core is
    # temporarily created.
    #
    # The trap commands are set up so that the welcome screen will be
    # killed if the "sam" command is killed or exits normally.
    #
    WELCOME=/usr/sam/help/C/graphics/welcome.pm.Z
    save_dir=`pwd`
    cd /var/sam
    rm -f core
    mkdir core
    sysname=`uname -n`
    /usr/sam/lbin/sxpm $WELCOME $sysname >/dev/null 2>&1 &
    welcome_proc=$!
    trap "kill $welcome_proc >/dev/null 2>&1; rmdir /var/sam/core >/dev/null 2>&1; tr
    trap "kill $welcome_proc >/dev/null 2>&1; rmdir /var/sam/core >/dev/null 2>&1; tr
    cd $save_dir

    if [ $rsb = true ]
    then
        samx $fopt /usr/sam/lib/%L/fal_custom.ui
    else
        if [ $user_is_root = true ]
        then
            samx $fopt /usr/sam/lib/%L/fal.ui
        else
            rsam
            if [ $? != 0 ]
            then
                samx $fopt /usr/sam/lib/%L/fal.ui
            fi
        fi
    fi
else
    samx $wopt $sopt $ui_file
fi
```

```
# @(#) $Header: makefile,v 72.2 93/11/02 14:48:39 hmgr Exp $

FAROOT=.

include defs.mk

SUBDIRS=        data tasks ui util

include ../make/dir.mk

#
# Lint related rules.
#
lint:   needed_lint_libs
        $(SAM)/tool/run.lint $(LINTOPTS1) $(LINTSRCS1) $(LINTDIR)/*.ln

needed_lint_libs:
        @for i in $(NEEDED_LINT_LIBS) ; do \
                cd $(SAM)/$$i ; make lintlib ; cd $(PWD); \
        done
```

```
# @(#) $Header: makefile,v 72.1 93/12/16 11:19:32 hmgr Exp $

FAROOT=..

include $(FAROOT)/defs.mk

COMOBJS=        $(OBJDIR)/fal_utils.o \
                $(OBJDIR)/fal_tasks.o \
                $(OBJDIR)/fal_ui.o

LIBS1=          $(HPDATA)/fal/fal.sl

LIBOBJS1=       $(COMOBJS)

ALL=    $(LIBS1)

include $(SAM)/make/rules.mk
```

```
/* @(#) $Header: fal_defs.h,v 72.43.1.1 95/04/10 18:18:04 hmgr Exp $  */

/*******************************************************************************
 *
 * Description:   Necessary definitions for the functional area launcher.
 *
 * Owner:         Tammy Heiserman
 *
 ******************************************************************************/

#ifndef _CONTROLBOX_INCLUDED
#define _CONTROLBOX_INCLUDED

#define DATA_FILE               "/usr/sam/lib/C/sam.cb"
#define SAM_UI_PATH             "/usr/sam/lib/C/sam.ui"
#define FAL_CUSTOM_FILE         "/etc/sam/sam_custom.cu"
#define FAL_CUSTOM_FILE_BACKUP  "/etc/sam/#sam_custom.cu"

#define FAL_WORKSPACE_DIR       "/var/sam/lock"
#define FAL_WORKSPACE           "/var/sam/lock/"


/* The FAL assumes that all files written to /etc/sam/custom are
 * SAM control files.  No one else should be placing files in this
 * directory!
 */
#define FAL_CONTROL_FILE_DIR    "/etc/sam/custom"
#define FAL_DEFAULT_CF          "/etc/sam/custom/sam_operator"


/* This is the help tag for the "Go up..." item in hierarchical lists.
 * The help callback routine needs to return this string if this item
 * is selected.
 */
#define FAL_OBAM_HELP_CLOSE     "ui/ui.hv:ACTIONS-CLOSE"


/* This string is used to name a string object on the handle in the
 * callback fal_remove_xmit()
 */
#define FAL_NN_IS_PARENT_CUSTOM         "FAL_NN_IS_PARENT_CUSTOM"

#define MAXLINE         80
#define CB_MAXCMDLEN    4096
#define CB_MAXLABEL     512

#define FAL_INVALID     -1
#define FAL_MAX_MSGSTRS  2

/* Help ID used for ou menu item
 */
#define OU_HELP_ID      "ui/cb.hv:CB-OTHER-UTIL"

/* The following lines define characters that are necessary to
 * parse the FAL description files.
 */
#define QUOTE    '"'
#define ESCAPE   '\\'           /* also used as EXTEND if last char on line */
#define COMMENT '#'
#define NEWLINE '\n'
#define NULCHAR '\0'
#define GROUNDED '/'
#define OPEN_SUB '{'
#define CLOSE_SUB '}'

#define IN_SPACE        0
#define IN_LABEL        1
#define IN_CMD          2
#define IN_HELP         3
#define IN_COMMENT      4

#define FAL__USER       "_user"
#define FAL_NULL_STR    ""

/* The following are pre-fixes used in writing control files.  They
 * need not be localized since they are not user visible.
 */
#define FAL_RSB_LABEL           "label: "
#define FAL_RSB_PARENTS         "parents: "
#define FAL_RSB_FILE            "file: "
#define FAL_RSB_TIME            "time: "
#define FAL_RSB_COMMENT         "comment: "

/*
 * Menu item types
 */
#define CB_TYPE         0
#define OU_TYPE         1
#define CU_TYPE         2

/* status types
 */
#define FAL_ENABLE_NUM   0
#define FAL_PARTIAL_NUM  1
#define FAL_DISABLE_NUM  2
#define FAL_INACCESS_NUM 3

/* allow command results
 */
#define FAL_UNKNOWN     0
#define FAL_ALLOWED     1
#define FAL_NOT_ALLOWED 2

/* This is the data structure where functional area information
 * is kept.  It also stores other utility information.
 */
typedef struct _fal_menuitem
{
    char    *source;
    char    *label;
    char    *cmd;
    char    *allow_cmd;
    char    *filename;
    char    *help;
    char    *icon_path;
    char    *execute_as;
    int     hpterm;
    int     type;
    int     status;
    int     gui_only;
    int     promote_access;
    int     terminal_pause;
    int     allow_cmd_results;
    unsigned int group;
} fal_menuitem, *fal_menuitem_ptr;

typedef struct _fal_area_tree
{
    fal_menuitem data;
    struct  _fal_area_tree *parent;
    struct  _fal_area_tree *first_child;
    struct  _fal_area_tree *last_child;
```

```
    struct  _fal_area_tree *sibling;
}  fal_area_tree, *fal_area_tree_ptr;

extern fal_area_tree_ptr fal_new_menuitem();


/* actions on the functional area launcher OLE
 */
#define FAL_ACT_ADD_GROUP         "fal_act_add_group"
#define FAL_ACT_ADD_UTILITY       "fal_act_add_utility"
#define FAL_ACT_MODIFY            "fal_act_modify"
#define FAL_ACT_REMOVE            "fal_act_remove"


/* attributes on functional area launcher OLE
 */
#define FAL_OLE_NAME     "fal_ole"
#define FAL_LEVEL_NAME   "fal_menuitem_tbl"

#define FAL_AT_SOURCE    "fal_at_source"
#define FAL_AT_LABEL     "fal_at_label"
#define FAL_AT_STATUS    "fal_at_status"
#define FAL_AT_KEY       "fal_at_key"


/* status line on restricted SAM builder OLE
 */
#define FAL_STATUS_USER           "fal_status_user"
#define FAL_STATUS_CHANGES        "fal_status_changes"


/* task dialogs used in the FAL
 */
#define FAL_MODIFY_GROUP_TD       "fal_modify_group_td"
#define FAL_MODIFY_UTILITY_TD     "fal_modify_utility_td"
#define FAL_EDIT_TD               "fal_edit_td"
#define FAL_SAVE_TD               "fal_save_td"
#define FAL_SAVE_UNLISTED_TD      "fal_save_unlisted_td"


/* fields in functional area launcher task dialogs
 */
#define FAL_SL_GUI                "fal_sl_gui"
#define FAL_TE_CMD                "fal_te_cmd"
#define FAL_TE_ACMD               "fal_te_acmd"
#define FAL_TE_LABEL              "fal_te_label"
#define FAL_TE_HELP               "fal_te_help"
#define FAL_TE_ICON               "fal_te_icon"

#define FAL_LOGOPTS_TE_SIZE       "fal_logopts_te_size"
#define FAL_LOGOPTS_SL_TRIMWHEN "fal_logopts_sl_trimwhen"
#define FAL_LOGOPTS_TG_VLOG       "fal_logopts_tg_vlog"

#define FAL_SL_USERS              "fal_sl_users"
#define FAL_AT_LOGIN              "fal_at_login"
#define FAL_AT_NAME               "fal_at_name"
#define FAL_AT_RESTRICTED         "fal_at_restricted"
#define FAL_AT_COMMENT            "fal_at_comment"
#define FAL_SAVE_TE_COMMENT       "fal_save_te_comment"
#define FAL_SAVE_TE_USER          "fal_save_te_user"
#define FAL_SL_ID                 "fal_sl_id"
#define FAL_TE_ID                 "fal_te_id"
#define FAL_LOGIN_AT_LOGIN        "fal_login_at_login"
#define FAL_LOGIN_AT_NAME         "fal_login_at_name"

/* Task manager calls
 */
#define FAL_EXEC_PRE_CONDITION  "FAL_EXEC_PRE_CONDITION"
#define FAL_ADD_CU              "FAL_ADD_CU"
#define FAL_MODIFY_CU           "FAL_MODIFY_CU"
#define FAL_REMOVE_CU           "FAL_REMOVE_CU"
#define FAL_VALIDATE_FILE       "FAL_VALIDATE_FILE"
#define FAL_SAVE_CONTROL_FILE   "FAL_SAVE_CONTROL_FILE"
#define FAL_READ_CONTROL_FILE   "FAL_READ_CONTROL_FILE"
#define FAL_GET_MODTIME         "FAL_GET_MODTIME"
#define FAL_GET_PUSERS          "FAL_GET_PUSERS"
#define FAL_IS_MUL_SAMS         "FAL_IS_MUL_SAMS"
#define FAL_GET_UID             "FAL_GET_UID"
#define FAL_CHECK_FOR_INSTALL   "FAL_CHECK_FOR_INSTALL"
#define FAL_GET_WHAT_STRING     "FAL_GET_WHAT_STRING"


/* Yoda definitions
 */
#define FAL_CU                  "FAL_CU"
#define FAL_CU_LABEL            "FAL_CU_LABEL"
#define FAL_CU_OLD_LABEL        "FAL_CU_OLD_LABEL"
#define FAL_CU_HPTERM           "FAL_CU_HPTERM"
#define FAL_CU_CMD              "FAL_CU_CMD"
#define FAL_CU_HELP             "FAL_CU_HELP"
#define FAL_CU_HASSUBMENUS      "FAL_CU_HASSUBMENUS"
#define FAL_CU_GUI_ONLY         "FAL_CU_GUI_ONLY"
#define FAL_CU_EXEC_AS          "FAL_CU_EXEC_AS"
#define FAL_CU_ICON             "FAL_CU_ICON"

#define FAL_CONTROL                     "FAL_CONTROL"
#define FAL_CONTROL_LABEL               "FAL_CONTROL_LABEL"
#define FAL_CONTROL_PARENTS             "FAL_CONTROL_PARENTS"
#define FAL_CONTROL_MODTIME             "FAL_CONTROL_MODTIME"
#define FAL_CONTROL_DESC_FILE           "FAL_CONTROL_DESC_FILE"

#endif /* _CONTROLBOX_INCLUDED */
```

```
/* @(#) $Header: fal_errmsg.h,v 72.56.1.1 95/04/10 18:18:06 hmgr Exp $        */

/****************************************
 * The following defines are error messages
 *
 ****************************************/
#define FAL_ERR_CREATE_CUSTOM_SAM_CU    "Could not create the file \"%s\", \
which means your custom application or group could not be added to \
SAM.  SAM stores all custom applications and groups in this file.  The error \
was: %s"

#define FAL_ERR_EDIT_CUSTOM_SAM_CU      "Could not edit the file \"%s\", \
which means your custom application or group could not be added to \
SAM.  SAM stores all custom applications and groups in this file."

#define FAL_ERR_RM_OPEN_CUSTOM_SAM_CU   "Could not open the file \"%s\", \
which means your custom application  or group could not be removed from SAM.  \
SAM stores all custom applications and groups in this file."

#define FAL_ERR_MOD_OPEN_CUSTOM_SAM     "Could not open the file \"%s\", \
which means the custom application or group could not be modified.  \
SAM stores all custom applications and groups in this file."

#define FAL_ERR_RM_CUSTOM_SAM_CU        "Could not locate the item \"%s\" \
in the file \"%s\".  All custom applications and groups are defined in this \
file.  This error can occur if the file was edited after starting SAM.  In \
this case, the item may have been removed from SAM manually."

#define FAL_ERR_RM_CANT_FIND_PARENT     "Could not locate the \
group \"%s\" in the file \"%s\".  This group is a parent of the item being \
removed.  SAM must find all parent groups in the file before the item \
can be removed.  This error can occur if the file was edited after starting \
SAM.  In this case, the item may have been removed from SAM manually."

#define FAL_ERR_MOD_CANT_FIND_PARENT    "Could not locate the group \
\"%s\" in the file \"%s\".  This group is a parent of the item being \
modified.  SAM must find all parent groups in the file before the \
item can be modified.  This error can occur if the file was edited after \
starting SAM.  In this case, the item may have been removed from SAM manually."

#define FAL_ERR_PARSE_FAIL              "Could not parse the file \"%s\", \
which contains applications to be listed in SAM.  All remaining \
entries in this file after the parsing error have been ignored.  \
The parsing error was:\n\nAt or near line %d, token \"%s\" is unexpected \
(need something else first)."

#define FAL_ERR_OUT_OF_MEMORY           "Could not continue initializing \
SAM because this system is out of memory.  The error occurred in the \
routine \"%s\"."

#define FAL_ERR_CMD_NOT_GROUNDED        "The command \"%s\" in the file \
\"%s\" does not begin with a \"/\".  SAM is unable to initialize the list \
of areas until this command contains the full path name."

#define FAL_ERR_CANT_READ_FILE          "Could not read the file \"%s\".  The \
entries in this file will not appear in SAM's list of areas."

#define FAL_ERR_CANT_REMOVE_NONEMPTY_GROUPS    "The application group \
\"%s\" cannot be removed from SAM because it is not empty.  To remove this \
group, first remove all items within the group."

#define FAL_ERR_LABEL_ALREADY_USED      "The label \"%s\" has been used for \
another item in this group.  Please input a unique label."

#define FAL_ERR_CMD_ENOENT      "The command \"%s\" does not exist on this \
system.  Please input a command that exists and is executable."

#define FAL_ERR_CMD_NOT_EXEC    "The command \"%s\" is not executable.  Please \
input a command that exists and is executable."

#define FAL_ERR_CMD_BEGIN_SLASH "The command \"%s\" does not begin with a \
\"/\".  Please enter a command using the full path name."

#define FAL_ERR_CMD_IS_DIR      "The command \"%s\" is a directory.  Please \
input an executable command."

#define FAL_ERR_MOD_NO_CHANGES  "No changes have been made."

#define FAL_ERR_MUST_BE_ROOT    "Sorry, you must have superuser (root) \
privilege to enter SAM."

#define LOGOPTS_XMIT_MODPREF_FAILED  "The malloc() routine, used to allocate dynamic

#define LOG_TE_SIZE_VAL_INVALID  "The minimum log file size that may be specified is

#define FAL_ERR_FILE_REGULAR    "The file \"%s\" is a regular file."

#define FAL_ERR_FILE_DIR        "The file \"%s\" is a directory."

#define FAL_ERR_FILE_SPECIAL    "The file \"%s\" is a character special file."

#define FAL_ERR_USERFILE_NEXIST         "The file \"%s\" does not exist."

#define FAL_ERR_FILENAME        "A component of the file \"%s\" does not \
exist or is incorrect.  Make sure that the directory \"/etc/sam/custom\" \
exists."

#define FAL_ERR_CONTROL_FILE_DIR        "Could not create the directory \
\"%s\".  This directory is where all control files are saved.  Without this \
directory, it is not possible to save a user's SAM privileges.  The \
error was: %s"

#define FAL_ERR_OPEN_CONTROL_FILE "Could not open the file \"%s\" for \
editing.  SAM cannot save the privileges for the specified user unless this \
file is opened.  The error was: %s."

#define FAL_ERR_SAVE_CONTROL_FILE "Could not save the specified user's \
privileges to the file \"%s\".  This error occurs when the file cannot be \
opened for editing, or an internal error occurs while writing the \
information to the file."

#define FAL_ERR_EDIT_NO_PUSERS "There are no users with privileges to SAM.  \
To set up a user's privileges, enable the desired areas \
and select the \"Save User Privileges\" item on the \"Actions\" menu."

#define FAL_ERR_READ_CONTROL_FILE       "Could not read the contents of the \
control file \"%s\".  This file describes the areas of SAM you have access \
to.  Without this file, you cannot access any of SAM.  See your system \
administrator for details."

#define FAL_ERR_RM_CONTROL_FILE         "Could not remove the empty control \
file \"%s\" from the system.  The error was: %s"

#define FAL_ERR_CF_DIR_PERM "The directory \"%s\" must be secure before \
control files can be saved.  Otherwise there is a security risk of \
non-superusers gaining unauthorized access to SAM.  Before any control \
files can be saved, you must ensure that this directory has the \
following attributes:\n\n1.  The directory exists.\n\n2.  The directory \
is owned by \"root\".\n\n3.  The directory is readable only by owner.\n\n \
4. No other permissions are set.\n\nFix the permissions and/or owner of this \
directory and save the control file again."
```

APPENDIX IV

```
#define FAL_ERR_NO_ENABLE_AREA  "You cannot enable the \"%s\" area for \
non-superuser access.  The system's security might be compromised if this \
area is executed by a non-superuser who has been promoted to superuser.  The \
application might not be able to limit the amount of superuser privileges \
given to the user."

#define FAL_ERR_NO_DISABLE_AREA "You cannot change the access status of the \
\"%s\" area.  This area is always inaccessible to non-superusers."

#define FAL_ERR_GET_UID         "This application is supposed to be executed \
as user \"%s\".  However, SAM could not retrieve the UID for this user.  This \
user must exist on the system in order to run this application."

#define FAL_ERR_KNOWN_USER      "The user \"%s\" is a known user on this \
system.  To save privileges for this user, cancel out of this screen and \
select the user in the list on the Save User Privileges screen."

#define FAL_ERR_CMD_HAS_QUOTES  "The command must not contain any quotes \
(\"\" or '')."

#define FAL_ERR_CANT_SAVE_ROOT  "You cannot save privileges for the user \
\"root\".  This user always has access to all of SAM."

#define FAL_ERR_NEED_ICON_PATH  "You need to input the complete path to an \
existing icon on the system."

#define FAL_ERR_CHECK_INSTL_CHG "Either SAM has been patched or a new version \
of SAM has been installed on this system.  This current SAM session cannot \
continue because some of the files it depends upon may have changed in \
unpredictable ways.\n\nWhen you press the OK button, this SAM session will \
exit.  If you have a pending kernel configuration change that has not been \
built into a new kernel, the changes are now lost and you will have to \
re-perform them.  If you have more system management tasks to perform, you may \
invoke the new version of SAM in the same way you invoked this session."

/***************************************
 * The following defines are informational messages
 *
 ***************************************/
#define FAL_INFO_READ_CONTROL_FILE      "Could not read the contents of the \
control file \"%s\".  All SAM areas will be disabled."

#define FAL_INFO_READ_DEFAULT_CF        "Could not obtain the default list \
of SAM areas to be enabled.  The file \"%s\" is corrupt or missing.  All \
SAM areas will be disabled."

#define FAL_INFO_COULDNT_FIND_AREA "Could not find the area \"%s\" in \
SAM's list of areas.  The file \"%s\" describes this area to SAM and may \
have been removed from the system.  This area will not be listed in SAM."

#define FAL_INFO_FAL_DESC_UPDATED "Could not find the area \"%s\" in SAM's \
list of areas.  The file \"%s\" describes this area to SAM.  This file has \
been updated since your version of SAM was last modified.  It is possible \
that this area no longer exists in SAM.  This area will not be available from \
SAM.  Contact your system administrator for details."

#define FAL_INFO_RSB_DESC_UPDATED "Could not find the area \"%s\" in SAM's \
list of areas.  The file \"%s\" describes this area to SAM.  This file has \
been updated since this control file was last modified.  It is possible that \
this area no longer exists in SAM.  You should verify that the desired areas \
in SAM are correctly enabled and save a new version of the control file."

#define FAL_INFO_SAVE_NO_CONTROL_FILES "There are no control files previously \
saved on this system.  You can create a new control file by specifying the \
control file name."

#define FAL_INFO_SAVE_SUCCEEDED "Successfully saved the privileges for \
user \"%s\"."

#define FAL_INFO_GENERIC_SAVE_SUCCEEDED "Successfully saved the privileges for \
all selected users."

#define FAL_INFO_GENERIC_REMOVE_SUCCEEDED "Successfully removed the \
privileges for all selected users."

#define FAL_INFO_NO_HELP_AVAIL  "There is no help available on \"%s\"."

#define FAL_INFO_MULTIPLE_SAMS  "Another SAM application is currently \
running.  Undesirable results could occur.  Please consult with the \
other SAM operators."

#define FAL_INFO_NO_AREAS_ENABLED       "You have requested that all SAM \
areas be disabled.  However, the user \"%s\" does not have any SAM \
privileges.  Therefore no changes were made."

#define FAL_INFO_LOAD_DEFAULT_FOR_USER  "User \"%s\" does not have any \
SAM privileges.  SAM will display the privileges that are recommended for \
a non-superuser.  If you want this user to have these privileges, you must \
save them for the user (select the \"Save User Privileges\" item from the \
\"Actions\" menu)."

/***************************************
 * The following defines are confirmation messages
 *
 ***************************************/
#define FAL_CONF_REMOVE_GROUP   "You have selected \"%s\" to be removed \
from SAM.  This application group will no longer appear in SAM's list of \
areas.  Are you sure that you want this group removed?"

#define FAL_CONF_REMOVE_UTILITY "You have selected \"%s\" to be removed \
from SAM.  The application that is run by this item will not be \
removed from the file system.  However, the item will no longer appear \
in SAM's list of areas.  Are you sure that you want this item removed \
from SAM?"

#define FAL_CONF_FILE_OPEN      "You have made changes that will be lost when \
you edit a different user's privileges.  Do you still want \
to edit a different user?"

#define FAL_CONF_EXIT           "You have made changes that will be lost when \
the Restricted SAM Builder exits.  Do you still want to exit?"

#define FAL_CONF_USE_EXISTING_FILE      "The file \"%s\" already exists.  Its \
contents will be overwritten when the task is performed.  Do you still want \
to use it?"

#define FAL_CONF_GENERIC_NO_AREAS_ENABLED  "You have requested that all \
SAM areas be disabled.  This will remove SAM privileges for all selected \
users.  Do you want to continue?"

#define FAL_CONF_REM_USER_PRIV          "SAM privileges will be removed for \
user \"%s\".  Do you want to continue?"

#define FAL_CONF_GENERIC_REM_USER_PRIV  "SAM privileges will be removed \
for all selected users.  Do you want to continue?"

/***************************************
 * The following defines are progress messages
 *
 ***************************************/
```

```
#define FAL_PROG_OLE_INIT          "Retrieving list of SAM areas..."

#define FAL_PROG_REMOVE            "Removing %s..."

#define FAL_PROG_ADD               "Adding %s..."

/****************************************
 * The following defines are summary level samlog messages.
 *
 ****************************************/
#define FAL_LOGS_START_ADD_GROUP          "Adding the application group \"%s\" \
to SAM's list of areas."

#define FAL_LOGS_FAIL_ADD_GROUP           "Failed to add the application group \
\"%s\" to SAM's list of areas."

#define FAL_LOGS_SUCC_ADD_GROUP           "Successfully added the application \
group \"%s\" to SAM's list of areas."

#define FAL_LOGS_START_ADD_UTIL           "Adding the custom application \"%s\" \
to SAM's list of areas."

#define FAL_LOGS_FAIL_ADD_UTIL            "Failed to add the custom application \
\"%s\" to SAM's list of areas."

#define FAL_LOGS_SUCC_ADD_UTIL            "Successfully added the custom \
application \"%s\" to SAM's list of areas."

#define FAL_LOGS_START_MOD_GROUP          "Modifying the application group \
\"%s\" in SAM's list of areas."

#define FAL_LOGS_SUCC_MOD_GROUP           "Successfully modified the \
application group \"%s\" in SAM's list of areas."

#define FAL_LOGS_FAIL_MOD                 "Failed to modify the item in \
SAM's list of areas."

#define FAL_LOGS_START_MOD_UTIL           "Modifying the custom application \
\"%s\" in SAM's list of areas."

#define FAL_LOGS_SUCC_MOD_UTIL            "Successfully modified the custom \
application \"%s\" in SAM's list of areas."

#define FAL_LOGS_START_REMOVE             "Removing \"%s\" from SAM's list of \
areas."

#define FAL_LOGS_FAIL_REMOVE              "Failed to remove the item from SAM's \
list of areas."

#define FAL_LOGS_SUCC_REMOVE              "Successfully removed \"%s\" from \
SAM's list of areas."

#define FAL_LOGS_START_SAVE_CF            "Saving privileges for user \"%s\"."

#define FAL_LOGS_SUCC_SAVE_CF             "Successfully saved privileges for \
user \"%s\"."

#define FAL_LOGS_FAIL_SAVE_CF             "Failed to save privileges for user \
\"%s\"."

#define FAL_LOGS_START_RM_CF              "Removing all privileges for user \
\"%s\"."

#define FAL_LOGS_SUCC_RM_CF               "Successfully removed all privileges \
for user \"%s\"."

#define FAL_LOGS_FAIL_RM_CF               "Failed to remove all privileges for \
user \"%s\"."

#define FAL_LOGS_START_GET_CF             "Retrieving privileges for user \
\"%s\"."

#define FAL_LOGS_SUCC_GET_CF              "Successfully retrieved privileges \
for user \"%s\"."

#define FAL_LOGS_FAIL_GET_CF              "Failed to retrieve privileges for \
user \"%s\"."

#define FAL_LOGS_START_EXEC_NONSAM_APP  "%T Entering area \"%s\"."

#define FAL_LOGS_SUCC_EXEC_NONSAM_APP   "%T Exiting area \"%s\"."

/****************************************
 * The following defines are detail level samlog messages.
 *
 ****************************************/
#define FAL_LOGD_CREATE_FILE     "Creating the file \"%s\"."

#define FAL_LOGD_ADD_CU          "Adding the entry to \"%s\"."

#define FAL_LOGD_EDIT_FILE       "Editing the file \"%s\"."

#define FAL_LOGD_CREATE_DIR      "Creating the directory \"%s\"."

#define FAL_LOGD_RM_CF           "Removing the file \"%s\"."

#define FAL_LOGD_CHANGE_PERM     "Changing ownership and permissions on %s."

/****************************************
 * The following defines are verbose level samlog messages.
 *
 ****************************************/
#define FAL_LOGV_READ_CF         "Reading the control file \"%s\" to \
determine the areas of SAM this user has access to."

#define FAL_LOGV_PRE_CONDITION_FAIL      "The pre-condition command for \
the area \"%s\" returned non-zero.  This area will not be listed in SAM."

#define FAL_LOGV_GUI_ONLY        "SAM is being executed on a terminal, but \
the area \"%s\" can only run in a graphical environment.  This area \
will not be listed in the terminal version of SAM."

#define FAL_LOGV_VALIDATE_FILE  "Checking if the file \"%s\" exists on the \
system."

#define FAL_LOGV_VALIDATE_CMD   "Verifying the command \"%s\" exists on the \
system."

#define FAL_LOGV_GET_PUSERS      "Retrieving list of users with privileges to \
SAM."

#define FAL_LOGV_GET_USERS       "Retrieving list of all users on the system."

#define FAL_LOGV_MODTIME         "Checking the modification time of \"%s\"."

#define FAL_LOGV_LOOK_CFS        "Looking for control files in the directory \
\"%s\"."

#define FAL_LOGV_LOOK_LFS        "Looking for SAM lock files in the directory \
```

```
\"%s\"."

#define FAL_LOGV_CHECK_DIR      "Checking permissions on directory \"%s\"."

#define FAL_LOGV_LOOK_CBFILES  "Looking for SAM *.cb files in directory \"%s\"."

#define FAL_LOGV_LOOK_OUFILES  "Looking for SAM *.ou files in directory \"%s\"."

#define FAL_LOGV_CHECK_INSTL_OK         "%$LABEL%: No Change."
#define FAL_LOGV_CHECK_INSTL_INIT       "%$LABEL%: Retrieved initial \
installed state."
#define FAL_LOGV_CHECK_INSTL_CHG        "%$LABEL%: SAM was patched or \
re-installed."

/****************************************
 * The following defines are error/note samlog messages.
 *
 ****************************************/
#define FAL_LOG_ERR_NOT_SUPERUSER       "The user with a real user id of \
%d tried to enter SAM.  Users must have superuser (root) privilege to \
enter SAM."

#define FAL_LOG_NOTE_SAM_NOT_ROOT  "Executing a restricted version of SAM for \
user \"%s\"."


/****************************************
 * The following defines are strings used in the FAL and RSB.
 * These strings are actually displayed on the DiB, either as
 * default values or static texts.
 *
 * They are in this file because they should be localized...
 *
 ****************************************/
#define FAL_CUSTOM_ADDON        "Custom"
#define FAL_HP_SAM              "SAM"
#define FAL_OTHER               "Other"
#define FAL_ENABLED             "Enabled"
#define FAL_DISABLED            "Disabled"
#define FAL_PARTIAL             "Partial"
#define FAL_INACCESS            "Inaccessible"
#define FAL_NONE                "<User Not Specified>"
#define FAL_CAP_YES             "YES"
#define FAL_CAP_NO              "NO"
#define FAL_YES                 "Yes"
#define FAL_NO                  "No"
#define FAL_ROOT                "root"
#define FAL_CURRENT_USER        "current user"
#define FAL_EXIT_SAM            "Exit SAM"
#define FAL_EXIT_SAM_MNEMONIC   "&Exit SAM"
```

```
/* @(#) $Header: fal_errors.h,v 72.11 95/04/10 18:18:08 hmgr Exp $      */

#ifndef _FAL_ERRORS_HEADER
#define _FAL_ERRORS_HEADER      1

/**********************************************************************************
*  FAL fatal errors
**********************************************************************************/

#define FAL_CREATE_CUSTOM_SAM_CU_ERR            -1
#define FAL_EDIT_CUSTOM_SAM_CU_ERR              -2
#define FAL_RM_OPEN_CUSTOM_SAM_CU_ERR           -3
#define FAL_RM_CANT_FIND_PARENT_ERR             -4
#define FAL_RM_CUSTOM_SAM_CU_ERR                -5
#define FAL_CMD_ENOENT_ERR                      -6
#define FAL_MOD_OPEN_CUSTOM_SAM_ERR             -7
#define FAL_MOD_CANT_FIND_PARENT_ERR            -8
#define FAL_FILE_REGULAR_ERR                    -9
#define FAL_FILE_DIR_ERR                        -10
#define FAL_FILE_SPECIAL_ERR                    -11
#define FAL_USERFILE_NEXIST_ERR                 -12
#define FAL_FILENAME_ERR                        -13
#define FAL_CONTROL_FILE_DIR_ERR                -14
#define FAL_OPEN_CONTROL_FILE_ERR               -15
#define FAL_SAVE_CONTROL_FILE_ERR               -16
#define FAL_RM_CONTROL_FILE_ERR                 -17
#define FAL_CF_DIR_PERM_ERR                     -18
#define FAL_SAM_WAS_REINSTALLED                 -19

/**********************************************************************************
*  FAL non-fatal errors
**********************************************************************************/
#define FAL_READ_CONTROL_FILE_ERR               1
#define FAL_MUL_SAMS_ERR                        2

#endif /*_FAL_ERRORS_HEADER*/
```

```
# @(#) $Header: makefile,v 72.12 94/09/02 09:18:36 hmgr Exp $

FAROOT=..

include $(FAROOT)/defs.mk

COMOBJS=        $(OBJDIR)/fal_utils.o \
                $(OBJDIR)/fal_tasks.o \
                $(OBJDIR)/fal_ui.o \
                $(UG)/$(MODEL)/ug_comlib.o \
                $(KC)/$(MODEL)/kc_comlib.o \
                $(COREOBJS)

EXECS1=         $(SAMLBIN)/fal_samx
EXECOBJS1=      $(SAMMAIN) $(COMOBJS)

EXECLIBS1=      $(SAMXLIBS)

OBJS2=          $(OBJDIR)/rsam.o

DEPENDS2=       $(SAM)/h/sam.h

EXECSA=         $(SAMLBIN)/rsam

EXECOBJSA=      $(ARCHLIBDIR)/log_util.o

SCRIPTS=        $(SAMROOT)/usr/newconfig/etc/sam/custom/sam_operator \
                $(SAMROOT)/etc/sam/custom/sam_operator

ALL= $(SCRIPTS) $(EXECS1) $(OBJS2) $(EXECSA)

include $(SAM)/make/rules.mk
```

```
/* @(#) $Header: rsam.c,v 72.5 94/04/26 16:31:42 hmgr Exp $     */

/*****************/
/* Include files */
/*****************/
#include <stdio.h>
#include <sys/stat.h>
#include <unistd.h>
#include "sam.h"
#include "fal_errmsg.h"

/**************************** Begin-Specification *****************************
 *
 * Command: rsam
 *
 * Author: Tammy Heiserman
 *
 * Description: This command is a setuid root executable that gets the
 *              user's real user id and verifies that the user has access
 *              to SAM.  If a control file (ie, /etc/sam/custom/<login_name>.cf)
 *              exists for the user, then samx is executed with the restricted
 *              user's login name.  The user is only allowed access to the
 *              areas of SAM listed in the control file.  The path to the
 *              control file is generated in samx.
 *
 *              This command is executed from the SAM script (/usr/sbin/sam).
 *              It is only executed if the effective user id is not superuser.
 *              However, since this command might accidently be executed
 *              stand-alone, we check for a real user id of "root" and
 *              return immediately.   IT IS NOT SUPPORTED TO GIVE ROOT
 *              USERS RESTRICTED ACCESS TO SAM!
 *
 *              If rsam was executed from the SAM script and rsam returns
 *              non-zero, then the SAM script will display an error message
 *              saying that the user must have superuser privileges to enter
 *              SAM.
 *
 *              When this routine executes SAM, it changes the real UID
 *              of the user to "root" so that the SAM applications will
 *              function properly.  Several of the users/groups commands
 *              and crontab(1M) are known to require real UID of root to
 *              succeed.
 *
 * Parameters: argc - Number of arguments on the command line (should be 1)
 *             argv - List of arguments on the command line
 *
 * Globals: none
 *
 * Returns: int - 0 if successfully ran SAM
 *                1 if user doesn't have special privileges for running SAM.
****************************** End-Specification ******************************/
FUNCTION int main (argc, argv)
int     argc;
char    *argv[];
{
    FILE        *fd;
    char        user_name[MIDLEN];
    char        control_file[MAXLEN];
    char        command_line[MAXLEN];
    struct stat sbuf;


    /* First, make sure the custom directory exists.  If it doesn't exist,
     * then no non-superusers have access to SAM.  Return non-zero so
     * the SAM script will know this user doesn't have permission to run
     * SAM.
     */
    if ((stat ("/etc/sam/custom", &sbuf) != 0) ||
        (S_ISDIR (sbuf.st_mode) == 0))
        return (1);

    /* Determine the real user's id.  See if the user has a control
     * file.
     */
    (void) unlink ("/etc/sam/custom/login_name");
    system ("/usr/bin/id -nru > /etc/sam/custom/login_name 2> /dev/null");
    if ((fd = fopen ("/etc/sam/custom/login_name", "r")) == NULL)
        /* Couldn't get the real user's id.  Assume this user does not
         * have access to SAM and return.
         */
        return (1);

    fscanf (fd, "%s", user_name);
    fclose (fd);
    (void) unlink ("/etc/sam/custom/login_name");

    /* Check if this is the root user.  If so, return immediately.
     * The SAM script will try running samx.
     */
    if (strcmp (user_name, "root") == 0)
        return (1);

    /* Build the name of the user's control file.   If this file exists,
     * it contains the access permissions for this user.
     */
    strcpy (control_file, "/etc/sam/custom/");
    strcat (control_file, user_name);
    strcat (control_file, ".cf");

    /* Now stat this control file.  If it doesn't exist, return immeidately.
     * This user does not have any special privileges for running SAM.
     */
    if (stat (control_file, &sbuf) != 0)
        return (1);

    /* Finally, execute SAM with the restricted user's name.  When the
     * samx returns, we can exit rsam.  Be sure to make the user's real
     * UID be root.
     */
    setuid (0);
    samlog (SAMLOG_NOTE, FAL_LOG_NOTE_SAM_NOT_ROOT, user_name);
    strcpy (command_line, "/usr/sam/lbin/samx -f ");
    strcat (command_line, user_name);
    strcat (command_line, " /usr/sam/lib/%L/fal.ui");
    system (command_line);
    return (0);
}
```

```
# @(#) $Header: defs.mk,v 72.5 94/01/17 10:54:11 hmgr Exp $

FA_TAG=FAL
SAM=$(FAROOT)/..

include $(SAM)/make/defs.mk

# The Msgs commands must go after including defs.mk

MSGCATALOG=fal
MSGFUNC=fal_catMsg

#
# Lint stuff
#
NEEDED_LINT_LIBS=       common $(ARCH_LINT_LIBS)

LINTOPTS1=      -I$(FAROOT)/h \
                -I$(SAM) \
                -I$(SAM)/h \
                -I$(ARCHINCDIR) \
                -I/usr/obam/include \
                -DNLS \
                -Dhp9000s$(MODEL) \
                -D__hp9000s$(MODEL)

LINTSRCS1=      $(FAROOT)/util/*.c \
                $(FAROOT)/tasks/*.c \
                $(FAROOT)/ui/*.c
```

```
revision "$Revision: 72.9 $"

/****************************** Begin-Specification ****************************
*
* CLASS NAME
*   FAL_CU
*
* DESCRIPTION
*   This object contains all necessary information for adding a custom
*   application or group to the FAL.  It is used by the add/modify/remove
*   custom application/group tasks.
*
****************************** End-Specification *****************************/


class FAL_CU {
    string      FAL_CU_LABEL            /* label appearing in FAL */
    string      FAL_CU_OLD_LABEL        /* used in modify, old label storage */
    string      FAL_CU_HPTERM           /* execute using hpterm in motif */
    string      FAL_CU_CMD              /* command to execute */
    string      FAL_CU_HELP             /* help for item */
    string      FAL_CU_HASSUBMENUS      /* item is a group */
    string      FAL_CU_GUI_ONLY         /* command can only run in GUI */
    string      FAL_CU_EXEC_AS          /* user to execute command as */
    string      FAL_CU_ICON             /* icon path for custom utility */
}


/****************************** Begin-Specification ****************************
*
* CLASS NAME
*   FAL_CONTROL
*
* DESCRIPTION
*
****************************** End-Specification *****************************/


class FAL_CONTROL {
    string      FAL_CONTROL_LABEL                       /* field desc */
    string      FAL_CONTROL_PARENTS                     /* field desc */
    string      FAL_CONTROL_MODTIME                     /* field desc */
    string      FAL_CONTROL_DESC_FILE                   /* field desc */
}
```

APPENDIX IV

```
<!--
################################################################################
################################################################################
#
# File:         fal.htg
# RCS:          $Header: fal.htg,v 72.23 95/04/06 16:22:48 hmgr Exp $
# Description:  SAM Functional-Area Launcher Help Screens package
# Author:       Clarke Echols
# Language:     HP HelpTag
# Package:      N/A
#
# (C) Copyright 1994, Hewlett-Packard, all rights reserved.
#
################################################################################
################################################################################
-->

<!-- Icons for notes, cautions, and warnings -->
<!entity NoteElementDefaultIconFile FILE "noteicon.pm">
<!entity CautionElementDefaultIconFile FILE "cauticon.pm">
<!entity WarningElementDefaultIconFile FILE "warnicon.pm">

<!-- manual title entities -->
<!entity hpuxref "<book|HP-UX Reference|">

<helpvolume>
<metainfo>
<!-- ################################################################## -->
<!-- #                                                                # -->
<!-- #                                                                # -->
<!-- #                           METAINFO                             # -->
<!-- #                                                                # -->
<!-- ################################################################## -->
    <title> SAM Subsystems Launcher Help Screens
    <copyright>&copy; 1992-1995, Hewlett-Packard Company.
                    All rights reserved.
    <abstract> This volume contains help screens related to the SAM
               Subsystems Launcher and general conceptual information
               about SAM.  This area of SAM help is browsable.
    <\abstract>
<\metainfo>

<!-- ============================================================== -->

<!--
 -->
<hometopic> SAM Main Window (SAM Areas) Online Help
<!-- ################################################################## -->
<!-- ################################################################## -->
<!-- ###     SAM Main FAL Window                                    ### -->
<!-- ###                                                            ### -->
<!-- ###                (Table-of-Contents)                         ### -->
<!-- ###                                                            ### -->
<!-- ################################################################## -->
<!-- ################################################################## -->

&copy; Copyright 1992-1995 Hewlett-Packard Co., All Rights Reserved

Welcome to the HP-UX System Administration Manager (SAM) online help files.
 From this location, you can browse these help topics.

<!-- ##### NB: This list was generated processing the <s1...> and <s2...>
          tags in this file. -->

<otherhead> Main-Level Window

<list bullet tight>
  * <link FAL-SAM+PRODUCT-INFO> Product Information <\link>
  * <link FAL-MAIN+OVERVIEW> SAM Start-Up Window Overview Help <\link>
    <list bullet tight>
    * <link FAL-MAIN+OVERVIEW+SysAdminRespQual> Administrator's Responsibilities
                                               and Qualifications <\link>
    * <link FAL-MAIN+OVERVIEW-MainMenu> Overview of "SAM Areas" Window <\link>
    <\list>

    <otherhead> Main Window Menu Bar

    <list bullet tight>
    * <link FAL-MAIN+OVERVIEW-MenuBar> Menu Bar Pulldown Menus <\link>
      <list bullet tight>
      * <link FAL-MENUBAR-FILE> The [[File]] Pulldown Menu <\link>
      * <link FAL-MENUBAR-VIEW> The [[View]] Pulldown Menu <\link>
      * <link FAL-MAIN+OPTIONS> The [[Options]] Pulldown Menu <\link>
        <list bullet tight>
        * <link FAL-LOGMON-OVERVIEW> The SAM Log File Viewer <\link>
        <\list>
      * <link FAL-MAIN+ACTIONS> The [[Actions]] Pulldown Menu <\link>
      * <link FAL-MENUBAR-HELP> The [[Help]] Pulldown Menu <\link>
      <\list>
    * <link FAL-MAIN+OVERVIEW+WhatsNew> What's New in SAM <\link>
    <\list>
<\list>

<otherhead> Adding and Modifying Custom Applications

<list bullet tight>
  * <link FAL-MAIN+DIALOG+AddCustomApplGroup> Task Dialog: Add Custom Application Gro
     <list bullet tight>
     * <link FAL-MAIN+DIALOGITEM+AddCustomApplGroup-Label> Custom Group:  Label<\link
     * <link FAL-MAIN+DIALOGITEM+AddCustomApplGroup-HelpFile> Custom Group: Help File
     * <link FAL-MAIN+DIALOGITEM+AddCustomApplGroup-IconPath> Custom Group: Help File
     <\list>
  * <link FAL-MAIN+DIALOG+AddCustomApplication> Task Dialog: Add Custom Application<\
     <list bullet tight>
     * <link FAL-MAIN+DIALOGITEM+AddCustomApplication-Label> Custom Application:  Lab
     * <link FAL-MAIN+DIALOGITEM+AddCustomApplication-Command> Custom Application: Co
     * <link FAL-MAIN+DIALOGITEM+AddCustomApplication-Interface> Custom Application:
                                                   User Interface Supports<\link>
     * <link FAL-MAIN+DIALOGITEM+AddCustomApplication-HelpFile> Custom Application:
                                                   Help File<\link>
     * <link FAL-MAIN+DIALOGITEM+AddCustomApplication-IconPath> Custom Application:
```

```
                                    Icon Path<\link>
    <\list>
  * <link FAL-MAIN+DIALOG+ModifyCustomApplicationGroup> Task Dialog: Modify Custom Gr
    <list bullet tight>
    * <link FAL-MAIN+DIALOGITEM+AddCustomApplGroup-Label> Custom Group: Label<\link>
    * <link FAL-MAIN+DIALOGITEM+AddCustomApplGroup-HelpFile> Custom Group: Help File
    * <link FAL-MAIN+DIALOGITEM+AddCustomApplGroup-IconPath> Custom Group: Help File
    <\list>
  * <link FAL-MAIN+DIALOG+ModifyCustomApplication> Task Dialog: Modify Custom Applica
    <list bullet tight>
    * <link FAL-MAIN+DIALOGITEM+AddCustomApplication-Label> Custom Application: Labe
    * <link FAL-MAIN+DIALOGITEM+AddCustomApplication-Command> Custom Application: Co
    * <link FAL-MAIN+DIALOGITEM+AddCustomApplication-Interface> Custom Application:
                                    User Interface Supports<\link>
    * <link FAL-MAIN+DIALOGITEM+AddCustomApplication-HelpFile> Custom Application:
                                    Help File<\link>
    * <link FAL-MAIN+DIALOGITEM+AddCustomApplication-IconPath> Custom Application:
                                    Icon Path<\link>
    <\list>
<\list>

<otherhead> Set Up SAM Logging

<list bullet tight>
  * <link FAL+OPT+SET-SAM-LOG> Set SAM Log Options<\link>
    <list bullet tight>
    * <link FAL+OPT+TRIM-LOGFILE> Trim SAM Log File <\link>
    * <link FAL+OPT+MAX-LOGFILE-SIZE> Maximum Log File Size <\link>
    * <link FAL+OPT+AUTOST-LOGFILE-VIEWER> Auto-start SAM Log File
                        Viewer<\link>
    * <link FAL+OPT+LOGFILE-OVERVIEW> Overview of SAM Log File Operation<\link>
    <\list>
<\list>
<!-- ================================================================ -->

For information about system administration tasks in general, select
<xref FAL-SAM-TASKS>

For overview information about SAM (System Administration Manager),
select <xref FAL-SAM-OVERVIEW>

For information about new features in SAM, select <xref
FAL-MAIN+OVERVIEW+WhatsNew>.

For information about what tasks you can perform from the SAM Areas Menu,
select <xref FAL+MAIN+TASKS-OVERVIEW>

For information about how to use the SAM Help System, select <xref
FAL-HELPSYS-XWIN> or <xref FAL-HELPSYS-TERM>.

<!-- ================================================================ -->

<!--
```

```
-->
<!-- ################################################################ -->
<!-- ################################################################ -->
<!-- ################################################################ -->
<!-- ###                                                          ### -->
<!-- ###              SAM VERSION INFORMATION SCREEN              ### -->
<!-- ###                                                          ### -->
<!-- ###  Accessed from the [Product Information] item in the     ### -->
<!-- ###    [Help] pulldown menu                                  ### -->
<!-- ###                                                          ### -->
<!-- ################################################################ -->
<!-- ################################################################ -->
<!-- ################################################################ -->

<memo>
        To access this screen, select [Product Information] in the
        [Help] pulldown menu anywhere in SAM.
<\memo>

<s1 id=FAL-SAM+PRODUCT-INFO> Product Information

HP-UX System Administration Manager, HP-UX Release 10.0

<lablist tight>
\&copy; 1988-1995,\ Hewlett-Packard Company. <newline>
                    All rights reserved.
<\lablist>

This is the HP-UX System Administration Manager, commonly called "SAM",
for HP-UX Release 10.0.

<otherhead> What is SAM?

SAM is a program that automates many different HP-UX system
administration tasks varying from relatively simple tasks to rather
complex operations.  SAM makes system administration much easier and
less frustrating by reducing or eliminating the need to learn a lot of
the intricate details that must be executed correctly and in proper
sequence when using ordinary keyboard commands to administer an HP-UX
system.  At the same time, SAM maintains a log of the operations it
performs, as it performs them, so you can always refer to that log to
determine what actions and commands SAM used to accomplish a given task.

<otherhead> What's New in SAM?

Many new and expanded capabilities are included in the HP-UX 10.0
version of SAM.  For specific information about what has been added or
changed in various SAM areas, select <xref FAL-MAIN+OVERVIEW+WhatsNew>.

<!-- ================================================================ -->

<!--
```

```
-->
<!-- ################################################################ -->
<!-- ################################################################ -->
<!-- ################################################################ -->
<!-- ################################################################ -->
<!-- ###                                                          ### -->
<!-- ###              SAM Main Opening Window                     ### -->
<!-- ###                                                          ### -->
<!-- ###  "Overview" item in [Help] pulldown menu                ### -->
<!-- ###                                                          ### -->
<!-- ################################################################ -->
<!-- ################################################################ -->
<!-- ################################################################ -->
<!-- ################################################################ -->
<s1 id=FAL-MAIN+OVERVIEW> System Administration Manager Areas Menu
<memo>
        To access this screen, press f1 in the opening window (or a
        descendent screen) with no items highlighted, or select
        "Overview" after selecting the "Help" button in upper
        right-hand corner of window.
<\memo>

This window is the main SAM start-up window as indicated by the words
"System Administration Manager" followed by the system name across the
top.  The large rectangular area in the middle of the window contains a
hierarchical selection list or group of icons for use in choosing the
various SAM functional areas and subareas where tasks are to be
performed.  The area lists or icons and descendent subarea-selection
lists or icon groups that appear in this window provide access to all of
the capabilities that SAM supports in all of its available functional
areas.  SAM is a robust tool with many features to help you as a system
administrator.  For more information about this window and how to use
it, select <xref FAL-MAIN+OVERVIEW-MainMenu>.

For information about any of the following topics, select:

<list bullet tight>
  * <xref FAL-SAM-OVERVIEW>
  * <xref FAL-MAIN+OVERVIEW-MainMenu>.
  * <xref FAL-MAIN+OVERVIEW+SysAdminRespQual>
  * <xref FAL-MAIN+OVERVIEW+WhatsNew>
  * <xref FAL-MAIN+OVERVIEW+WhatsNew-SAM>
  * <xref FAL-SAM-TERMUSE>
  * <xref FAL-HELPSYS-TERM>
  * <xref FAL-HELPSYS-XWIN>
<\list>

To browse all help topics related to SAM area selection and general SAM
overview topics, select:
<list bullet tight>
* <link "_hometopic" JumpNewView> SAM Main Window (SAM Areas) Online Help
   <\link>
<\list>

<!-- ============================================================== -->

<!--
```

```
-->
<!-- ################################################################ -->
<!-- ################################################################ -->
<!-- ################################################################ -->
<!-- ####                                                        #### -->
<!-- ####           "WHAT'S NEW IN SAM" SCREENS                  #### -->
<!-- ####                                                        #### -->
<!-- ####            SAM Main Opening Window                     #### -->
<!-- ####                "Actions" Menu                          #### -->
<!-- ####           Select "What's New in SAM..."                #### -->
<!-- ####                                                        #### -->
<!-- ################################################################ -->
<!-- ################################################################ -->
<!-- ################################################################ -->
<s2 id=FAL-MAIN+OVERVIEW+WhatsNew> What's New in SAM...

   The HP-UX Release 10.0 Version of SAM contains many new features
   and capabilities.  For specific information about particular areas,
   and features, select from the following list:

<list bullet>
   * <xref FAL-MAIN+OVERVIEW+WhatsNew-SAM>
   * <xref FAL-MAIN+OVERVIEW+WhatsNew-FAL>
   * <xref FAL-MAIN+OVERVIEW+WhatsNew-UG>
   * <xref FAL-MAIN+OVERVIEW+WhatsNew-TS>
   * <xref FAL-MAIN+OVERVIEW+WhatsNew-BR>
   * <xref FAL-MAIN+OVERVIEW+WhatsNew-Clusters>
   * <xref FAL-MAIN+OVERVIEW+WhatsNew-FS>
   * <xref FAL-MAIN+OVERVIEW+WhatsNew-KC>
   * <xref FAL-MAIN+OVERVIEW+WhatsNew-NNC>
   * <xref FAL-MAIN+OVERVIEW+WhatsNew-PD>
   * <xref FAL-MAIN+OVERVIEW+WhatsNew-LP>
   * <xref FAL-MAIN+OVERVIEW+WhatsNew-PM>
   * <xref FAL-MAIN+OVERVIEW+WhatsNew-RT>
   * <xref FAL-MAIN+OVERVIEW+WhatsNew-RemoteSAM>
   * <xref FAL-MAIN+OVERVIEW+WhatsNew-Time>
   * <xref FAL-MAIN+OVERVIEW+WhatsNew-Other>
   * <xref FAL-MAIN+OVERVIEW+WhatsNew-RestrictedSAM>
   * <xref FAL-MAIN+OVERVIEW+WhatsNew-HelpSystem>
<\list>

<!-- ============================================================== -->

<!--
```

```
-->
<!-- ################################################################# -->
<!-- ###                                                           ### -->
<!-- ###    "WHAT'S NEW IN SAM": User Interface                    ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-SAM> What's New: SAM User Interface Features

SAM now has an app-defaults file that can be used to customize the SAM
user interface if you are using a Motif-based (X-Windows) display.
Among other things, this enables you to customize the size of online
help windows and other X resources.

When SAM starts up in the Motif or X-windows environment, it displays a
welcome screen which disappears after the SAM area-selection window
appears.  If for some reason the window does not appear, the welcome
disappears after about 60 seconds.  The time delay before it disappears
can also be customized.  Setting the value to zero causes the screen to
not appear.

For more information about how to customize application defaults,
consult the documentation for the X-windows-based graphical user
interface used by SAM (Motif, HP VUE, etc.)  on your system.

<!-- ================================================================= -->
<!--
-->
<!-- ################################################################# -->
<!-- ###                                                           ### -->
<!-- ###    "WHAT'S NEW IN SAM": FAL Opening Screen/Hierarchy      ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-FAL> What's New: SAM Start-up and Opening Screens

The opening start-up window has been redesigned.  The X-windows/Motif/HP
VUE version can be switched between an icon-based display (default) and
a tabular listing format similar to the text terminal version by using
format-selection items in the [[View]] pulldown menu.

Behavior is similar to that of earlier versions, but other applications
(such as software distribution and management applications) can register
their presence with SAM and be administered from the SAM opening-window
display.  Each application must provide its own help system.

You can also add custom applications or groups of applications
(programs, shell scripts, HP-UX commands, etc.)  to the opening SAM
area-selection interface.

<!-- ================================================================= -->
<!--
```

```
 -->
<!-- ################################################################## -->
<!-- ###                                                            ### -->
<!-- ###    "WHAT'S NEW IN SAM": Accounts for Users and Groups      ### -->
<!-- ###                                                            ### -->
<!-- ###        SAM Main Menu Screen: "Actions" Menu                ### -->
<!-- ###             Select "What's New in SAM..."                  ### -->
<!-- ###                                                            ### -->
<!-- ################################################################## -->
<s3 id=FAL-MAIN+OVERVIEW+WhatsNew-UG> What's New: Accounts for Users and Groups

The following new features have been added to this area in HP-UX Release
10.0:

<list bullet tight>
  * Modify Group now allows group ID modification.

  * Standard HP-UX password aging is now supported (non-trusted systems).

  * Full capabilities for modifying group membership.

  * Complete trusted systems support includes:

    <list bullet tight>
       * account lifetime;
       * account inactivity period;
       * password aging;
       * authorized login times;
       * single-user boot authorization;
       * maximum password length;
       * password generation options (machine-generated, pronounceable,
         user-specified, etc.);
       * maximum number of login tries that are allowed before disabling
         the account or port;
       * "trusted-system-smart" account deactivation and reactivation
         (can put administrative locks on accounts to deactivate them,
         and can query the system to determine why an account may be
         deactivated, in order to properly reactivate it);
    <\list>
  * Supports associated features in NFS clusters (cluster-wide or
    local-only logins, user/group IDs, etc.).
<\list>

<!-- ================================================================= -->

<!--
```

```
 -->
<!-- ################################################################## -->
<!-- ###                                                            ### -->
<!-- ###    "WHAT'S NEW IN SAM": Auditing and Security              ### -->
<!-- ###                                                            ### -->
<!-- ###        SAM Main Menu Screen: "Actions" Menu                ### -->
<!-- ###             Select "What's New in SAM..."                  ### -->
<!-- ###                                                            ### -->
<!-- ################################################################## -->
<s3 id=FAL-MAIN+OVERVIEW+WhatsNew-TS> What's New:  Auditing and Security

SAM previously supported converting a standard HP-UX system to a
trusted system.  It now also supports converting the system from a
trusted system back to a normal HP-UX system.

SAM also supports setting global security policies for password aging,
password format policies, general user account policies, and terminal
policies.

<!-- ================================================================= -->

<!--
```

```
-->
<!-- ################################################################## -->
<!-- ###                                                            ### -->
<!-- ###    "WHAT'S NEW IN SAM": Backup and Recovery                ### -->
<!-- ###                                                            ### -->
<!-- ###        SAM Main Menu Screen: "Actions" Menu                ### -->
<!-- ###             Select "What's New in SAM..."                  ### -->
<!-- ###                                                            ### -->
<!-- ################################################################## -->
<s3 id=FAL-MAIN+OVERVIEW+WhatsNew-BR> What's New:  Backup and Recovery

Backup and recovery uses the HP-UX ''fbackup'' and ''frecover''
utilities, as in previous releases.

Screens have some minor changes in design and functionality.
This area is still divided into two subareas, one for setting up and
managing automated backups; the other for interactive backup and
recovery.  Automatic backups can also be set up from the interactive
backup and recovery subarea.

The online help system for backup and recovery has been completely
redesigned and rewritten.

<!-- ================================================================== -->

<!--
```

```
-->
<!-- ################################################################## -->
<!-- ###                                                            ### -->
<!-- ###    "WHAT'S NEW IN SAM": NFS-based Clusters                 ### -->
<!-- ###                                                            ### -->
<!-- ###        SAM Main Menu Screen: "Actions" Menu                ### -->
<!-- ###             Select "What's New in SAM..."                  ### -->
<!-- ###                                                            ### -->
<!-- ################################################################## -->
<s3 id=FAL-MAIN+OVERVIEW+WhatsNew-Clusters> What's New:  NFS Clusters

The old HP Clustered Environment (HP-UX Clusters) shipped with HP-UX
releases prior to 10.0 are no longer supported at Release 10.0.  It
is being replaced by NFS-based cluster technology.

The change to System V Release 4 file-system layout at HP-UX Release
10.0 is well-suited for NFS-based clusters, eliminating the need for
context-dependent files (CDFs) and removing the restriction that all
systems residing on the same local sub-network.  NFS clusters can
include systems that reside on other networks with access by means of
gateway machines.

Files, file systems, peripherals (such as line printers), and other
resources can be configured as local-only or as cluster-wide to match
individual user and system needs.

<!-- ================================================================== -->
<!--
```

```
-->
<!-- ################################################################## -->
<!-- ###                                                            ### -->
<!-- ###    "WHAT'S NEW IN SAM": Disks and File Systems             ### -->
<!-- ###                                                            ### -->
<!-- ###        SAM Main Menu Screen: "Actions" Menu                ### -->
<!-- ###             Select "What's New in SAM..."                  ### -->
<!-- ###                                                            ### -->
<!-- ################################################################## -->

<s3 id=FAL-MAIN+OVERVIEW+WhatsNew-FS> What's New:  Disks and File Systems

The following features are new in the SAM "Disks and File Systems" area
for HP-UX Release 10.0:

<list bullet>
  * Magneto-optical drives and autochangers are now managed directly in
    the "Disk Devices" subarea.  They are no longer a separate subarea
    with dissimilar actions.

  * LVM (Logical Volume Manager) support has been enhanced and made
    easier to use.  When performing any task that involves creating a
    logical volume, you can also create the desired file systems or set
    up swap at the same time.  In earlier releases, creating the logical
    volume and defining usage were completely separate steps.

  * Managing local file systems and networked file systems is now done
    in a single "File Systems" subarea window.

  * The Disks and File Systems subarea now displays and helps manage
    dump devices.

  * When an operation will overwrite an unmounted file system, SAM now
    does a better job of helping you decide whether the data being
    overwritten is valuable.  This is done by showing the last known
    mount point and most recent modification time for any unmounted file
    system when it is about to be overwritten.
<\list>

<!-- ============================================================== -->

<!--
```

```
-->
<!-- ################################################################## -->
<!-- ###                                                            ### -->
<!-- ###    "WHAT'S NEW IN SAM": Kernel Configuration               ### -->
<!-- ###                                                            ### -->
<!-- ###        SAM Main Menu Screen: "Actions" Menu                ### -->
<!-- ###             Select "What's New in SAM..."                  ### -->
<!-- ###                                                            ### -->
<!-- ################################################################## -->
<s3 id=FAL-MAIN+OVERVIEW+WhatsNew-KC> What's New:  Kernel Configuration

<otherhead> Changes

<list bullet>
  * The root and console devices are no longer displayed or modifiable
    by SAM because they cannot be configured in the kernel.

  * The primary swap device is now configured via the "Swap Devices"
    subarea in the file systems area.

  * The kernel-configuration area still contains dump device
    configuration (new for 700s).  Multiple dump devices are allowed.

  * [[f1]] help has been added for individual items in the main
    list screen for the "Configurable Parameters" subarea.  A large
    help module has been added to support configurable parameters,
    explaining what they are used for, minimum, maximum, and default
    values, and how they interact (when applicable).
<\list>

<otherhead> "Lite" Configuration

This feature is available only on Series 700 systems with less than 32
MBytes of RAM.  This action reduces the kernel size by removing drivers
that are rarely used and lowering the value of certain configurable
kernel parameters.  It also edits files in ''/etc/rc.config.d'' to
eliminate certain subsystems, including the following diagnostics
drivers:

<ex>
                                                     Approximate
   Driver          Description                       RAM Savings
   -------------------------------------------------------------
   dmem            Memory diagnostics pseudo-driver    (~ 4.5 Kbytes)
   diag1           I/O diagnostics pseudo-driver       (~ 6.3 Kbytes)
   diag2           Generic error-logging pseudo-driver (~ 5.9 Kbytes)
                   (diag2 also allocates a 12 K-byte logging buffer)
<\ex>

Also, the following configurable parameters are reduced for space
savings:

<ex>
                               Approx.
                                 RAM
   Parameter  Default/Tuned    Savings     Description
   --------------------------------------------------------------
   dbc_max_pct     50/25       N/A         Dynamic buffer cache maximum (25%).
   dbc_min_pct      5/2        >500 Kbytes Dynamic buffer cache minimum (2%).
                                           The RAM savings here reduces the
                                           dynamic memory usage of the system
                                           during VM stress conditions.

   nproc          276/120      78.0 Kbytes Max number of active processes.
   ninode         476/250      78.5 Kbytes Max number of open inodes in memory.
   nfile          671/400       8.5 Kbytes Max number of open files.
```

```
nflocks        200/50     19.4 Kbytes Max number of file/record locks.

npty            60/30     14.5 Kbytes Max number of pseudo terminals.
                                      This limits the maximum number
                                      of windows / network-sessions.

msgmni          50/20      3.0 Kbytes Max number of message queues.
semmni          64/20      3.8 Kbytes Max number of semaphore identifiers.
shmmni         200/50     15.2 Kbytes Max number of shared mem segments.
shmseg         120/50      --         Max number of shmem segs / process.
                                      These values for the System V IPC
                                      configurables appear to be adequate
                                      for most single-user environments.

scroll_lines   100/70      7.5 Kbytes Graphics ITE maximum scroll lines.
                                      This only impacts the scroll limit
                                      before VUE/X is started.

maxusers        32/8      12.0 Kbytes
<\ex>

The following subsystems in ''/etc/rc.config.d'' are affected:

<ex>
                                         Approx.
  Disabled Subsystems                      RAM
  (Daemons)                              Savings
  ---------------------------------------------------
  On-line Diagnostics                    1736 Kbytes
  (DIAGMON, DEMLOG, MEMLOGP)

  Network Tracing and Logging             668 Kbytes
  (netfmt, nktl_daemon, ntl_reader)

  uucp(1), vt(1), shl(1)                  200 Kbytes
  (ptydaemon, vtdaemon(1m))
<\ex>

<otherhead> Tunable Parameter Sets

This feature allows the user to modify the values of a set of
configurable parameters to optimize the kernel for some specific
application usage.
<memo>
There are no sets here yet (except for the liteRAM set above),
but we should get some before IC3.
<\memo>

<otherhead> Extensible Description Files

This is for third-party and other software packages that are not part of
the standard HP-UX operating system.  These packages can deliver files
into ''/usr/sam/lib/kc'' that inform SAM about new drivers, subsystems,
and configurable kernel parameters.  This allows SAM to do a better job
of managing those new kernel objects.  Of particular interest is the
subsystems feature:  If the external software product driver or drivers,
when installed in the kernel, must be installed along with a number of
other drivers, the entire group can be given a name with a list of
associated drivers which SAM can then manage as a set.  The formats for
extensible description files are explained in the comments at the
beginning of the files.  For more information, examine the files
''drivers.tx'', ''params.tx'', and ''subsys.tx'' in directory
''/usr/sam/lib/kc''.

When adding new files, the file names must match the patterns:
''drivers''%%mmm%%''.tx'', ''params''%%mmm%%''.tx'', and/or
''subsys''%%mmm%%''.tx'', where %%mmm%% represents a recommended two- or
three-character mnemonic that represents the name of the product.  For
example, a product named "Datakit" could name the associated files
''drivers.DK.tx'', ''params.DK.tx'', and ''subsys.DK.tx''.

<!-- ============================================================== -->

<!--
```

```
-->
<!-- ################################################################# -->
<!-- ###                                                           ### -->
<!-- ###    "WHAT'S NEW IN SAM": Networking and Communications     ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-NNC> What's New:  Networking and Communications

The following features are new at 10.0:

<otherhead> Networked File Systems

<list bullet tight>
  * Networked file systems and local file systems are now managed
    from the "File Systems" subarea window in the "Disks and File
    Systems" area.
<\list>

<otherhead> NFS Automounter configuration

<list bullet tight>
  * updates direct, indirect, and master maps
  * reads NIS maps
  * enable and disable the automounter
  * update startup configuration files for the automounter
<\list>

<otherhead> Improved LAN configuration:

<list bullet tight>
  * Supports changeable station address, and MTU size if applicable.
<\list>

<otherhead> Other

<list bullet tight>
  * Miscellaneous Usability Improvements
<\list>

<!-- ================================================================= -->

<!--
```

```
-->
<!-- ################################################################# -->
<!-- ###                                                           ### -->
<!-- ###    "WHAT'S NEW IN SAM": Peripheral Devices                ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-PD> What's New:  Peripheral Devices

The only subarea in the peripheral-devices area that has changed
significantly at 10.0 is in the terminals-and-modems subarea on systems
that have been converted to a trusted system where the following
security-related operations can be applied to a selected terminal or
modem:

<lablist>
\Lock Terminal/Modem\
<newline>
        Prevents all users from logging in on the terminal or modem
        connection.

\Unlock Terminal/Modem\
<newline>
        Removes an existing lock on the terminal or modem.

\Modify Security Policies\
<newline>
        Sets the following parameters for the terminal or modem.
        <list bullet tight>
        * Maximum number of unsuccessful login tries allowed.
        * Minimum delay between successive login tries.
        * Login timeout value.
        <\list>

\Modify Authorized Users\
<newline>
        Allows only specific users to log in on the selected terminal or
        modem.
<\lablist>

<!-- ================================================================= -->

<!--
```

```
-->
<!-- ################################################################# -->
<!-- ###                                                           ### -->
<!-- ###    "WHAT'S NEW IN SAM": Printers and Plotters             ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-LP> What's New:  Printers and Plotters

The "Printers and Plotters" area of SAM supports the following
new features:

<list bullet>
  * Accept or reject requests without also disabling or enabling a
    printer.

  * The actions:  enable, disable, accept requests, reject requests,
    remove, and modify fence priority can be performed on multiple
    printer/plotter devices or device classes.

  * Printer/plotter device classes are shown in the "Printers and
    Plotters" subarea.  The actions that can be performed on a device
    class are:  accept requests, reject requests, set as the default
    destination, and show class members.

  * There are no restrictions on which text characters can be used in a
    remote printer name.  This allows better interoperability with
    non-HP-UX systems.

  * When running SAM on a system that is a member of an NFS cluster,
    printers, plotters and print classes can be managed as cluster-wide
    resources and/or as local resources assigned to a particular
    machine in the cluster.
<\list>

<!-- ================================================================= -->

<!--
```

```
-->
<!-- ################################################################# -->
<!-- ###                                                           ### -->
<!-- ###    "WHAT'S NEW IN SAM": Process Management                ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-PM> What's New:  Process Management

Performance monitors are now executed directly from SAM's opening
window.

SAM can maintain a continuous display of active processes in the system
process control area.

<!-- ================================================================= -->

<!--
```

```
-->
<!-- ############################################################################ -->
<!-- ###                                                                      ### -->
<!-- ###    "WHAT'S NEW IN SAM": Routine Tasks                                ### -->
<!-- ###                                                                      ### -->
<!-- ###        SAM Main Menu Screen: "Actions" Menu                          ### -->
<!-- ###             Select "What's New in SAM..."                            ### -->
<!-- ###                                                                      ### -->
<!-- ############################################################################ -->
<s3 id=FAL-MAIN+OVERVIEW+WhatsNew-RT> What's New:  Routine Tasks

No significant changes from earlier releases except that SAM now removes
files that have no valid owner (previously owned by a user whose user ID
no longer exists on the system).

ASCII and non-ASCII log files are now viewable from the same screen.

Not that if a user is removed from the system but files owned by that
user are !!not!!  removed from the system, those files become "unowned"
files.  If you add a a different user and reassign the old user's user
ID to the new user, the new user becomes the owner of those "unowned"
files.  This may or may not be a problem, depending on what the files
are and what they contain.

<!-- ====================================================================== -->

<!--
```

```
-->
<!-- ############################################################################ -->
<!-- ###                                                                      ### -->
<!-- ###    "WHAT'S NEW IN SAM": Running SAM on Remote Systems                ### -->
<!-- ###                                                                      ### -->
<!-- ###        SAM Main Menu Screen: "Actions" Menu                          ### -->
<!-- ###             Select "What's New in SAM..."                            ### -->
<!-- ###                                                                      ### -->
<!-- ############################################################################ -->
<s3 id=FAL-MAIN+OVERVIEW+WhatsNew-RemoteSAM> What's New:  Running SAM on Remote Syste

No significant changes in this area.

<!-- ====================================================================== -->

<!--
```

```
-->
<!-- ################################################################# -->
<!-- ###                                                           ### -->
<!-- ###    "WHAT'S NEW IN SAM": Restricted SAM                    ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-RestrictedSAM> What's New:  Restricted SAM

This is a new SAM feature.  If you log in as user ''root'' (or use the
''su'' command to become ''root''), then run ''sam -r'', you can build
custom versions of SAM that grant restricted access to specific areas
by non-root users.

For example, suppose you create a version that allows user ''user1'' to
access only the "Accounts for Users and Groups" area of SAM:

<list bullet>
  * ''user1'' executes SAM.

  * SAM changes ''user1'''s user ID to ''root'' or whatever other user
    ID may be necessary while running the restricted version or
    authorized applications.

  * The only SAM area that is visible to ''user1'' is the "Accounts for
    Users and Groups" area of SAM.

  * No unauthorized SAM areas appear in the main SAM area-selection
    window, thus ensuring that the user is properly restricted to
    specific areas where he or she is authorized to make system changes.
    This prevents access to all other (unauthorized) areas.
<\list>

<!-- ================================================================= -->

<!--
```

```
-->
<!-- ################################################################# -->
<!-- ###                                                           ### -->
<!-- ###    "WHAT'S NEW IN SAM": SAM Online Help System            ### -->
<!-- ###                                                           ### -->
<!-- ###        SAM Main Menu Screen: "Actions" Menu               ### -->
<!-- ###             Select "What's New in SAM..."                 ### -->
<!-- ###                                                           ### -->
<!-- ################################################################# -->
<s3 id=FAL-MAIN+OVERVIEW+WhatsNew-HelpSystem> What's New:  SAM Online Help System

As part of the on-going improvements in SAM, the SAM online help system
has been redesigned and rewritten in many (but not all) areas.  Some new
features include browsable help where you can explore an area of SAM
without performing any actions or explore a related subarea before
taking an action.

Scrollable glossary lists have been added in some areas to clarify
specific explanations.

In the opening SAM area-selection window, you can get online help on
each area or subarea label or icon by highlighting the label or icon
then pressing [[f1]].

[[f1]] help is also available on most configurable kernel parameters
listed in the "Configurable Parameters" subarea screen of the Kernel
Configuration area.

<!-- ================================================================= -->

<!--
```

```
-->
<!-- ####################################################################### -->
<!-- ###                                                                ### -->
<!-- ###    "WHAT'S NEW IN SAM": Time and NTP Time Service              ### -->
<!-- ###                                                                ### -->
<!-- ###        SAM Main Menu Screen: "Actions" Menu                    ### -->
<!-- ###             Select "What's New in SAM..."                      ### -->
<!-- ###                                                                ### -->
<!-- ####################################################################### -->

<s3 id=FAL-MAIN+OVERVIEW+WhatsNew-Time> What's New:  Time and NTP Time Services

This is a new area in SAM at HP-UX Release 10.0.  Use it to set the date
and time on the local machine where SAM is running (same capabilities as
the normal HP-UX ''date'' command), and to administer NTP time services
in a network (new HP-UX capability).

Network-Time-Protocol (NTP) is a new feature at 10.0.  Use NTP time
services to set up and share a common time reference among multiple
systems in a network to maintain properly synchronized time and date
information throughout the network.

<otherhead> Network Time Protocol configuration

<list bullet tight>
  * configures network time protocol daemon
  * specifies local time source
  * defines time source authentication policy
  * sets local time and date
<\list>

<!-- ================================================================ -->

<!--
```

```
-->
<!-- ####################################################################### -->
<!-- ###                                                                ### -->
<!-- ###    "WHAT'S NEW IN SAM": SAM Other Areas                        ### -->
<!-- ###                                                                ### -->
<!-- ###        SAM Main Menu Screen: "Actions" Menu                    ### -->
<!-- ###             Select "What's New in SAM..."                      ### -->
<!-- ###                                                                ### -->
<!-- ####################################################################### -->

<s3 id=FAL-MAIN+OVERVIEW+WhatsNew-Other> What's New:  Other Areas

A number of other features and products are available at HP-UX Release
10.0, many of which register themselves with SAM so that they can be
administered from the SAM user interface.  These packages are separate
from SAM, have their own help systems, etc., and are not documented
specifically here.  One example is the HP software distribution
utilities that are available in the HP-UX operating system for
distributing and installing operating-system and applications software
on various systems in a network.

<!-- ================================================================ -->

<!--
```

```
-->
<!-- ################################################################ -->
<!-- ################################################################ -->
<!-- ###                                                          ### -->
<!-- ### SYSTEM ADMINISTRATOR RESPONSIBILITIES AND QUALIFICATIONS ### -->
<!-- ###                                                          ### -->
<!-- ###  Hyperlink access from SAM Main Menu Overview Help Screen ### -->
<!-- ###                                                          ### -->
<!-- ################################################################ -->
<!-- ################################################################ -->
<s2 id=FAL-MAIN+OVERVIEW+SysAdminRespQual> Administrator's Responsibilities and Quali

<otherhead> Responsibilities

As system adminstrator, you are normally responsible for the following:

<list bullet tight>
* Installing and testing the hardware.
* Installing HP-UX operating system software.
* Configuring the HP-UX operating system.
* Updating the HP-UX operating system.
* Setting up user access (login accounts, system security, etc.)
* Adding or removing peripheral devices from time to time.
* Monitoring file system use and growth.
* Backing up and restoring files.
* Detecting and correcting file system errors.
* Assisting others in using the system properly.
* Providing for a backup administrator in your absence.
<\list>

<otherhead> Qualifications

SAM assumes you know how to do at least the following:

<list bullet tight>
* Log in and out of the system.
* Move around in the directory tree (changing directories).
* Distinguish between !!absolute!! and !!relative!! path names.
* Edit files using a common HP-UX editor such as ''vi''.
* Display file contents by using ''more'' or ''cat''.
* Search text files using ''grep''.
* Move, copy, and remove files using ''mv'', ''cp'', and ''rm'',
  respectively.
* Use one of the common HP-UX shells such as ''ksh'', ''sh'', or ''csh''.
* Display reference manual entries using the ''man'' command.
<\list>

To browse all help topics related to SAM area selection and general SAM
overview topics, select:
<list bullet tight>
* <link "_hometopic" JumpNewView> SAM Main Window (SAM Areas) Online Help
  <\link>
<\list>

<!-- ============================================================== -->

<!--
```

```
-->
<!-- ################################################################ -->
<!-- ################################################################ -->
<!-- ################################################################ -->
<!-- ###                                                          ### -->
<!-- ### OVERVIEW OF "SAM AREAS" OPENING WINDOW                   ### -->
<!-- ###                                                          ### -->
<!-- ###  Hyperlink access from SAM Main Menu Overview Help Screen ### -->
<!-- ###                                                          ### -->
<!-- ################################################################ -->
<!-- ################################################################ -->
<!-- ################################################################ -->
<s2 id=FAL-MAIN+OVERVIEW-MainMenu> Overview of "SAM Areas" Window

The top-level window that SAM displays at start-up is the SAM
functional-area-selection window.  Use this window to select functional
areas (such as "Disks and File Systems" or "Networking and
Communications") for performing administrative tasks, or use it to
execute applications related to specific SAM or user-defined activities
such as running custom programs for special system needs.

The main window contains a !!hierarchical!! selection list which means
that selecting given items in the current list often leads to another
list at a lower level in the hierarchy until there are no more
descendent lists for that subarea.  For example, selecting the "Disks
and File Systems" area at the opening level exposes a second level where
a new list is displayed for selecting disks and file systems, logical
volumes, volume groups, etc.  Selecting any of those subareas then opens
a new window where you can perform administrative tasks related to that
specific subarea.

<otherhead> Window Description

!!Top Row Menu Buttons!!
<newline>
The top row across the "SAM Areas" window is called a !!menu bar!!.  It
contains a row of buttons ([[File]], [[View]], [[Options]], [[Actions]],
and [[Help]]) which activate pulldown menus that support various
ancillary functions related to the current screen and to highlighted
items in the current screen.  These buttons remain unchanged as you move
from level to level in the hierarchical area-selection lists.  For help
on these buttons, select the button of interest, then press [[f1]].  For
more information, see <xref FAL-MAIN+OVERVIEW-MenuBar>.

!!Title Line!!
<newline>
The title line under the menu bar identifies what kind of items are
listed in the main part of the window.  At startup, ''SAM Areas''
appears, identifying this window as an area-selection menu.  At lower
levels in the "Areas" hierarchy, the title text is followed by the
functional area and/or subarea to which items in the list belong.  For
example, in the Disks and File Systems functional area screen, the title
becomes ''SAM Areas:  Disks and File Systems''.  At a third level or
beyond, if there is not enough room to display the entire path, a single
'':...:'' represents one or more intermediate levels that could not be
displayed in the available space.

!!List Headings!!
<newline>
Items in the SAM areas hierarchical list are displayed in one of two
formats:

<list bullet>
  * Icon and text identifier for each area if the user interface is
    Motif or HP VUE (X-windows based), or
```

```
  * Table format, if you are using a text terminal or if you select
    ''By Properties'' from the [[View]] pulldown menu in a Motif
    or HP VUE window.
<\list>

Headings identify what information is contained in the corresponding
column:

<lablist>
\''Source''\  Origin of the subsystem or application.  Actual text in this
              column can be:
              <lablist>
              \''SAM''\     This subsystem or subarea is delivered as
                            part of the SAM software package in the HP-UX
                            operating system.

              \''Custom''\  Customer-defined application (program or
                            command) or group of applications (descendent
                            hierarchical list leading to other subareas
                            or applications).

              \''Other''\   Subsystems and/or applications that are not
                            part of standard SAM.  These are usually
                            supplied by other entities within HP or by
                            outside third-party software providers.  If
                            the text for the Source column is not
                            specified by the software provider, SAM
                            displays ''Other'' in this column.

          <\lablist>

\''Area''\ An area, application, or subsystem within SAM or that is accessed
           via SAM.  Items in this list include standard SAM subsystems
           (or a limited set of SAM and other subsystems if you are
           using a restricted version of SAM), customer-defined custom
           applications or subsystems (application groups), if any, and
           other commands or programs linked to SAM by other software
           suppliers within or outside of HP.

           <lablist>
           \!!applications!!\  Utilities are listed by the name defined
                               when the application was configured into
                               SAM.  These are programs or commands that
                               run or are executed by selecting
                               (highlighting and opening) the item.

           \!!groups!!\        Groups are identified by a ''->'' at the
                               end of the area name, indicating that
                               selecting the item opens a descendent
                               menu list containing additional selection
                               items.
           <\lablist>
<\lablist>

For more information about available SAM areas, select <xref
FAL+MAIN+TASKS-OVERVIEW>.

<otherhead> Selecting an Area

To select an item in the Area list, double-click the left-hand mouse
button on the item to highlight and open or run it, or highlight the
item then select [[Open]] or [[Run]] in the [[Actions]] pulldown menu.

<otherhead> Returning to Previous Levels

Select [[Close]] in the [[Actions]] menu or double-click the left-hand
mouse button on the ''..(go up)'' list item to close the current list
and return to the next higher level in the hierarchy.  To go to the top
(opening screen) level, select Select [[Go to Top Level]] in the
[[Actions]] menu.

<otherhead> Additional Information

For information about system administration tasks in general, select
<xref FAL-SAM-TASKS>.

For overview information about SAM (System Administration Manager),
select <xref FAL-SAM-OVERVIEW>.

For information about what tasks you can perform from the SAM Areas
window, select <xref FAL+MAIN+TASKS-OVERVIEW>.

For information about how to use the SAM Help System, select <xref
FAL-HELPSYS-XWIN> or <xref FAL-HELPSYS-TERM>.

To browse all help topics related to SAM area selection and general SAM
overview topics, select:

<list bullet tight>
* <link "_hometopic" JumpNewView> SAM Main Window (SAM Areas) Online Help
  <\link>
<\list>
<!-- ================================================================= -->

<!--
```

```
-->
<!-- ################################################################ -->
<!-- ################################################################ -->
<!-- ################################################################ -->
<!-- ###                                                          ### -->
<!-- ### OVERVIEW OF SAM, THE SYSTEM ADMINISTRATION TOOL          ### -->
<!-- ###                                                          ### -->
<!-- ###  Hyperlink access from SAM Main Menu Overview Help Screen ### -->
<!-- ###                                                          ### -->
<!-- ################################################################ -->
<!-- ################################################################ -->
<!-- ################################################################ -->

<s3 id=FAL-SAM-OVERVIEW> Overview of SAM

SAM, an acronym for !!S!!ystem !!A!!dministration !!M!!anager, is a
collection of programs and software modules. These modules are accessed
and executed through a graphical user interface or through an equivalent
user interface on an ordinary text terminal. SAM provides an convenient
method for using a large collection of complex HP-UX commands to perform
various kinds of system administration tasks of widely varying
complexity, without requiring intimate detailed knowledge of what those
commands are or in what sequence they must be used.

<otherhead> SAM Startup

When SAM starts, the opening screen presents a list of functional areas
where tasks can be performed, such as adding or changing accounts for
system users and user groups, setting up or altering file systems,
changing kernel configuration by adding drivers or performing other
alterations, setting the system clock or network time references, etc.

<otherhead> Selecting Task Areas

To perform administrative tasks in a given area, simply select the area
of interest. This produces a new list of selectable subareas, or it
opens a new window where you can perform the actual work. For example,
selecting "Accounts for Users and Groups" leads to a subarea list where
you can choose "Users" or "Groups". On the other hand, selecting "Run
SAM on Remote Systems" leads directly to a new window where you can
select a system from the list to run SAM on, or add a new remote system
to the list. See <xref FAL+MAIN+TASKS-OVERVIEW>.

<otherhead> SAM Online Help System

SAM has an extensive online help system. To obtain overview help for
area-selection windows or for subarea task windows, select [[Overview]]
from the [[Help]] pulldown menu in the upper-right-hand corner of the
screen. For other windows, select the [[Help]] button in the lower
right-hand corner. For help on specific items in a window, highlight
the window and press [[f1]]. See <xref FAL-HELPSYS-XWIN> or <xref
FAL-HELPSYS-TERM>.

<!-- ============================================================== -->

<!--
```

```
-->
<!-- ################################################################ -->
<!-- ################################################################ -->
<!-- ################################################################ -->
<!-- ###                                                          ### -->
<!-- ### SAM Main Menu Screen                                     ### -->
<!-- ###                                                          ### -->
<!-- ################################################################ -->
<!-- ################################################################ -->
<!-- ################################################################ -->

<s2 id=FAL-MAIN+OVERVIEW-MenuBar> Menu-Bar Pulldown Menus

The menu bar at the top of the SAM start-up main window contains buttons
for accessing the following pulldown menus:

<lablist>
\[[File]]\      Contains two menu items. Select [[Exit SAM]] to terminate
                SAM or [[Print]], if accessible, to print an ASCII
                representation of the current window. See <xref
                FAL-MENUBAR-FILE> for more information. In lower levels
                of SAM, the [[Exit]] item returns you to the main
                area-selection window.

\[[View]]\      Use this pulldown menu to rearrange the contents and
                sequence of columns in the main list area of the window.
                See <xref FAL-MENUBAR-VIEW> for more information.

\[[Options]]\   Use this pulldown menu to view the SAM log, configure
                SAM logging, or to update the current selection list with
                new data ([[Refresh Screen]]). See <xref
                FAL-MAIN+OPTIONS> for more information.

\[[Actions]]\   Use this pulldown menu to choose an action related to the
                entire list or related to adding a new item to the list.
                The contents of this menu varies, depending on where you
                are in the current area/subarea-selection hierarchy.
                Also, certain items may be present or omitted from the
                list, depending on current system state, configuration,
                or current context. See <xref FAL-MAIN+ACTIONS> for more
                information.

\[[Help]]\      Use this pulldown menu to access the SAM help system, get
                overview help for the current screen topic, or obtain help
                information about the keyboard or HP-UX help system. See
                <xref FAL-MENUBAR-HELP> for more information.
<\lablist>

To browse all help topics related to SAM area selection and general SAM
overview topics, select:
<list bullet tight>
* <link "_hometopic" JumpNewView> SAM Main Window (SAM Areas) Online Help
  <\link>
<\list>

<!-- ============================================================== -->

<!--
```

```
 -->
<!-- ################################################################## -->
<!-- ###      [[File]] Pulldown Menu Description                   ### -->
<!-- ################################################################## -->

<s3 id=FAL-MENUBAR-FILE> The [[File]] Pulldown Menu

The [[File]] pulldown menu contains two menu items:

<lablist>
\[[Print]]\     Creates an ASCII representation of main listing area of
                the current screen, including column heads, and prints
                it to a file or a system line printer.  Does not print
                the information in the menu bar and status lines above
                the window's list area.

\[[Exit SAM]]\  Terminates SAM and and returns to the user shell from
                which SAM was started.
<\lablist>

<list bullet tight>
* <link "_hometopic" JumpNewView> SAM Main Window (SAM Areas) Online Help
  <\link>
<\list>

<!-- ================================================================ -->

<!--
```

```
 -->
<!-- ################################################################## -->
<!-- ###       "View" Pulldown Menu Description                    ### -->
<!-- ################################################################## -->

<s3 id=FAL-MENUBAR-VIEW> The [[View]] Pulldown Menu

The [[View]] pulldown menu contains four menu items for rearranging the
contents and sequence of columns in the main list area of the window:

<lablist>
\[[Columns...]]\            Activates the list-screen column editor so you
                            can choose any of the available columns for
                            display, specify whether the column should be
                            left- or right-justified, and specify the
                            width to be reserved for each column.

\[[Filter...]]\             Activates the Filter configuration screen
                            where you can choose to suppress or display
                            items in the list that match, are greater
                            than or less than, or not equal to a
                            specified value.

\[[Sort...]]\               Activates the Sort configuration screen
                            where you can choose sorting priority
                            according to which column the sorting
                            information of interest is in, and whether
                            the sort is to be in ascending or descending
                            order.

\[[By Name and Icon]]\      Switches the list of SAM areas in the main
                            area of the screen to an array of icons with
                            accompanying text identifying each area
                            (graphical user interface version only).

\[[By Properties]]\         Switches the list of SAM areas in the main
                            area of the screen to a text-table-format
                            list of areas with accompanying source
                            information indicating where the
                            area-administration software came from
                            (''SAM'', ''Other'', or ''Custom'').  This
                            is the only format available on terminals.

\[[Save View as Default]]\  Selecting this menu item takes the current
                            filter configuration for the current subarea
                            list and saves it as the default
                            configuration so that the same configuration
                            information is displayed each time the
                            current subarea is entered until the
                            configuration is changed again.
<\lablist>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================ -->

<!--
```

```
-->
<!-- ################################################################# -->
<!-- ###      "Options" Pulldown Menu Description                  ### -->
<!-- ################################################################# -->
<s3 id=FAL-MAIN+OPTIONS> The [[Options]] Pulldown Menu

The [[Options]] pulldown menu contains two menu items:

<lablist>
\[[View SAM Log...]]\        <location id=FAL-MAIN+OPTIONS-ViewLog>&empty;<\location
                             Selecting this item produces a new window
                             for the SAM Log-File Monitor.  From that
                             monitor, you can change log-file filtering,
                             save the filtered log to a file, scroll
                             through the current file contents, and
                             return to the current window when you are
                             finished.  See <xref FAL-LOGMON-OVERVIEW>
                             for more information.

\[[SAM Log Options...]]\  <location id=FAL-MAIN+OPTIONS-SetLogOpts>&empty;<\location>
                             (This item appears only in the main SAM
                             area-selection-list window.)  Selecting
                             this item produces a new window for
                             setting the maximum log-file size,
                             specifying whether the file should be
                             automatically trimmed when it exceeds a
                             given size, and whether to run the log
                             viewer continuously while SAM is running.

\[[Refresh List]]\           Selecting this item updates the current
                             list screen with new information.

<\lablist>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================ -->

<!--
```

```
-->
<!-- ################################################################# -->
<!-- ###      "Actions" Pulldown Menu Description                  ### -->
<!-- ################################################################# -->

<s3 id=FAL-MAIN+ACTIONS> The [[Actions]] Pulldown Menu

Use the [[Actions]] pulldown menu to choose an action related to the
entire list or related to adding a new item to the list.  This menu
supports the following actions:

<lablist>
\[[Open Item]]\          <location id=FAL-MAIN+ACTIONS-Open>&empty;<\location>
                         Select this menu item to open a new
                         area-selection screen on the highlighted item
                         (only one item in the current list can be
                         highlighted).  If no item is highlighted in the
                         current list, or if the highlighted item does not
                         lead to a new screen at the next lower level,
                         this item does not appear in the [[Actions]]
                         menu or is inaccessible.

\[[Close Level]]\        <location id=FAL-MAIN+ACTIONS-Close>&empty;<\location>
                         Select this menu item to close the current list
                         and return to the next higher level in the
                         hierarchy.  If you are already at the top level,
                         this item is not accessible.

\[[Go to Top Level]]\    <location id=FAL-MAIN+ACTIONS-GoTopLevel>&empty;<\location>
                         Use this menu item to return to the top, opening
                         level of the opening SAM Areas screen.  This item
                         is useful when you are at a lower level in the
                         area-selection hierarchy and want to return
                         directly to the top level and select a different
                         area.

\[[Add Custom Application...]]\ <location id=FAL-MAIN+ACTIONS-AddCustomApplication>&e
                         Use this action item-pair to add a ++custom
                         application++ to the current list in the
                         hierarchical area-selection structure.  A new
                         dialog window appears where you can define the
                         label text for the custom list item and an
                         associated online help file.  For more
                         information about adding custom applications, see
                         <xref FAL-MAIN+DIALOG+AddCustomApplication>.

\[[Add Custom Application Group...]]\   <location id=FAL-MAIN+ACTIONS-AddGroup>&em
                         Use this action item-pair to build a new
                         hierarchical list containing a group of subareas
                         where applications or other groups can be
                         structured.  A new window appears where you can
                         define the label text for the ''Area'' list item
                         and an associated online help file.  For more
                         information about adding custom groups, see <xref
                         FAL-MAIN+DIALOG+AddCustomApplGroup>.

\[[What's New in SAM...]]\
            <location id=FAL-MAIN+ACTIONS-WhatsNew>&empty;<\location>
                         This item opens a help screen for accessing
                         information about new features added to SAM at
                         HP-UX Release 10.0.  To access the same
                         information from here, select <xref
                         FAL-MAIN+OVERVIEW+WhatsNew>.
<\lablist>

If any custom applications or custom application groups have been
```

```
added to SAM, a double horizontal separator line appears in the
[[Actions]] menu and the following additional items appear in the
list:

<lablist>
\[[Run]]\               <location id=FAL-MAIN+SELECTED-Execute>&empty;<\location>
                        This menu item executes the selected item
                        immediately if it is a command or program
                        (application).  If the item is associated with a
                        group of associated applications, a new menu
                        appears, showing custom applications and/or
                        application groups at the next lower level in the
                        hierarchical area-selection list structure.

\[[Modify...]]\         <location id=FAL-MAIN+SELECTED-Modify>&empty;<\location>
                        Select this item if you want to change the label,
                        help file name, command name, or graphical
                        interface specification for the highlighted custom
                        application or application group.  This item
                        appears in the menu only if the highlighted item
                        in the current area-selection list is a ++custom
                        application++ or ++custom application group++
                        !!and!!  your effective user ID is ''root''.  For
                        more information, see <xref
                        FAL-MAIN+DIALOG+ModifyCustomApplicationGroup>.

\[[Remove from SAM]]\   <location id=FAL-MAIN+SELECTED-Remove>&empty;<\location>
                        Select this item if you want to completely remove
                        the highlighted custom application or application
                        group from SAM.  Removal applies to the current
                        application or group only.  Any descendent
                        applications or groups must first be removed in a
                        separate operation before a custom group can be
                        removed.  If the parent of the current item is a
                        custom group at a higher level, the parent is not
                        affected.  This item appears in the menu only if
                        the highlighted item in the current area-selection
                        list is a ++custom application++ or ++custom
                        application group++ !!and!!  your effective user
                        ID is ''root''.

<\lablist>

To obtain help on specific items in this menu, activate the menu while
in the subarea of interest, highlight the item of interest (using the
&up; or &down; keys, then press [[f1]].

For more information about related task dialogs, select:

<list bullet tight>
   * <xref FAL-MAIN+DIALOG+AddCustomApplication>

   * <xref FAL-MAIN+DIALOG+AddCustomApplGroup>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ============================================================== -->

<!--
```

```
 -->
<!-- ################################################################ -->
<!-- ###      "Help" Pulldown Menu Description                    ### -->
<!-- ################################################################ -->

<s3 id=FAL-MENUBAR-HELP> The [[Help]] Pulldown Menu

The [[Help]] pulldown menu contains the following items:

<lablist>
\[[Overview...]]\             An overview help screen that describes the
                              current window contents.  This overview
                              screen usually provides hyperlinks to other
                              help screens that provide greater details
                              about various specific items in the window.

                              The overview screen also provides hyperlink
                              access to a browsing window where you can
                              browse through the entire help system for the
                              "SAM Areas" area-selection window.

                              Help systems for the various SAM area
                              cannot be accessed from the "SAM Areas"
                              help system.  To access the entire help
                              system pertaining to any given area or
                              subarea in a hierarchical list, highlight
                              the corresponding item of interest in the
                              SAM area-selection list, then press the
                              [[f1]] key.

\[[Keyboard...]]\             Explains how to access the help system from
                              the keyboard (without using the mouse).

\[[Using Help...]]\           Explains in general how to use the HP Help
                              system.

\[[Product Information...]]\  Displays SAM software version and
                              copyright information, and other information
                              about SAM.  See <xref FAL-SAM+PRODUCT-INFO>.

<\lablist>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ============================================================== -->

<!-- ============================================================== -->

<!-- ################################################################ -->
<!-- ################################################################ -->
<!-- ################################################################ -->
<!-- ###                                                          ### -->
<!-- ### SAM Master Task Capabilities Overview                    ### -->
<!-- ###                                                          ### -->
<!-- ################################################################ -->
<!-- ################################################################ -->
<!-- ################################################################ -->

<s2 id=FAL-SAM-TASKS> Overview of SAM Task Capabilities
```

```
SAM is the tool of choice for administering HP-UX systems.  It supports
both a graphical user interface and a separate character-driven
interface for simple ASCII terminals on systems that do not have a
terminal or workstation that supports X-Windows.

SAM supports a standard set of task areas (see <xref
FAL+MAIN+TASKS-OVERVIEW>) as well as other SAM-compatible administrative
tools, whether supplied by other organizations inside Hewlett-Packard,
other software suppliers, or by the user.  SAM supports adding custom
programs or task areas (groups) to meet individual system needs by using
simple procedures accessed through the "Actions" menu at the top of the
SAM Areas window.

The SAM Areas window uses a multi-layer hierarchical selection structure
that provides considerable flexibility in navigating easily from the top
of the selection tree to a specific task area or subarea.

<!-- ================================================================ -->
<!--
```

```
-->
<!-- ################################################################ -->
<!-- ################################################################ -->
<!-- ###                                                          ### -->
<!-- ### SAM Main Menu Task Areas                                 ### -->
<!-- ###                                                          ### -->
<!-- ################################################################ -->
<!-- ################################################################ -->

<s3 id=FAL+MAIN+TASKS-OVERVIEW> Overview of SAM Opening Window Task Areas

The following task areas are included in standard SAM, and can be
selected in the top-level SAM Areas menu:

<lablist>
\Accounts for Users and Groups\ <newline>
                             Adding and deleting users and user groups
                             on the system.

\Auditing and Security\      <newline>
                             Tasks related to managing and auditing
                             system security with regard to events,
                             system calls, users and groups, and
                             global security policies.

\Backup and Recovery\        <newline>
                             Tasks related to preserving file system
                             contents on backup devices, and recovering
                             lost information from backup media.

\Cluster Configuration\      <newline>
                             Tasks related to configuring and managing
                             clusters of networked systems.

\Disks and File Systems\     <newline>
                             Tasks related to configuring disks and file
                             systems, including networked file systems
                             (NFS).

\Kernel Configuration\       <newline>
                             Setting up configurable kernel operating
                             parameters, adding or deleting drivers in
                             the kernel, setting up root and swap devices,
                             and configuring kernel subsystems.

\Networking/Communications\  <newline>
                             Setting up and managing network communication
                             resources on the system where SAM is running.

\Peripheral Devices\         <newline>
                             Configuring the system to properly interact
                             with peripheral hardware devices, including
                             disks and file systems (alternate path to
                             same task area), tape drives, printers and
                             plotters (alternate path), terminals and
                             modems, etc.).

\Printers and Plotters\      <newline>
                             Configuring and managing print requests,
                             spooling, and similar tasks related to line
                             printers, plotters, and similar hard-copy
                             output devices.

\Process Management\         <newline>
                             Scheduling jobs via ''cron'', monitoring
                             system performance and scheduling behavior,
```

```
                          and controlling system processes.

\Remote Administration\   <newline>
                          Running SAM on remote systems (supports
                          administration of multiple systems from a
                          single location).

\Routine Tasks\           Backup and recovery (alternate path to same
                          task area), log files, and selective file
                          removal.

\Time\                    Setting local system's time clock and
                          configuring and managing Network Time
                          Protocol (NTP) time services that
                          coordinate and synchronize time clocks
                          among systems in a network.
<\lablist>

SAM also supports other areas and applications if they have been
installed and configured to work with SAM.  Functionality that is not
included in the standard SAM is identified by text other than ''SAM'' in
the "Source" column of the SAM Areas list (if SAM is currently
displaying areas by name and icon, select ''By Properties'' from the
[[View]] pulldown menu to obtain a tabular listing of SAM areas showing
this information).

To browse all help topics related to SAM area selection and general SAM
overview topics, select:

<list bullet tight>
* <link "_hometopic" JumpNewView> SAM Main Window (SAM Areas) Online Help
  <\link>
<\list>

<!--
 -->
<!-- ################################################################## -->
<!-- ################################################################## -->
<!-- ### Dialog Box:                                                ### -->
<!-- ###                 Add Custom Application Group               ### -->
<!-- ### Access Path:                                               ### -->
<!-- ###              SAM Main Window                               ### -->
<!-- ###                 "Actions" pulldown menu                   ### -->
<!-- ###                    Select "Add Custom -> ...Group"         ### -->
<!-- ###                                                            ### -->
<!-- ################################################################## -->
<!-- ################################################################## -->

<s2 id=FAL-MAIN+DIALOG+AddCustomApplGroup> Task Dialog: Add Custom Application Group

Use this dialog box to add a custom group to the current ''SAM Areas''
area or subarea selection list for use in selecting descendent groups
(subareas) or applications (commands or programs).

This screen contains two fields:  one for specifying the label text to
be displayed in the ''Area'' column of the selection list; the other
specifying the name of a help file.

<otherhead> Procedure

<list order>
  * When the dialog box opens, the label field is highlighted.

  * Type the text you want to appear in the ''Area'' column of the
    selection list and press [[Return]] or [[&down;]] to advance to the
    next (help-file) field.  To correct any errors, use [[Back Space]],
    [[Delete char]], and left- or right-arrow as needed.

  * Type the absolute directory path name (starting with ''/'') and file
    name where the help file for this custom group resides.  This is the
    file that is to be displayed whenever a user highlights the group
    label being added, then presses [[f1]] for help.  This field is
    optional.  No validity checks are made, so you can specify the help
    file then add it later if you prefer.

  * Select [[OK]] when the two fields contain the correct information,
    or select [[Cancel]] to abort the procedure.  The dialog box then
    disappears, returning you to the ''SAM Areas'' window at the current
    level in the hierarchy.
<\list>

After the group is created, select the group and open it (double click
on the item or use the ''Open'' item in the [[Actions]] pulldown menu.
You can then add custom applications and/or additional descendent groups to
the newly created group.

<otherhead> Additional Information

<list bullet tight>
* <xref FAL-MAIN+DIALOGITEM+AddCustomApplGroup-Label>
* <xref FAL-MAIN+DIALOGITEM+AddCustomApplGroup-HelpFile>
* <xref FAL-MAIN+DIALOGITEM+AddCustomApplGroup-IconPath>
* <xref FAL-MAIN+DIALOG+AddCustomApplication>
<\list>

To browse all help topics related to SAM area selection and general SAM
overview topics, select:

<list bullet tight>
* <link "_hometopic" JumpNewView> SAM Main Window (SAM Areas) Online Help
  <\link>
```

```
<\list>

<!-- ================================================================== -->

<!--
```

```
-->
<s3 id=FAL-MAIN+DIALOGITEM+AddCustomApplGroup-Label> Custom Application Group:  Label

This field specifies the text that is to be displayed in the ''Area''
column of the current SAM Areas screen when the group is created.  The
label can contain up to 256 characters.  For easy readability with
respect to other items in the list, limiting labels to about 30 or fewer
characters is preferred.

Type the label text in this field.

To modify the field or correct typing errors, use [[Back Space]],
[[Delete char]], and left- or right-arrow keys as needed.  New
characters are added after the cursor and the cursor advances as they
are typed.  [[Back space]] or [[Delete char]] deletes characters and
moves the cursor to the left.  The cursor can also be moved by placing
the mouse pointer at the desired location and clicking the left-hand
mouse button.

Press [[Return]] to advance to the next field, or select the ''Help
File:'' field by clicking the left-hand mouse button when the mouse
cursor is inside the text area.

When the ''Label:'' and ''Help File:'' fields are correct, select
[[OK]] to create the group in the list and exit the dialog box.

<otherhead> Additional Information

<list bullet tight>
* <xref FAL-MAIN+DIALOG+AddCustomApplGroup>
* <xref FAL-MAIN+DIALOGITEM+AddCustomApplGroup-HelpFile>
* <xref FAL-MAIN+DIALOGITEM+AddCustomApplGroup-IconPath>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================== -->

<!--
```

```
-->
<s3 id=FAL-MAIN+DIALOGITEM+AddCustomApplGroup-HelpFile> Custom Application Group: He

This field specifies the directory path and file name for the help file
to be displayed when a user selects (highlights) the group in the
area-selection list and presses [[f1]] to obtain help. The length of
each directory or file name in the path must not exceed ''NAME_MAX''
characters (14 characters on a short filename system, usually 256 on a
long filename system), and the total pathname length must not exceed
''PATH_MAX'' characters as defined in the ''limits.h'' header file (see
&hpuxref; entry <link limits Man> <book|limits|(5)<\link>.

Type the help file pathname in this field.

To modify the field or correct typing errors, use [[Back Space]],
[[Delete char]], and left- or right-arrow keys as needed. New
characters are added after the cursor and the cursor advances as they
are typed. [[Back space]] or [[Delete char]] deletes characters and
moves the cursor to the left. The cursor can also be moved by placing
the mouse pointer at the desired location and clicking the left-hand
mouse button.

When the ''Label:'' and ''Help File:'' fields are correct, select
[[OK]] to create the group in the list and exit the dialog box.

<otherhead> Additional Information

<list bullet tight>
* <xref FAL-MAIN+DIALOG+AddCustomApplGroup>
* <xref FAL-MAIN+DIALOGITEM+AddCustomApplGroup-Label>
<\list>

<!-- ================================================================ -->

<!--
```

```
-->
<s3 id=FAL-MAIN+DIALOGITEM+AddCustomApplGroup-IconPath> Custom Application Group: Ic

This field specifies the directory path and file name for an existing
icon file to be interpreted and displayed for a user to select
(highlight) the corresponding custom application group in the
area-selection list. The length of each directory or file name in the
path must not exceed ''NAME_MAX'' characters (14 characters on a short
filename system, usually 256 on a long filename system), and the total
pathname length must not exceed ''PATH_MAX'' characters as defined in
the ''limits.h'' header file (see &hpuxref; entry <link limits Man>
<book|limits|(5)<\link>.

To modify the field or correct typing errors, use [[Back Space]],
[[Delete char]], and left- or right-arrow keys as needed. New
characters are added after the cursor and the cursor advances as they
are typed. [[Back space]] or [[Delete char]] deletes characters and
moves the cursor to the left. The cursor can also be moved by placing
the mouse pointer at the desired location and clicking the left-hand
mouse button.

<otherhead> Icon File Requirements

The file must be in X pixmap (XPM) format. The file must exist, but SAM
does not verify the format when you specify it. If the format is
incorrect when SAM attempts to access the file during normal operation,
SAM substitutes a default icon instead to prevent other problems that
might result from a faulty icon. To create or modify an icon file, use
the icon editor program in ''/usr/vue/bin/vueicon''.

<otherhead> Additional Information

<list bullet tight>
* <xref FAL-MAIN+DIALOG+AddCustomApplication>
* <xref FAL-MAIN+DIALOG+ModifyCustomApplication>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>


<!-- ================================================================ -->

<!--
```

```
-->
<!-- ################################################################## -->
<!-- ################################################################## -->
<!-- #   Dialog Box:                                                  # -->
<!-- #                         Add Custom Application                 # -->
<!-- #   Access Path:                                                 # -->
<!-- #                  SAM Main Window                               # -->
<!-- #                       "Actions" pulldown menu                  # -->
<!-- #                          Select "Add Custom -> ...Application" # -->
<!-- #                                                                # -->
<!-- ################################################################## -->
<!-- ################################################################## -->

<s2 id=FAL-MAIN+DIALOG+AddCustomApplication> Task Dialog: Add Custom Application

Use this dialog box to add a custom application (command or program) to
the current ''SAM Areas'' area or subarea selection list.

This screen contains five fields:

<lablist>
\''Label:''\        Label text to be displayed in the ''Area'' column of
                    the "SAM Areas" selection list screen.

\''Command:''\      Complete directory and file pathname of the executable
                    file containing the command or application.

\''Execute Using:''\ User ID to use while executing the application (current
                     user, a particular user, or ''root'' (super-user).

\''User Interface Supports:''\<newline>
                    Specifies whether the user interface for the
                    application supports graphical (and terminal)
                    environments or only ASCII text terminals.

\''Help File:''\    Complete directory and file pathname of the file
                    containing the help information for this application.
<\lablist>

<otherhead> Procedure

<list order>
  * When the dialog box opens, the label field is highlighted.

  * Type the text you want to appear in the ''Area'' column of the
    selection list and press [[Return]] or [[&down;]] to advance to the
    "Command" field.  To correct any errors, use [[Back Space]],
    [[Delete char]], and left- or right-arrow as needed.

  * Type the absolute directory path name (starting with ''/'') and file
    name where the !!existing!!  executable file resides.  This file can
    be an executable object-code program file or a text file containing
    a shell script.  Press [[Return]] or [[&down;]] to advance to the
    "User Interface Supports" field.

  * Select a user ID to use when running the application.  Select the
    pushbutton to obtain a pop-up menu listing the three options:

    <lablist>
    \''Root's ID''\        Execute using UID = 0 (''root'').  This is
                           required if the application requires
                           super-user access.

    \''User's ID''\        Execute using the user's current (usually
                           non-root) user ID.

    \''Specific User ID''\ Execute using a specific user ID that is
                           assigned to certain system user.  This option
                           brings up another text box and pushbutton
                           where you can type a login name or select
                           from a list of known users.
    <\lablist>

  * Set or release the toggles corresponding to the two interface types
    for the application being specified.  If the application can manage
    its own graphical interface (X-windows, bit-mapped displays) and
    alpha-numerical text terminal displays, set both toggles.  Otherwise
    depress only one.  If the application produces only ASCII text
    output, select ''Terminal Environments''.  Press [[Return]] or
    [[&down;]] to advance to the "Help File" field.  See <xref
    FAL-MAIN+DIALOGITEM+AddCustomApplication-Interface> for more
    information about output capabilities.

  * Alter, if needed, the absolute directory path name (starting with
    ''/'') and file name where the help file for this custom application
    resides.  This is the file that is to be displayed whenever a user
    highlights the application label being added, then presses [[f1]]
    for help.  This field is optional.  No validity checks are made, so
    you can specify the help file then add it later if you prefer.

  * When all fields contain the correct information, select [[OK]] to
    add the application to SAM and exit the window.  If you want to add
    the application to SAM then remain in this dialog box so you can
    specify another custom application, select [[Apply]] instead.
    Select [[Cancel]] to abort the procedure without altering the
    current SAM configuration and return to the ''SAM Areas'' window at
    the current level in the hierarchy.
<\list>

<otherhead> Additional Information

<list bullet tight>
* <xref FAL-MAIN+DIALOGITEM+AddCustomApplication-Label>
* <xref FAL-MAIN+DIALOGITEM+AddCustomApplication-Command>
* <xref FAL-MAIN+DIALOGITEM+ExecutionUserID>
* <xref FAL-MAIN+DIALOGITEM+SpecificUserLoginName>
* <xref FAL-MAIN+DIALOGITEM+AddCustomApplication-Interface>
* <xref FAL-MAIN+DIALOGITEM+AddCustomApplication-HelpFile>
* <xref FAL-MAIN+DIALOGITEM+AddCustomApplication-IconPath>
* <xref FAL-MAIN+DIALOG+AddCustomApplGroup>
* <xref FAL-MAIN+DIALOG+ModifyCustomApplication>
<\list>

<!-- ================================================================ -->

<!--
```

```
-->
<s3 id=FAL-MAIN+DIALOGITEM+AddCustomApplication-Label> Custom Application:  Label

This field specifies the text that is to be displayed in the ''Area''
column of the current SAM Areas screen when the custom application is
added to the SAM area-selection hierarchy.  The label can contain up to
256 characters.  For easy readability with respect to other items in the
list, limiting the label to about 30 or fewer characters is preferred.

To modify the field or correct typing errors, use [[Back Space]],
[[Delete char]], and left- or right-arrow keys as needed.  New
characters are added after the cursor and the cursor advances as they
are typed.  [[Back space]] or [[Delete char]] deletes characters and
moves the cursor to the left.  The cursor can also be moved by placing
the mouse pointer at the desired location and clicking the left-hand
mouse button.

Press [[Return]] or use the [[&down;]] key to advance to the next field
or select the desired field by clicking the left-hand mouse button when
the mouse cursor is in the field of interest.

When all fields are correct, select [[OK]] to create the group in the
list and exit the dialog box, or [[Apply]] to add the application to SAM
and remain in the box so you can add another custom application.

<otherhead> Additional Information

<list bullet tight>
* <xref FAL-MAIN+DIALOG+AddCustomApplication>
* <xref FAL-MAIN+DIALOG+ModifyCustomApplication>
<\list>

To browse all help topics related to SAM area selection and general SAM
overview topics, select:
<list bullet tight>
* <link "_hometopic" JumpNewView> SAM Main Window (SAM Areas) Online Help
  <\link>
<\list>

<!-- ================================================================= -->

<!--
```

```
-->
<s3 id=FAL-MAIN+DIALOGITEM+AddCustomApplication-Command> Custom Application:  Command

This is the name of the command or program file that is to be executed
when the custom application is selected and run.  The name specified
must be the complete directory and file pathname, and the file must be
executable (execute permission bits set).  The length of each directory
or file name in the path must not exceed ''NAME_MAX'' characters (14
characters on a short filename system, usually 256 on a long filename
system), and the total pathname length must not exceed ''PATH_MAX''
characters as defined in the ''limits.h'' header file (see &hpuxref;
entry <link limits Man> <book|limits|(5)<\link>.

The command must not contain !!any!! double quotes, single forward
quotes (apostrophe) or single backward quotes (accent grave).

<otherhead> Additional Information

<list bullet tight>
* <xref FAL-MAIN+DIALOG+AddCustomApplication>
* <xref FAL-MAIN+DIALOG+ModifyCustomApplication>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================= -->
<!--
```

```
-->

<s3 id=FAL-MAIN+DIALOGITEM+ExecutionUserID> Custom Application: Execute Using

Select which user ID to use when running the custom application or
command by selecting the pushbutton labeled "Execute Using:", then
selecting one of the options shown in the pop-up menu:

<lablist>
\''Root's ID''\          Application or command is executed with the
                         user ID set to ''root''.

\''User's ID''\          Application or command is executed using the
                         current user's user ID.

\''Specific User's ID''\ Application or command is executed with the the
                         user ID of some other, specific user who is
                         listed in the system's password file.  If you
                         select this option, a second text box appears
                         where you can specify which user's ID is to be
                         used.  Type the user's name in the text box, or
                         select the pushbutton to obtain a list of
                         current users from which you can select a name.
<\lablist>

<otherhead> Additional Information

<list bullet tight>
* <xref FAL-MAIN+DIALOG+AddCustomApplication>
* <xref FAL-MAIN+DIALOGITEM+SpecificUserLoginName>
* <xref FAL-MAIN+DIALOG+ModifyCustomApplication>
<\list>

<!-- ================================================================== -->
<!--
```

```
-->
<s3 id=FAL-MAIN+DIALOGITEM+AddCustomApplication-Interface> Custom Application:  User

Enable one or both of the toggles labeled "Graphical Environments" and
"Terminal Environments" so SAM can determine what type of interface to
provide for the application or program whenever it runs under SAM's
control.  Depending on which button or buttons are enabled, SAM does
the following when starting the custom application:

<otherhead> Only "Terminal Environments" is Set

If this button is set but "Graphical Environments" is not set:

<list bullet>
  * If SAM is being run from an X-windows-based interface, SAM starts a
    new ''hpterm'' window and connects it to standard output from the
    application or command.

  * If SAM is being run from an ordinary text terminal, SAM transfers
    control of the terminal to the application program or command until
    the application terminates.
<\list>

<otherhead> Only "Graphical Evironments" is Set

If this button is set but "Terminal Environments" is not set:

<list bullet>
  * SAM assumes the program or command supports its own graphical user
    interface and starts the application with no terminal or ''hpterm''
    window for standard output.

  * If SAM is being run from a text terminal, any application that is
    configured for graphical-environments-only is not accessible, and
    cannot be run.
<\list>

<otherhead> Both Buttons are Set

If !!both!! buttons are set, SAM first determines whether the current
user interface environment is a text terminal or a graphical
(X-windows-based) interface.  It then starts the program as follows:

<lablist>
\Terminal Interface\
        If SAM is being run from a text terminal, SAM transfers control
        of the terminal to the application, allowing the application to
        use the terminal for standard output.  The application should
        examine the value of the ''DISPLAY'' variable and, finding it
        not set, send only ASCII text to standard output, suppressing
        any graphical output.

\Graphical Interface\
        If SAM is being run from an X-windows-based graphical user
        interface, SAM starts the application without opening an
        ''hpterm'' window.  The application should then examine the
        current value of the ''DISPLAY'' variable, and manage its own
        graphical interface on that device.
<\lablist>

<otherhead> Explanations

Any custom application that requires user input or provides user output
(information, messages, or errors) must support a user interface.  The
user interface can be a simple keyboard and ASCII terminal interface, or
it can can have more elaborate capabilities suited for graphical (HP
```

```
VUE, Motif, or X windows) output.  Some applications support both
interfaces.  The application's user interface capabilities must be
specified so they are known to SAM.

Suppose an application produces graphical output that cannot be
displayed on an ASCII terminal.  The application can be configured for
graphical environments with the "Terminal Environments" button disabled.
In such a case, the application then cannot be run if the current SAM
user interface is a text terminal.  However, if the user changes to a
graphical device such as a workstation or X terminal on the same system
or accessible over a network, SAM then allows that application to be
run using that interface.

<otherhead> Additional Information

<list bullet tight>
* <xref FAL-MAIN+DIALOG+AddCustomApplication>
* <xref FAL-MAIN+DIALOG+ModifyCustomApplication>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================= -->
<!--
-->
<s3 id=FAL-MAIN+DIALOGITEM+AddCustomApplication-HelpFile> Custom Application: Help Fi

This field specifies the directory path and file name for the help file
to be displayed when a user selects (highlights) the application in the
area-selection list and presses [[f1]] to obtain help.  It should
contain information about what the application is, what it does, and how
to interact with the user interface (rather than how to use/run the
application itself).  The length of each directory or file name in the
path must not exceed ''NAME_MAX'' characters (14 characters on a short
filename system, usually 256 on a long filename system), and the total
pathname length must not exceed ''PATH_MAX'' characters as defined in
the ''limits.h'' header file (see &hpuxref; entry <link limits Man>
<book|limits|(5)<\link>.

To modify the field or correct typing errors, use [[Back Space]],
[[Delete char]], and left- or right-arrow keys as needed.  New
characters are added after the cursor and the cursor advances as they
are typed.  [[Back space]] or [[Delete char]] deletes characters and
moves the cursor to the left.  The cursor can also be moved by placing
the mouse pointer at the desired location and clicking the left-hand
mouse button.

<otherhead> Additional Information

<list bullet tight>
* <xref FAL-MAIN+DIALOG+AddCustomApplication>
* <xref FAL-MAIN+DIALOG+ModifyCustomApplication>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================= -->
<!--
```

```
-->
<s3 id=FAL-MAIN+DIALOGITEM+AddCustomApplication-IconPath> Custom Application: Icon Pa

This field specifies the directory path and file name for an existing
icon file to be interpreted and displayed for a user to select
(highlight) the corresponding custom application in the area-selection
list.  The length of each directory or file name in the path must not
exceed ''NAME_MAX'' characters (14 characters on a short filename
system, usually 256 on a long filename system), and the total pathname
length must not exceed ''PATH_MAX'' characters as defined in the
''limits.h'' header file (see &hpuxref; entry <link limits Man>
<book|limits|(5)<\link>.

To modify the field or correct typing errors, use [[Back Space]],
[[Delete char]], and left- or right-arrow keys as needed.  New
characters are added after the cursor and the cursor advances as they
are typed.  [[Back space]] or [[Delete char]] deletes characters and
moves the cursor to the left.  The cursor can also be moved by placing
the mouse pointer at the desired location and clicking the left-hand
mouse button.

<otherhead> Icon File Requirements

The file must be in X pixmap (XPM) format.  The file must exist, but SAM
does not verify the format when you specify it.  If the format is
incorrect when SAM attempts to access the file during normal operation,
SAM substitutes a default icon instead to prevent other problems that
might result from a faulty icon.  To create or modify an icon file, use
the icon editor program in ''/usr/vue/bin/vueicon''.

<otherhead> Additional Information

<list bullet tight>
* <xref FAL-MAIN+DIALOG+AddCustomApplication>
* <xref FAL-MAIN+DIALOG+ModifyCustomApplication>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================ -->
<!--
```

```
-->
<s3 id=FAL-MAIN+DIALOGITEM+SpecificUserLoginName> Specific User's Login Name

Type the login name of the user whose user ID is to be assigned to the
process whenever the custom application is executed.  If you prefer,
select the pushbutton to create a new window containing a list of all
current login names on the system from which you can select an appropriate
name.  See <xref FAL-MAIN+SELECTLIST+UsersWithLoginsOnSystem> for more
information.

When SAM executes the custom application, it executes a ''setresuid()''
system call (see <link setresuid Man> <book|setresuid|(2)<\link>) to
set the real and effective user ID to the new user before running
the application.

<!-- ================================================================ -->
<!--
```

```
-->
<s4 id=FAL-MAIN+SELECTLIST+UsersWithLoginsOnSystem> Users with Logins on the System

This dialog window lists all current valid system users.

Select the user's login name from this list whose user ID is to be
assigned to the process whenever the custom application is executed.
When the correct user's login name is highlighted, select [[OK]].  To
abort and return to the previous window without making a selection,
select [[Cancel]] instead.

<!-- ============================================================== -->
<!--
-->
<!-- ################################################################## -->
<!-- ################################################################## -->
<!-- #   Dialog Box:                                                  # -->
<!-- #                   Modify Custom Group                          # -->
<!-- #   Access Path:                                                 # -->
<!-- #                SAM Main Window                                 # -->
<!-- #                   "Actions" pulldown menu                      # -->
<!-- #                      Select "Modify..."                        # -->
<!-- #                                                                # -->
<!-- ################################################################## -->
<!-- ################################################################## -->

<s2 id=FAL-MAIN+DIALOG+ModifyCustomApplicationGroup> Task Dialog: Modify Custom Appli

Use this dialog box to modify a custom application group in the current
''SAM Areas'' area or subarea selection list.  This can be done at any
time, whether other groups or applications have been installed
underneath the group.

This screen contains two fields:  one for specifying the label text to
be displayed in the ''Area'' column of the selection list; the other for
specifying the name of a help file.

<otherhead> Procedure

<list order>
  * When the dialog box opens, the label field is highlighted.

  * If it is not already correct, modify or retype the text you want to
    appear in the ''Area'' column of the selection list and press
    [[Return]] or [[&down;]] to advance to the next field.  To correct
    any errors, use [[Back Space]], [[Delete char]], and left- or
    right-arrow as needed.

  * To change the name or directory path of the help file, type the
    absolute directory path name (starting with ''/'') and file name
    where the help file for this custom group resides.  This is the file
    that is to be displayed whenever a user highlights the group label
    being added, then presses [[f1]] for help.  This field is optional.
    No validity checks are made, so you can specify the help file then
    add it later if you prefer.

  * Select [[OK]] when the two fields contain the correct information,
    or select [[Cancel]] to abort the procedure.  The dialog box then
    disappears, returning you to the ''SAM Areas'' window at the current
    level in the hierarchy.
<\list>

To alter any current lists of custom applications or application groups
underneath the current custom group in the area-selection hierarchy,
select the current group and open it (double click on the item or use
the ''Open'' item in the [[Actions]] pulldown menu.  You can then add
or modify custom applications and/or additional descendent groups to the
newly created group.

<otherhead> Additional Information

<list bullet tight>
* <xref FAL-MAIN+DIALOGITEM+AddCustomApplGroup-Label>
* <xref FAL-MAIN+DIALOGITEM+AddCustomApplGroup-HelpFile>
* <xref FAL-MAIN+DIALOGITEM+AddCustomApplGroup-IconPath>
<\list>

To browse all help topics related to SAM area selection and general SAM
overview topics, select:
```

```
<list bullet tight>
* <link "_hometopic" JumpNewView> SAM Main Window (SAM Areas) Online Help
  <\link>
<\list>

<!-- ================================================================= -->
```

```
<!-- ################################################################# -->
<!-- ################################################################# -->
<!-- #   Dialog Box:                                                  # -->
<!-- #                  Modify Custom Application                     # -->
<!-- #   Access Path:                                                 # -->
<!-- #              SAM Main Window                                   # -->
<!-- #                  "Actions" pulldown menu                      # -->
<!-- #                     Select "Modify..."                         # -->
<!-- #                                                                # -->
<!-- ################################################################# -->
<!-- ################################################################# -->

<s2 id=FAL-MAIN+DIALOG+ModifyCustomApplication> Task Dialog:  Modify Custom Applicati

Use this dialog box to alter the specifications for a custom application
(command or program) that is already present in the current ''SAM
Areas'' area or subarea selection list.

This screen contains four fields:

<lablist>
\''Label:''\         Label text to be displayed in the ''Area'' column of
                     the "SAM Areas" selection list screen.

\''Command:''\       Complete directory and file pathname of the executable
                     file containing the command or application.

\''Execute Using:''\ User ID to use while executing the application (current
                     user, a particular user, or ''root'' (super-user).

\''User Interface Supports:''\  Specifies whether the user interface for
                                the application supports graphical (and
                                terminal) environments or only ASCII
                                text terminals.

\''Help File:''\     Complete directory and file pathname of the file
                     containing the help information for this application.
<\lablist>

<otherhead> Procedure

<list order>
  * When the dialog box opens, the label field is highlighted.

  * Make any alterations needed in the text that appears in the ''Area''
    column of the selection list and press [[Return]] or [[&down;]] to
    advance to the "Command" field.  Use [[Back Space]], [[Delete
    char]], and left- or right-arrow as needed.

  * Alter the absolute directory path name (starting with ''/'') and
    file name where the !!existing!! executable file containing the
    application resides, if appropriate.  This file can be an executable
    object-code program file or a text file containing a shell script.
    Press [[Return]] or [[&down;]] to advance to the "User Interface
    Supports" field.

  * Select a user ID to use when running the application.  Select the
    pushbutton to obtain a pop-up menu listing the three options:

    <lablist>
    \''Root's ID''\         Execute using UID = 0 (''root'').  This is
                            required if the application requires
                            super-user access.

    \''User's ID''\         Execute using the user's current (usually
                            non-root) user ID.
```

```
\''Specific User ID''\ Execute using a specific user ID that is
                        assigned to certain system user.  This option
                        brings up another text box and pushbutton
                        where you can type a login name or select
                        from a list of known users.
  <\lablist>

 * Depress or release the toggles corresponding to the two interface
   types for the application being specified.  If the application can
   handle both graphical (X-windows, bit-mapped displays) and
   alpha-numerical text terminals, set both toggles.  Otherwise depress
   only one.  If the human interface to the application is limited to
   text terminals only, select ''Terminal Environments''.  Press
   [[Return]] or [[&down;]] to advance to the "Help File" field.

 * Type the absolute directory path name (starting with ''/'') and file
   name where the help file for this custom application resides.  This
   is the file that is to be displayed whenever a user highlights the
   application label being added, then presses [[f1]] for help.  This
   field is optional.  No validity checks are made, so you can specify
   the help file then add it later if you prefer.

 * When all fields contain the correct information, select [[OK]] to
   add the application to SAM and exit the window.  Select [[Cancel]]
   to abort the procedure without altering the current SAM
   configuration and return to the ''SAM Areas'' window at the current
   level in the hierarchy.
<\list>

<otherhead> Additional Information

<list bullet tight>
* <xref FAL-MAIN+DIALOG+AddCustomApplication>
* <xref FAL-MAIN+DIALOGITEM+AddCustomApplication-Label>
* <xref FAL-MAIN+DIALOGITEM+AddCustomApplication-Command>
* <xref FAL-MAIN+DIALOGITEM+ExecutionUserID>
* <xref FAL-MAIN+DIALOGITEM+SpecificUserLoginName>
* <xref FAL-MAIN+DIALOGITEM+AddCustomApplication-Interface>
* <xref FAL-MAIN+DIALOGITEM+AddCustomApplication-HelpFile>
* <xref FAL-MAIN+DIALOGITEM+AddCustomApplication-IconPath>
* <xref FAL-MAIN+DIALOG+AddCustomApplGroup>
<\list>

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ================================================================ -->

<!--
```

```
-->
<!-- ################################################################# -->
<!-- ################################################################# -->
<!-- ###  Dialog Box:                                               ### -->
<!-- ###                   Set SAM Log Options                       ### -->
<!-- ###  Access Path:                                             ### -->
<!-- ###              SAM Main Window                              ### -->
<!-- ###                   "Options" pulldown menu                ### -->
<!-- ###                      Select "SAM Log Options..."          ### -->
<!-- ###                                                            ## -->
<!-- ################################################################# -->
<!-- ################################################################# -->

<s2 id=FAL-MAIN+DIALOG+SetSAMlogOpts> Set SAM Log Options

Use this window to select options related to managing the SAM log file:

<list bullet tight>
   * Select between automatic log-file trimming or no trimming.

   * Specify maximum log-file size if automatic trimming is specified.

   * Choose whether to automatically start the SAM log viewer
     whenever SAM is run.
<\list>

For more information about the SAM log file and SAM logging, see <xref
FAL+OPT+LOGFILE-OVERVIEW>.

To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ---------------------------------------------------------------- -->

<otherhead> Trim SAM Log File
            <location id=FAL-MAIN+DIALOGITEM+TrimLogfile>&empty;<\location>

Select between ''Automatically'' and ''Never'' trimming the log file.
<!-- ---------------------------------------------------------------- -->

<otherhead> Maximum Log File Size (bytes)
            <location id=FAL-MAIN+DIALOGITEM+MaxLogfileSize>&empty;<\location>

Specify the maximum number of bytes to be allowed in the log file if
trimming the log file ''Automatically'' is selected.  If ''Never'' is
selected instead, this field is not visible.
<!-- ---------------------------------------------------------------- -->

<otherhead> Auto-start SAM Log File Viewer
        <location id=FAL-MAIN+DIALOGITEM+AutostLogfileViewer>&empty;<\location>

Use this toggle button to specify whether or not the SAM log viewer is
to be started automatically whenever SAM is run.

<!-- ================================================================ -->

<!--
```

```
-->
<!-- ################################################################## -->
<!-- #         Log File Overview                                    # -->
<!-- ################################################################## -->
<s3 id=FAL+OPT+LOGFILE-OVERVIEW> Overview of SAM Log File Operation

Various SAM subsystems produce logging information about actions taken
and record this information in a log file.  The SAM log file can then be
displayed by the SAM log viewer.

<otherhead> Log File Contents

The kind of information contained in the log file includes but is not
limited to the following:

<list bullet>
   * Any error messages sent to the screen by SAM.

   * Summaries of actions taken or manipulations made by SAM.

   * Detailed listings of certain actions that may be of interest to
     the administrator.
<\list>

Ordinary messages produced by SAM during normal operation are usually
not recorded in the log file.  However, some subsystems may place
selected messages in the file, depending on their relative importance
when evaluating SAM actions.

<otherhead> Log File Location

The SAM log file is located at ''/var/sam/log/samlog''.  If automatic
log-file trimming is enabled, the most recently discarded log file, if
any, is located at ''/var/sam/log/samlog.old''.  See Log-File Trimming
below.

<otherhead> Viewing the Log File

Some administrators prefer to have the viewer running while they use SAM
to perform various tasks.  This enables them to watch what SAM is doing
as it happens.  (Simultaneous viewing requires a graphics output device
such as a workstation display or X-terminal.  Ordinary text terminals
cannot support log file viewing while SAM is running other tasks.)

The log viewer can be started manually in any given session, or it
can be configured to start automatically each time SAM is run.  When the
latter is selected, SAM runs the log viewer in a separate window so
that it is easy to watch what SAM is placing in the log file as SAM
performs its various tasks.

See <xref FAL-LOGMON-OVERVIEW> for more information about the SAM Log
Viewer.

<otherhead> SAM Log Trimming

If SAM is configured for automatic log-file trimming (select
[[Automatically]]), the log file, ''samlog'', is examined at the
beginning of each SAM session.  If the file size in bytes exceeds the
specified maximum, the log file is moved to ''samlog.old'' and a new log
file is created for the current session.  If the log file exceeds the
maximum size at the end of a SAM session, it is not trimmed until the
next time SAM runs.

If log-file trimming is disabled (select [[Never]]), the log file
contains all logging information recorded in the file since the file was
created.
```

```
To browse all help topics related to SAM area selection and general SAM
overview topics, select:

<list bullet tight>
* <link "_hometopic" JumpNewView> SAM Main Window (SAM Areas) Online Help
  <\link>
<\list>

<!-- ============================================================== -->
<!--
```

```
-->
<!-- ############################################################################## -->
<!-- ############################################################################## -->
<!-- ############################################################################## -->
<!-- ############################################################################## -->
<!-- ###                                                                        ### -->
<!-- ### SAM Log Viewer Help Screens                                            ### -->
<!-- ###                                                                        ### -->
<!-- ############################################################################## -->
<!-- ############################################################################## -->
<!-- ############################################################################## -->
<!-- ############################################################################## -->

<s1 id=FAL-LOGMON-OVERVIEW> SAM Log Viewer Overview

Use the SAM Log Viewer dialog window to view the contents of the SAM log
file.  The viewer window containing three main areas:

<otherhead> Current Filters

At start-up, the top part of the Log Viewer window normally contains
information about the filters currently being applied to the log file to
determine what kinds of information in the log is actually displayed by
the viewer.  For an explanation of the items in this part of the window,
see <xref FAL-LOGMON-CurrentFilters>.

If you use the [[Save...]] or [[Search...]] pushbuttons, the contents of
this area changes, providing a means for specifying the file where the
filtered log information is to be stored, or for specifying a search
string for use in finding information of interest in the log.  For
additional explanation of these two buttons, select:

<list bullet tight>
  * <xref FAL-LOGMON-SaveFilteredLog>
  * <xref FAL-LOGMON-SearchLogForPattern>
<\list>

If you change the top area by selecting [[Save...]] or [[Search...]], a
new pushbutton labeled [[Filter...]] replaces the one you selected,
providing a means for returning to the "Current Filters" mode.

<otherhead> Filtered SAM Log

This area contains a scrollable complete listing of all entries in the
SAM log file that match the display conditions defined in the area at
the top of the window.

For a detailed description of this area and how it works, see <xref
FAL-LOGMON-FilteredOutput>.

<otherhead> Viewer Configuration

Three pushbuttons and two toggles control the configuration and behavior
of the SAM Log Viewer window and the area at the top.  At any given
time, !!only two of the three pushbuttons are visible!!, providing
access to the other two operating modes in the top part of the window.
They are:

<lablist>
\''Filter...''\              Use this pushbutton to display a set of
                             fields in the top part of the Log Viewer
                             window where you can select log filter
                             parameters.  See <xref
                             FAL-LOGMON-CurrentFilters> for more
                             information.

\''Save...''\                Use this pushbutton to display fields in
                             the top part of the Log Viewer window
                             so you can specify a directory path and
                             name of a file where you want SAM to
                             record a copy of the log as currently
                             filtered.  See <xref
                             FAL-LOGMON-FilteredFileName> and
                             FAL-LOGMON-WriteFilteredLog> for more
                             information.

\''Search...''\              Use this pushbutton to display fields in
                             the top part of the Log Viewer window
                             where you can specify a search string for
                             finding specific information of interest
                             in the displayed log data then search
                             forward or backwards from the current
                             location to find that information.  See
                             <xref FAL-LOGMON-SearchLogForPattern> for
                             more information.

\''Include Timestamps...''\  This toggle adds or removes time stamps
                             from the filtered output.  Time stamps
                             show the date and time when each event was
                             recorded that appears in the filtered log.
                             See <xref FAL-LOGMON-IncludeTimestamps> for
                             more information.

\''Automatic Scrolling...''\ Setting this toggle moves the active
                             display to the end of the log file and
                             automatically scrolls as any new events
                             appear in the SAM log that meet the filter
                             requirements.  Unsetting it stops the
                             scrolling.  See <xref
                             FAL-LOGMON-SelectMsgLevel> for more
                             information about how scrolling is
                             handled.
<\lablist>

<otherhead> Stopping the Viewer

To stop the viewer window and restore normal SAM displays, select
[[OK]].

<!-- ================================================================= -->
<!--
```

```
-->
<!-- ##################################################################### -->
<!-- ##################################################################### -->
<!-- ###                                                              ### -->
<!-- ### SAM Log Viewer: Current Filters Subwindow Area               ### -->
<!-- ###                                                              ### -->
<!-- ##################################################################### -->
<!-- ##################################################################### -->

<s2 id=FAL-LOGMON-CurrentFilters> Current Filters

This area in the upper part of the SAM Log Viewer window, when active,
lists the current settings of the log-file viewing filters.  Log file
filters are useful for defining the kind of information you want to see
and the time periods and users you are interested in.  The filter
parameters are:

<lablist>
\''Message Level''\  The label in the pushbutton shows the current
                     filter setting for limiting the scope of messages
                     shown in the log file viewer output.  Available
                     levels are ''Summary'', ''Detail'', ''Verbose'',
                     and ''Commands Only''.  To change the message level
                     for filtering, select the pushbutton to obtain a
                     pop-up menu of values, then select the desired
                     value.  For more information about message levels,
                     see <xref FAL-LOGMON-SelectMsgLevel>.

\''User(s)''\        The Users filter causes only those entries made by
                     the single selected user to be displayed.  If
                     ''All'' is shown (user filtering disabled), entries
                     made by all users are displayed.  Otherwise, only
                     entries made by the user whose name appears on the
                     right-hand side of the pushbutton are displayed.

                     Select this pushbutton to obtain a new dialog window
                     where you can enable or disable user filtering.
                     When selected, the default state is switched from
                     the current state to the opposite one.  If user
                     filtering is enabled after the dialog window
                     appears, the window also contains a list of known
                     system users from which you can select !!one!!
                     user to include in the filtered log output text.
                     For more information, see <xref
                     FAL-LOGMON+DIALOG+UserFiltering>.

\''Time Range''\     Text to the right of this pushbutton indicates
                     the start and end times of filtered log information
                     that is available in the scrollable SAM log-viewing
                     window space:

                     <lablist>
                     \''Start Time''\
                          The start time causes only those log entries
                          logged on or after that date and time to be
                          displayed.  The default start time is the
                          date and time of the first entry in the log.
                          This is indicated by the message ''Beginning
                          of Log'', with the actual date and time of
                          the first entry shown in parentheses.  (Note
                          that, if the log is empty, the date and time
                          shown in parentheses is replaced with the
                          string ''Currently Undefined''.)

                     \''Stop Time''\
                          The stop time causes only those log entries
                          logged on or before that date and time to be
                          displayed.  The default stop time is future
                          infinity; i.e., no stop time at all.  This is
                          indicated by the string ''None''.  If a
                          specific stop time has been requested, it is
                          shown instead of ''None''.
                     <\lablist>

                     Select this pushbutton to obtain a new dialog
                     window where you can specify a new start and/or
                     stop time, starting at a specific time or at
                     beginning of file, and stopping at a specific time
                     or at end of file.  For more information, see <xref
                     FAL-LOGMON+DIALOG+TimeRange>.
<\lablist>

All of these filters can be used at the same time in any combination to
customize the data you see.  To modify filtering, use the pushbuttons
as explained above.

<!-- ================================================================= -->
<!--
```

```
-->
<!-- ################################################################## -->
<!-- ################################################################## -->
<!-- ###                                                            ### -->
<!-- ### SAM Log Viewer: Filtered SAM Log Viewing Area              ### -->
<!-- ###                                                            ### -->
<!-- ################################################################## -->
<!-- ################################################################## -->

<s2 id=FAL-LOGMON-FilteredOutput> Filtered SAM Log

This section of the screen displays the log-file entries which meet the
filtering requirements shown in the "Current Log Filters" section.

The entries displayed in this section are periodically updated by the
log viewer.  This enables you to see messages as they are added by the
current SAM session.

<otherhead> Scrolling Through the Filtered Log

The scroll bar at the far right side of the display window can be used
to scroll up and down in the output.  If the scroll bar is positioned at
the very end of the output, automatic scrolling is enabled.  This causes
SAM to immediately display any new messages and scroll the display up,
as needed, to make room for them.

If you scroll back to some position in the output other than at the end,
SAM disables automatic scrolling.  Incoming log messages are still added
to the output, but they are not visible until you scroll back to the end
of the output.

Use the "Automatic Scrolling" toggle at the top right-hand side of the
display window to enable or disable automatic scrolling at any time.  If
you enable automatic scrolling and you are not currently at the end of
the output, SAM repositions the active display area to the end of the
log before resuming automatic scrolling.  Disabling automatic scrolling
leaves your current position in the output unchanged.

<!-- ============================================================== -->
<!--
-->
<!-- ################################################################## -->
<!-- ###                                                            ### -->
<!-- ### SAM Log Viewer: [Filter...] Pushbutton                     ### -->
<!-- ###                                                            ### -->
<!-- ################################################################## -->

<s2 id=FAL-LOGMON-ConfigFilters> "Filter..." Pushbutton

Use this pushbutton to switch the top part of the window back to the
state where you can specify time range, message level, and user
filtering when displaying current SAM log-file contents.  For
information about the filter configuration pushbuttons, see:

<list bullet tight>
  * <xref FAL-LOGMON-SelectMsgLevel>.
  * <xref FAL-LOGMON+DIALOG+UserFiltering>.
  * <xref FAL-LOGMON+DIALOG+TimeRange>.
<\list>

<!-- ============================================================== -->
<!--
```

```
-->
<!-- ################################################################ -->
<!-- ###                                                          ### -->
<!-- ### SAM Log Viewer: [Save...] Pushbutton                     ### -->
<!-- ###                                                          ### -->
<!-- ################################################################ -->

<s2 id=FAL-LOGMON-SaveFilteredLog> "Save..." Pushbutton

Use this pushbutton to access a new set of fields in the top part of
this window where you can specify the directory path and file name of
the file where you want SAM to store the filtered log file output that
currently appears in the Filtered SAM Log area of the SAM Log Viewer
window.  For information about the fields in the area of the window, see
<xref FAL-LOGMON-WriteFilteredLog>.

<!-- ============================================================== -->
<!--
```

```
-->
<!-- ################################################################ -->
<!-- ###                                                          ### -->
<!-- ### SAM Log Viewer: [Search...] Pushbutton                   ### -->
<!-- ###                                                          ### -->
<!-- ################################################################ -->

<s2 id=FAL-LOGMON-SearchLogForPattern> "Search..." Pushbutton

Use this pushbutton to access a new set of fields in the top part of
this window where you can specify a pattern to be used for searching
the formatted log file for specific information.  Searches can be made
forward or backwards from the current viewer location in the log file.
For more information about using search patterns, see <xref
FAL-LOGMON-SearchPattern>.

<!-- ============================================================== -->
<!--
```

```
-->
<!-- ################################################################# -->
<!-- ###                                                           ### -->
<!-- ### SAM Log Viewer: [X] "Include Timestamps" Toggle Button    ### -->
<!-- ###                                                           ### -->
<!-- ################################################################# -->

<s2 id=FAL-LOGMON-IncludeTimestamps> Include Timestamps

Set this toggle if you want SAM to display the date and time when
each logged event occurred in a separate column on the left side of
the log information.  If this toggle is not set, only the date and
time information contained in some individual log messages appears.


<!-- ================================================================= -->
<!-- ################################################################# -->
<!-- ###                                                           ### -->
<!-- ### SAM Log Viewer: [X] "Automatic Scrolling" Toggle Button   ### -->
<!-- ###                                                           ### -->
<!-- ###      No help provided here.  It is part of ObAM help      ### -->
<!-- ###      System.                                              ### -->
<!-- ###                                                           ### -->
<!-- ################################################################# -->


<!-- ================================================================= -->
<!--

-->
<!-- ################################################################# -->
<!-- ###                                                           ### -->
<!-- ### SAM Log Viewer Filter-configuration subwindow area:       ### -->
<!-- ###                                                           ### -->
<!-- ###        "Message Level" Pushbutton                         ### -->
<!-- ###                                                           ### -->
<!-- ################################################################# -->

<s2 id=FAL-LOGMON-SelectMsgLevel> Message Level Button

The ''Message Level'' pushbutton shows the current level of detail that is
being included in the log viewer output.  Select it whenever you want to
change the current detail level.  Four levels are available:

<lablist>
   \''Summary''\ The highest (least detailed) level.  If this level is
                 selected, only summary log messages issued at the
                 start or end of a particular task, all errors, and
                 notes are shown in the filtered view.

                 Summary log entries are marked with ''------''.
                 Error entries (descriptions of errors that kept a
                 particular task from completing) are marked by
                 ''ERROR''.  Notes (entries describing events that
                 require your attention, but that do not keep the
                 task from completing) are marked with ''NOTE''.

   \''Detail''\  The "Detail" level includes all "Summary"-level
                 data, plus all detail log entries.  Detail log
                 entries describe actions SAM has taken which
                 modified your system in some way.  These entries are
                 marked with a single ''*''.  This is the default
                 message level when the log viewer begins executing.

   \''Verbose''\ The "Verbose" level includes all "Detail"-level
                 data, plus all verbose log entries.  Verbose log
                 entries describe all of the steps taken by SAM in
                 completing the current task that did not require
                 modifications to your system.  These entries are
                 marked with a single ''*''.

   \''Commands Only''\ <newline>
                 This level displays only the commands that were
                 executed in the course of completing a task.
                 Summary level log entries (see above) are also
                 included as shell comments to provide the context in
                 which the commands were executed.

                 Note that no effort has been made to ensure that the
                 resulting "script" displayed in this level actually
                 executes correctly and achieves the same results that
                 SAM did.  The commands displayed are intended only to
                 provide additional insight into what SAM is doing.
<\lablist>

To change the current message level to a new value, select the
pushbutton to the right of the "Message Level" label, then select the
desired new message level from the pop-up menu that appears.  The menu
then disappears, and the pushbutton shows the selected new value.

<!-- ================================================================= -->
<!--
```

```
-->
<!-- ################################################################# -->
<!-- ###                                                           ### -->
<!-- ### SAM Log Viewer Filter-configuration subwindow area:       ### -->
<!-- ###                                                           ### -->
<!-- ###         [User(s)...] Pushbutton                           ### -->
<!-- ###                                                           ### -->
<!-- ################################################################# -->

<s2 id=FAL-LOGMON-SelectUsers> User(s)... Pushbutton

Use this pushbutton to alternate between viewing log entries related
to all SAM users at any time or to view log entries related to a
specific SAM user.  Selecting the button opens a new dialog window
with a two-button selector that enables or disables user filtering
and provides a list of users that can be selected for viewing if
the filter is enabled.  See <xref FAL-LOGMON+DIALOG+UserFiltering>
for more information.

<!-- ================================================================= -->
<!--
```

```
-->
<!-- ################################################################# -->
<!-- ###                                                           ### -->
<!-- ### SAM Log Viewer Filter-configuration subwindow area:       ### -->
<!-- ###                                                           ### -->
<!-- ###         [Time Range...] Pushbutton                        ### -->
<!-- ###                                                           ### -->
<!-- ################################################################# -->

<s2 id=FAL-LOGMON-SelectTimeRange> Time Range... Pushbutton

Use this pushbutton to open a new dialog window where you can specify
beginning and/or end time limits for viewing log entries from:

<list bullet tight>
  * Beginning of file to a specified time,
  * Starting a specified time and stopping at a later time, or
  * Starting a specified time and continuing to end of log.
<\list>

See <xref FAL-LOGMON+DIALOG+TimeRange> for more information.

<!-- ================================================================= -->
<!--
```

```
-->
<!-- ################################################################# -->
<!-- ###                                                           ### -->
<!-- ### SAM Log Viewer Save-filtered-file subwindow area:         ### -->
<!-- ###                                                           ### -->
<!-- ###        [Save] Pushbutton                                  ### -->
<!-- ###                                                           ### -->
<!-- ################################################################# -->

<s3 id=FAL-LOGMON-WriteFilteredLog> Save Pushbutton

Select this button to record the filtered log contents in the file
specified above the button.   directory path and name of a file where
you want to save the filtered contents of the SAM log file.  If the file
already exists, SAM issues a warning and asks if you want to continue.

The data saved to the file is in exactly the same format as that used in
the output display on the main log viewer screen.  Note that the
resulting file cannot then be used as a source file for
''samlog_viewer'', because it is in a formatted form that
''samlog_viewer'' does not recognize.

<!-- ================================================================= -->
<!--
-->
<!-- ################################################################# -->
<!-- ###                                                           ### -->
<!-- ### SAM Log Viewer Save-filtered-file subwindow area:         ### -->
<!-- ###                                                           ### -->
<!-- ###        [Cancel] Pushbutton                                ### -->
<!-- ###                                                           ### -->
<!-- ################################################################# -->

<s4 id=FAL-LOGMON-Cancel> Cancel

Select this button to cancel the pending log-file save operation and
return to the normal log viewer screen.

<!-- ================================================================= -->
<!--
```

```
-->
<!-- ################################################################ -->
<!-- ###                                                          ### -->
<!-- ### SAM Log Viewer Save-filtered-file subwindow area:         ### -->
<!-- ###                                                          ### -->
<!-- ###        "File Name" Text-edit box                          ### -->
<!-- ###                                                          ### -->
<!-- ################################################################ -->

<s4 id=FAL-LOGMON-FilteredFileName> File Name

Use this text box to specify the directory path and file name where
you want SAM to store the filtered log information being displayed
by the SAM log viewer.

<!-- ================================================================ -->
<!--
```

```
-->
<!-- ################################################################ -->
<!-- ###                                                          ### -->
<!-- ### SAM Log Viewer Search-filtered-file subwindow area:       ### -->
<!-- ###                                                          ### -->
<!-- ###        "Search String" Text-edit box                      ### -->
<!-- ###                                                          ### -->
<!-- ################################################################ -->

<s4 id=FAL-LOGMON-SearchPattern> Search String

Use this text box to specify a search string.  The string can be plain
ASCII text where the text in the log file must match the string exactly
in a character-by-character comparison, or it can be an !!extended!!
regular expression meeting the rules for constructing extended regular
expressions (see &hpuxref; entry <link regexp Man>
<book|regexp|(5)<\link>).  After you specify the search string, use the
[[Search Forward]] and [[Search Backward]] buttons to initiate searches
for matching text in the direction indicated.

When using plain text strings, uppercase and lowercase characters are
!!not!! treated as equivalent.

<otherhead> Search Source

Searches are performed on the !!formatted!!  information displayed the
log viewer.  They are !!not!! performed on the actual log file itself.
This has several advantages:

  <list bullet>
  * If timestamps are included in the display, you can search for
    specific times and/or dates.

  * You can search for log-level tags by searching for ''ERROR'',
    ''=====', ''-----'', or ''+++++'' to find command-filter-mode
    summary-level comments, etc.
  <\list>

Note that searches cannot cross end-of-line boundaries.  For the search
to find a match, any text that matches the specified extended regular
expression must !!all!! occur within a single line.

<otherhead> Positioning Matching Text

When SAM finds a matching pattern, it locates the beginning of the log
entry that produced the matching line, and places the corresponding text
in the viewer such that the beginning of that log entry is the first
line in the active view window.  That line then becomes the "current"
location in the file from which the next forward or backward search
proceeds.

<otherhead> Examples

For examples of actual searches and how they behave, select <xref
FAL-LOGMON-SearchExamples>.

<!-- ============================================================= -->
<!--
```

```
 -->
<!-- ################################################################### -->
<!-- ###                                                             ### -->
<!-- ### SAM Log Viewer Search-filtered-file subwindow area:         ### -->
<!-- ###                                                             ### -->
<!-- ###      Example searches for user enlightenment                ### -->
<!-- ###        (no link from ObAM UI description file)              ### -->
<!-- ###                                                             ### -->
<!-- ################################################################### -->

<s5 id=FAL-LOGMON-SearchExamples> Example Searches

The following examples illustrate actual search operations and how the
results are displayed in the view window, or in the search-control space
at the top of the window:

<otherhead> Text not in First Line of Entry

<ex smaller>
 Filtered SAM Log                                   [ ] Automatic Scrolling
/------------------------------------------------------------------------\
|     + Attempting to read default values for kernel configuration      ^
|       (drivers, subsystems, devices, and tunable parameters) from     |
|       both the *.tx files in /usr/sam/lib/kc and from                  |
|       /usr/conf/master.d/*.                                           |
|   DBG Entering Task Manager with task kc_cmd_get_drivers.             |
|     + Performing task "Get Driver Descriptions":  Getting the         |
|       driver/module descriptions from /usr/sam/lib/kc/drivers*.tx     v
\<esc><<\esc>                                                                ->/
<\ex>

This view was the result of a search backward for the pattern
''master''.  The matching string is actually in the fourth line, but it
is the fourth line in the log entry that begins on the first line.  A
search forward for that same pattern would not find the word "master" on
the fourth line, because the search would begin with the next log entry
that begins on the fifth line.

<otherhead> Matching Entry not at Top of Screen

<ex smaller>
Filtered SAM Log                                   [X] Automatic Scrolling
/------------------------------------------------------------------------\
|          /usr/lbin/sysadm/system_prep -k /stand/vmunix            -s ^
|          /var/tmp/SAM_kfile                                           |
|     + Command completed with exit status 0.                           |
|   DBG Exiting Task Manager with task kc_cmd_get_system_file.          |
| ERROR getkinfo: The driver "nm" specified in the system file is not  |
|       supported by the kernel libraries currently installed on this   |
|       system.                                                         v
\<esc><<\esc>                                                                ->/
<\ex>

This was the result of a forward search for the pattern ''ERROR''.  In
this case, the matching log entry is not located at the first line of
the viewer.  This is because the matching log entry is that entry in the
log file.  When a match is found in the last screen full of the log
file, the match cannot be positioned at the top of the screen.  You know
that you are seeing the last screen full of the log file because
Automatic Scrolling is on.  Scrolling is on only when this is true.

<otherhead> Simultaneous Search for Separate Patterns

<ex smaller>
/--------------------------------------------------------------------\
|Search Filtered Log for Text String:                                |
|Search String:  (=====)|(ERROR)                                     |
|                                                                    |
| [ Search Backward  ]    [  Search Forward  ]    [    End Search    ]|
\--------------------------------------------------------------------/
<\ex>

This example illustrates how to use the Logical OR of two separate
search strings or patterns.  This search looks for lines containing
either the pattern ''=====''  or the pattern ''ERROR''.  In other words,
it finds summary or error log entries.

<!-- ============================================================= -->
<!--
```

```
-->
<!-- ################################################################### -->
<!-- ###                                                             ### -->
<!-- ### SAM Log Viewer Search-filtered-file subwindow area:         ### -->
<!-- ###                                                             ### -->
<!-- ###         [Search Backward] pushbutton                        ### -->
<!-- ###                                                             ### -->
<!-- ################################################################### -->

<s4 id=FAL-LOGMON-SearchBack> Search Backward

Select this button to search the log file in the backward direction for
text matching the pattern specified in the search string.

<otherhead> Search Direction

Searching begins at the line in the log file immediately preceding the
log-file entry which in whole or in part occupies the !!top!! line in
the current view window, then proceeds backward toward the beginning of
the log file.

If the view window is currently at the beginning of the log file,
any attempt to search backward results in an error message.  Searching
does not wrap from beginning to end of file or vice-versa.

<otherhead> No Matches Found

If the search reaches the beginning of the file and no matching text is
found, an error message is produced indicating that fact.  Select [[OK]]
to dismiss the message and continue.

<!-- ================================================================ -->
<!--
```

```
-->
<!-- ################################################################### -->
<!-- ###                                                             ### -->
<!-- ### SAM Log Viewer Search-filtered-file subwindow area:         ### -->
<!-- ###                                                             ### -->
<!-- ###         [Search Forward] pushbutton                         ### -->
<!-- ###                                                             ### -->
<!-- ################################################################### -->

<s4 id=FAL-LOGMON-SearchForward> Search Forward

Select this button to search the log file in the forward direction for
text matching the pattern specified in the search string.

<otherhead> Search Direction

Searching begins at the line in the log file immediately following the
log-file entry which in whole or in part occupies the !!top!! line in
the current view window, then proceeds backward toward the beginning of
the log file.

If the view window is currently at the end of the log file, any attempt
to search backward results in an error message.  Searching does not wrap
from beginning to end of file or vice-versa.

<otherhead> No Matches Found

If the search reaches the end of the file and no matching text is found,
an error message is produced indicating that fact.  Select [[OK]] to
dismiss the message and continue.

<!-- ================================================================ -->
<!--
```

```
-->
<!-- ################################################################### -->
<!-- ###                                                             ### -->
<!-- ### SAM Log Viewer Search-filtered-file subwindow area:         ### -->
<!-- ###                                                             ### -->
<!-- ###         [End Search] pushbutton                             ### -->
<!-- ###                                                             ### -->
<!-- ################################################################### -->

<s4 id=FAL-LOGMON-EndSearch> End Search

Select this button to terminate the search and restore the log viewer
window to its normal state.

<!-- =============================================================== -->
<!--
```

```
-->
<!-- ################################################################### -->
<!-- ################################################################### -->
<!-- ###                                                             ### -->
<!-- ### SAM Log Viewer: "User Filtering" Dialog Window              ### -->
<!-- ###                                                             ### -->
<!-- ################################################################### -->
<!-- ################################################################### -->

<s3 id=FAL-LOGMON+DIALOG+UserFiltering> User Filtering

Use this dialog window to enable or disable user filtering and select
a user if filtering is enabled.  This window has two functionally
related fields:

<list bullet>
  * The top field, ''User Filtering'', consists of two interacting
    selector buttons labeled ''Enable'' and ''Disable''.  Selecting
    either one cancels the other.  For more information, see <xref
    FAL-LOGMON+DIALOGITEM+UserFilterOnOff>.

  * The bottom area is a scrollable list of system users from which
    you can select a single login name to include in the viewable log
    information in the main Log Viewer window.  For more information,
    see <xref FAL-LOGMON+DIALOGITEM+ListOfUsers>.
<\list>

<s4 id=FAL-LOGMON+DIALOGITEM+UserFilterOnOff> Enable/Disable User Filtering

Select the appropriate button to enable or disable user filtering, as
indicated.  If user filtering is disabled, all entries that meet other
filter criteria are included in the Log Viewer output, regardless of
which SAM user may have initiated the action.  If enabled, only the
currently highlighted user's SAM actions appear in the output.

<s4 id=FAL-LOGMON+DIALOGITEM+ListOfUsers> Select User

This selection list contains the login names of all system users.
Usually, the only names of interest for log filtering are the names of
users who are authorized to use all or parts of SAM without logging in
separately as super-user.  These are typically any users who have been
granted SAM access privileges by means of the Restricted SAM Builder.

Select any appropriate name from the list, then select [[OK]] to
complete the configuration and return to the main Log Viewer window.
To return without changing the filter status as it existed before
this dialog window was entered, select [[Cancel]] instead.

<!-- =============================================================== -->
<!--
```

```
-->
<!-- ################################################################## -->
<!-- ################################################################## -->
<!-- ###                                                            ### -->
<!-- ### SAM Log Viewer: "Time Range" Dialog Window                 ### -->
<!-- ###                                                            ### -->
<!-- ###                                                            ### -->
<!-- ################################################################## -->
<!-- ################################################################## -->

<s3 id=FAL-LOGMON+DIALOG+TimeRange> Time Range

This dialog window is divided into two separate subwindows for
specifying the start and stop points in the log between which log
data is to be processed for viewing.

The normal default settings are to start at beginning of log and
continue without end (adding new data as SAM progresses in the current
SAM session). This condition is indicated when the ''Beginning of File''
toggle in the ''Start Time:'' field and the ''None'' toggle in the
''Stop Time:'' field are both set.

If either of these toggles is not set (turned off), additional items
appear below the respective toggle for defining the exact starting
and/or stopping time in the SAM log. For information about these
items, select from the following:

<list bullet tight>
  * <xref FAL-LOGMON+DIALOGITEM+SetHourMinute>
  * <xref FAL-LOGMON+DIALOGITEM+SetAmPm>
  * <xref FAL-LOGMON+DIALOGITEM+SetDay>
  * <xref FAL-LOGMON+DIALOGITEM+SetMonth>
  * <xref FAL-LOGMON+DIALOGITEM+SetYear>
<\list>

<s4 id=FAL-LOGMON+DIALOGITEM+StartBeginning> Start Time: Beginning of Log

Use the "Beginning of Log" toggle to quickly select the first entry in
the log as your start time. If this toggle is set, no further action is
required for setting the start time.

If the toggle is not set, several text boxes appear so you can specify
a specific date and time:

<list bullet tight>
  * <xref FAL-LOGMON+DIALOGITEM+SetHourMinute>
  * <xref FAL-LOGMON+DIALOGITEM+SetAmPm>
  * <xref FAL-LOGMON+DIALOGITEM+SetDay>
  * <xref FAL-LOGMON+DIALOGITEM+SetMonth>
  * <xref FAL-LOGMON+DIALOGITEM+SetYear>
<\list>

<s4 id=FAL-LOGMON+DIALOGITEM+SetHourMinute> Filter Start/Stop Hour and Minute

This text box specifies the time of day. You can specify this time in
either 12- or 24-hour clock time. However, if the hour value is less
than 13, use the pushbutton to the right of the text box to specify AM
or PM. Type the value with one or two digits for the hour, a colon,
then the minutes after the hour. Hour values can range from 0 or 00
through 24; minutes 0 or 00 through 59.

<s4 id=FAL-LOGMON+DIALOGITEM+SetAmPm> Filter Start/Stop AM or PM

To change the AM/PM setting, select this pushbutton to obtain a pop-up
menu containing the two choices, then select the new value for start or
stop time. 12:00 AM is midnight.

<s4 id=FAL-LOGMON+DIALOGITEM+SetDay> Filter Start/Stop Day of Month

Specify the day of the month that you want the filter to start or stop
taking logged events from the log file. Acceptable values are 1 through
31.

<s4 id=FAL-LOGMON+DIALOGITEM+SetMonth> Filter Start/Stop Month

Specify the month of the year that you want the filter to start or stop
taking logged events from the log file. Acceptable values are 1 through
12.

<s4 id=FAL-LOGMON+DIALOGITEM+SetYear> Filter Start/Stop Year

Specify which year you want the filter to start or stop taking logged
events from the log file. If you use a 2-digit value, SAM assumes the
20th century and adds 1900 to that value.

<s4 id=FAL-LOGMON+DIALOGITEM+NoStop> Stop Time: None

Setting this toggle causes the viewer to interpret the file to the end
of the file and accept any new entries while the viewer is running. If
new logged events pass the filter requirements while SAM is running,
they are added to the screen and it is scrolled accordingly. This is
useful for keeping the viewer active while you are using SAM so you can
observe what events are taking place that are being logged.

If you clear the toggle, that disables the continuous update to the
screen, and produces new options below the toggle for setting the time and
date when you want the filter to stop:

<list bullet>
  * <xref FAL-LOGMON+DIALOGITEM+SetHourMinute>
  * <xref FAL-LOGMON+DIALOGITEM+SetAmPm>
  * <xref FAL-LOGMON+DIALOGITEM+SetDay>
  * <xref FAL-LOGMON+DIALOGITEM+SetMonth>
  * <xref FAL-LOGMON+DIALOGITEM+SetYear>
<\list>

<!-- ============================================================== -->
<!--
```

```
-->
<!-- @@@@@@@@@@@@@@@@@@@@@@@@@@@@@@@@@@@@@@@@@@@@@@@@@@@@@@@@@@@@@@@@@@ -->
<!-- @@@@@@@@@@@@@@@@@@@@@@@@@@@@@@@@@@@@@@@@@@@@@@@@@@@@@@@@@@@@@@@@@@ -->
<!-- ################################################################## -->
<!-- ################################################################## -->
<!-- ###                                                            ### -->
<!-- ###      Help System Help Screens                              ### -->
<!-- ###                                                            ### -->
<!-- ################################################################## -->
<!-- ################################################################## -->
<!-- @@@@@@@@@@@@@@@@@@@@@@@@@@@@@@@@@@@@@@@@@@@@@@@@@@@@@@@@@@@@@@@@@@ -->
<!-- @@@@@@@@@@@@@@@@@@@@@@@@@@@@@@@@@@@@@@@@@@@@@@@@@@@@@@@@@@@@@@@@@@ -->

<!-- ################################################################## -->
<!-- #   Access this screen from first screen of Help Overview        # -->
<!-- #       in SAM task-area-selection menu (X-window version).      # -->
<!-- #                                                                # -->
<!-- ################################################################## -->

<s3 id=FAL-HELPSYS-XWIN> SAM X-Windows Help

SAM provides complete online help to assist you in completing tasks.

Online help is always available at any point when using SAM, providing
explanations about the screen you are currently in, the items in the
screen, or the steps needed to complete a task.

When SAM is running in an X Window or HP VUE environment, online help is
provided via the HP Help System.  To learn how to use this help system,
refer to <link hyperlink="Help4Help _HomeTopic">Using the HP Help
System<\link> in the HP Help System help.

For information about setting up and using an X-window system with SAM,
refer to <xref FAL-XWinHelp-UsingSAM>.

If you are using a text terminal instead of X-windows, refer to <xref
FAL-HELPSYS-TERM>.

<!-- ============================================================== -->

<!--
-->
<!-- ################################################################## -->
<!-- #   SAM Opening Area-Selection-List Window                        # -->
<!-- #                                                                 # -->
<!-- #                                                                 # -->
<!-- ################################################################## -->

<s4 id=FAL-XwinHelp-UsingSAM>Using SAM with an X Window System

If you are using a text terminal, the material in this section docs
!!not!!  apply to your terminal.  Refer to <xref FAL-HELPSYS-TERM>.
This section describes the following tasks:

<otherhead>Subtopics

<list bullet tight>
* <xref FAL-XwinHelp-SelectingItems>
* <xref FAL-XwinHelp-UsingWindows>
* <xref FAL-XwinHelp-ExitSAM>
* <xref FAL-XwinHelp-PrintWindow>
* <xref FAL-XwinHelp-CustomizeInterface>
* <xref FAL-XwinHelp-SettingDISPLAYvar>
<\list>

<!-- ============================================================== -->

<!--
```

```
-->
<!-- ################################################################### -->
<!-- #   SAM Opening Area-Selection-List Window                        # -->
<!-- #                                                                 # -->
<!-- #                                                                 # -->
<!-- ################################################################### -->

<s5 id=FAL-XwinHelp-SettingDISPLAYvar>Setting the DISPLAY Variable

Keyboard input to and display output from SAM can be handled on the
system where SAM is running or on a remote system over a network
connection.

To use the preferred X-Windows interface that SAM is optimized for, the
''DISPLAY'' environment variable on the system where SAM is running must
be set to identify which system and display device SAM is to use for the
user interface.

If you need to verify current environment variable settings on the
machine where SAM is running, use the ''env'' or ''set'' commands on
that machine to view current environment and shell variable values.

The ''DISPLAY'' environment variable is most commonly set in the ''.profile''
file (Korn and Bourne shells) or in the ''.login'' file (C shell) by
commands resembling the following:

Using ''ksh'' or ''sh'':

<ex>
$ <user|DISPLAY=%%hostname%%:0.0|
$ <user|export DISPLAY|
<\ex>

Using ''csh'':

<ex>
% <user|setenv DISPLAY <var|hostname||
<\ex>

where %%hostname%% is the name returned by the ''hostname'' command on
the machine where the keyboard and display reside.

<note>
The ''export'' command used with the Korn, Bourne, and POSIX shells
passes the shell variable definition to subsequent processes.
<\note>

<otherhead> Setting up Display System

If you are running SAM on a remote system and using your local system
for keyboard input and display output, your local system must be
configured as an X-windows (Motif) host by executing the command:

<ex>
$ <user|/usr/bin/X11/xhost +%%hostname%%|
<\ex>

where %%hostname%% is the name returned by the ''hostname'' command on
the machine where SAM is running.

<otherhead> DISPLAY Variable Not Set:

<note>
If the ''DISPLAY'' environment variable is not set, SAM attempts to
execute the text terminal interface, provided the ''TERM'' environment
variable is set to a value that SAM recognizes.
<\note>

<otherhead>See Also

<list bullet tight>
* <xref FAL-XwinHelp-ExitSAM>
* <xref FAL-XwinHelp-PrintWindow>
* <xref FAL-XwinHelp-CustomizeInterface>
<\list>

<!-- ================================================================= -->

<!--
```

```
-->
<!-- ################################################################ -->
<!-- #   SAM Opening Area-Selection-List Window                      # -->
<!-- #                                                               # -->
<!-- #                                                               # -->
<!-- ################################################################ -->

<s5 id=FAL-XwinHelp-ExitSAM>Exiting SAM

To exit SAM while in the functional area selection window, select the
[[Exit SAM]] item in the [[File]] pulldown menu.

<!-- ============================================================== -->

<!--
```

```
-->
<!-- ################################################################ -->
<!-- #   SAM Opening Area-Selection-List Window                      # -->
<!-- #                                                               # -->
<!-- #                                                               # -->
<!-- ################################################################ -->

<s5 id=FAL-XwinHelp-PrintWindow>Printing the Current Window

To print an ASCII text representation of the contents of the current SAM
window, select the [[Print]] item in the [[File]] pulldown menu.  A new
window appears where you can select between printing on a system line
printer or placing the information in a specified file.

<!-- ============================================================== -->

<!--
```

```
-->
<!-- ################################################################ -->
<!-- #   SAM Opening Area-Selection-List Window                     # -->
<!-- #                                                              # -->
<!-- #                                                              # -->
<!-- ################################################################ -->

<s5 id=FAL-XwinHelp-SelectingItems>Selecting Items and Initiating Actions with the Mo

To select (highlight) a single item in a list or menu, turn a toggle
button on or off, or access a pop-up menu, position the mouse pointer
over the object of interest, then click (depress and release) the
!!left!!-hand mouse button.

To select an item from a pop-up menu, position the mouse pointer
over the menu bar, hold the mouse button down until the correct item
is highlighted, then release the button.

If you are in a browsable help window (help hierarchy listed at top of
window) and you have accessed subsequent topics via hyperlinks, you can
backtrack through the hierarchy of help screens by using the
!!right-hand!!  mouse button to access a navigational window containing
a [[backtrack]] item.

To select multiple !!adjacent!!  items in a selection list (if multiple
selections are allowed, position the mouse pointer on the first desired
item in the list, hold the mouse button down, then slide the mouse
across the desired items in the list and release after the last item is
highlighted.  If the desired items are not adjacent, hold the [[Ctrl]]
key down while making each successive selection after the first item.

The mouse pointer changes to an hourglass shape while SAM is processing
a request.  Inputs during this time are not accepted.  If the pointer
looks like the international "Do Not Enter" traffic sign (horizontal bar
inside a circle), that means that the window is currently blocked for
input because of a higher priority request in a subsequent window.  You
must exit from the subsequent window by completing or canceling the
requested task.

<otherhead>See Also

<list bullet tight>
* <xref FAL-XwinHelp-UsingWindows>
<\list>

<!-- ================================================================ -->

<!--
-->
<!-- ################################################################ -->
<!-- #   SAM Opening Area-Selection-List Window                     # -->
<!-- #                                                              # -->
<!-- #                                                              # -->
<!-- ################################################################ -->

<s5 id=FAL-XwinHelp-UsingWindows>Manipulating SAM Windows

The window manager tasks you can perform on SAM windows are:
<list tight bullet>
* moving windows
* resizing windows
* closing windows
* minimizing and maximizing windows
<\list>

<otherhead>Moving SAM Windows
The SAM main window is placed at location (0,0) of your display. Functional
subarea windows and object list windows are also placed at location (0,0).
Subsequent dialog boxes are offset down and to the right of the parent
window.  Message boxes are centered over the parent window. If a window,
other than the main window, is moved, subsequent windows will be positioned
relative to the current position rather than the original position.

<otherhead>Resizing SAM Windows
The size of the main SAM window and most of its descendents can be
increased or decreased using the window manager.  The windows cannot be
resized smaller horizontally, but can be resized smaller vertically.
Help windows can be expanded wider and/or longer for better readability
if you prefer.

Dialog boxes, message boxes, and step menus cannot be resized.

<otherhead>Closing SAM Windows

Closing the window using the window manager while in SAM's main
area-selection window menu is the same as selecting [[Exit SAM]]
in the [[File]] pulldown menu.

Closing the window using the window manager while positioned in any
functional-area task window is the same as selecting [[Exit SAM]] from the
[[File]] menu.

Closing the window using the window manager while positioned in a
dialog box or step menu is the same as selecting the [[Cancel]]
button.

Closing the window using the window manager while positioned in a
message box is the same as activating the [[OK]] button for all types
of messages except the confirmation message.  Confirmation
messages cannot be closed by the window manager.

<otherhead>Minimizing and Maximizing SAM Windows

SAM does not provide any special icons or bitmaps.  Any window iconified
has its own icon.  Groups of windows, for example, within a functional
area, cannot be iconified into a single icon.  Icon names use the full
window title.

Minimizing an object list window that has subsequent dialog boxes and step
menus results in minimizing the object list window. The subsequent
window temporarily disappears until the icon is restored.

Dialog boxes and step menus can be minimized separately with no affect
on subsequent windows.
```

```
Message dialogs cannot be minimized.

<otherhead>See Also

<list bullet tight>
* <xref FAL-XwinHelp-SelectingItems>
<\list>

<!-- ================================================================ -->

<!--
-->
<!-- ################################################################## -->
<!-- #   SAM Opening Area-Selection-List Window                       # -->
<!-- #                                                                # -->
<!-- #                                                                # -->
<!-- ################################################################## -->

<s5 id=FAL-XwinHelp-CustomizeInterface>Customizing the SAM Interface

You can customize the following features in the SAM interface:

<list tight>
* colors
* fonts
* help window size
<\list>

<otherhead> Customizing Colors

SAM colors and fonts are determined by the environment SAM is running
in.  SAM requires only foreground and background color.  However, if SAM
is running under HP VUE, SAM will use HP VUE colors (for example,
different colors for the menu bar, dialog boxes, etc.).  The VUE
definitions for resources !!supersede!!  the X11 resource definitions in
your ''$HOME/.X11defaults'' file.  To customize the resources for your
HP VUE environment, refer to the HP VUE documentation.

The ''.X11defaults'' file entries for customizing SAM colors are:
<ex>
sam*foreground
sam*background
<\ex>

<otherhead> Customizing Fonts

SAM uses two fonts, a proportional, sans serif system font, and a monospace
user font.  The system and user fonts are implemented for the following
primary components of the SAM interface:

<lablist>
\system\<list bullet tight>
                * menu bar
                * menu items
                * control buttons
                * most labels and titles
          <\list>

\user\<list bullet tight>
                * static message text
                * user input text
                * scrollable message text
                * list boxes (object list and selection list items)
                * list box column titles (object list and selection list column
                headings)

         <\list>
<\lablist>

The entries for customizing SAM fonts are:
<ex>
sam*userFont
sam*systemFont
<\ex>

<otherhead> Customizing Help Window Sizes
```

```
The entries for customizing the size of SAM help windows and their
default values are:

<ex>
*helpWindow*columns:        40
*helpWindow*rows:           15
*helpWindow*leading:        2

*quickHelpWindow*columns:  40
*quickHelpWindow*rows:     15
*quickHelpWindow*leading:  2
<\ex>

The ''*quickHelpWindow'' values are for help windows that appear when
you use the [[f1]] key or the [[Help]] button in a SAM window.

The ''*helpWindow'' values are for help windows that are created when
you request browsable help from a help window that was initially created
by SAM.

The ''columns'' entries define the width of the screen in terms of how
many normal characters are allowed on a single row in a normal text
terminal window (standard terminals display 80 characters per row).

The ''rows'' entries define the height of the screen in terms of how
many horizontal rows of text are allowed from the top to the bottom
of the window, again in terms of normal text terminal displays
(standard terminals display 25 rows per screen).

The values for ''leading'' specify how much vertical space (in pixels)
is reserved between horizontal rows of text.  To widen the space between
lines, increase the value.

The font and default help-windows specifications for SAM originate in
file ''/usr/sam/lib/X11/app-defaults/Sam''.  If you are running SAM on
a remote system, the display resource defaults must be set up on the
system where the keyboard and display reside.

<!-- ================================================================= -->

<!--
 -->
<s3 id=FAL-SAM-TERMUSE> Controlling SAM from a Text Terminal
<!-- ################################################################# -->
<!-- #   SAM Opening Area-Selection-List Window                        # -->
<!-- #                                                                 # -->
<!-- #                                                                 # -->
<!-- ################################################################# -->

A ++text terminal++ is a combination video display and keyboard.  A text
terminal can only display !!individual characters!!; i.e., letters,
numbers, and punctuation symbols.  It cannot display ++bit-mapped++
graphics required by the X Window System.  Some text terminals use
++line-drawing characters++ for constructing lines and simple images.
SAM uses line-drawing characters when it knows the terminal supports
them.

SAM uses a special human interface on text terminals to replace the
interaction between a mouse and the X-windows display.  Certain keys or
key combinations are used for navigating within a screen and for moving
between screens related to the task being performed.

<otherhead>Additional Information

For more information about how to control SAM from the text-terminal
interface, select any of the following items of interest:

<list bullet tight>
* <xref FAL-TERMHELP-NAVIGAT>
* <xref EXITSAM2>
* <xref CHANGEWINDOW>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================= -->

<!--
```

```
-->
<s4 id=FAL-TERMHELP-NAVIGAT> Navigating and Manipulating Objects on a Text Terminal
<!-- ################################################################ -->
<!-- #   SAM Opening Area-Selection-List Window                     # -->
<!-- #                                                              # -->
<!-- #                                                              # -->
<!-- ################################################################ -->

Although the !!physical appearance!! of SAM windows on a text terminal
is somewhat different from their appearance when using the X Window
System, their !!structure!!  and !!behavior!!  are identical.  The
result of selecting items, enabling or disabling options, and such are
exactly the same regardless of whether you are using a text terminal or
an X-Windows interface.

However, a text terminal has no mouse-like pointing device, so the means
of interacting with SAM on a text terminal is not the same as the
X-Windows interface on an X terminal or workstation.  Instead of mouse
point-and-click operations, text terminals use the keyboard to control
SAM operations.

<otherhead>Subtopics

For more information about using SAM on a text terminal,
refer to the following:

<list bullet tight>
* <xref FAL-TERMHELP-HIGHLIGHT>
* <xref FAL-TERMHELP-CTRLBUTTON>
* <xref FAL-TERMHELP-CHECKBOX>
* <xref FAL-TERMHELP-RADIOBUTTON>
* <xref FAL-TERMHELP-MENUS>
* <xref TERMNAV>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->
<!--
-->
<s5 id=FAL-TERMHELP-HIGHLIGHT>Selecting Items in a List
<!-- ################################################################ -->
<!-- #   SAM Opening Area-Selection-List Window                     # -->
<!-- #                                                              # -->
<!-- #                                                              # -->
<!-- ################################################################ -->

SAM uses selection lists for navigating into various task areas,
choosing values from a list of recognized values, and other similar
purposes.  !!Selecting!! an item marks it as a candidate for a potential
pending action or change in status.  As each item in a list is selected,
it is !!highlighted!!.  On a text terminal, items are highlighted by
changing the appearance from normal video to inverse video, returning to
normal if the highlighting is canceled.  Only highlighted items can be
acted upon by SAM.  Some selection lists allow only one item to be
selected and highlighted; others allow multiple selections.

To select an item in a list, use the [[&up;]] or [[&down;]] keys to move
the cursor to the desired item, then press the space bar or [[Return]]
key to highlight it.  The item then changes to inverse video except for
the first character which remains normal to indicate the current cursor
position.

To cancel a highlight, simply press the space bar or [[Return]] again.

<otherhead>Highlighting Multiple Items

To select multiple items in those lists that allow multiple selections,
highlight the first item in the usual manner, then use the arrow keys to
move up or down to the next item and highlight it, continuing until all
desired items are highlighted.  If the selection list does not allow
multiple highlights, highlighting a second item cancels any existing
previous highlight.

<otherhead>Help on Selected Items

When an item is highlighted, press the help function key ([[f1]]) as
usual to obtain help specific to that item.

<otherhead>See Also

<list bullet tight>
* <xref FAL-TERMHELP-CTRLBUTTON>
* <xref FAL-TERMHELP-CHECKBOX>
* <xref FAL-TERMHELP-RADIOBUTTON>
* <xref TERMNAV>
* <xref FAL-TERMHELP-MENUS>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s5 id=FAL-TERMHELP-CTRLBUTTON>Using Control Buttons
<!-- ################################################################## -->
<!-- #   SAM Opening Area-Selection-List Window                       # -->
<!-- #                                                                # -->
<!-- #                                                                # -->
<!-- ################################################################## -->

Various SAM windows contain an assortment of !!control buttons!! that
initiate actions related to the window where they appear.  The following
are the most common:

<vex>
[ OK     ]
[ Cancel ]
[ Apply  ]
[ Help  ]
<\vex>

!!Activate!! the appropriate button to make SAM carry out the corresponding
actions as defined in the window where the button appears.

Use the [[Tab]] key to move the cursor from one control button to the next
in one direction, or use [[Shift]]-[[Tab]] to move in the reverse direction.
To activate the current (highlighted) button, press the space bar.

To activate a control button without having to use the tab key and space
bar, press the corresponding mnemonic key on the keyboard ([[A]] for
"Apply", [[C]] for "Cancel", etc.). (This does not work if you are
adding text to a text box.)

<otherhead>See Also

<list bullet tight>
* <xref FAL-TERMHELP-HIGHLIGHT>
* <xref FAL-TERMHELP-CHECKBOX>
* <xref FAL-TERMHELP-RADIOBUTTON>
* <xref TERMNAV>
* <xref FAL-TERMHELP-MENUS>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s5 id=FAL-TERMHELP-MENUS>Using Menus
<!-- ################################################################## -->
<!-- #   SAM Opening Area-Selection-List Window                       # -->
<!-- #                                                                # -->
<!-- #                                                                # -->
<!-- ################################################################## -->

The following topics explain how to manipulate SAM menus.

<otherhead>Subtopics

<list bullet tight>
* <xref FAL-TERMHELP-MENUOPTS>
* <xref FAL-TERMHELP-MENUBAR>
* <xref FAL-TERMHELP-MENUITEM>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s6 id=FAL-TERMHELP-MENUOPTS>Menu Option Buttons
<!-- ################################################################## -->
<!-- #   SAM Opening Area-Selection-List Window                        # -->
<!-- #                                                                 # -->
<!-- #                                                                 # -->
<!-- ################################################################## -->

Some screen buttons present a range of options from which you must
choose.  These !!menu buttons!!  differ in appearance from ordinary
buttons by the presence of ``->'' after the button label.  Menu buttons
look like this:

<ex>

[ %%label%%  ->]

<\ex>

To "open" a menu button, highlight it and press the space bar.  The menu
button expands into a small menu.

To choose an item from the menu, press the [[&up;]] and
[[&down;]] keys to highlight your choice, then press the space bar.
The choice is displayed on the menu button.

<otherhead>See Also

<list bullet tight>
* <xref FAL-TERMHELP-MENUBAR>
* <xref FAL-TERMHELP-MENUITEM>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ============================================================== -->

<!--
```

```
-->
<s6 id=FAL-TERMHELP-MENUBAR>Using the Menu Bar
<!-- ################################################################## -->
<!-- #   SAM Opening Area-Selection-List Window                        # -->
<!-- #                                                                 # -->
<!-- #                                                                 # -->
<!-- ################################################################## -->

The !!menu bar!!  extends across the top of the primary SAM windows, and
contains several menu buttons such as [[File]], [[List]], [[View]],
[[Options]], [[Actions]], and [[Help]].  Activating any of these buttons
reveals a pulldown menu containing choices related to the corresponding
menu button.

To move the cursor to the menubar:

<list bullet tight>
* Press [[Tab]] on any terminal
* Press [[f4]] on HP or Wyse terminals
* Press [[PF 1]], then the space bar on VT100 or ANSI terminals.
<\list>

To display the menu associated with a particular button, use the
[[&left;]] or [[&right;]] keys to highlight the menu button of interest,
then press the space bar to display the menu.

<otherhead>See Also

<list bullet tight>
* <xref FAL-TERMHELP-MENUOPTS>
* <xref FAL-TERMHELP-MENUITEM>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ============================================================== -->
<!--
```

```
-->
<!-- ################################################################## -->
<!-- #   SAM Opening Area-Selection-List Window                       # -->
<!-- #                                                                # -->
<!-- #                                                                # -->
<!-- ################################################################## -->

<s6 id=FAL-TERMHELP-MENUITEM>Choosing a Pulldown Menu Item

You can !!select!! a menu item in either of two ways:

<list bullet>

* Use the [[&up;]] and [[&down;]] keys to highlight the menu item of
  your choice.  If you attempt to go past the top or bottom of the menu,
  the highlight rotates to the end of the menu and continues.

  To activate the highlighted menu item, press [[Return]] on the
  keyboard.

* To activate a menu item that contains an underlined character without
  having to highlight it, press the mnemonic key on the keyboard that
  matches the corresponding underlined character in the menu.  (If the
  mnemonic is the same as another menu, this pulls down the menu
  instead of selecting the menu item.)
<\list>

<otherhead>See Also

<list bullet tight>
* <xref FAL-TERMHELP-MENUOPTS>
* <xref FAL-TERMHELP-MENUBAR>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s5 id=FAL-TERMHELP-RADIOBUTTON> Radio Buttons
<!-- ################################################################## -->
<!-- #   SAM Opening Area-Selection-List Window                       # -->
<!-- #                                                                # -->
<!-- #                                                                # -->
<!-- ################################################################## -->

Certain SAM selection lists (such as the "List" menu when it appears in
the menu bar), contain two or more items, only one of which can be
active at any given time.  Each item usually pertains to an alternate
mode of operation or alternate portrayal of system information, and
selecting one always disables selection of any other item in the list.
These items are called !!radio buttons!!  because "pressing" one button
automatically cancels the others much like the tuning buttons on a radio
receiver.  Radio buttons differ in appearance from ordinary buttons by
the presence of a diamond shape to the left of the button label.  A
radio button looks like this when it is "on":

<ex>

<esc|<|*> %%button_name%%

<\ex>

or like this when it is "off":

<ex>

<esc|<| > %%button_name%%

<\ex>

To turn a radio button on or off, highlight the radio button with the
[[&up;]] or [[&down;]] arrow keys and press the space bar.  If the
button is in the [[List]] menu, the screen will change to another
portrayal of information related to the current functional area.

Radio buttons are mutually exclusive.  Only one button can be turned on
at any given time.

<otherhead>See Also

<list bullet tight>
* <xref FAL-TERMHELP-HIGHLIGHT>
* <xref FAL-TERMHELP-CTRLBUTTON>
* <xref FAL-TERMHELP-CHECKBOX>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s5 id=FAL-TERMHELP-CHECKBOX>Turning a Checkbox On or Off
<!-- ################################################################# -->
<!-- #   SAM Opening Area-Selection-List Window                        # -->
<!-- #                                                                 # -->
<!-- #                                                                 # -->
<!-- ################################################################# -->

A !!checkbox!!  is an object that can be turned "on" or "off."
Checkboxes differ in appearance from ordinary buttons by the presence of
a square shape to the left of the button label.  A checkbox looks like
this when it is turned "on":

<ex>
[x] %%label%%
<\ex>

A checkbox looks like this when it is turned off:

<ex>
[ ] %%label%%
<\ex>

To turn a checkbox on or off, use the [[Tab]] to move the highlight over
the checkbox, then press the space bar.  If it was ''on,'' the ''x'' in
the checkbox disappears.  If it was ''off,'' an ''x'' appears in the
checkbox.

Checkboxes are !!not!!  mutually exclusive.  You may turn "on" or "off"
as many as you need.

<otherhead>See Also

<list bullet tight>
* <xref FAL-TERMHELP-HIGHLIGHT>
* <xref FAL-TERMHELP-CTRLBUTTON>
* <xref FAL-TERMHELP-RADIOBUTTON>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s5 id=TERMNAV>Navigating in SAM
<!-- ################################################################# -->
<!-- #   SAM Opening Area-Selection-List Window                        # -->
<!-- #                                                                 # -->
<!-- #                                                                 # -->
<!-- ################################################################# -->

The following topics explain how to move around in SAM
using the keyboard:

<otherhead>Subtopics

<list bullet tight>
* <xref TERMFUNCTION>
* <xref TERMNAVFUN>
* <xref TERMNAVSPECIAL>
* <xref TERMSELECTOBJ>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s6 id=TERMNAVFUN>Using Softkeys
<!-- ################################################################## -->
<!-- #   SAM Opening Area-Selection-List Window                       # -->
<!-- #                                                                # -->
<!-- #                                                                # -->
<!-- ################################################################## -->

Hewlett-Packard terminals (and some others) display eight !!softkey
labels!! below the window area.  The keyboard keys to which these
labels correspond are in a row across the top of the terminal's
keyboard, and they are usually labeled [[f1]] through [[f8]].

The labels may change when a new window appears.  The table below lists
the labels that you will see most often.

<note>
VT-100 (and other ANSI-standard) terminals will not display the
function-key labels.

The last column of the table lists the keys or key combinations that
give the equivalent result for these terminals.
<\note>

<ex>
          Function Keys for SAM's Text-terminal Interface

Meaning             Label              Key(s)*
                               HP or Wyse       VT-100 or ANSI
-----------------------------------------------------------------

Get help            Help       [[f1]]           [[Help]] or [[PF 2]]
in understanding    On Item
an element
displayed on the
screen

Type alternate      Alt        [[f2]]           [[PF 1]]
character

Highlight an        Select     [[f3]]           [[space bar]]
item or activate               or [[space bar]]
a button

Move cursor         Menubar    [[f4]]           [[PF 3]], [[space bar]]
to menubar          on\off                    or [[PF 3]], [[=]]

Open the            Open       [[f5]]           [[Return]]
highlighted
functional area or
subarea

Return to the       Previous   [[f8]]           (none)
previous level      Level
of SAM

"Escape"            Shell      [[f7]]           (none)
(temporarily)
to a shell

Exit the            Exit       [[f6]]           (none)
current window

Exit SAM            Exit       [[f8]]           (none)
entirely            SAM
-----------------------------------------------------------------
* Keys are specified by the symbols that appear on their
  keycaps.  Presence of a comma (,) between two keycaps means
  that the keys should be pressed in sequence.
<\ex>

Hewlett-Packard and Wyse terminals can display the !!labels!!
associated with these function-key bindings on-screen in a line below
the regular text display.

VT-100 (and other ANSI-standard) terminals will not display these
function-key labels.
<otherhead>See Also

<list bullet tight>
* <xref FAL-TERMHELP-MENUS>
* <xref TERMFUNCTION>
* <xref TERMNAVSPECIAL>
* <xref TERMSELECTOBJ>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ============================================================== -->

<!--
```

```
-->
<s6 id=TERMNAVSPECIAL>Navigating with Keys and Key Combinations
<!-- ############################################################# -->
<!-- #   SAM Opening Area-Selection-List Window                  # -->
<!-- #                                                           # -->
<!-- #                                                           # -->
<!-- ############################################################# -->

You must use particular keys and combinations of keys to navigate and
perform particular tasks in SAM.
The following table lists the special meanings of the keys you must
use to navigate through the windows in SAM's text-terminal interface.

<ex>
                      Meanings of Selected Keys

Action                          Key(s)*
                        HP or Wyse       VT-100 or ANSI
-------------------------------------------------------------------

Move the cursor one     [[&right;]]           [[&right;]]
space to the right

Move the cursor one     [[&left;]]            [[&left;]]
space to the left

Move the cursor up      [[&up;]]         [[&up;]]
one line

Move the cursor         [[&down;]]       [[&down;]]
down one line

Move the cursor         [[Tab]]              [[Tab]]
to the next field

Move the cursor to      [[f4]]               [[PF 3]]
the menubar

Scroll a list up        [[Shift]]-           [[PF 1]], 2 (on keypad)
one page                [[&up;]]

Scroll a list down      [[Shift]]-           [[PF 1]], 8 (on keypad)
one page                [[&down;]]

Scroll a list up        [[f2]],              [[PF 1]], [[&up;]]
one line                [[&up;]]

Scroll a list down      [[f2]],              [[PF 1]], [[&down;]]
one line                [[&down;]]

Scroll a list left      [[Prev]]             [[PF 1]], 4 (on keypad)
one page

Scroll a list right     [[Next]]             [[PF 1]], 6 (on keypad)
one page

Scroll a list left      [[f2]],              [[&left;]]
one character           [[&left;]]

Scroll a list right     [[f2]],              [[&right;]]
one character           [[&right;]]

Highlight one item      [[f3]] or            [[space bar]]
                        [[space bar]]

Highlight all items     [[f2]], [[/]]          [[PF 1]], [[/]]
in a list

Highlight a range       [[f2]], [[f3]]        [[PF 1]], [[.]]
of items                on first item,      on first item,
                        move cursor,        move cursor,
                        [[f2]], [[f3]]         [[PF 1]], [[.]] on
                        on last item.       last item, or
                                            [[Find]] on first
                                            item, move cursor,
                                            [[Find]] on last item.

un-highlight             [[f3]] or            [[space bar]]
one item                [[space bar]]

un-highlight all         [[f2]], [[\]]          [[PF 1]], [[\]]
items in a list

Open a menu on the      [[f2]],              [[PF 1]],
menubar by using a      mnemonic key        mnemonic key
!!mnemonic!!
(first letter of menu)

Close a menu            [[f4]] or            [[PF 3]] or
                        [[space bar]]         [[space bar]]
-------------------------------------------------------------------

* Keys are specified by the symbols that appear on their
keycaps.  Presence of a comma (,) between two keycaps means
that the keys should be pressed in sequence; presence of a
hyphen (-) between two keycaps indicates that the keys should
be pressed simultaneously.
<\ex>

<otherhead>See Also

<list bullet tight>
* <xref TERMNAVFUN>
* <xref FAL-TERMHELP-MENUS>
* <xref TERMFUNCTION>
* <xref TERMSELECTOBJ>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ============================================================= -->
<!--
```

```
-->
<!-- ################################################################ -->
<!-- #   SAM Opening Area-Selection-List Window                     # -->
<!-- #                                                              # -->
<!-- #                                                              # -->
<!-- ################################################################ -->

<s6 id=TERMFUNCTION>Entering a Functional Area

SAM's main opening window is a hierarchical list of functional areas and
subareas.  Some items in the list are followed by the characters ``->''
which is an indicator that a lower-level screen contains additional
selectable subareas.  To move to a given second-level screen:

<lablist>
\Using a mouse\   Double click on item with the left mouse button, or
                  click on the item to highlight it, then select the
                  [[Open]] item in the [[Actions]] pulldown menu.

\Using keyboard\  Use [[&up;]] and [[&down;]] keys to navigate to an
                  item in the list, then press [[Return]] to select it
                  or use [[Open]] softkey.  (You can also use [[Tab]]
                  to go to the [[Actions]] menu then select [[Open]] in
                  the menu.)

<\lablist>


For items in the opening window list that do not have a ``->'' after
them, select [[Run]] in the [[Actions]] menu, press [[Return]]
(terminals), or double-click on the item (mouse).  This action runs the
program or leads directly to a functional area or subarea window for
setting up related tasks.  For other that are followed by ``->'', double
clicking or using the "Open" button opens a lower-level window for
making additional selections from a list of subareas.

To browse all help topics related to the SAM opening window area, select:

<list bullet tight>
* <link "_hometopic" JumpNewView> SAM Main Window (SAM Areas) Online Help
  <\link>
<\list>

<!-- ============================================================== -->

<!--
```

```
-->
<!-- ################################################################ -->
<!-- #   SAM Opening Area-Selection-List Window                     # -->
<!-- #                                                              # -->
<!-- #                                                              # -->
<!-- ################################################################ -->

<s6 id=TERMSELECTOBJ>Selecting an Item

Use the mouse pointer or the [[&up;]] and [[&down;]] keys to identify an
item of interest, then click the left mouse button or press the space
bar to select the item.  Some lists allow multiple selections.  To
select multiple items with the mouse, hold the [[Ctrl]] key down while
making the selection.

SAM can now act on the highlighted object.  You can highlight more than
one object at a time.  For more information on selecting objects, see
<xref TERMNAVSPECIAL>.

Depending on current system state and configuration, some selection list
screens may open with an empty list.  When this happens, SAM provides a
message telling you how to add items to the list.

<otherhead>See Also

<list bullet tight>
* <xref FAL-TERMHELP-MENUS>
* <xref TERMNAVFUN>
* <xref TERMNAVSPECIAL>
* <xref TERMSELECTOBJ>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ============================================================== -->

<!--
```

```
-->
<s4 id=EXITSAM2>Exiting SAM
<!-- ################################################################# -->
<!-- #   SAM Opening Area-Selection-List Window                      # -->
<!-- #                                                               # -->
<!-- #                                                               # -->
<!-- ################################################################# -->

To exit SAM:

<list bullet>
* Activate [[Exit SAM]] in the [[File]] menu, or

* Press the softkey labeled "Exit SAM".
<\list>

This closes the main window (and any other windows that may be open) and
returns the shell prompt.

To browse all help topics related to the SAM opening window area, select:

<list bullet tight>
* <link "_hometopic" JumpNewView> SAM Main Window (SAM Areas) Online Help
  <\link>
<\list>

<!-- ================================================================= -->

<!--
```

```
-->
<s4 id=CHANGEWINDOW>Changing Windows
<!-- ################################################################# -->
<!-- #   SAM Opening Area-Selection-List Window                      # -->
<!-- #                                                               # -->
<!-- #                                                               # -->
<!-- ################################################################# -->

As you interact with SAM's text-terminal interface, you may have more
than one window open at the same time.  The interface allows you to
perform various actions with windows:  open, close, move, resize, and
!!iconify!!  (reduce the window to a small symbol on the screen).

These actions may be chosen from the !!window control menu!!.  To open
the window control menu:

<list tight>

* on a Hewlett-Packard or Wyse terminal, press [[f2]], [[=]] or [[f2]],
  space bar.

* on a VT-100/ANSI terminal, press [[PF 1]], space bar or [[PF 1]],
  [[=]].
<\list>

<otherhead>Subtopics

<list bullet tight>
* <xref MOVEWINDOW>
* <xref ICONWINDOW>
* <xref OPENWINDOW>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================= -->

<!--
```

```
-->
<s5 id=MOVEWINDOW>Moving or Resizing a Window
<!-- ################################################################ -->
<!-- #   SAM Opening Area-Selection-List Window                     # -->
<!-- #                                                              # -->
<!-- #                                                              # -->
<!-- ################################################################ -->

<otherhead>Moving a Window

Open the window control menu, highlight "Move" and press the space bar.
Notice that the four corners of the window have begun to "blink."
Press any of the up, down, left, and right arrow keys to
move the window to the desired location, then press the space bar.

<otherhead>Resizing a Window

Open the window control menu, highlight "Resize" and press the space
bar.  Notice that the corners of the window have begun to "blink."  (If
one of the corners is not blinking, it indicates that the window cannot
be resized in that direction.)  Press any of the up, down, left, and
right arrow keys to move the window corners to the locations that
indicate the new size you require, then press the space bar.

<otherhead>See Also

<list bullet tight>
* <xref ICONWINDOW>
* <xref OPENWINDOW>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s5 id=ICONWINDOW>Iconifying or Maximizing a Window
<!-- ################################################################ -->
<!-- #   SAM Opening Area-Selection-List Window                     # -->
<!-- #                                                              # -->
<!-- #                                                              # -->
<!-- ################################################################ -->

<otherhead>Iconifying a Window

Open the window control menu, highlight "Iconify" and press
the space bar.  The window disappears, but you can see that it is still
available by opening the !!window list menu!!  (see <xref OPENWINDOW>).
If there is an un-iconified window available, the cursor will move to
that window.

<otherhead>Maximizing a Window

Open the window control menu, highlight "Maximize" and press
the space bar.  The window will be resized to fill the entire screen.

<otherhead>See Also

<list bullet tight>
* <xref MOVEWINDOW>
* <xref OPENWINDOW>
<\list>

To browse all help topics related to the SAM opening window area, select:
<list bullet tight>
* <link "_hometopic" JumpNewView> SAM Main Window (SAM Areas) Online Help
  <\link>
<\list>

<!-- ================================================================ -->

<!--
```

```
-->
<s5 id=OPENWINDOW>Opening or Closing a Window
<!-- ################################################################## -->
<!-- #   SAM Opening Area-Selection-List Window                         # -->
<!-- #                                                                  # -->
<!-- #                                                                  # -->
<!-- ################################################################## -->

<otherhead>Opening a Window

To ''raise'' (open up) an iconified window:

<list tight>

* on a Hewlett-Packard or Wyse terminal, press [[f2]], [[O]].

* on a VT-100/ANSI terminal, press [[PF 1]], [[O]].

<\list>

This opens the !!window list menu!!.  This menu lists the titles of all
visible or iconified windows.  To choose the title of the window you
wish to open, use the [[&up;]] and [[&down;]] keys to highlight the desired
window title, then press the space bar.

<otherhead>Closing a Window

Open the window control menu, highlight
"Close", then press the space bar.

The window disappears, but it is added to the window list
menu, and it may be opened as described in the previous
section.

<otherhead>See Also

<list bullet tight>
* <xref MOVEWINDOW>
* <xref ICONWINDOW>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================== -->

<!--
-->
<s4 id=FAL-HELPSYS-TERM> Using the SAM Help System on Text Terminals
<!-- ################################################################## -->
<!-- #   Access this screen from SAM Terminals Help screen.           # -->
<!-- #     This is TOP access point for entire help-on-terminal-help # -->
<!-- #       (counterpart of X windows "help4help")                    # -->
<!-- ################################################################## -->

When SAM is running in a text terminal environment, the SAM text
terminal interface provides several methods for accessing help.  For
more information about these methods, select any of the following items:

<list bullet tight>
* <xref FAL-TERMHELP-KBD>
* <xref FAL-TERMHELP-SCREEN>
* <xref FAL-TERMHELP-CONTEXT>
<\list>

Each help screen contains:

<list bullet>
   * A text area containing the help information.  To scroll this
     information, use the [[&up;]] and [[&down;]] keys.

   * A "See also" or "Additional Information" list for accessing
     related information.  To view this related information, do the
     following:

     <list tight order>
       * Press [[Tab]] until the highlight moves into the "See also" list.

       * Use the [[&up;]] and [[&down;]] keys to move the highlight within the
         list.

       * Once an item is highlighted, press the space bar or [[Return]].
     <\list>

   * A [[Close]] button, which closes the help and returns you to the
     current screen in SAM.

   * A [[Back]] button, which backtracks in reverse sequence through the
     help screens you have viewed.

   * A [[Help]] button, which accesses help on how to use the HP Help
     system.
<\list>

To move the highlight cursor to various locations in a help screen, use
the [[Tab]] key.

To move the highlight up and down in a specific area, use the [[&up;]] and
[[&down;]] keys.

<otherhead>Additional Information

To browse all help topics related to the SAM opening window area, select:

<list bullet tight>
* <link "_hometopic" JumpNewView> SAM Main Window (SAM Areas) Online Help
  <\link>
<\list>

<!-- ================================================================== -->

<!--
```

```
-->
<s3 id=FAL-TERMHELP-KBD>Keyboard Tutorial Help
<!-- ################################################################ -->
<!-- #                                                              # -->
<!-- #                                                              # -->
<!-- #                                                              # -->
<!-- ################################################################ -->

Press [[CTRL]]-[[K]] at any time to obtain a brief tutorial on how to
use the keyboard for navigating in the current screen.

<list tight>
  * To print the tutorial, press the [[P]] key.

  * If a tutorial screen ends with a "--More--" message, press the space
    bar or [[Return]] to view the rest of the tutorial.

  * To return to the current SAM screen after finishing a tutorial,
    press any key.
<\list>

<otherhead> Additional Information

<list bullet tight>
* <xref FAL-HELPSYS-XWIN>
* <xref FAL-HELPSYS-TERM>
* <xref FAL-TERMHELP-SCREEN>
* <xref FAL-TERMHELP-CONTEXT>
<\list>

To browse all help topics related to the SAM opening window area, select:

<list bullet tight>
* <link "_hometopic" JumpNewView> SAM Main Window (SAM Areas) Online Help
  <\link>
<\list>

<!-- ================================================================ -->

<!--
```

```
-->
<s3 id=FAL-TERMHELP-SCREEN>Overview Help on Current Screen
<!-- ################################################################ -->
<!-- #                                                              # -->
<!-- #                                                              # -->
<!-- #                                                              # -->
<!-- ################################################################ -->

SAM provides overview help for each screen, and item-specific help for
any highlighted item in the current screen.

<otherhead> Screen Overview Help

For overview help related to the entire screen, do the following:

<list bullet>
  * Selection-list windows have a [[Help]] button in the menu bar in the
    upper right-hand corner area of the screen.  Use the [[Tab]] and
    arrow keys to move the cursor to the menu bar [[Help]] button, then
    press [[Return]] to open the Help pulldown menu.  Press [[Return]]
    again to select "Overview" help, or use the arrow keys to highlight
    a different item in the menu before pressing [[Return]].

  * Dialog windows usually have the [[Help]] button at the bottom of the
    screen.  For help on dialog windows, use the [[Tab]] key to move to
    the [[Help]] button, then press [[Return]] to obtain the help
    information.
<\list>

<otherhead> Help Menu List

The menu-bar "Help" pulldown menu contains the following items:

    <lablist tight>
    \[[Overview]]\            Brief explanation of the current screen
                              and how to use it; usually includes links
                              for accessing additional information.

    \[[Keyboard]]\            General information about how to use the
                              keyboard to navigate in SAM.

    \[[Using Help]]\          General help for the HP Help System.

    \[[Product Information]]\ Displays the current SAM version and
                              copyright message.
    <\lablist>

<otherhead> Item-Specific Help

For help on how to get help related to a specific item in the screen or
dialog box, see <xref FAL-TERMHELP-CONTEXT>.

<otherhead>Additional Information

<list bullet tight>
* <xref FAL-HELPSYS-XWIN>
* <xref FAL-HELPSYS-TERM>
* <xref FAL-TERMHELP-KBD>
* <xref FAL-TERMHELP-CONTEXT>
<\list>

To browse all help topics related to the SAM opening window area, select:

<list bullet tight>
* <link "_hometopic" JumpNewView> SAM Main Window (SAM Areas) Online Help
  <\link>
```

```
<\list>

<!-- ================================================================ -->

<!--
```

```
 -->
<s3 id=FAL-TERMHELP-CONTEXT>Help on Highlighted Item
<!-- ################################################################ -->
<!-- #   SAM Opening Area-Selection-List Window                       # -->
<!-- #                                                                # -->
<!-- #                                                                # -->
<!-- ################################################################ -->

SAM provides overview help for each screen, and specific (context) help
for most or all individual items that can be highlighted in any given
screen.

<otherhead> Item-Specific Help

To obtain help on any specific item:

<list bullet>
  * Using the [[Tab]] and arrow keys to navigate,
    move the location cursor to the item of interest.

  * Press [[Return]] to highlight the item if it is not already
    highlighted.

  * Press the "Help on Context" softkey [[f1]] at the bottom left of the
    screen (on VT100 or ANSI terminals, press [[PF2]]).
<\list>

<otherhead> Screen Overview Help

For help related to the entire screen or dialog box, see <xref
FAL-TERMHELP-SCREEN>.

<otherhead>Additional Information

<list bullet tight>
* <xref FAL-HELPSYS-XWIN>
* <xref FAL-HELPSYS-TERM>
* <xref FAL-TERMHELP-KBD>
* <xref FAL-TERMHELP-SCREEN>
<\list>

To browse all help topics related to the SAM opening window area, select:

<list bullet tight>
* <link "_hometopic" JumpNewView> SAM Main Window (SAM Areas) Online Help
  <\link>
<\list>


<glossary>

<dterm> Bit-Mapped
Graphical displays that portray images by means of individual dots and
corresponding color information that is mapped bit-by-bit in graphics
memory then transferred to the screen, much like a normal television
image.

<dterm> Custom Application Group
An item that leads to another screen containing multiple selectable
items.  The label for a group in the current screen has a ''->'' arrow
appended at the end of the label, indicating that selecting and opening
the item displays a new screen.

<dterm> Custom Application
A command, script, or application that is executed or run by
highlighting the item in the current list and selecting the [[Open]]
```

```
item in the [[Actions]] menu or double clicking on the selected item.

<dterm> Line-Drawing Characters
Special characters that can be used for drawing lines, boxes, borders,
etc.  on a text terminal that does not support ++bit-mapped++ displays.
These characters are usually printed by sending a special series of
control characters from the computer to the terminal for each character
or group of characters.

<dterm> Text Terminal
A keyboard and terminal combination that can display only ASCII text
characters, line-by-line.  It cannot display ++bit-mapped++ graphical
images as required by the X Windows system.

<\helpvolume>
```

```
#include "fal_errmsg.h"

revision "$Header: fal.tm,v 72.13 95/01/09 09:52:16 hmgr Exp $"
library "/usr/sam/lib/fal/fal.sl"
prefix "fal"

/***************************** Begin-Specification ****************************
*
* TASK NAME
*   FAL_EXEC_PRE_CONDITION
*
* DESCRIPTION
*   Execute the pre-condition command for the given application.  If the
*   application returns 0, the application is listed in the FAL.
*
* PARAMETERS
*   Strings containing the following:
*
*       FAL_COMMAND.STRING_ID   pre-condition command to be executed
*       FAL_APP.STRING_ID       name of SAM area pre-condition applies to
*
* RETURN VALUES
*   Returns an error if the pre-condition command returns non-zero.
****************************** End-Specification *****************************/
task FAL_EXEC_PRE_CONDITION
{
    label "Execute Pre-Condition for Area"
    description "determine if \"%$FAL_APP.STRING_ID%\" should be listed in SAM"
    log tag SAMLOG_VERBOSE

    command
    {
        execute "%$FAL_COMMAND.STRING_ID%"
        switch $EXITCODE
        {
            case 0
            {
            }
            default
            {
                /* The pre-condition failed.  It doesn't matter what
                 * message we add to the handle because it won't be
                 * printed.  All we need to do is ensure that an
                 * error exists on the handle.  The frontend handles
                 * any logging that is done.
                 */
                $ERR_TEXT="pre-condition failed"
            }
        }
    }
}  /* End of task FAL_EXEC_PRE_CONDITION */

/***************************** Begin-Specification ****************************
*
* TASK NAME
*   FAL_ADD_CU
*
* DESCRIPTION
*   Adds a custom group or utility to SAM by adding an entry in
*   /etc/sam/custom/sam_custom.cu.
*
* PARAMETERS
*   Contains an FAL_CU object which has the information on the custom
*   group or utility being added.  It also contains a string with the
*   list of parent groups where the item to be added resides in the
*   SAM hierarchy.
*
* RETURN VALUES
*   Always returns OKAY
****************************** End-Specification *****************************/
task FAL_ADD_CU
{
    label "Add Custom Group or Application"
    log tag SAMLOG_DEBUG

    function
    {
        perform fal_ts_add_cu()
    }
} /* End of task FAL_ADD_CU */

/***************************** Begin-Specification ****************************
*
* TASK NAME
*   FAL_MODIFY_CU
*
* DESCRIPTION
*   Modifies a custom group or utility in SAM by modifying the entry in
*   /etc/sam/custom/sam_custom.cu.
*
* PARAMETERS
*   Contains an FAL_CU object which has the information on the custom
*   group or utility being modified.  It also contains a string with the
*   list of parent groups where the item to be modified resides in the
*   SAM hierarchy.
*
* RETURN VALUES
*   Returns OKAY if success, non-zero if failure.
****************************** End-Specification *****************************/
task FAL_MODIFY_CU
{
    label "Modify Custom Group or Application"
    log tag SAMLOG_DEBUG

    function
    {
        perform fal_ts_modify_cu()

        switch $EXITCODE
        {
            case 0
            {
            }
            default
            {
                log FAL_LOGS_FAIL_MOD tag SAMLOG_SUMMARY
            }
        }
    }
} /* End of task FAL_MODIFY_CU */

/***************************** Begin-Specification ****************************
*
* TASK NAME
*   FAL_REMOVE_CU
*
* DESCRIPTION
*   Removes a custom group or utility in SAM by removing the entry in
*   /etc/sam/custom/sam_custom.cu.
```

```
*
* PARAMETERS
*   Contains an FAL_CU object which has the information on the custom
*   group or utility being removed.  It also contains a string with the
*   list of parent groups where the item to be removed resides in the
*   SAM hierarchy.  Finally, it contains a named string
*   (FAL_NN_IS_PARENT_CUSTOM) that is "1" if the bottom-most parent group
*   is a custom group.  Otherwise, this string contains "0".
*
* RETURN VALUES
*   Returns OKAY if success, non-zero if failure.
****************************** End-Specification *****************************/
task FAL_REMOVE_CU
{
    label "Remove Custom Group or Application"
    log tag SAMLOG_DEBUG

    function
    {
        perform fal_ts_remove_cu()

        switch $EXITCODE
        {
            case 0
            {
            }
            default
            {
                log FAL_LOGS_FAIL_REMOVE tag SAMLOG_SUMMARY
            }
        }
    }
} /* End of task FAL_REMOVE_CU */


/**************************** Begin-Specification ****************************
*
* TASK NAME
*   FAL_SAVE_CONTROL_FILE
*
* DESCRIPTION
*   Saves the information on the handle to the control file specified on
*   the handle.
*
* PARAMETERS
*   handle contains:
*       - a list of FAL_CONTROL objects
*       - FAL_CONTROL_FILE.STRING_ID:  the name of the control file
*       - FAL_COMMENT.STRING_ID     :  the comment to save for the user
*
* RETURN VALUES
*   Returns OKAY if success,
*           1 if failed to save control file,
*           2 if failed to remove control file
****************************** End-Specification *****************************/
task FAL_SAVE_CONTROL_FILE
{
    label "Save User Privileges"
    log tag SAMLOG_DEBUG

    function
    {
        perform fal_ts_save_control_file()

        switch $EXITCODE
        {
            case 0
            {
            }
            case 1
            {
                log FAL_LOGS_FAIL_SAVE_CF tag SAMLOG_SUMMARY
            }
            default
            {
                log FAL_LOGS_FAIL_RM_CF tag SAMLOG_SUMMARY
            }
        }
    }
} /* End of task FAL_SAVE_CONTROL_FILE */

/**************************** Begin-Specification ****************************
*
* TASK NAME
*   FAL_READ_CONTROL_FILE
*
* DESCRIPTION
*   This routine reads the information from the control file & returns a
*   list of FAL_CONTROL objects.
*
* PARAMETERS
*   handle contains:
*       - FAL_CONTROL_FILE.STRING_ID: the control file to read
*
*   handle returns:
*       - FAL_COMMENT.STRING_ID: the comment saved for the user
*       - list of FAL_CONTROL  : one for each entry read
*
* RETURN VALUES
*   Always returns OKAY.
****************************** End-Specification *****************************/
task FAL_READ_CONTROL_FILE
{
    label "Retrieve User Privileges"
    log tag SAMLOG_DEBUG

    function
    {
        perform fal_ts_read_control_file()
    }
} /* End of task FAL_READ_CONTROL_FILE */


/**************************** Begin-Specification ****************************
*
* TASK NAME
*   FAL_GET_MODTIME
*
* DESCRIPTION
*   Gets the modification time for the file that is specified on the handle.
*   If we can't stat the file, then we return a modification time of 0.
*
* PARAMETERS
*   handle contains a string object with the name of the file.
*
* RETURN VALUES
*   Always returns OKAY.
****************************** End-Specification *****************************/
task FAL_GET_MODTIME
{
    label "Retrieve Last Modification Time for File"
```

```
    log tag SAMLOG_DEBUG

    function
    {
        perform fal_ts_get_modtime()
    }
} /* End of task FAL_GET_MODTIME */

/***************************** Begin-Specification ****************************
*
* TASK NAME
*   FAL_GET_PUSERS
*
* DESCRIPTION
*   This routine gets a list of users that already have restricted access
*   to SAM.
*
* PARAMETERS
*   handle is initially empty
*
*   handle returns:
*       - list of FAL_USER.STRING_ID    user with restricted access
*       - list of FAL_COMMENT.STRING_ID comment for user with restricted access
*
* RETURN VALUES
*   Always returns OKAY.
****************************** End-Specification *****************************/
task FAL_GET_PUSERS
{
    label "Retrieve List of Users with SAM Privileges"
    log tag SAMLOG_DEBUG

    function
    {
        perform fal_ts_get_pusers()
    }
} /* End of task FAL_GET_PUSERS */

/***************************** Begin-Specification ****************************
*
* TASK NAME
*   FAL_IS_MUL_SAMS
*
* DESCRIPTION
*   Determines if multiple versions of SAM are running on the system.
*
* PARAMETERS
*   String object containing the lock file for the current SAM session.
*
* RETURN VALUES
*   Returns a warning on the error object if there is another SAM running
*   on the system.
****************************** End-Specification *****************************/
task FAL_IS_MUL_SAMS
{
    label "Check for Multiple SAMs Running on System"
    log tag SAMLOG_VERBOSE

    function
    {
        perform fal_ts_is_mul_sams()

        switch $EXITCODE
        {
            case 0
            {
            }
            default
            {
                log FAL_INFO_MULTIPLE_SAMS tag SAMLOG_NOTE
            }
        }
    }
} /* End of task FAL_IS_MUL_SAMS */

/***************************** Begin-Specification ****************************
*
* TASK NAME
*   FAL_GET_UID
*
* DESCRIPTION
*   Gets the UID of the specified user
*
* PARAMETERS
*   handle contains one named string:
*       FAL_USER_NAME.STRING_ID         name of the user
*
*   handle returns one named string:
*       FAL_USER_ID.STRING_ID           id of the user
*
* RETURN VALUES
*   OKAY if success, otherwise non-zero
****************************** End-Specification *****************************/
task FAL_GET_UID
{
    label "Get User ID"
    description "retrieve UID for %$FAL_USER_NAME.STRING_ID%"
    log tag SAMLOG_VERBOSE

    command
    {
        execute "/usr/bin/id -u %$FAL_USER_NAME.STRING_ID%"

        stdout
        {
            parse
            {
                default separator "\n"
                position 1 to field FAL_USER_ID.STRING_ID
            }
        }
    }
} /* FAL_GET_UID */

/***************************** Begin-Specification ****************************
*
* TASK NAME
*   FAL_VALIDATE_FILE
*
* DESCRIPTION
*   Validates the file specified on the handle.
*
* PARAMETERS
*   handle contains a string with the file name to be validated.
*
*   handle always returns one of the following errors.  The frontend
*   code should ignore the ones that are not errors before calling the
*   error handler.
```

APPENDIX IV

```
*
*   FAL_USERFILE_NEXIST_ERR     the file does not exist
*   FAL_FILENAME_ERR            there is an error in the file name (rare)
*   FAL_FILE_DIR_ERR            the file is a directory
*   FAL_FILE_REGULAR_ERR        the file is a regular file
*   FAL_FILE_SPECIAL_ERR        the file is a special file
*
* RETURN VALUES
*   OKAY if success, otherwise non-zero
******************************** End-Specification ******************************/
task FAL_VALIDATE_FILE
{
    label "Validate File"
    description "determine type of file %$STRING_ID%"
    log tag SAMLOG_VERBOSE

    function
    {
        perform fal_ts_validate_file()
    }
} /* FAL_VALIDATE_FILE */
```

```
/* $Header: fal.ui,v 72.57 95/02/15 16:30:33 hmgr Exp $ */

/* DESCRIPTION FILE FOR SAM FUNCTIONAL AREA LAUNCHER
 */

/****************************************************************************
 * COMMON DEFINES USED IN THE FUNCTIONAL AREA LAUNCHER
 *
 * Abbreviations used locally:
 *
 *      act     actions menu on OLE
 *      fal     functional area launcher
 *      file    file menu on OLE
 *      opt     options menu on OLE
 */

/*  Include sam.ui, which contains global ObAM constructs used by
 *  all SAM functional areas.
 */
#include "sam.ui"

/*  This defines the path that ObAM uses when searching for icons.
 */
icon_search_path "/usr/sam/help/%L/graphics/%B%M.pm.Z"

/*  This is the shared library the fal callbacks are in.
 */
library "/usr/sam/lib/fal/fal.sl"
library "/usr/sam/lib/kc/kc_com.sl"

data_dirs "fal"

/****************************************************************************
 * EXECUTE ME FIRST
 *
 * This routine determines whether the user executed SAM with a specific
 * file and turns off the menu items that can customize the SAM environment.
 */
execute_me_first fal_execute_me_first()


/****************************************************************************
 * FUNCTIONAL AREA LAUNCHER
 *
 * This object-list screen contains all of the SAM functional areas
 * as well as other utilities added by the customer.
 */
object_list_screen fal_ole
{
  label "System Administration Manager"
  entry callback fal_entry_ole()
  exit  callback fal_exit_ole()

  /* Options menu additions.  The macro is defined in sam.ui.
   */
  options
  {
    SAM_UI_VIEW_SAM_LOG

    menuitem fal_opt_logopts
    {
      label "SAM Log Options"
      help "fal/fal.hv:FAL-MAIN+OPTIONS-SetLogOpts"
      mnemonic "S"
      do fal_opt_logopts_td
    }
  }

  /* There is only one subarea -- the list of SAM functional areas
   * and other utilities.
   */
  subarea fal_sa
  {
    help "fal/fal.hv:FAL-MAIN+OVERVIEW"
    multiselection false

    hierarchy
    {
      init fal_ole_init()
      help "fal/fal.hv:FAL-MAIN+OVERVIEW"
      help callback fal_help_xmit()

      icon fal_icon_samgroup
      {
          image "sam_sgp"
          type fal_at_group "1"
          type fal_at_type "0"
      }

      icon fal_icon_samapp
      {
          image "sam_sap"
          type fal_at_group "0"
          type fal_at_type "0"
      }

      icon fal_icon_ougroup
      {
          image "sam_ogp"
          type fal_at_group "1"
          type fal_at_type "1"
      }

      icon fal_icon_ouapp
      {
          image "sam_oap"
          type fal_at_group "0"
          type fal_at_type "1"
      }

      icon fal_icon_cugroup
      {
          image "sam_cgp"
          type fal_at_group "1"
          type fal_at_type "2"
      }

      icon fal_icon_cuapp
      {
          image "sam_cap"
          type fal_at_group "0"
          type fal_at_type "2"
      }

      level fal_menuitem_tbl
      {
        /* This list of attributes must match the list in fal_custom.ui.
         * Both the FAL and the Restricted SAM Builder share the same
         * initialization routine.
         *
         * Only fields that are visible on the OLE or needed for determining
         * the visibility of action items are listed on the OLE as attributes.
```

```
        * All other fields are stored in the data structure referenced by
        * fal_at_key.
        */
       label "SAM Areas"
       delimiter "->"
       attr fal_at_source  { label "Source" column 1 }
       attr fal_at_label   { name label "Area" column 2 no_ignore
                             sort_priority 1 icon_label_width 15 }
       attr fal_at_status  { private }
       attr fal_at_group   { private }
       attr fal_at_type    { private }
       attr fal_at_exec_as { label "Run As" }
       attr fal_at_key     { key private pointer }

     }
   }

   selected
   {
     menuitem fal_act_exec
     {
       label "Run"
       mnemonic "R"
       help "fal/fal.hv:FAL-MAIN+SELECTED-Execute"
       default action
       type not fal_at_group "1"
       do fal_exec_xmit()
     }

     menuitem fal_act_modify
     {
       label "Modify..."
       mnemonic "M"
       help "fal/fal.hv:FAL-MAIN+SELECTED-Modify"
       type fal_at_source "Custom"
       do fal_modify_xmit()
     }

     menuitem fal_act_remove
     {
       label "Remove from SAM"
       mnemonic "S"
       help "fal/fal.hv:FAL-MAIN+SELECTED-Remove"
       type fal_at_source "Custom"
       do fal_remove_xmit()
     }
   } /* selected menu */
 } /* subarea */

 /* Actions menu additions.
  */
 menu global_actions
 {
   menuitem fal_act_top
   {
     label "Go to Top Level"
     mnemonic "T"
     help "fal/fal.hv:FAL-MAIN+ACTIONS-GoTopLevel"
     do fal_top_xmit()
         quick_access true
   }

   menuitem fal_act_add_utility
   {
     label "Add Custom Application"
     mnemonic "A"
     help "fal/fal.hv:FAL-MAIN+ACTIONS-AddCustomApplication"
     do fal_add_utility_td
         quick_access true
   }

   menuitem fal_act_add_group
   {
     label "Add Custom Application Group"
     mnemonic "G"
     help "fal/fal.hv:FAL-MAIN+ACTIONS-AddGroup"
     do fal_add_group_td
         quick_access true
   }

   menuitem fal_act_whats_new
   {
     label "What's New in SAM..."
     mnemonic "W"
     help "fal/fal.hv:FAL-MAIN+ACTIONS-WhatsNew"
     do fal_whats_new_xmit()
         quick_access true
   }
 } /* actions */
} /* object-list screen */


/***************************************************************************
 * DIALOG BOX DEFINITIONS
 *
 * These are the task dialogs associated with the functional area launcher.
 */

/* This task dialog allows the administrator to add a new group to SAM's
 * main menu.
 */
task_dialog fal_add_group_td
{
  label "Add Custom Application Group"
  help "fal/fal.hv:FAL-MAIN+DIALOG+AddCustomApplGroup"
  ok callback fal_add_group_xmit()

  text_edit fal_te_label
  {
    label "    Label:"
    help "fal/fal.hv:FAL-MAIN+DIALOGITEM+AddCustomApplGroup-Label"
    width 40
    maxchars 256
    format "^[[:alnum:][:space:]_'/,:;]*$"
    callback fal_te_label_fx()
  }

  skip_line terminal_only

  text_edit fal_te_help
  {
    label "Help File:"
    help "fal/fal.hv:FAL-MAIN+DIALOGITEM+AddCustomApplGroup-HelpFile"
    width 40
    maxchars 1024
    optional true
  }

  skip_line terminal_only

  text_edit fal_te_icon
  {
```

```
    label "Icon Path:"
    help "fal/fal.hv:FAL-MAIN+DIALOGITEM+AddCustomApplGroup-IconPath"
    width 40
    callback fal_te_icon_fx()
    maxchars 1024
    optional true
  }
} /* fal_add_group_td */


/* This TD allows the administrator to add custom utilities to SAM's main menu.
 */
task_dialog fal_add_utility_td
{
  label "Add Custom Application"
  help "fal/fal.hv:FAL-MAIN+DIALOG+AddCustomApplication"
  ok callback fal_add_utility_xmit()
  buttons repeatable_task

  text_edit fal_te_label
  {
    label "  Label:"
    help "fal/fal.hv:FAL-MAIN+DIALOGITEM+AddCustomApplication-Label"
    width 40
    maxchars 256
    format "^[[:alnum:][:space:]_'/,:;]*$"
    callback fal_te_label_fx()
  }

  skip_line terminal_only
  text_edit fal_te_cmd
  {
    label "Command:"
    help "fal/fal.hv:FAL-MAIN+DIALOGITEM+AddCustomApplication-HelpFile"
    width 40
    maxchars 1024
    callback fal_te_cmd_fx()
  }

  skip_line terminal_only
  group fal_gr1
  {
    selection_list fal_sl_id
    {
      label "Execute Using:"
      help "fal/fal.hv:FAL-MAIN+DIALOGITEM+ExecutionUserID"
      data "Root's ID"
           "User's ID"
           "Specific User ID"
      selected_items 1
      multiselection false
      callback fal_sl_id_fx()
      representation optionbutton
    }

    new_column
    text_edit fal_te_id
    {
      label "Login Name"
      help "fal/fal.hv:FAL-MAIN+DIALOGITEM+SpecificUserLoginName"
      width 15
      maxchars 255
      visible false
      callback fal_te_id_fx()
      choices
      {
        label "Users with Logins on the System"
        help "fal/fal.hv:FAL-MAIN+SELECTLIST+UsersWithLoginsOnSystem"
        entry callback fal_users_se()
        width 45
        attr fal_login_at_login
        {
          label "Login"
          width 10
        }
        attr fal_login_at_name
        {
          label "Name"
          width 30
        }
      }
    }
  }

  skip_line terminal_only
  selection_list fal_sl_gui
  {
    label "User Interface Supports:"
    help "fal/fal.hv:FAL-MAIN+DIALOGITEM+AddCustomApplication-Interface"
    data "Graphical Environments"
         "Terminal Environments"
    selected_items 2
    multiselection true
    representation toggles
  }

  skip_line terminal_only
  text_edit fal_te_help
  {
    label "Help File:"
    help "fal/fal.hv:FAL-MAIN+DIALOGITEM+AddCustomApplication-HelpFile"
    width 40
    maxchars 1024
    optional true
  }

  skip_line terminal_only
  text_edit fal_te_icon
  {
    label "Icon Path:"
    help "fal/fal.hv:FAL-MAIN+DIALOGITEM+AddCustomApplication-IconPath"
    width 40
    callback fal_te_icon_fx()
    maxchars 1024
    optional true
  }
} /* fal_add_utility_td */


/* This TD allows users to modify custom groups in the OLE.
 */
task_dialog fal_modify_group_td
{
  label "Modify Custom Application Group"
  help "fal/fal.hv:FAL-MAIN+DIALOG+ModifyCustomApplicationGroup"
  entry callback fal_modify_group_se()
  ok callback fal_modify_group_xmit()

  text_edit fal_te_label
  {
    label "    Label:"
    help "fal/fal.hv:FAL-MAIN+DIALOGITEM+AddCustomApplGroup-Label"
```

```
    width 40
    maxchars 256
    format "^[[:alnum:][:space:]_'/,:;]*$"
    default "$(fal_at_label)"
    callback fal_te_label_fx()
  }

  skip_line terminal_only

  text_edit fal_te_help
  {
    label "Help File:"
    help "fal/fal.hv:FAL-MAIN+DIALOGITEM+AddCustomApplGroup-HelpFile"
    width 40
    maxchars 1024
    optional true
  }
  skip_line terminal_only

  text_edit fal_te_icon
  {
    label "Icon Path:"
    help "fal/fal.hv:FAL-MAIN+DIALOGITEM+AddCustomApplGroup-IconPath"
    width 40
    callback fal_te_icon_fx()
    maxchars 1024
    optional true
  }
} /* fal_modify_group_td */


/* This TD allows users to modify custom groups in the OLE.
 */
task_dialog fal_modify_utility_td
{
  label "Modify Custom Application"
  help "fal/fal.hv:FAL-MAIN+DIALOG+ModifyCustomApplication"
  entry callback fal_modify_utility_se()
  ok callback fal_modify_utility_xmit()

  text_edit fal_te_label
  {
    label "    Label:"
    help "fal/fal.hv:FAL-MAIN+DIALOGITEM+AddCustomApplication-Label"
    width 40
    maxchars 256
    format "^[[:alnum:][:space:]_'/,:;]*$"
    default "$(fal_at_label)"
    callback fal_te_label_fx()
  }

  skip_line terminal_only
  text_edit fal_te_cmd
  {
    label "  Command:"
    help "fal/fal.hv:FAL-MAIN+DIALOGITEM+AddCustomApplication-Command"
    width 40
    maxchars 1024
    callback fal_te_cmd_fx()
  }

  skip_line terminal_only
  group fal_gr1
  {
    selection_list fal_sl_id
    {
      label "Execute Using:"
      help "fal/fal.hv:FAL-MAIN+DIALOGITEM+ExecutionUserID"
      data "Root's ID"
           "User's ID"
           "Specific User ID"
      selected_items 1
      multiselection false
      callback fal_sl_id_fx()
      representation optionbutton
    }

    new_column
    text_edit fal_te_id
    {
      label "Login Name"
      help "fal/fal.hv:FAL-MAIN+DIALOGITEM+SpecificUserLoginName"
      width 15
      maxchars 255
      visible false
      callback fal_te_id_fx()
      choices
      {
        label "Users with Logins on the System"
        help "fal/fal.hv:FAL-MAIN+SELECTLIST+UsersWithLoginsOnSystem"
        entry callback fal_users_se()
        width 45
        attr fal_login_at_login
        {
          label "Login"
          width 10
        }
        attr fal_login_at_name
        {
          label "Name"
          width 30
        }
      }
    }
  }

  skip_line terminal_only
  selection_list fal_sl_gui
  {
    label "User Interface Supports:"
    help "fal/fal.hv:FAL-MAIN+DIALOGITEM+AddCustomApplication-Interface"
    data "Graphical Environments"
         "Terminal Environments"
    selected_items 1 2
    multiselection true
    representation toggles
  }

  skip_line terminal_only
  text_edit fal_te_help
  {
    label "Help File:"
    help "fal/fal.hv:FAL-MAIN+DIALOGITEM+AddCustomApplication-HelpFile"
    width 40
    maxchars 1024
    optional true
  }

  skip_line terminal_only
  text_edit fal_te_icon
  {
    label "Icon Path:"
```

```
    help "fal/fal.hv:FAL-MAIN+DIALOGITEM+AddCustomApplication-IconPath"
    width 40
    callback fal_te_icon_fx()
    maxchars 1024
    optional true
  }
} /* fal_modify_utility_td */


task_dialog fal_opt_logopts_td
{
  label "SAM Log Options"
  help "fal/fal.hv:FAL-MAIN+DIALOG+SetSAMlogOpts" /* Dialog box main "Help" button */
  entry callback fal_opt_logopts_se()
  ok callback fal_opt_logopts_xmit()

  toggle fal_logopts_tg_vlog
  {
    label "Auto-start SAM Log Viewer"
    help "fal/fal.hv:FAL-MAIN+DIALOGITEM+AutostLogfileViewer"
    default off
  }

  skip_line terminal_only

  selection_list fal_logopts_sl_trimwhen
  {
    label "Trim SAM Log:"
    help "fal/fal.hv:FAL-MAIN+DIALOGITEM+TrimLogfile"
    data "Automatically"
         "Never"
    representation optionbutton
    callback fal_logopts_sl_trimwhen_fx()
    selected_items 1
  }

  skip_line terminal_only

  text_edit fal_logopts_te_size
  {
    label "Maximum SAM Log Size (bytes):"
    format "^[0-9]+$"
    callback fal_logopts_te_size_val()
    help "fal/fal.hv:FAL-MAIN+DIALOGITEM+MaxLogfileSize"
    width 12
    maxchars 12
  }
} /* fal_opt_logopts_td */

#include "kcfe.ui"
```

```
<!--
################################################################################
################################################################################
#
# File:          fal_cust.htg
# RCS:           $Header: fal_cust.htg,v 72.5 95/03/01 15:52:38 hmgr Exp $
# Description:   Restricted SAM Builder Help Screens package
# Author:        Clarke Echols
# Language:      HP HelpTag
#
# (C) Copyright 1994, Hewlett-Packard, all rights reserved.
#
################################################################################
################################################################################
-->

<!-- Icons for notes, cautions, and warnings -->
<!entity NoteElementDefaultIconFile FILE "noteicon.pm">
<!entity CautionElementDefaultIconFile FILE "cauticon.pm">
<!entity WarningElementDefaultIconFile FILE "warnicon.pm">

<!-- manual title entities -->
<!entity hpuxref "<book|HP-UX Reference|">

<helpvolume>
<metainfo>
<!-- ################################################################## -->
<!-- #                                                                # -->
<!-- #                                                                # -->
<!-- #                           METAINFO                             # -->
<!-- #                                                                # -->
<!-- ################################################################## -->
    <title> Restricted SAM Builder Help Screens
    <copyright>&copy; 1994-5, Hewlett-Packard Company.
                  All rights reserved.
    <abstract> This volume contains help screens related to the
           Restricted SAM Builder.
    <\abstract>
<\metainfo>

<!-- ================================================================ -->
<!--
-->
<hometopic> Restricted SAM Builder Online Help
<!-- ################################################################## -->
<!-- ################################################################## -->
<!-- ###                                                          ### -->
<!-- ###     Execute command: "sam -r" to start program           ### -->
<!-- ###                                                          ### -->
<!-- ################################################################## -->
<!-- ################################################################## -->

&copy; Copyright 1994-1995 Hewlett-Packard Co., All Rights Reserved

<!-- ================================================================ -->
<!--
```

```
-->
<!-- ################################################################## -->
<!-- ################################################################## -->
<!-- ################################################################## -->
<!-- ###                                                            ### -->
<!-- ###               SAM VERSION INFORMATION SCREEN               ### -->
<!-- ###                                                            ### -->
<!-- ###  Accessed from the [Product Information] item in the       ### -->
<!-- ###    [Help] pulldown menu                                    ### -->
<!-- ###                                                            ### -->
<!-- ################################################################## -->
<!-- ################################################################## -->
<!-- ################################################################## -->

<s1 id=FAL-CUSTOM+ProductInfo> SAM Product Information

HP-UX System Administration Manager, HP-UX Release 10.0

<lablist tight>
\&copy; 1988-1995,\ Hewlett-Packard Company. <newline>
                    All rights reserved.
<\lablist>

This is the HP-UX System Administration Manager, commonly called "SAM",
for HP-UX Release 10.0.

<otherhead> What is SAM?

SAM is a program that automates many different HP-UX system
administration tasks varying from relatively simple tasks to rather
complex operations.  SAM makes system administration much easier and
less frustrating by reducing or eliminating the need to learn a lot of
the intricate details that must be executed correctly and in proper
sequence when using ordinary keyboard commands to administer an HP-UX
system.  At the same time, SAM maintains a log of the operations it
performs, as it performs them, so you can always refer to that log to
determine what actions and commands SAM used to accomplish a given task.

<!-- ============================================================== -->

<!--
```

```
-->
<!-- ################################################################## -->
<!-- ################################################################## -->
<!-- ################################################################## -->
<!-- ################################################################## -->
<!-- ###                                                            ### -->
<!-- ###               SAM Main Opening Window                      ### -->
<!-- ###                                                            ### -->
<!-- ###  "Overview" item in [Help] pulldown menu                   ### -->
<!-- ###                                                            ### -->
<!-- ################################################################## -->
<!-- ################################################################## -->
<!-- ################################################################## -->
<!-- ################################################################## -->

<s1 id=FAL-CUSTOM+OVERVIEW> Restricted SAM Builder: Overview

This is the main window from which restricted versions of SAM are built
for specific users.  One or more individual users can be given specific
privileges, as appropriate, so they can administer certain parts of the
system but not others.  Which areas and subareas a given user can access
is defined by selecting from the various SAM areas and subareas that
appear in the various levels of the normal SAM opening hierarchical
areas-selection window.

For more information about specific parts of this window and various
tasks that can be performed with the Restricted SAM Builder, select
from the following:

<list bullet>
  * <xref FAL-CUSTOM+ProductInfo> A one-paragraph description
    of the SAM product.

  * <xref FAL-CUSTOM+RestrictedBuilder> What the Restricted SAM
    Builder is, and an explanation of how it works.

  * <xref FAL-CUSTOM+Overview-LoadUserPrivs> Loading existing privileges
    for a given user (or a default set if the user is being added as a
    new restricted-SAM user) then customizing privileges for that user.

  * <xref FAL-CUSTOM+Overview-SaveUserPrivs> Storing a newly configured
    set of privileges, applying them to one or more specific users.

  * <xref FAL-CUSTOM+Overview-RemoveUserPrivs> Removing all SAM
    privileges from one or more specific users.
<\list>

<!-- ============================================================== -->
<!--
```

```
 -->
<!-- ####################################################################### -->
<!-- ####################################################################### -->
<!-- ####################################################################### -->
<!-- ###                                                                 ### -->
<!-- ###  DIALOG BOX: How it Works                                       ### -->
<!-- ###                                                                 ### -->
<!-- ####################################################################### -->
<!-- ####################################################################### -->
<!-- ####################################################################### -->

<s2 id=FAL-CUSTOM+RestrictedBuilder> The Restricted SAM Builder and How It Works

The Restricted SAM Builder is a separate application inside of SAM.  It
is useful for authorizing certain ordinary system users to access SAM so
that they can perform specific kinds of administrative tasks that
normally require root (super-user) privileges, without having to rely on
the primary system administrator.

Privileges can be assigned, for example, to:

<list bullet tight>
  * Users who need access to the line-printer spooler for managing
    large print jobs when the administrator is absent or unavailable.

  * Users who need to perform system backups or recover files from
    backup media without interrupting or contacting the system
    administrator.

  * Someone who is responsible for adding or deleting users and/or
    groups on the system, such as when as personnel are hired,
    terminated, or transferred to and from other departments.
<\list>

The Restricted SAM Builder is also useful for dividing administration
responsibilities among department personnel, where each person can be
responsible for certain aspects of system configuration and
administration without having to acquire broad knowledge of system
details.

<otherhead> How SAM Manages Restricted Users

When one or more restricted users are granted certain privileges, SAM
maintains a file containing information about which SAM areas and
subareas each authorized user is allowed to access.  When a restricted
user runs SAM, SAM reads the file where that user's privileges are
stored to determine which areas and subareas are available to that user.
SAM then displays in the main SAM area-selection window only those areas
and subareas that the user is authorized to access.  Thus, if user
''foo'' runs SAM and is authorized to manage the SAM "Printers and
Plotters" and "Users and Groups" areas, SAM displays the labels or icons
for those areas only.  Other areas are not shown, preventing that user
from accessing other areas that are represented by the labels or icons
that are not shown.  Likewise, if the same user is authorized to access
the "Users" subarea but not the "Groups" subarea, only the "Users" label
appears at the next level down in the "Users and Groups" area.

To ensure system security and integrity, restricted SAM users cannot:

<list bullet>
  * Escape to a shell on terminals (which would allow access as
    super-user to unauthorized areas in the system), or

  * Access the [[List]] menu for quick access between related subareas.
<\list>
```

```
<otherhead> Access Status Indicators

SAM displays the status of access privileges being configured for the
currently selected restricted user or users.  If you are using the Motif
or HP VUE graphical interface to display status ''By Name and Icon''
(viewing option provided by the [[View]] pulldown menu), the status for
each SAM area is indicated by the background color within each icon.  If
you have selected the ''By Properties'' viewing option, the status is
shown in the column labeled "Access Status" as follows:

<lablist>
\''Enabled''\     (Icon background color green).  The selected user
                  or users currently have full access to capabilities
                  provided in that particular SAM area.

\''Partial''\     (Icon background color yellow).  The selected user
                  or users currently have only partial access to
                  capabilities provided in that particular SAM area.

\''Disabled''\    (Icon background color red).  The selected user
                  or users currently do not have access to any
                  capabilities provided in that particular SAM area.
<\lablist>

<!-- ================================================================ -->
<!--
```

```
-->
<!-- ##################################################################### -->
<!-- ##################################################################### -->
<!-- ##################################################################### -->
<!-- ###                                                               ### -->
<!-- ###  DIALOG BOX: Privileges for a Single User                     ### -->
<!-- ###                                                               ### -->
<!-- ##################################################################### -->
<!-- ##################################################################### -->
<!-- ##################################################################### -->
```

<s2 id=FAL-CUSTOM+Overview-LoadUserPrivs> Loading and Configuring Privileges for a Gi The Restricted SAM Builder starts by presenting a window where you can select a known user before configuring SAM privileges. You can select a user from that window and load that users current privileges (or a default set if none exist), or cancel to exit the window without choosing a user. You can also load a particular user's current privileges at any time from the main window.

<otherhead> Loading Privileges

To load the current set of privileges for a given user, or to load a default set of privileges, select [[Load User Privileges]] from the [[Actions]] menu. A new user-selection dialog window appears where you can select from a list of known system users (obtained from the system password database). The current privileges for the selected user are loaded, or a default set of privileges is loaded if none exist for that user. SAM then displays the current or default configuration for that user in the main list area of the "SAM Areas" window, and lists the login name of the user whose privileges were loaded in the upper left-hand corner of the window. The login name has no further significance to the Restricted SAM Builder from that time onward because the new configuration can be saved for any one or more system users when it is completed.

<otherhead> Changing Privilege Settings

To disable or enable given privileges to their non-default settings, select the item or items you want to change (if you select two or more, all are given the same new setting regardless of current setting), then select [[Enable]] or [[Disable]] to set them all to the corresponding "enabled" or "disabled" state. (To select multiple items, hold the [[Ctrl]] key down while making subsequent selections after the first.) By selecting multiple items, you can set up a complete privilege configuration at the current level in the SAM area/subarea hierarchy in as few as two operations.

To set up privileges in one or more subarea trees (such as allowing the user being configured to manage the print spooler but not add or remove printers, for example) use the [[Open]] item in the [[Actions]] menu or double-click the mouse on the area or subarea of interest to navigate down to the next subarea level where you can enable and disable individual subareas within that area or subarea (or use the [[Go to Top]] action to select and configure another area).

The login name in the upper left-hand corner only identifies whose privileges were loaded. It has no other significance. If any changes are made to the loaded privileges (enable, disable, or enable all), the text, "Changes Pending" is also displayed in the upper right-hand corner of the window to indicate that the modified privileges have not been saved.

When you are satisfied with the new set of privileges, select [[Save User Privileges]] in the [[Actions]] menu to obtain a new window where you can specify one or more users to receive the new privileges. When you select [[OK]] in that window after choosing one or more users, SAM then stores those privileges in the permanent privileges-configuration file. See <xref FAL-CUSTOM+Overview-SaveUserPrivs> for more information.

```
<!-- ================================================================= -->
<!--
```

```
-->
<!-- ################################################################ -->
<!-- ################################################################ -->
<!-- ################################################################ -->
<!-- ###                                                          ### -->
<!-- ###  DIALOG BOX: Privileges for One or More Users            ### -->
<!-- ###                                                          ### -->
<!-- ################################################################ -->
<!-- ################################################################ -->
<!-- ################################################################ -->

<s2 id=FAL-CUSTOM+Overview-SaveUserPrivs> Saving Configured Privileges for One or Mor

After using the Restricted SAM Builder to configure a set of SAM
privileges, use the [[Save User Privileges]] item in the [[Actions]]
menu of the main window to save those privileges for one or more users.

[[Save User Privileges]] opens a new window, again listing all known
system users in a sub-window area.  You can then select one or more
known system users to receive the new privileges, or you can assign the
privileges to an unlisted user.  If you are assigning privileges to an
unknown user, that user must be known elsewhere, such as in an NIS
network-users password database.

<!-- ================================================================ -->
<!--
```

```
-->
<!-- ################################################################ -->
<!-- ################################################################ -->
<!-- ################################################################ -->
<!-- ###                                                          ### -->
<!-- ###  DIALOG BOX: Removing Users' SAM Privileges              ### -->
<!-- ###                                                          ### -->
<!-- ################################################################ -->
<!-- ################################################################ -->
<!-- ################################################################ -->

<s2 id=FAL-CUSTOM+Overview-RemoveUserPrivs> Removing SAM Privileges from Users

Whenever you want to use the Restricted SAM Builder to remove !!all!!
SAM privileges for one or more specific users, use the "Remove User
Privileges" item in the [[Actions]] menu of the main window.

This action opens a new window where you can select which users who
now have SAM privileges are to be removed, then remove them with the
simple press of a button.

To change SAM privileges for a given user, go to the main opening window
at any level in the area-selection hierarchy.  Use "Load User
Privileges" in the [[Actions]] menu to get the current privileges, make
any needed changes, then use "Save User Privileges" the [[Actions]] menu
to store the new privileges.

<!-- ================================================================ -->
<!--
```

```
-->
<!-- ################################################################# -->
<!-- ################################################################# -->
<!-- ################################################################# -->
<!-- ###                                                           ### -->
<!-- ###  DIALOG BOX: Restricted SAM Builder [Actions] Menu         ### -->
<!-- ###                                                           ### -->
<!-- ################################################################# -->
<!-- ################################################################# -->
<!-- ################################################################# -->

<s2 id=FAL-CUSTOM+ACTIONS> Restricted SAM Builder [[Actions]] Menu

The following items always appear in the [[Actions]] menu:

<list bullet>
  * <otherhead> Open Item

    Moves down to the next lower level in the SAM areas/subareas
    hierarchy along the branch identified by the currently highlighted
    item in the list of areas or subareas.

  * <otherhead> Close Level

    Moves up to the next higher level in the current branch of the SAM
    areas/subareas hierarchy.

    <location id=FAL-CUSTOM+ACTIONS-GoToTopLevel>&empty;<\location>
  * <otherhead> Go to Top Level

    Immediately moves to the top level in the SAM areas/subareas
    hierarchy.

    <location id=FAL-CUSTOM+ACTIONS-SaveUserPrivileges>&empty;<\location>
  * <otherhead> Save User Privileges

    Leads to a dialog window where you can select one or more users who
    are to be assigned SAM privileges !!as currently defined!!  in the
    list of SAM areas and subareas shown in the current area/subarea
    selection-hierarchy list screens (main area of the current window).
    See <xref FAL-CUSTOM+DIALOG+SaveUserPrivileges> for more
    information.

    <location id=FAL-CUSTOM+ACTIONS-RemoveUserPrivileges>&empty;<\location>
  * <otherhead> Remove User Privileges

    Leads to a dialog window where you can select one or more users
    whose SAM privileges are to be removed (canceled).  Upon completion,
    those users are removed from the list of users who have SAM
    privileges.  To again give them privileges, you must then save a new
    set of privileges for each removed user who is to be reinstated.
    See <xref FAL-CUSTOM+DIALOG+RemoveUserPrivileges> for more
    information.

    <location id=FAL-CUSTOM+ACTIONS-LoadUserPrivileges>&empty;<\location>
  * <otherhead> Load User Privileges

    Leads to a dialog window where you can select a user whose current
    SAM privileges you want to load.  Once loaded, you can then modify
    those privileges to form a new set.  If there are no current
    privileges for the selected user, a default set of privileges is
    loaded which you can then modify to fit your particular needs.  See
    <xref FAL-CUSTOM+DIALOG+LoadUserPrivileges> for more information.

    <location id=FAL-CUSTOM+ACTIONS-EnableAll>&empty;<\location>
  * <otherhead> Enable All

    Enables !!all!! privileges in !!all!! SAM areas and subareas
    (whether currently enabled or not) for the current user whose
    privileges are being configured.
<\list>

The following actions appear only if one or more areas or subareas are
highlighted in the hierarchical area-selection list in the main area of
the screen.  If no items are selected, a grayed ''(nothing selected)''
message appears instead.

<list bullet>
    <location id=FAL-CUSTOM+SELECTED-Enable>&empty;<\location>
  * <otherhead> Enable

    Changes all currently selected SAM areas or subareas in the
    area-selection part of the screen to "Enabled".

    <location id=FAL-CUSTOM+SELECTED-Disable>&empty;<\location>
  * <otherhead> Disable

    Changes all currently selected SAM areas or subareas in the
    area-selection part of the screen to "Disabled".
<\list>

<!-- ================================================================ -->
<!--
```

```
 -->
<!-- ################################################################## -->
<!-- ################################################################## -->
<!-- ################################################################## -->
<!-- ###                                                            ### -->
<!-- ###  DIALOG BOX: Save User Privileges                          ### -->
<!-- ###                                                            ### -->
<!-- ################################################################## -->
<!-- ################################################################## -->
<!-- ################################################################## -->

<s3 id=FAL-CUSTOM+DIALOG+SaveUserPrivileges> Save User Privileges

Use this dialog window to assign the currently configured set of
privileges from the main window to one or more specific users.

To assign the current set of privileges to a single user, select that
user, then select [[OK]].

To assign the current set of privileges to two or more users, select the
first user, then hold the [[Ctrl]] key down while selecting additional
users.  When you are satisfied with the set of highlighted users, select
[[OK]] to save the specified privileges for each individual, highlighted
user.

To assign the current set of privileges to a single user who does not
have a normal login entry in the system password file, select the
pushbutton labeled "Save for Unlisted User" to obtain a new dialog
window where you can specify a different user who is known elsewhere,
such as in an NIS network-users password database.

See <xref FAL-CUSTOM+DIALOGITEM+SelectUsersToSave> for more information.

To abort and return to the previous window, select [[Cancel]] instead.

<!-- ================================================================== -->
<!--
 -->
<!-- ################################################################## -->
<!-- ################################################################## -->
<!-- ###                                                            ### -->
<!-- ###  DIALOG ITEM: Select One or More Users                     ### -->
<!-- ###                                                            ### -->
<!-- ################################################################## -->
<!-- ################################################################## -->

<s4 id=FAL-CUSTOM+DIALOGITEM+SelectUsersToSave> Select One or More Users

This selection-list dialog window contains a list of known system users,
their login names, and a column indicating whether they have any current
SAM privileges.  The last column on the right also contains administrator
comments about each user, if any exist.  Select one or more entries in
the list (hold the [[Ctrl]] key down while making subsequent selections),
then select [[OK]] to complete the assignment of privileges to those
highlighted users.

<!-- ================================================================== -->
<!--
```

```
-->
<!-- ################################################################ -->
<!-- ################################################################ -->
<!-- ###                                                          ### -->
<!-- ###  DIALOG ITEM: Comment                                    ### -->
<!-- ###                                                          ### -->
<!-- ################################################################ -->
<!-- ################################################################ -->

<s4 id=FAL-CUSTOM+DIALOGITEM+Comment> Comment

This text field is for creating a pertinent comment about the user or
users being added so that they can easily identified in various lists
that appear while setting up restricted access to SAM.  Text about
what privileges they have is suggested.

Type the desired comment (up to 70 characters) into the text box.  Use
[[Back Space]] and [[Delete char]] to make any needed typographical
corrections.

<!-- ============================================================== -->
<!--
```

```
-->
<!-- ################################################################ -->
<!-- ################################################################ -->
<!-- ###                                                          ### -->
<!-- ###  DIALOG ITEM: "Save for Unlisted User" Button            ### -->
<!-- ###                                                          ### -->
<!-- ################################################################ -->
<!-- ################################################################ -->

<s4 id=FAL-CUSTOM+DIALOGITEM+SaveForUnlistedUser> Save for Unlisted User

This pushbutton leads to a new dialog window where you can specify a
user that is not known to the system; usually someone who is included
in an NIS login database or other equivalent.  See <xref
FAL-CUSTOM+SUBDIALOG+SaveForUnlistedUser> for more information.

See <xref FAL-CUSTOM+DIALOG+SaveUserPrivileges> for more information
about this window and how to use it.

<!-- ============================================================== -->
<!--
```

```
-->
<!-- ################################################################ -->
<!-- ################################################################ -->
<!-- ################################################################ -->
<!-- ###                                                          ### -->
<!-- ###  DIALOG BOX: Load User Privileges                        ### -->
<!-- ###                                                          ### -->
<!-- ################################################################ -->
<!-- ################################################################ -->
<!-- ################################################################ -->

<s3 id=FAL-CUSTOM+DIALOG+LoadUserPrivileges> Load User Privileges

This selection-list dialog window appears when the Restricted SAM
Builder starts up, and whenever you select [[Load User Privileges]]
from the [[Actions]] menu.

This window contains a list of known system users, their login names,
and a column indicating whether they have any current SAM privileges.
The last column on the right also contains administrator comments about
each user, if any exist.

Select a user from the list, then select [[OK]] to load the current set
of privileges for that user (or a default set if there are no current
privileges). SAM returns to the main window where you can then modify
the current (or default) privileges for that user in various SAM areas
and subareas before saving them for the selected user or for other users
(also see <xref FAL-CUSTOM+DIALOGITEM+SelectUserToLoad>).

To abort this dialog window and return to the main Restricted SAM
Builder window without selecting any user, select [[Cancel]] instead.
You can then configure privileges without defining a user and later
apply the new configuration to one or more users.

<!-- ============================================================== -->
<!--
```

```
-->
<!-- ################################################################ -->
<!-- ################################################################ -->
<!-- ###                                                          ### -->
<!-- ###  DIALOG ITEM: Select a User to Load                      ### -->
<!-- ###                                                          ### -->
<!-- ################################################################ -->
<!-- ################################################################ -->

<s4 id=FAL-CUSTOM+DIALOGITEM+SelectUserToLoad> Select a User to Load

This is a list of all users known to the system. It includes the login
name and given name of each user, and indicates whether that user currently
has any SAM privileges. The column on the right contains any identifying
comments previously created by an administrator.

To create a list of SAM privileges for a user, select the user from the
list in this dialog window, then select [[OK]] to continue. SAM then
loads the current privileges for that user if they exist (or loads a
default set of privileges if none exist) then returns to the main
opening-level window which lists all SAM areas with the current (or
default) settings for that user.

See <xref FAL-CUSTOM+DIALOG+LoadUserPrivileges> for more information.

<!-- ============================================================== -->
<!--
```

```
-->
<!-- ################################################################# -->
<!-- ################################################################# -->
<!-- ################################################################# -->
<!-- ###                                                           ### -->
<!-- ###  DIALOG BOX: Remove User Privileges                       ### -->
<!-- ###                                                           ### -->
<!-- ################################################################# -->
<!-- ################################################################# -->
<!-- ################################################################# -->

<s3 id=FAL-CUSTOM+DIALOG+RemoveUserPrivileges> Remove User Privileges

This selection-list dialog window lists only those users on the system
who have SAM privileges.  The list includes login name, given name, and
a column for any comments about each user.  See <xref
FAL-CUSTOM+DIALOGITEM+SelectUsersToRemove> for more information.

Select one or more users whose SAM privileges are to be removed (hold
the [[Ctrl]] key down while making subsequent selections), then select
[[OK]] to complete the cancellation of privileges and return to the
previous window.

To abort and return without removing any users' SAM privileges, select
[[Cancel]] instead.

<!-- ============================================================== -->
<!--
-->
<!-- ################################################################# -->
<!-- ################################################################# -->
<!-- ###                                                           ### -->
<!-- ###  DIALOG ITEM: Select Users to Remove                      ### -->
<!-- ###                                                           ### -->
<!-- ################################################################# -->
<!-- ################################################################# -->

<s4 id=FAL-CUSTOM+DIALOGITEM+SelectUsersToRemove> Select Users to Remove

This is a list of users who currently have SAM privileges.  Select one
or more users whose SAM privileges are to be removed, then select [[OK]]
to complete the removal of privileges of each selected user and return
to the previous window.  (Hold the [[Ctrl]] key down while making
multiple selections.)

To abort and return without removing any users' SAM privileges, select
[[Cancel]] instead.

See <xref FAL-CUSTOM+DIALOG+RemoveUserPrivileges> for more information
about this window.

<!-- ============================================================== -->
<!--
```

```
-->
<!-- ################################################################## -->
<!-- ################################################################## -->
<!-- ################################################################## -->
<!-- ###                                                            ### -->
<!-- ###  DIALOG BOX: Save for Unlisted User                        ### -->
<!-- ###                                                            ### -->
<!-- ################################################################## -->
<!-- ################################################################## -->
<!-- ################################################################## -->

<s3 id=FAL-CUSTOM+SUBDIALOG+SaveForUnlistedUser> Save for Unlisted User

Use this dialog window to identify an unknown user who is being granted
access to administrative privileges for certain SAM areas or subareas.

The ''Login Name'' field contains the login name (usually from an NIS
database) of the user who is to have access to SAM privileges.  The
''Comments'' field is for identifying comments about the user; usually
something about the user's responsibilities that require SAM access
privileges or something similar.  See <xref
FAL-CUSTOM+DIALOGITEM+LoginName> for more information.

After specifying a login name and adding comments, if any, select [[OK]]
to save the currently defined privileges being assigned to the unknown
user.  SAM then returns to the top-level window.

To abort and return to the "Save User Privileges" dialog window, select
[[Cancel]] instead.

<!-- ================================================================== -->
<!--
-->
<!-- ################################################################## -->
<!-- ################################################################## -->
<!-- ###                                                            ### -->
<!-- ###  DIALOG ITEM: Login Name                                   ### -->
<!-- ###                                                            ### -->
<!-- ################################################################## -->
<!-- ################################################################## -->

<s4 id=FAL-CUSTOM+DIALOGITEM+LoginName> Login Name

Use this text field to type the login name of a user who is not
currently listed as a known user on the system.  This is usually a login
name that exists in an NIS user database for a user who is to be granted
administration privileges on this system for certain SAM areas and/or
subareas.  SAM makes no attempt to validate the user by examining the
NIS or other user-access database.

Typing the login name of a known user produces an error message (use the
previous window before this one to save privileges for known users).

See <xref FAL-CUSTOM+SUBDIALOG+SaveForUnlistedUser> for more information
about this window.
```

```
/* $Header: fal_custom.ui,v 72.35 95/02/13 14:04:40 hmgr Exp $ */

/* DESCRIPTION FILE FOR RESTRICTED SAM BUILDER
 */

/***************************************************************************
 * COMMON DEFINES USED IN THE RESTRICTED SAM BUILDER
 *
 * The Restricted SAM Builder uses many of the same routines as the
 * Functional Area Launcher (FAL).  In fact, it references the same
 * shared library and data files.  All callbacks and field identifiers
 * begin with the "fal" prefix.  These identifier names cannot be
 * changed or the Restricted SAM Builder will break.
 *
 * Abbreviations used locally:
 *
 *      act     actions menu on OLE
 *      rsb     restricted SAM builder
 *      fal     functional area launcher
 *      remp    remove user privileges
 */

/*  Include sam.ui, which contains global ObAM constructs used by
 *  all SAM functional areas.
 */
#include "sam.ui"

/*  This defines the path that ObAM uses when searching for icons.
 */
icon_search_path "/usr/sam/help/%L/graphics/%B%M.pm.Z"

/*  This is the shared library the callbacks are in.
 */
library "/usr/sam/lib/fal/fal.sl"

data_dirs "fal"

/***************************************************************************
 * EXECUTE ME FIRST
 *
 * This routine determines whether the user executed SAM with a specific
 * file.  It also sets a flag so the initialization routine knows we are
 * executing the restricted SAM builder.
 */
execute_me_first fal_rsb_execute_me_first()


/***************************************************************************
 * RESTRICTED SAM BUILDER
 *
 * This object-list screen contains all of the SAM functional areas
 * as well as other utilities added by the customer.
 */
object_list_screen fal_ole
{
    label "Restricted SAM Builder"
    entry callback fal_entry_ole()
    exit callback fal_rsb_exit_ole()

    /* Options menu additions.  The macro is defined in sam.ui.
     */
    options
    {
        SAM_UI_VIEW_SAM_LOG
    }

/* Status line definitions.
 */
status_line
{
    status_item fal_status_user
    {
        label "Privileges for:"
        default "<User Not Specified>"
        width 55
    }

    status_item fal_status_changes
    {
        label "Changes Pending:"
        default "NO"
        width 25
    }
}

/* There is only one subarea -- the list of SAM functional areas
 * and other utilities.
 */
subarea fal_rsb_sa
{
    help "fal/fal_cust.hv:FAL-CUSTOM+OVERVIEW"
    hierarchy
    {
        init fal_ole_init()
        help callback fal_help_xmit()

        icon fal_icon_samgroup
        {
            image "sam_sgp"
            type fal_at_group "1"
            type fal_at_type "0"
        }

        icon fal_icon_samapp
        {
            image "sam_sap"
            type fal_at_group "0"
            type fal_at_type "0"
        }

        icon fal_icon_ougroup
        {
            image "sam_ogp"
            type fal_at_group "1"
            type fal_at_type "1"
        }

        icon fal_icon_ouapp
        {
            image "sam_oap"
            type fal_at_group "0"
            type fal_at_type "1"
        }

        icon fal_icon_cugroup
        {
            image "sam_cgp"
            type fal_at_group "1"
            type fal_at_type "2"
        }

        icon fal_icon_cuapp
```

```
        {
            image "sam_cap"
            type fal_at_group "0"
            type fal_at_type "2"
        }

        icon_background fal_iconb_enabled
        {
            color "green"
            type fal_at_status "Enabled"
        }

        icon_background fal_iconb_disabled
        {
            color "red"
            type fal_at_status "Disabled"
        }

        icon_background fal_iconb_partial
        {
            color "yellow"
            type fal_at_status "Partial"
        }

        level fal_menuitem_tbl
        {
            /* This list of attributes must match the list in fal.ui.
             * Both the FAL and the Restricted SAM Builder share the
             * same initialization routine.
             *
             * Only fields that are visible on the OLE or needed for
             * determining the visibility of action items are listed
             * on the OLE as attributes.  All other fields are stored
             * in the data structure referenced by fal_at_key.
             */
            label "SAM Areas"
            delimiter "->"
            attr fal_at_source   { label "Source" column 1 }
            attr fal_at_label    { name label "Area" column 2 no_ignore
                                   sort_priority 1 icon_label_width 15 }
            attr fal_at_status   { label "Access Status" column 3 }
            attr fal_at_group    { private }
            attr fal_at_type     { private }
            attr fal_at_exec_as  { label "Run As" }
            attr fal_at_key      { key private pointer }
        }
    }

    selected
    {
        menuitem fal_act_enable
        {
            label "Enable"
            help "fal/fal_cust.hv:FAL-CUSTOM+SELECTED-Enable"
            multiselection true
            mnemonic "E"
            do fal_enable_xmit()
        }

        menuitem fal_act_disable
        {
            label "Disable"
            help "fal/fal_cust.hv:FAL-CUSTOM+SELECTED-Disable"
            multiselection true
            mnemonic "D"
            do fal_disable_xmit()
            }
        } /* selected menu */

        menu global_actions
        {
            menuitem fal_act_top
            {
                label "Go to Top Level"
                help "fal/fal_cust.hv:FAL-CUSTOM+ACTIONS-GoToTopLevel"
                mnemonic "G"
                do fal_top_xmit()
                quick_access true
            }

            menuitem fal_save
            {
                label "Save User Privileges"
                help "fal/fal_cust.hv:FAL-CUSTOM+ACTIONS-SaveUserPrivileges"
                mnemonic "S"
                do fal_save_td
                quick_access true
            }

            menuitem fal_remp
            {
                label "Remove User Privileges"
                help "fal/fal_cust.hv:FAL-CUSTOM+ACTIONS-RemoveUserPrivileges"
                mnemonic "R"
                do fal_remp_td
                quick_access true
            }

            menuitem fal_edit
            {
                label "Load User Privileges"
                help "fal/fal_cust.hv:FAL-CUSTOM+ACTIONS-LoadUserPrivileges"
                mnemonic "L"
                do fal_edit_td
                quick_access true
            }

            menuitem fal_enable_all
            {
                label "Enable All"
                help "fal/fal_cust.hv:FAL-CUSTOM+ACTIONS-EnableAll"
                mnemonic "A"
                do fal_enableall_xmit()
                quick_access true
            }
        } /* actions menu */
    }
} /* object-list screen */

/**************************************************************************
 * DIALOG BOX DEFINITIONS
 *
 * These are the task dialogs associated with the functional area launcher.
 */

/* This TD allows user to save SAM setup to a file.
 */
task_dialog fal_save_td
{
    label "Save User Privileges"
    ok callback fal_save_xmit()
```

```
    entry callback fal_save_edit_se()
    help "fal/fal_cust.hv:FAL-CUSTOM+DIALOG+SaveUserPrivileges"

    selection_list fal_sl_users
    {
        label "Select a User:"
        help "fal/fal_cust.hv:FAL-CUSTOM+DIALOGITEM+SelectUsersToSave"
        multiselection true
        callback fal_sl_users_fx()
        width 70
        height 10
        attr fal_at_login
        {
            label "Login"
            width 10
        }
        attr fal_at_name
        {
            label "Name"
            width 25
        }
        attr fal_at_restricted
        {
            label "Has SAM\nPrivileges"
            width 10
        }
        attr fal_at_comment
        {
            label "Comment"
            width 70
        }
    }

    skip_line terminal_only
    text_edit fal_save_te_comment
    {
        label "Comment:"
        help "fal/fal_cust.hv:FAL-CUSTOM+DIALOGITEM+Comment"
        width 25
        maxchars 70
        optional true
    }

    skip_line terminal_only
    push_button fal_save_pb_unlisted
    {
        label "Save for Unlisted User..."
        help "fal/fal_cust.hv:FAL-CUSTOM+DIALOGITEM+SaveForUnlistedUser"
        callback fal_save_pb_unlisted_fx()
    }
} /* fal_save_td */


/* This TD allows the user to open a saved SAM configuration file for
 * editing.
 */
task_dialog fal_edit_td
{
    label "Load User Privileges"
    help "fal/fal_cust.hv:FAL-CUSTOM+DIALOG+LoadUserPrivileges"
    entry callback fal_save_edit_se()
    ok callback fal_edit_xmit()

    selection_list fal_sl_users
    {
        label "Select a User:"
        help "fal/fal_cust.hv:FAL-CUSTOM+DIALOGITEM+SelectUserToLoad"
        selected_items 1
        multiselection false
        representation listbox
        width 70
        height 10
        attr fal_at_login
        {
            label "Login"
            width 10
        }
        attr fal_at_name
        {
            label "Name"
            width 25
        }
        attr fal_at_restricted
        {
            label "Has SAM\nPrivileges"
            width 10
        }
        attr fal_at_comment
        {
            label "Comment"
            width 70
        }
    }
} /* fal_edit_td */


/* This TD allows the user to remove a user's privileges
 */
task_dialog fal_remp_td
{
    label "Remove User Privileges"
    help "fal/fal_cust.hv:FAL-CUSTOM+DIALOG+RemoveUserPrivileges"
    entry callback fal_remp_se()
    ok callback fal_remp_xmit()

    selection_list fal_sl_users
    {
        label "Select a User:"
        help "fal/fal_cust.hv:FAL-CUSTOM+DIALOGITEM+SelectUsersToRemove"
        selected_items 1
        multiselection true
        representation listbox
        width 70
        height 10
        attr fal_at_login
        {
            label "Login"
            width 10
        }
        attr fal_at_name
        {
            label "Name"
            width 25
        }
        attr fal_at_comment
        {
            label "Comment"
            width 70
        }
    }
} /* fal_remp_td */
```

```
/* This task dialog allows the user to input a login name to save the
 * privileges for.  No checks are done on this login.  This is the only
 * way to save privileges for an NIS login.
 */
task_dialog fal_save_unlisted_td
{
    label "Save for Unlisted User"
    help "fal/fal_cust.hv:FAL-CUSTOM+SUBDIALOG+SaveForUnlistedUser"
    ok callback fal_save_unlisted_xmit()

    text_edit fal_save_te_user
    {
        label "Login Name:"
        help "fal/fal_cust.hv:FAL-CUSTOM+DIALOGITEM+LoginName"
        format "^[A-Za-z]([!-+]|[--9]|[;-~]){0,7}$"
        callback fal_save_te_user_fx()
        width 15
        maxchars 8
    }

    skip_line terminal_only
    text_edit fal_save_te_comment
    {
        label "   Comment:"
        help "fal/fal_cust.hv:FAL-CUSTOM+DIALOGITEM+Comment"
        width 25
        maxchars 70
        optional true
    }
} /* fal_unlisted_users_td */
```

```
# @(#) $Header: makefile,v 72.16 94/10/07 14:58:33 hmgr Exp $

FAROOT=..

include $(FAROOT)/defs.mk

DATA=   $(MSGDATA)/fal.ui \
        $(MSGDATA)/fal_custom.ui

HELP=   $(HELPDIR)/fal/fal.hv \
        $(HELPDIR)/fal/fal_cust.hv

DBFILES=$(HPDATA)/fal/fal.tm $(HPDATA)/fal/fal.da
FADBINCS=        -I$(FAROOT)/h

ALL= $(REGDB) $(DATA) $(HELP)

include $(SAM)/make/rules.mk
```

```
/* @(#) $Header: fal_ts_add.c,v 72.11 94/12/30 15:08:04 hmgr Exp $      */

/*****************/
/* Include files */
/*****************/
#include <sys/stat.h>
#include "common/fedit/nc_defs.h"
#include "sam.h"
#include "da_yoda.h"
#include "fal_defs.h"
#include "fal_errmsg.h"
#include "fal_errors.h"

/**********************/
/* External variables */
/**********************/
extern int errno;
extern char *fal_fa_name;

/**********************/
/* External functions */
/**********************/
extern long fal_search_for_line();

/*********************************/
/* Functions defined in this file */
/*********************************/
static void fal_add_group();


/**************************** Begin-Specification ****************************
*
* Module: fal_ts_add_cu
*
* Author: Tammy Heiserman
*
* Description: This task routine adds a custom group or utility to the system
*              by adding an entry in /etc/sam/custom/sam_custom.cu.
*
*              If the entry is added at SAM's top level, then we don't need
*              to search all existing entries in sam_custom.cu -- we can
*              merely append it to the end of the file.
*
*              If the group or utility is not added to SAM's top level, then
*              we need to determine where to place the entry in the file.
*              We start by looking for the top-most parent group that the
*              utility or group should be added under.  If this group
*              already exists in the file, then we search for each
*              subsequent parent group in the file.  When we find a parent
*              group that doesn't exist, we add it below it's previous
*              parent and continue to add subsequent parent groups under
*              it.  If the top-most parent group does not exist in the
*              file, then we add it and all subsequent parent groups
*              to the end of the file.
*
*              This routine uses the common library file editing routines
*              to search and write to FAL_CUSTOM_FILE.  See the common
*              library for more information on open_cur_file(),
*              close_cur_file(), search_forward(), goto_char(), insert_line(),
*              and next_line().  Note that these routines manage the pointer
*              into the currently opened file.  These routines also always
*              create a backup copy of FAL_CUSTOM_FILE.  This backup is
*              always removed when the file is closed.
*
*              NOTE:  This task routine depends on SAM being the only
*                     editor of FAL_CUSTOM_FILE.  Valid syntaxes for
*                     FAL description files in general will *NOT* work
*                     in FAL_CUSTOM_FILE.  If at any time, SAM cannot
*                     read this file, an error message is generated.
*                     This routine could be made more robust by using
*                     lex & yacc to parse the contents of the file instead
*                     of assuming the file will have the correct syntax.
*
* Parameters: handle - Contains the information on the custom utility to
*                      be added.
*
* Globals: None
*
* Returns: int - 0 if success, non-zero otherwise
****************************** End-Specification *****************************/
FUNCTION int fal_ts_add_cu (handle)
object_ptr handle;
{
    int          size;
    int          num_parents = 0;
    int          save_errno;
    int          i;
    int          rc;
    int          saved_point;
    long         found_parent;
    long         prev_parent = 0;
    long         prev_parent_end = 0;
    boolean      still_searching = TRUE;
    char         buffer[MAXLEN];
    char         label[MAXLEN];
    char         help[MAXLEN];
    char         icon[MAXLEN];
    char         indent_buffer[MAXLEN];
    char         line[MAXLEN];
    char         fal_custom_file[MAXLEN];
    char         fal_custom_file_backup[MAXLEN];
    struct stat  sbuf;
    FILE         *fd;


    com_use_samroot (fal_custom_file, FAL_CUSTOM_FILE);
    com_use_samroot (fal_custom_file_backup, FAL_CUSTOM_FILE_BACKUP);

    /* Determine if FAL_CUSTOM_FILE exists.  If it doesn't, create it.
     */
    if (stat (fal_custom_file, &sbuf) != 0)
    {
        /* Try opening the file and immediately closing it.  This
         * should create the file.  If it doesn't, give an error
         * message.
         */
        samlog (SAMLOG_DETAIL, FAL_LOGD_CREATE_FILE, fal_custom_file);
        if ((fd = fopen (fal_custom_file, "a")) == NULL)
        {
            save_errno = errno;
            err_obj_add_err (handle, FAL_CREATE_CUSTOM_SAM_CU_ERR, fal_fa_name);
            err_obj_add_text (handle, fal_custom_file);
            errno = save_errno;
            err_obj_add_text (handle, err_explain_errno (errno));
            return (OKAY);
        }
        fclose (fd);
    }

    /* Now open the file for editing.  An error here is really rare.
     */
    if (open_cur_file (fal_custom_file) == NULL)
```

```
{
    err_obj_add_err (handle, FAL_EDIT_CUSTOM_SAM_CU_ERR, fal_fa_name);
    err_obj_add_text (handle, fal_custom_file);
    (void) unlink (fal_custom_file_backup);
    return (OKAY);
}

/* Determine if we are adding an item to SAM's top level.  If so,
 * then we don't need to search the existing entries in FAL_CUSTOM_FILE.
 * We can merely add our entry to the end of the file.
 */
da_obj_list_size (handle, STRING_DATA, &size);
if (size != 0)
{
    /* This utility is added in a lower level of SAM's hierarchy.  Search
     * existing entries in FAL_CUSTOM_FILE to determine where it belongs.
     * Once we find where it belongs, ensure all parent groups are entered
     * into FAL_CUSTOM_FILE.
     */
    for (rc = da_obj_set_list_first(handle, STRING_DATA);
         rc == OKAY;
         rc = da_obj_set_list_next (handle, STRING_DATA))
    {
        da_obj_gets (handle, STRING_DATA, label, MAXLEN);
        if (still_searching == TRUE)
        {
            /* We haven't found the spot where we need to start writing
             * parent groups into FAL_CUSTOM_FILE.  Build the parent
             * directory we are going to search for and search for it.
             */
            sprintf (line, "label \"%s\"", label);
            found_parent = fal_search_for_line(num_parents, line);
            if (found_parent == -1)
            {
                /* This parent item does not exist in the file, so we
                 * need to add it.  From now on, we will know where
                 * to add any parent groups that go under this group.
                 */
                still_searching = FALSE;

                /* Determine if we need to add it under the previous
                 * parent or at the end of the file.
                 */
                if (prev_parent > 0)
                    goto_char (prev_parent_end);
                else
                    goto_char (POINT_MAX);

                /*  There is no assoicated help -- either the help is
                 * defined in another FAL description file or no help
                 * was given when the group was created.
                 */
                strcpy (help, "");
                strcpy (icon, "");
                fal_add_group (num_parents, label, help, icon);
                num_parents++;
            }
            else if (found_parent < 0)
            {
                /* There was an error reading this file.  Add an
                 * error object to the handle and return.  No need
                 * to give another error message if there are problems
                 * closing the file.
                 */
                (void) close_cur_file (0);
                err_obj_add_err (handle,FAL_EDIT_CUSTOM_SAM_CU_ERR,fal_fa_name);
                err_obj_add_text (handle, fal_custom_file);
                (void) unlink (fal_custom_file_backup);
                return (OKAY);
            }
            else
            {
                /* If we got here, the search was successful.
                 * However, we need to make sure we found the right
                 * parent.  If a previous parent was found, this parent
                 * entry should be within the previous parent's entry.
                 * Otherwise, there is another entry elsewhere in the
                 * menu hierarchy that contains the same name.
                 *
                 * prev_parent_end was calculated when the
                 * previous parent was found.
                 */
                if ((prev_parent_end > 0) &&
                    (found_parent > prev_parent_end))
                {
                    /* There is another group somewhere in the menu
                     * hierarchy with this label.  We need to add this
                     * group under the previous parent.
                     */
                    goto_char (prev_parent_end);
                    strcpy (help, "");
                    strcpy (icon, "");
                    fal_add_group (num_parents, label, help, icon);
                    still_searching = FALSE;
                }
                else
                {
                    /* This parent group belongs to the previous
                     * parent, so it is the one we need.  Save
                     * a pointer to it so that we can add entries
                     * under it if necessary.
                     */
                    prev_parent = found_parent;

                    /* Locate the open bracket for this group.
                     * If we need to add any entries into this group,
                     * it will be after the open bracket.
                     */
                    strcpy (line, "\\(");
                    saved_point = fal_search_for_line (num_parents, line);
                    if (saved_point <= 0)
                    {
                        /* There is an error in the file.
                         */
                        (void) close_cur_file (0);
                        err_obj_add_err(handle, FAL_EDIT_CUSTOM_SAM_CU_ERR,
                                        fal_fa_name);
                        err_obj_add_text (handle, fal_custom_file);
                        (void) unlink (fal_custom_file_backup);
                        return (OKAY);
                    }

                    /* Determine where this parent ends.  If we find the
                     * next parent, we want to make sure it is in this
                     * parent group and not another one.
                     */
                    strcpy (line, ")");
                    prev_parent_end = fal_search_for_line (num_parents,
                                      line);
                    if (prev_parent_end <= 0)
                    {
                        /* There is an error in the file.
```

```
                        */
                        (void) close_cur_file (0);
                        err_obj_add_err(handle, FAL_EDIT_CUSTOM_SAM_CU_ERR,
                                        fal_fa_name);
                        err_obj_add_text (handle, fal_custom_file);
                        (void) unlink (fal_custom_file_backup);
                        return (OKAY);
                    }
                    goto_char (saved_point);
                }
                num_parents++;
            }
        }
        else
        {
            /* We have already determined where to add this group.
             * Go ahead and add the item.
             */
            strcpy (help, "");
            strcpy (icon, "");
            fal_add_group (num_parents, label, help, icon);
            num_parents++;
        }
    }
}

/* Make sure the file pointer is set to the insertion point.  If
 * still_searching is true, it is pointing to the open bracket of
 * the last parent group or the beginning of the file.  Go to the
 * appropriate location.
 */
if (still_searching == TRUE)
    if (prev_parent_end > 0)
        goto_char (prev_parent_end);
    else
        goto_char (POINT_MAX);

/* Determine if we are adding a group or utility.
 */
samlog (SAMLOG_DETAIL, FAL_LOGD_ADD_CU, fal_custom_file);
da_obj_geti (handle, FAL_CU_HASSUBMENUS, &i);
if (i == TRUE)
{
    /* We are adding a group.  The customer must enter this group and
     * add a custom utility before any items will appear in the group.
     */
    da_obj_gets (handle, FAL_CU_LABEL, label, MAXLEN);
    da_obj_gets (handle, FAL_CU_HELP, help, MAXLEN);
    da_obj_gets (handle, FAL_CU_ICON, icon, MAXLEN);
    fal_add_group (num_parents, label, help, icon);
}
else
{
    /* We are adding a utility.  Print the label, icon path, command
     * line, any help, and who to execute as to FAL_CUSTOM_FILE.
     * Don't forget to add a blank line before the utility.
     */
    insert_line("");
    next_line();

    /* Indent child entries two spaces for each parent that they have.
     */
    strcpy (indent_buffer, "");
    for (i=0; i<num_parents; i++)
        strcat (indent_buffer, "  ");

        da_obj_gets (handle, FAL_CU_LABEL, label, MAXLEN);
        sprintf (line, "%slabel \"%s\"\n", indent_buffer, label);
        insert_line (line);
        next_line();

        da_obj_gets (handle, FAL_CU_ICON, icon, MAXLEN);
        if (strlen (icon) > 0)
        {
            sprintf (line, "%sicon_path \"%s\"\n",indent_buffer, icon);
            insert_line (line);
            next_line();
        }

        da_obj_gets (handle, FAL_CU_CMD, buffer, MAXLEN);
        da_obj_geti (handle, FAL_CU_GUI_ONLY, &i);
        if (i == TRUE)
            /* This is a gui-only application.
             */
            sprintf (line,"%scommand gui_only \"%s\"\n", indent_buffer, buffer);
        else
        {
            da_obj_geti (handle, FAL_CU_HPTERM, &i);
            if (i == TRUE)
                /* This command requires an hpterm on Motif.
                 */
                sprintf (line, "%scommand \"%s\"\n", indent_buffer, buffer);
            else
                /* This command does not require an hpterm on Motif.
                 */
                sprintf (line, "%scommand gui \"%s\"\n", indent_buffer, buffer);

        }
        insert_line (line);
        next_line();

        da_obj_gets (handle, FAL_CU_EXEC_AS, buffer, MAXLEN);
        if (strlen (buffer) > 0)
        {
            sprintf (line, "%sexecute_as \"%s\"\n", indent_buffer, buffer);
            insert_line (line);
            next_line();
        }

        da_obj_gets (handle, FAL_CU_HELP, help, MAXLEN);
        if (strlen (help) > 0)
        {
            sprintf (line, "%shelp \"%s\"\n",indent_buffer, help);
            insert_line (line);
            next_line();
        }
    }

    /* Close the file and return.
     */
    if (close_cur_file (1) != 0)
    {
        err_obj_add_err(handle, FAL_EDIT_CUSTOM_SAM_CU_ERR, fal_fa_name);
        err_obj_add_text (handle, fal_custom_file);
    }
    (void) unlink (fal_custom_file_backup);
    return (OKAY);
}   /* fal_ts_add_cu */


/*****************************************************************************
```

```
 *
 * THIS IS A UTILITY ROUTINE THAT IS ONLY CALLED FROM FAL_TS_ADD_CU().
 *
 ******************************************************************************/

/**************************** Begin-Specification *****************************
 *
 * Module: fal_add_group
 *
 * Author: Tammy Heiserman
 *
 * Description: This routine adds the group entry to SAM_CUSTOM_FILE at the
 *              current location in the file as tracked by the common library
 *              file editing routines.
 *
 * Parameters: label - The label for the group being added.
 *             help  - Any optional help file
 *
 * Globals: None
 *
 * Returns: int - 0 if success, non-zero otherwise
 ****************************** End-Specification *****************************/
FUNCTION static void fal_add_group (num_parents, label, help, icon)
int  num_parents;
char *label;
char *help;
char *icon;
{
    char line[MAXLEN];
    char indent_buffer[MAXLEN];
    int  i;


    /* Add an initial blank line
     */
    insert_line("");
    next_line();

    /* Determine how far to indent the item.
     */
    strcpy (indent_buffer, "");
    for (i=0; i<num_parents; i++)
        /* Indent child entries two spaces for each parent that they have.
         */
        strcat (indent_buffer, "  ");

    /* Write the label and advance to the next line.
     */
    sprintf (line, "%slabel \"%s\"\n", indent_buffer, label);
    insert_line (line);
    next_line();

    /* Write the parent's open-bracket and advance to the next line.
     */
    sprintf (line, "%s{\n", indent_buffer);
    insert_line (line);
    next_line();

    /* Write the help line to the file.  We want to preserve the file
     * pointer on the close-parens line, so we push help on before
     * writing the close-parens line.  We don't advance to the next line
     * in case we need to add a child item to this parent group.
     */
    if (strlen (help) > 0)
    {
        sprintf (line, "%shelp \"%s\"\n", indent_buffer, help);
        insert_line (line);
    }

    /* Now write the close-parens and optional icon path line.
     */
    if (strlen (icon) == 0)
        sprintf (line, "%s}\n", indent_buffer);
    else
        sprintf (line, "%s} icon_path \"%s\"\n", indent_buffer, icon);
    insert_line (line);

    return;
} /* fal_add_group */
```

```
/* @(#) $Header: fal_ts_get_modtime.c,v 72.1 94/01/11 17:00:31 hmgr Exp $       */

/******************/
/* Include files */
/******************/
#include <sys/stat.h>
#include "sam.h"
#include "da_yoda.h"
#include "fal_defs.h"
#include "fal_errmsg.h"
#include "fal_errors.h"

/***********************/
/* External variables */
/***********************/
extern int errno;


/***************************** Begin-Specification *****************************
 *
 * Module: fal_ts_get_modtime
 *
 * Author: Tammy Heiserman
 *
 * Description: This task routine gets the modification time for the
 *              file that is specified in the string on the handle.
 *              If we can't stat the file, then we return a modification
 *              time of 0.
 *
 * Parameters: handle - Contains the file we are retrieving the modification
 *                      time for.
 *
 * Globals: None
 *
 * Returns: int - 0 if success, non-zero otherwise
 ****************************** End-Specification *****************************/
FUNCTION int fal_ts_get_modtime (handle)
object_ptr handle;
{
    char        buffer[MAXLEN];
    struct stat sbuf;


    /* Get the modification time for the specified file and write
     * it back to the string object on the handle.
     */
    da_obj_gets (handle, STRING_ID, buffer, MAXLEN);

    if (stat (buffer, &sbuf) != 0)
    {
        /* Store a modification time of "0" on the handle.
         */
        da_obj_puts (handle, STRING_ID, "0");
        return (OKAY);
    }

    sprintf (buffer, "%d", sbuf.st_mtime);
    da_obj_puts (handle, STRING_ID, buffer);

    return (OKAY);
}    /* fal_get_modtime */
```

```
/* @(#) $Header: fal_ts_get_pusers.c,v 72.5 94/07/08 16:07:22 hmgr Exp $ */

/******************/
/* Include files */
/******************/
#include <dirent.h>
#include <string.h>
#include <stdlib.h>
#include "sam.h"
#include "da_yoda.h"
#include "fal_defs.h"
#include "fal_errmsg.h"
#include "fal_errors.h"
#include "common/fedit/nc_defs.h"


/*************/
/* Externals */
/*************/
extern int scandir();
extern int alphasort();


/**************************** Begin-Specification *****************************
*
* Module: fal_ts_get_pusers
*
* Author: Tammy Heiserman
*
* Description: This task routine gets the list of users with control files on
*              the system.
*
* Parameters: handle - initially contains only the error object
*
* Globals: None
*
* Returns: int - 0 if success, non-zero otherwise
****************************** End-Specification *****************************/
FUNCTION int fal_ts_get_pusers (handle)
object_ptr handle;
{
    int               num_entries;
    int               i;
    int               buf1_len;
    int               line_size;
    char              buffer[MAXLEN];
    char              buffer1[MAXLEN];
    char              cf_file[MAXLEN];
    char              fal_cf_dir[MIDLEN];
    char              line[MAXLEN];
    struct dirent     **namelist;
    struct dirent     **list;


    com_use_samroot (fal_cf_dir, FAL_CONTROL_FILE_DIR);

    /* Create a list of strings to store the control files in.
     */
    da_handle_create_add_list (&handle, "FAL_USER.STRING_ID");
    da_handle_create_add_list (&handle, "FAL_COMMENT.STRING_ID");
    da_obj_set_list_first (handle, "FAL_USER.STRING_ID");
    da_obj_set_list_first (handle, "FAL_COMMENT.STRING_ID");

    samlog (SAMLOG_VERBOSE, FAL_LOGV_LOOK_CFS, fal_cf_dir);
    if ((num_entries = scandir (fal_cf_dir, &namelist, NULL, alphasort)) < 0)
        /* The directory doesn't exist or we can't find any entries.
         * No need to display an error message since the UI checks the
         * size of the list of strings and displays one.
         */
        return (OKAY);

    /* All files in this directory should be of the form:
     *
     * <user_login>.cf
     *
     * If a file is not in this form, ignore it.  Then strip off
     * the ".cf" and return the user's login name on the handle.
     */
    for (i=0, list=namelist; i<num_entries; i++)
    {
        sprintf (buffer, "%s", (*list)->d_name);

        strcpy (buffer1, "");
        buf1_len = com_basename (buffer1, buffer, ".cf");
        if ((buf1_len > 0) && (strlen (buffer) == buf1_len + 3))
        {
            /* We found a control file.  Add the user's name to the handle.
             */
            da_obj_puts (handle, "FAL_USER.STRING_ID", buffer1);
            da_obj_set_list_next (handle, "FAL_USER.STRING_ID");

            /* Open the file and read the comment line.  If we
             * can't open the file, fail silently.  The user will
             * be notified of the problem when saving a user's privileges.
             */
            sprintf (cf_file, "%s/%s", fal_cf_dir, buffer);
            if (open_cur_file (cf_file) == NULL)
                da_obj_puts (handle, "FAL_COMMENT.STRING_ID", "");
            else
            {
                line_size = copy_line (line, MAXLEN);
                line[line_size-1] = '\0';
                line_size = strlen (FAL_RSB_COMMENT);
                if (strncmp (line, FAL_RSB_COMMENT, line_size) == 0)
                    da_obj_puts (handle, "FAL_COMMENT.STRING_ID",
                                 &line[line_size]);
                else
                    da_obj_puts (handle, "FAL_COMMENT.STRING_ID", "");

                (void) close_cur_file (1);

                /* unlink the backup file that the NNC routines create.
                 */
                sprintf (cf_file, "%s/#%s", fal_cf_dir, buffer);
                (void) unlink (cf_file);
            }
            da_obj_set_list_next (handle, "FAL_COMMENT.STRING_ID");
        }

        free (*list);
        *list++;
    }
    free (namelist);

    return (OKAY);
}   /* fal_get_pusers */
```

```
/* @(#) $Header: fal_ts_is_mul_sams.c,v 72.4 94/03/09 16:58:31 hmgr Exp $        */

/******************/
/* Include files */
/******************/
#include "sam.h"
#include "da_yoda.h"
#include "fal_defs.h"
#include "fal_errmsg.h"
#include "fal_errors.h"
#include <dirent.h>
#include <unistd.h>
#include <errno.h>
#include <fcntl.h>
#include <string.h>


/*********************/
/* External defines */
/*********************/
extern char     *fal_fa_name;


/**************************** Begin-Specification ****************************
*
* Module: fal_ts_is_mul_sams
*
* Author: Tammy Heiserman
*
* Description: This task routine determines if there are multiple SAMs
*              running on the system.  It returns a warning message if
*              there is more than one SAM being executed.
*
* Parameters: handle - Contains the lock file for the existing SAM session.
*
* Globals: None
*
* Returns: int - returns 0 if there are no other SAMs running on the system.
*                Otherwise, returns 1.
***************************** End-Specification *****************************/
FUNCTION int fal_ts_is_mul_sams (handle)
object_ptr handle;
{
    char                lock_file[MAXLEN];
    char                buf[MAXLEN];
    char                *tmp_ptr;
    DIR                 *dirp;
    DIR                 *opendir();
    struct dirent       *dp;
    struct dirent       *readdir();
    int                 lock_fildes;
    long                dummy = 0;


    /* First extract the name of the lock file for this session.  We only
     * have multiple SAM sessions if we encounter another lock file for a
     * different SAM session.
     */
    da_obj_gets (handle, STRING_ID, lock_file, MAXLEN);
    tmp_ptr = strrchr (lock_file, '/');
    tmp_ptr++;
    com_use_samroot (buf, FAL_WORKSPACE_DIR);
    samlog (SAMLOG_VERBOSE, FAL_LOGV_LOOK_LFS, buf);
    dirp = opendir (buf);
    for (dp = readdir(dirp); dp != NULL; dp = readdir(dirp))
    {
        if (strcmp (dp->d_name,tmp_ptr) == 0)
            /* This lock file is the one we just created for this SAM
             * sesion, so ignore it.
             */
            continue;

        if (strncmp (dp->d_name, "lock_", 5) == 0)
        {
            com_use_samroot (buf, FAL_WORKSPACE);
            strcat (buf, dp->d_name);

            if ((lock_fildes = open(buf, (O_RDWR), 0600)) == -1)
            {
                /* Rather than complaining here, it's less confusing to the
                 * user to just continue with SAM.
                 */
                closedir(dirp);
                return (OKAY);
            }
            if ((lockf (lock_fildes, F_TLOCK, dummy)) == -1)
            {
                if ((errno == EAGAIN) || (errno == EACCES))
                {
                    /* We have multiple SAMs running on this system.
                     * Return a warning.
                     */
                    err_obj_add_err (handle, FAL_MUL_SAMS_ERR, fal_fa_name);
                    close (lock_fildes);
                    closedir (dirp);
                    return (1);
                }
            }
            close (lock_fildes);
        }
    }
    closedir (dirp);
    return (OKAY);
}   /* fal_ts_is_mul_sams */
```

```
/* @(#) $Header: fal_ts_modify.c,v 72.11 94/12/30 15:08:07 hmgr Exp $   */

/*****************/
/* Include files */
/*****************/
#include "common/fedit/nc_defs.h"
#include "sam.h"
#include "da_yoda.h"
#include "fal_defs.h"
#include "fal_errmsg.h"
#include "fal_errors.h"

/********************/
/* External defines */
/********************/
extern long fal_search_for_line();
extern char *fal_fa_name;


/**************************** Begin-Specification *****************************
*
* Module: fal_ts_modify_cu
*
* Author: Tammy Heiserman
*
* Description: This task routine modifies a custom utility in SAM by
*              modifying the entry in FAL_CUSTOM_FILE.  Note that the
*              executable on the system is not modified.
*
*              This routine uses the common library file editing routines
*              to search and write to FAL_CUSTOM_FILE.  See the common
*              library for more information on open_cur_file(),
*              close_cur_file(), search_forward(), goto_char(), insert_line(),
*              and next_line().  Note that these routines manage the pointer
*              into the currently opened file.  These routines also always
*              create a backup copy of FAL_CUSTOM_FILE.  This backup copy
*              is removed whenever FAL_CUSTOM_FILE is closed.
*
*              NOTE:  This task routine depends on SAM being the only
*                     editor of FAL_CUSTOM_FILE.  Valid syntaxes for
*                     FAL description files in general will *NOT* work
*                     in FAL_CUSTOM_FILE.  If at any time, SAM cannot
*                     read this file, an error message is generated.
*                     This routine could be made more robust by using
*                     lex & yacc to parse the contents of the file instead
*                     of assuming the file will have the correct syntax.
*
* Parameters: handle - Contains the information on the custom utility to
*                      be modified.  The following fields are placed on
*                      the handle:
*
*                      FAL_CU
*                       object contains information on custom utility or group
*                       being modified
*
*                      List of strings
*                       each string represents a parent group
*
* Globals: None
*
* Returns: int - Returns OKAY for success.  If the task failed, the appropriate
*                errors are placed on the handle and it returns 1.
****************************** End-Specification *****************************/
FUNCTION int fal_ts_modify_cu (handle)
object_ptr handle;
{
    int         rc;
    int         i;
    int         num_parents = 0;
    long        found_parent;
    long        prev_parent_end = 0;
    char        fal_custom_file[MAXLEN];
    char        fal_custom_file_backup[MAXLEN];
    char        label[MAXLEN];
    char        old_label[MAXLEN];
    char        line[MAXLEN];
    char        buffer[MAXLEN];
    char        buffer2[MAXLEN];
    char        indent_buffer[MAXLEN];


    com_use_samroot (fal_custom_file, FAL_CUSTOM_FILE);
    com_use_samroot (fal_custom_file_backup, FAL_CUSTOM_FILE_BACKUP);

    /* Open the file for editing.  If we can't open it, then we can't
     * modify any entries.
     */
    samlog (SAMLOG_DETAIL, FAL_LOGD_EDIT_FILE, fal_custom_file);
    if (open_cur_file (fal_custom_file) == NULL)
    {
        err_obj_add_err (handle, FAL_MOD_OPEN_CUSTOM_SAM_ERR, fal_fa_name);
        err_obj_add_text (handle, fal_custom_file);
        (void) unlink (fal_custom_file_backup);
        return (1);
    }

    /* Determine if we are modifying an item from SAM's top level.  If
     * so, we can search for the item directly.  Otherwise, we need
     * to search for all parent groups first.
     */
    da_obj_list_size (handle, STRING_DATA, &i);
    if (i != 0)
    {
        /* This utility or group exists in a lower level of SAM's hierarchy.
         * Search the existing entries in FAL_CUSTOM_FILE until all parent
         * groups have been found.
         */
        for (rc = da_obj_set_list_first(handle, STRING_DATA);
             rc == OKAY;
             rc = da_obj_set_list_next (handle, STRING_DATA))
        {
            da_obj_gets (handle, STRING_DATA, label, MAXLEN);
            sprintf (line, "label \"%s\"", label);
            found_parent = fal_search_for_line (num_parents, line);
            if (found_parent < 0)
            {
                /* Couldn't find this parent in FAL_CUSTOM_FILE.  This
                 * means we can't modify the item because it should
                 * belong somewhere under this parent.  No need to give
                 * another error message if there are problems closing
                 * the file.  Note that this error message should be
                 * extremely rare.
                 */
                (void) close_cur_file (0);
                err_obj_add_err (handle, FAL_MOD_CANT_FIND_PARENT_ERR, fal_fa_name);
                err_obj_add_text (handle, fal_custom_file);
                err_obj_add_text (handle, label);
                (void) unlink (fal_custom_file_backup);
                return (1);
            }

            /* If we get to here, then we have found the parent group.
```

```
        * We need to verify that this label appears in the previous
        * parent's group (if there was a previous parent).
        */
       if ((prev_parent_end > 0) && (found_parent > prev_parent_end))
       {
           /* There is another group somewhere in the menu hierarchy
            * with this label.  Hence, we couldn't find this parent
            * after all.  Give an error message and return.
            */
           (void) close_cur_file (0);
           err_obj_add_err (handle, FAL_MOD_CANT_FIND_PARENT_ERR, fal_fa_name);
           err_obj_add_text (handle, fal_custom_file);
           err_obj_add_text (handle, label);
           (void) unlink (fal_custom_file_backup);
           return (1);
       }

       /* Now find the end to this parent's group.  We will want
        * to make sure the next parent entry is found somewhere
        * within this parent group.
        */
       strcpy (line, "}");
       prev_parent_end = fal_search_for_line (num_parents, line);
       if (prev_parent_end <= 0)
       {
           /* There is an error in the file.
            */
           (void) close_cur_file (0);
           err_obj_add_err (handle, FAL_MOD_CANT_FIND_PARENT_ERR, fal_fa_name);
           err_obj_add_text (handle, fal_custom_file);
           err_obj_add_text (handle, label);
           (void) unlink (fal_custom_file_backup);
           return (1);
       }
       goto_char (found_parent);
       num_parents++;
    }
}

/* If we got to here, then all parent groups have been found in
 * FAL_CUSTOM_FILE.  Determine if the item we are modifying is
 * in the file.  We will search for the item under the old label
 * in case the label has changed.
 */
da_obj_gets (handle, FAL_CU_OLD_LABEL, old_label, MAXLEN);
sprintf (line, "label \"%s\"", old_label);
found_parent = fal_search_for_line (num_parents, line);
if (found_parent < 0)
{
    (void) close_cur_file (0);
    err_obj_add_err (handle, FAL_RM_CUSTOM_SAM_CU_ERR, fal_fa_name);
    err_obj_add_text (handle, fal_custom_file);
    err_obj_add_text (handle, old_label);
    (void) unlink (fal_custom_file_backup);
    return (1);
}

/* Set the indent buffer -- all lines will be prepended with this
 * amount of white space.
 */
indent_buffer[0] = CHNULL;
for (i=1; i<=num_parents; i++)
    strcat (indent_buffer, "  ");

/* Finally, we are ready to begin modifying this item.  First we
 * need to determine if this item is a utility or group.
 */
da_obj_geti (handle, FAL_CU_HASSUBMENUS, &i);
if (i == TRUE)
{
    /* We are modifying a group.  First, modify the label.
     */
    da_obj_gets (handle, FAL_CU_LABEL, label, MAXLEN);
    if (SAMSTREQ (label, old_label) == FALSE)
    {
        sprintf (line, "%slabel \"%s\"\n", indent_buffer, label);
        replace_line (line);
    }

    /* Now search for the closing bracket for this group.
     */
    strcpy (line, "}");
    prev_parent_end = fal_search_for_line (num_parents, line);
    if (prev_parent_end <= 0)
    {
        (void) close_cur_file (0);
        err_obj_add_err (handle, FAL_RM_CUSTOM_SAM_CU_ERR, fal_fa_name);
        err_obj_add_text (handle, fal_custom_file);
        err_obj_add_text (handle, old_label);
        (void) unlink (fal_custom_file_backup);
        return (1);
    }

    /* Found it.  Now replace the closing bracket line with
     * one that contains the appropriate new icon -- but only
     * if there was a change to it.
     */
    da_obj_gets (handle, FAL_CU_ICON, buffer, MAXLEN);
    if (buffer[0] != CHNULL)
        sprintf (line, "%s} icon_path \"%s\"\n", indent_buffer, buffer);
    else
        sprintf (line, "%s}\n", indent_buffer);

    replace_line (line);
    next_line();

    /* Now determine if we need to replace, remove or add a help
     * line, or leave the existing help line alone.
     */
    da_obj_gets (handle, FAL_CU_HELP, buffer2, MAXLEN);
    copy_line (line, MAXLEN);
    sprintf (buffer, "%shelp", indent_buffer);
    if (strncmp (buffer, line, strlen (buffer)) != 0)
    {
        /* There is not an existing help line -- need to add
         * one if help was specified.
         */
        if (buffer2[0] != CHNULL)
        {
            sprintf (line, "%shelp \"%s\"\n", indent_buffer, buffer2);
            insert_line (line);
        }
    }
    else if (buffer2[0] != CHNULL)
    {
        /* Need to replace the help line.
         */
        sprintf (line, "%shelp \"%s\"\n", indent_buffer, buffer2);
        replace_line (line);
    }
    else
        /* Need to remove the help line.
```

```
        */
        delete_line ();
}
else
{
    /* We are modifying a utility.  First, change the label if necessary.
     */
    da_obj_gets (handle, FAL_CU_LABEL, label, MAXLEN);
    if (SAMSTREQ (label, old_label) == FALSE)
    {
        sprintf (line, "%slabel \"%s\"\n", indent_buffer, label);
        replace_line (line);
    }
    next_line();

    /* Next change the icon line.  See if this entry already had an
     * icon line.
     */
    da_obj_gets (handle, FAL_CU_ICON, buffer2, MAXLEN);
    copy_line (line, MAXLEN);
    sprintf (buffer, "%sicon", indent_buffer);
    if (strncmp (line, buffer, strlen (buffer)) != 0)
    {
        /* There is not an existing icon line -- need to add one if
         * an icon path was specfied.
         */
        if (buffer2[0] != CHNULL)
        {
            sprintf (line, "%sicon_path \"%s\"\n",indent_buffer, buffer2);
            insert_line (line);
            next_line();
        }
    }
    else if (buffer2[0] != CHNULL)
    {
        /* Need to replace the icon line.
         */
        sprintf (line, "%sicon_path \"%s\"\n", indent_buffer, buffer2);
        replace_line (line);
        next_line();
    }
    else
        /* Need to remove the icon line.
         */
        delete_line();

    /* Next change the command line.
     */
    da_obj_gets (handle, FAL_CU_CMD, buffer, MAXLEN);
    da_obj_geti (handle, FAL_CU_GUI_ONLY, &i);
    if (i == TRUE)
        /* This is a gui-only application.
         */
        sprintf(line,"%scommand gui_only \"%s\"\n", indent_buffer, buffer);
    else
    {
        /* Determine if this command has a GUI or needs an hpterm when
         * executed in a Motif environment.
         */
        da_obj_geti (handle, FAL_CU_HPTERM, &i);
        if (i == TRUE)
            sprintf (line, "%scommand \"%s\"\n", indent_buffer, buffer);
        else
            sprintf(line, "%scommand gui \"%s\"\n", indent_buffer, buffer);

    }
    replace_line (line);
    next_line();

    /* Now update the "execute_as" line.  See if this entry already
     * has an execute_as line.
     */
    da_obj_gets (handle, FAL_CU_EXEC_AS, buffer2, MAXLEN);
    copy_line (line, MAXLEN);
    sprintf (buffer, "%sexecute_as", indent_buffer);
    if (strncmp (line, buffer, strlen (buffer)) != 0)
    {
        /* There is not an existing execute_as line -- need to add one
         * if user was specified.
         */
        if (buffer2[0] != CHNULL)
        {
            sprintf (line, "%sexecute_as \"%s\"\n",indent_buffer, buffer2);
            insert_line (line);
            next_line();
        }
    }
    else if (buffer2[0] != CHNULL)
    {
        /* Need to replace the execute_as line.
         */
        sprintf (line, "%sexecute_as \"%s\"\n", indent_buffer, buffer2);
        replace_line (line);
        next_line();
    }
    else
        /* Need to remove the execute_as line.
         */
        delete_line();


    /* Finally, change the help line.  See if this entry already had
     * a help line.
     */
    da_obj_gets (handle, FAL_CU_HELP, buffer2, MAXLEN);
    copy_line (line, MAXLEN);
    sprintf (buffer, "%shelp", indent_buffer);
    if (strncmp (buffer, line, strlen (buffer)) != 0)
    {
        /* There is not an existing help line -- need to add one
         * if help was specified.
         */
        if (buffer2[0] != CHNULL)
        {
            sprintf (line, "%shelp \"%s\"\n",indent_buffer, buffer2);
            insert_line (line);
            next_line();
        }
    }
    else if (buffer2[0] != CHNULL)
    {
        /* Need to replace the help line.
         */
        sprintf (line, "%shelp \"%s\"\n", indent_buffer, buffer2);
        replace_line (line);
        next_line();
    }
    else
        /* Need to remove the help line.
         */
        delete_line();
}
```

```
    /* Close the file and return.
     */
    if (close_cur_file (1) != 0)
    {
        err_obj_add_err (handle, FAL_RM_CUSTOM_SAM_CU_ERR, fal_fa_name);
        err_obj_add_text (handle, fal_custom_file);
        err_obj_add_text (handle, label);
        (void) unlink (fal_custom_file_backup);
        return (1);
    }
    (void) unlink (fal_custom_file_backup);
    return (OKAY);
}    /* fal_ts_modify_cu */
```

```
/* @(#) $Header: fal_ts_read_file.c,v 72.9 94/07/08 16:07:21 hmgr Exp $         */

/******************/
/* Include files */
/******************/
#include "sam.h"
#include "da_yoda.h"
#include "common/fedit/nc_defs.h"
#include "fal_defs.h"
#include "fal_errmsg.h"
#include "fal_errors.h"

/*********************/
/* External defines */
/*********************/
extern char     *fal_fa_name;


/***************************** Begin-Specification *****************************
*
* Module: fal_ts_read_control_file
*
* Author: Tammy Heiserman
*
* Description: This task routine reads the information from the control
*              SAM file and returns a list of FAL_CONTROL objects on the
*              handle.
*
* Parameters: handle - Contains the control file name.
*
* Globals: None
*
* Returns: int - 0 if success, non-zero otherwise
****************************** End-Specification *****************************/
FUNCTION int fal_ts_read_control_file (handle)
object_ptr handle;
{
    char        control_file[MAXLEN];
    char        backup_control_file[MAXLEN];
    char        control_file_dir[MAXLEN];
    char        line[MAXLEN];
    char        buffer[MAXLEN];
    int         prefix_size;
    int         line_size;


    /* Create a list of FAL_CONTROL objects on the handle.
     */
    da_handle_create_add_list (&handle, FAL_CONTROL);

    /* Open the control file for reading.  If there are any problems,
     * give an error message.
     */
    da_obj_gets (handle, "FAL_CONTROL_FILE.STRING_ID", control_file, MAXLEN);
    samlog (SAMLOG_VERBOSE, FAL_LOGV_READ_CF, control_file);
    if (open_cur_file (control_file) == NULL)
    {
        err_obj_add_err (handle, FAL_READ_CONTROL_FILE_ERR, fal_fa_name);
        err_obj_add_text (handle, control_file);
        return (OKAY);
    }

    /* Build the name of the backup control file.  This automatically
     * gets created when we use open_cur_file().  We will remove
     * this file after we close the control file.
     */
    com_use_samroot (control_file_dir, FAL_CONTROL_FILE_DIR);
    strcpy (buffer, strrstr (control_file, "/"));
    sprintf (backup_control_file, "%s/#%s", control_file_dir, &buffer[1]);

    /* Read each of the control file entries in the file and store
     * their information on a list of FAL_CONTROL objects on the handle.
     *
     * A comment may preceed the entries.  Store this comment on the
     * handle.
     *
     * Each entry contains the following lines:
     *
     * 1) The label of the entry
     * 2) The parent groups of the entry ("->" separated)
     * 3) The name of the FAL description file the entry is defined in
     * 4) The last modification time for the FAL description file
     *
     * NOTE: copy_line() always returns a string with an ending '\012' on
     *       it.  The string comparisons will fail if these characters are
     *       returned.  It is too risky to fix this bug in copy_line() since
     *       this function is used throughout SAM.  Therefore, all lines
     *       returned from copy_line() are NULL terminated in the correct
     *       place.
     */
    da_obj_set_list_first (handle, FAL_CONTROL);
    line_size = copy_line (line, MAXLEN);
    line[line_size-1] = '\0';
    prefix_size = strlen (FAL_RSB_COMMENT);
    if (strncmp (line, FAL_RSB_COMMENT, prefix_size) == 0)
    {
        /* There is a comment -- save it and continue reading the
         * entries.
         */
        strcpy (buffer, &line[prefix_size]);
        da_handle_create_and_puts (&handle, "FAL_COMMENT.STRING_ID", buffer);
        next_line ();
        line_size = copy_line (line, MAXLEN);
        line[line_size-1] = '\0';
    }
    else
        da_handle_create_and_puts (&handle, "FAL_COMMENT.STRING_ID", "");

    while (strlen (line) > 0)
    {
        /* Read the entry's label
         */
        prefix_size = strlen (FAL_RSB_LABEL);
        if (strncmp (line, FAL_RSB_LABEL, (size_t) prefix_size) != 0)
        {
            /* This line is something other than a label for a
             * control entry.  Therefore, this must not be a
             * control file.  Give an error message and return.
             */
            err_obj_add_err (handle, FAL_READ_CONTROL_FILE_ERR, fal_fa_name);
            err_obj_add_text (handle, control_file);
            (void) close_cur_file (0);
            (void) unlink (backup_control_file);
            return (OKAY);
        }
        strcpy (buffer, &line[prefix_size]);
        da_obj_puts (handle, FAL_CONTROL_LABEL, buffer);
        next_line ();

        /* Read the parent groups for the entry
         */
        line_size = copy_line (line, MAXLEN);
```

```
line[line_size-1] = '\0';
prefix_size = strlen (FAL_RSB_PARENTS);
if (strncmp (line, FAL_RSB_PARENTS, (size_t) prefix_size) != 0)
{
    /* This line is something other than the parents for a
     * control entry.  Therefore, this must not be a
     * control file.  Give an error message and return.
     */
    err_obj_add_err (handle, FAL_READ_CONTROL_FILE_ERR, fal_fa_name);
    err_obj_add_text (handle, control_file);
    (void) close_cur_file (0);
    (void) unlink (backup_control_file);
    return (OKAY);
}
strcpy (buffer, &line[prefix_size]);
da_obj_puts (handle, FAL_CONTROL_PARENTS, buffer);
next_line ();

/* Read the name of the FAL description file for the entry
 */
line_size = copy_line (line, MAXLEN);
line[line_size-1] = '\0';
prefix_size = strlen (FAL_RSB_FILE);
if (strncmp (line, FAL_RSB_FILE, (size_t) prefix_size) != 0)
{
    /* This line is something other than the FAL description file
     * for a control entry.  Therefore, this must not be a
     * control file.  Give an error message and return.
     */
    err_obj_add_err (handle, FAL_READ_CONTROL_FILE_ERR, fal_fa_name);
    err_obj_add_text (handle, control_file);
    (void) close_cur_file (0);
    (void) unlink (backup_control_file);
    return (OKAY);
}
strcpy (buffer, &line[prefix_size]);
da_obj_puts (handle, FAL_CONTROL_DESC_FILE, buffer);
next_line ();

/* Read the modification time for the entry's FAL description
 * file.
 */
line_size = copy_line (line, MAXLEN);
line[line_size-1] = '\0';
prefix_size = strlen (FAL_RSB_TIME);
if (strncmp (line, FAL_RSB_TIME, (size_t) prefix_size) != 0)
{
    /* This line is something other than the modification time
     * for a control entry.  Therefore, this must not be a
     * control file.  Give an error message and return.
     */
    err_obj_add_err (handle, FAL_READ_CONTROL_FILE_ERR, fal_fa_name);
    err_obj_add_text (handle, control_file);
    (void) close_cur_file (0);
    (void) unlink (backup_control_file);
    return (OKAY);
}
strcpy (buffer, &line[prefix_size]);
da_obj_puts (handle, FAL_CONTROL_MODTIME, buffer);
next_line ();

/* Advance to the next FAL_CONTROL object.  Copy the next
 * line, which should be the label to the next object or
 * NULL if there are no more objects.
 */
da_obj_set_list_next (handle, FAL_CONTROL);
        line_size = copy_line (line, MAXLEN);
        line[line_size-1] = '\0';
    }

    /* Close the file and return.
     */
    if (close_cur_file (1) != 0)
    {
        err_obj_add_err(handle, FAL_READ_CONTROL_FILE_ERR, fal_fa_name);
        err_obj_add_text (handle, control_file);
    }
    (void) unlink (backup_control_file);
    return (OKAY);
}   /* fal_read_control_file */
```

```
/* @(#) $Header: fal_ts_remove.c,v 72.11 94/12/30 15:08:06 hmgr Exp $   */

/*****************/
/* Include files */
/*****************/
#include "common/fedit/nc_defs.h"
#include "sam.h"
#include "da_yoda.h"
#include "fal_defs.h"
#include "fal_errmsg.h"
#include "fal_errors.h"

/********************/
/* External defines */
/********************/
extern long     fal_search_for_line();
extern char     *fal_fa_name;


/**************************** Begin-Specification ****************************
 *
 * Module: fal_ts_remove_cu
 *
 * Author: Tammy Heiserman
 *
 * Description: This task routine removes a custom utility from SAM.
 *              It removes the entry in FAL_CUSTOM_FILE.  Note that
 *              the executable is not removed from the system.
 *
 *              If the bottom-most parent group of the item being removed
 *              is not a custom group, then this routine will check if
 *              the group will contain any custom items once the one item has
 *              been removed.  If not, it will remove the parent group from
 *              FAL_CUSTOM_FILE.  Note that this does not remove the parent
 *              group from SAM since it is not a custom group.  This routine
 *              then makes sure the next parent contains at least one custom
 *              item in it (and so on...).  If the parent group is a custom
 *              group, then the user must explicitly remove it or it will
 *              remain in the SAM menu as an empty group.
 *
 *              This routine uses the common library file editing routines
 *              to search and write to FAL_CUSTOM_FILE.  See the common
 *              library for more information on open_cur_file(),
 *              close_cur_file(), search_forward(), goto_char(), insert_line(),
 *              and next_line().  Note that these routines manage the pointer
 *              into the currently opened file.  These routines also always
 *              create a backup copy of FAL_CUSTOM_FILE.  This backup copy
 *              is removed when FAL_CUSTOM_FILE is closed.
 *
 *              NOTE:  This task routine depends on SAM being the only
 *                     editor of FAL_CUSTOM_FILE.  Valid syntaxes for
 *                     FAL description files in general will *NOT* work
 *                     in FAL_CUSTOM_FILE.  If at any time, SAM cannot
 *                     read this file, an error message is generated.
 *                     This routine could be made more robust by using
 *                     lex & yacc to parse the contents of the file instead
 *                     of assuming the file will have the correct syntax.
 *
 * Parameters: handle - Contains the information on the custom utility to
 *                      be added.  The following fields are placed on the
 *                      handle:
 *
 *                      FAL_CU
 *                       object contains information on custom utility or group
 *                       being removed
 *
 *                      List of strings
 *                       each string represents a parent group
 *
 *                      FAL_NN_IS_PARENT_CUSTOM string
 *                       contains "1" if the bottom-most parent group is a
 *                       custom group.  Otherwise, contains "0".
 *
 *
 * Globals: None
 *
 * Returns: int - 0 if success, non-zero otherwise
 ***************************** End-Specification *****************************/
FUNCTION int fal_ts_remove_cu (handle)
object_ptr handle;
{
    int         size;
    int         rc;
    int         i;
    int         num_parents = 0;
    int         num_lines_delete;
    boolean     delete_parent_group = TRUE;
    long        found_parent;
    long        prev_parent_end = 0;
    char        fal_custom_file[MAXLEN];
    char        fal_custom_file_backup[MAXLEN];
    char        label[MAXLEN];
    char        help[MAXLEN];
    char        icon[MAXLEN];
    char        execute_as[MAXLEN];
    char        line[MAXLEN];
    char        buffer[MIDLEN];


    com_use_samroot (fal_custom_file, FAL_CUSTOM_FILE);
    com_use_samroot (fal_custom_file_backup, FAL_CUSTOM_FILE_BACKUP);

    /* Open the file for editing.  If we can't open it, then we can't
     * remove any entries.
     */
    samlog (SAMLOG_DETAIL, FAL_LOGD_EDIT_FILE, fal_custom_file);
    if (open_cur_file (fal_custom_file) == NULL)
    {
        err_obj_add_err (handle, FAL_RM_OPEN_CUSTOM_SAM_CU_ERR, fal_fa_name);
        err_obj_add_text (handle, fal_custom_file);
        (void) unlink (fal_custom_file_backup);
        return (1);
    }

    /* Determine if we are removing an item from SAM's top level.  If
     * so, we can search for the item directly.  Otherwise, we need
     * to search for all parent groups first.
     */
    da_obj_list_size (handle, STRING_DATA, &size);
    if (size != 0)
    {
        /* This utility or group exists in a lower level of SAM's hierarchy.
         * Search the existing entries in FAL_CUSTOM_FILE until all parent
         * groups have been found.
         */
        for (rc = da_obj_set_list_first(handle, STRING_DATA);
             rc == OKAY;
             rc = da_obj_set_list_next (handle, STRING_DATA))
        {
            da_obj_gets (handle, STRING_DATA, label, MAXLEN);
            sprintf (line, "label \"%s\"", label);
            found_parent = fal_search_for_line (num_parents, line);
```

```
        if (found_parent < 0)
        {
            /* Couldn't find this parent in FAL_CUSTOM_FILE.  This
             * means we can't remove the item because it should
             * belong somewhere under this parent.  No need to give
             * another error message if there are problems closing
             * the file.  Note that this error message should be
             * extremely rare.
             */
            (void) close_cur_file (0);
            err_obj_add_err (handle, FAL_RM_CANT_FIND_PARENT_ERR, fal_fa_name);
            err_obj_add_text (handle, fal_custom_file);
            err_obj_add_text (handle, label);
            (void) unlink (fal_custom_file_backup);
            return (1);
        }

        /* If we get to here, then we have found the parent group.
         * We need to verify that this label appears in the previous
         * parent's group (if there was a previous parent).
         */
        if ((prev_parent_end > 0) && (found_parent > prev_parent_end))
        {
            /* There is another group somewhere in the menu hierarchy
             * with this label.  Hence, we couldn't find this parent
             * after all.  Give an error message and return.
             */
            (void) close_cur_file (0);
            err_obj_add_err (handle, FAL_RM_CANT_FIND_PARENT_ERR, fal_fa_name);
            err_obj_add_text (handle, fal_custom_file);
            err_obj_add_text (handle, label);
            (void) unlink (fal_custom_file_backup);
            return (1);
        }

        /* Now find the end to this parent's group.  We will want
         * to make sure the next parent entry is found somewhere
         * within this parent group.
         */
        strcpy (line, "}");
        prev_parent_end = fal_search_for_line (num_parents, line);
        if (prev_parent_end <= 0)
        {
            /* There is an error in the file.
             */
            (void) close_cur_file (0);
            err_obj_add_err (handle, FAL_RM_CANT_FIND_PARENT_ERR, fal_fa_name);
            err_obj_add_text (handle, fal_custom_file);
            err_obj_add_text (handle, label);
            (void) unlink (fal_custom_file_backup);
            return (1);
        }
        goto_char (found_parent);
        num_parents++;
    }
}

/* If we got to here, then all parent groups have been found in
 * FAL_CUSTOM_FILE.  Determine if the item we are deleting is
 * in the file.
 */
da_obj_gets (handle, FAL_CU_LABEL, label, MAXLEN);
sprintf (line, "label \"%s\"", label);
found_parent = fal_search_for_line (num_parents, line);
if (found_parent < 0)
{
    (void) close_cur_file (0);
    err_obj_add_err (handle, FAL_RM_CUSTOM_SAM_CU_ERR, fal_fa_name);
    err_obj_add_text (handle, fal_custom_file);
    err_obj_add_text (handle, label);
    (void) unlink (fal_custom_file_backup);
    return (1);
}

/* Finally, we are ready to begin deleting the item.  The number
 * of lines we need to delete depends on whether the item is a
 * utility or group.
 */
da_obj_geti (handle, FAL_CU_HASSUBMENUS, &i);
if (i == TRUE)
{
    da_obj_gets (handle, FAL_CU_HELP, help, MAXLEN);
    if (strlen (help) > 0)
        /* Delete initial blank, label, open bracket, close bracket
         * + icon path & help lines
         */
        num_lines_delete = 5;
    else
        /* Delete initial blank, label, open bracket, & close bracket
         * + optional icon path lines
         */
        num_lines_delete = 4;
}
else
{
    da_obj_gets (handle, FAL_CU_HELP, help, MAXLEN);
    da_obj_gets (handle, FAL_CU_EXEC_AS, execute_as, MAXLEN);
    da_obj_gets (handle, FAL_CU_ICON, icon, MAXLEN);

    /* Delete initial blank, label and command lines
     */
    num_lines_delete = 3;

    /* Delete help line (if exists)
     */
    if (strlen (help) > 0)
        num_lines_delete++;

    /* Delete execute_as line (if exists)
     */
    if (strlen (execute_as) > 0)
        num_lines_delete++;

    /* Delete icon line (if exists)
     */
    if (strlen (icon) > 0)
        num_lines_delete++;
}

prev_line();
for (i=1; i<=num_lines_delete; i++)
    (void) delete_line();

/* Determine how many  previous parents need to be removed.  The previous
 * parent needs to be removed if it is *NOT* a custom group and it contains
 * no more custom groups or utilities.  Empty custom groups must be removed
 * by the user.  The frontend passes us whether or not the bottom-most
 * parent group is a custom group.
 */
sprintf (buffer, "%s.%s", FAL_NN_IS_PARENT_CUSTOM, STRING_DATA);
da_obj_geti (handle, buffer, &i);
if (i == 0)
```

```
    {
        /* The bottom-most parent group is not a custom group.  Remove it
         * and any of its parent groups that are empty.  If the parent
         * group is empty, then the current pointer will be on the close
         * bracket and the previous line will contain the open bracket.
         * Get the contents of the current line and compare it with
         * what the close bracket line should look like.
         */
        while (delete_parent_group == TRUE)
        {
            copy_line (line, MAXLEN);
            num_parents--;
            strcpy (label, "");
            for (i=1; i<=num_parents; i++)
                strcat (label, "  ");
            strcat (label, ")");
            if (strncmp (line, label, strlen(label)) == 0)
            {
                /* The current line is the close bracket.  Check if the
                 * previous line is the open bracket.
                 */
                prev_line();
                copy_line (line, MAXLEN);
                strcpy (label, "");
                for (i=1; i<=num_parents; i++)
                    strcat (label, "  ");
                strcat (label, "(");
                if (strncmp (line, label, strlen(label)) == 0)
                {
                    /* This parent group needs to be removed.  Back up
                     * the current pointer to the blank line and remove 4
                     * lines (initial blank, label, open bracket & close
                     * bracket).
                     */
                    prev_line();   /* label */
                    prev_line();   /* initial blank line */
                    delete_line(); /* initial blank line */
                    delete_line(); /* label */
                    delete_line(); /* open bracket */
                    delete_line(); /* close bracket/optional help */
                }
                else
                    delete_parent_group = FALSE;
            }
            else
                delete_parent_group = FALSE;
        }
    }


    /* Close the file and return.
     */
    if (close_cur_file (1) != 0)
    {
        err_obj_add_err (handle, FAL_RM_CUSTOM_SAM_CU_ERR, fal_fa_name);
        err_obj_add_text (handle, fal_custom_file);
        err_obj_add_text (handle, label);
        (void) unlink (fal_custom_file_backup);
        return (1);
    }
    (void) unlink (fal_custom_file_backup);
    return (OKAY);
}   /* fal_ts_remove_cu */
```

APPENDIX IV

```
/* @(#) $Header: fal_ts_save_rest_file.c,v 72.12 94/07/08 16:07:20 hmgr Exp $   */

/*****************/
/* Include files */
/*****************/
#include <sys/stat.h>
#include <pwd.h>
#include <grp.h>
#include <unistd.h>
#include "common/fedit/nc_defs.h"
#include "sam.h"
#include "da_yoda.h"
#include "fal_defs.h"
#include "fal_errmsg.h"
#include "fal_errors.h"

/**********************/
/* External variables */
/**********************/
extern int      errno;
extern char     *fal_fa_name;

/**************************** Begin-Specification *****************************
 *
 * Module: fal_ts_save_control_file
 *
 * Author: Tammy Heiserman
 *
 * Description: This task routine saves the information on the handle to the
 *              control file specified on the handle.
 *
 * Parameters: handle - Contains:
 *                      1) list of FAL_CONTROL objects
 *                      2) FAL_CONTROL_FILE string object which is the name
 *                         of the control file
 *                      3) FAL_COMMENT string object which contains the user
 *                         comment, if any
 *
 * Globals: None
 *
 * Returns: int - 0 if success,
 *                1 if failed to save control file,
 *                2 if failed to remove control file
 ****************************** End-Specification *****************************/
FUNCTION int fal_ts_save_control_file (handle)
object_ptr handle;
{
    char                control_file[MAXLEN];
    char                backup_control_file[MAXLEN];
    char                control_file_dir[MAXLEN];
    char                line[MAXLEN];
    char                buffer[MAXLEN];
    struct stat         sbuf;
    FILE                *fd;
    int                 save_errno;
    int                 rc;
    int                 size;
    uid_t               root_uid;
    gid_t               other_gid;
    struct passwd       *passwd;
    struct group        *group;


    /* Save the uid for "root" and the gid for "other" for use later.
     * If we can't retrieve these values, then use a root_uid = 0 and
     * other_gid = 1 later on.  We use these to ensure the control files
     * and the control file directory have the correct ownerships.
     */
    if ((passwd = getpwnam ("root"))  != (struct passwd *) NULL)
        root_uid = passwd->pw_uid;
    else
        root_uid = 0;

    if ((group  = getgrnam ("other")) != (struct group *)  NULL)
        other_gid = group->gr_gid;
    else
        other_gid = 1;


    /* First make sure FAL_CONTROL_FILE_DIR exists.  If not, create it.
     * Make sure it is created with owner root, group other, and
     * permissions 0400 for security reasons.
     */
    com_use_samroot (control_file_dir, FAL_CONTROL_FILE_DIR);
    if (stat (control_file_dir, &sbuf) != 0)
    {
        if (mkdir (control_file_dir, 0400) != 0)
        {
            save_errno = errno;
            err_obj_add_err (handle, FAL_CONTROL_FILE_DIR_ERR, fal_fa_name);
            err_obj_add_text (handle, control_file_dir);
            errno = save_errno;
            err_obj_add_text (handle, err_explain_errno (errno));
            return (1);
        }

        (void) chown (control_file_dir, root_uid, other_gid);
        samlog (SAMLOG_DETAIL, FAL_LOGD_CREATE_DIR, control_file_dir);
    }
    else
    {
        /* Ensure the control file directory has restrictive permissions.
         * If not, give an error message & exit.
         */
        samlog (SAMLOG_VERBOSE, FAL_LOGV_CHECK_DIR, control_file_dir);
        if ((sbuf.st_uid != root_uid) || (S_ISDIR (sbuf.st_mode) == 0) ||
            (sbuf.st_mode & S_IRWXG) || (sbuf.st_mode & S_IRWXO))
        {
            err_obj_add_err (handle, FAL_CF_DIR_PERM_ERR, fal_fa_name);
            err_obj_add_text (handle, control_file_dir);
            return (1);
        }
    }

    /* Determine if there are any entries to be written to the file.  If
     * not, remove the file.
     */
    da_obj_gets (handle, "FAL_CONTROL_FILE.STRING_ID", buffer, MAXLEN);
    sprintf (control_file, "%s/%s", control_file_dir, buffer);
    da_obj_list_size (handle, FAL_CONTROL, &size);
    if (size == 0)
    {
        /* We can remove this file.
         */
        samlog (SAMLOG_DETAIL, FAL_LOGD_RM_CF, control_file);
        if (unlink (control_file) != 0)
        {
            save_errno = errno;
            err_obj_add_err (handle, FAL_RM_CONTROL_FILE_ERR, fal_fa_name);
            err_obj_add_text (handle, control_file);
            errno = save_errno;
```

```
        err_obj_add_text (handle, err_explain_errno (errno));
        return (2);
    }
    return (OKAY);
}

/* Create the name of the backup control file.  This will need
 * to be removed when we are done editing.  The file editing
 * routines in the common library save a backup and there's no
 * way to disable it, so we will remove it.
 */
sprintf (backup_control_file, "%s/#%s", control_file_dir, buffer);

/* Open the control file for writing.  This will automatically truncate
 * the file to zero if it already exists.  We then immediately close the
 * file.  The file editing routines require that the file exist.
 */
samlog (SAMLOG_DETAIL, FAL_LOGD_EDIT_FILE, control_file);
if ((fd = fopen (control_file, "w")) == NULL)
{
    save_errno = errno;
    err_obj_add_err (handle, FAL_OPEN_CONTROL_FILE_ERR, fal_fa_name);
    err_obj_add_text (handle, control_file);
    errno = save_errno;
    err_obj_add_text (handle, err_explain_errno (errno));
    return (1);
}
fclose (fd);

/* Change permissions & ownership on the file before it is opened for
 * editing.  That way if any errors are encountered and this routine
 * exits, we know the file was created with secure permissions.
 * We have already guaranteed the file exists, so errors shouldn't
 * occur.
 */
samlog (SAMLOG_DETAIL, FAL_LOGD_CHANGE_PERM, control_file);
(void) chmod (control_file, 0400);
(void) chown (control_file, root_uid, other_gid);

/* Open the file for real using the file editing routines.  An
 * error here should never happen.
 */
if (open_cur_file (control_file) == NULL)
{
    err_obj_add_err (handle, FAL_SAVE_CONTROL_FILE_ERR, fal_fa_name);
    err_obj_add_text (handle, control_file);
    return (1);
}

/* If the user specified a comment, write it to the file.
 */
da_obj_gets (handle, "FAL_COMMENT.STRING_ID", buffer, MAXLEN);
if (strlen (buffer) > 0)
{
    sprintf (line, "%s%s", FAL_RSB_COMMENT, buffer);
    insert_line (line);
    next_line ();
}

/* Walk through the list of control entries on the handle.
 * Write the information for each one.  The lines that are written
 * are:
 *
 * 1) The label of the entry
 * 2) The parent groups of the entry ("->" separated)
 * 3) The name of the FAL description file the entry is defined in
 * 4) The last modification time for the FAL description file
 */
for (rc = da_obj_set_list_first (handle, FAL_CONTROL);
     rc == OKAY;
     rc = da_obj_set_list_next (handle, FAL_CONTROL))
{
    /* Write the label of the entry
     */
    da_obj_gets (handle, FAL_CONTROL_LABEL, buffer, MAXLEN);
    sprintf (line, "%s%s", FAL_RSB_LABEL, buffer);
    insert_line (line);
    next_line ();

    /* Write the parent groups for the entry
     */
    da_obj_gets (handle, FAL_CONTROL_PARENTS, buffer, MAXLEN);
    sprintf (line, "%s%s", FAL_RSB_PARENTS, buffer);
    insert_line (line);
    next_line ();

    /* Write the name of the FAL description file for the entry
     */
    da_obj_gets (handle, FAL_CONTROL_DESC_FILE, buffer, MAXLEN);
    sprintf (line, "%s%s", FAL_RSB_FILE, buffer);
    insert_line (line);
    next_line ();

    /* Get the modification time for the FAL description file and
     * write it to the control file.
     */
    if (stat (buffer, &sbuf) != 0)
    {
        err_obj_add_err (handle, FAL_SAVE_CONTROL_FILE_ERR, fal_fa_name);
        err_obj_add_text (handle, control_file);
        (void) close_cur_file (0);
        return (1);
    }

    sprintf (line , "%s%d", FAL_RSB_TIME, sbuf.st_mtime);
    insert_line (line);
    next_line ();
}

/* Close the file and return.
 */
if (close_cur_file (1) != 0)
{
    err_obj_add_err(handle, FAL_SAVE_CONTROL_FILE_ERR, fal_fa_name);
    err_obj_add_text (handle, control_file);
    (void) unlink (backup_control_file);
    return (1);
}

/* Remove the backup control file & exit.
 */
(void) unlink (backup_control_file);
return (OKAY);
}   /* fal_save_control_file */
```

```
/* @(#) $Header: fal_ts_validate_file.c,v 72.6 95/01/09 09:51:37 hmgr Exp $     */

/******************/
/* include files */
/******************/
#include <sys/types.h>
#include <sys/stat.h>
#include <errno.h>
#include "sam.h"
#include "da_yoda.h"
#include "fal_defs.h"
#include "fal_errors.h"


/*********************/
/* External defines */
/*********************/
extern int      errno;
extern char     *fal_fa_name;


/**************************** Begin-Specification *****************************
 *
 * Module: fal_ts_validate_file
 *
 * Author: Tammy Heiserman
 *
 * Description: This task routine validates a given file by ensuring it exists
 *              on the system.
 *
 * Parameters: handle - The handle contains the file to validate
 *
 * Globals: None
 *
 * Returns: This routine always returns an error code.  The following
 *          error codes may be returned:
 *
 *          FAL_FILE_REGULAR_ERR        The file is a regular file
 *          FAL_FILE_DIR_ERR            The file is a directory
 *          FAL_FILE_SPECIAL_ERR        The file is a special file
 *          FAL_USERFILE_NEXIST_ERR     The file does not exist on system
 *          FAL_FILENAME_ERR            This should never happen!
 *
****************************** End-Specification ******************************/
FUNCTION int fal_ts_validate_file(handle)
object_ptr      handle;
{
    char        filename[MAXLEN];
    char        buffer[MAXLEN];
    struct stat buf;


    /* Ensure the file we are validating is in the correct form.  If
     * we are debugging and the file begins with "/usr/sam", it should
     * be mapped to SAMROOT.
     */
    da_obj_gets (handle, STRING_DATA, buffer, MAXLEN);
    com_use_samroot (filename, buffer);

    if (stat (filename, &buf) != 0)
        switch (errno)
        {
            case ENOENT:
                err_obj_add_err (handle, FAL_USERFILE_NEXIST_ERR, fal_fa_name);
                err_obj_add_text (handle, filename);
                return (FAL_USERFILE_NEXIST_ERR);
                /* NOTREACHED */
                break;
            default:
                err_obj_add_err (handle, FAL_FILENAME_ERR, fal_fa_name);
                err_obj_add_text (handle, filename);
                return (FAL_FILENAME_ERR);
                /* NOTREACHED */
                break;
        }

    /* Determine what type of file this is
     */
    if (S_ISDIR(buf.st_mode))
    {
        err_obj_add_err (handle, FAL_FILE_DIR_ERR, fal_fa_name);
        err_obj_add_text (handle, filename);
        return (FAL_FILE_DIR_ERR);
    }
    else if (S_ISREG (buf.st_mode))
    {
        err_obj_add_err (handle, FAL_FILE_REGULAR_ERR, fal_fa_name);
        err_obj_add_text (handle, filename);
        return (FAL_FILE_REGULAR_ERR);
    }

    /* If we got to here, this is a special file.
     */
    err_obj_add_err (handle, FAL_FILE_SPECIAL_ERR, fal_fa_name);
    err_obj_add_text (handle, filename);
    return (FAL_FILE_SPECIAL_ERR);
}   /* fal_ts_validate_file */
```

```
# @(#) $Header: makefile,v 72.12 95/01/09 09:51:52 hmgr Exp $

FAROOT=..

include $(FAROOT)/defs.mk

OBJS1=  $(OBJDIR)/fal_ts_add.o \
        $(OBJDIR)/fal_ts_modify.o \
        $(OBJDIR)/fal_ts_save_rest_file.o \
        $(OBJDIR)/fal_ts_read_file.o \
        $(OBJDIR)/fal_ts_get_modtime.o \
        $(OBJDIR)/fal_ts_get_pusers.o \
        $(OBJDIR)/fal_ts_remove.o \
        $(OBJDIR)/fal_ts_validate_file.o \
        $(OBJDIR)/fal_ts_is_mul_sams.o

DEPENDS1= $(FAROOT)/h/fal_defs.h \
          $(FAROOT)/h/fal_errmsg.h \
          $(FAROOT)/h/fal_errors.h

FAFLAGS1= $(PIC)

TASKS=  $(OBJS1)

ALL= $(TASKS) $(OBJDIR)/fal_tasks.o

include $(SAM)/make/rules.mk

$(OBJDIR)/fal_tasks.o: $(TASKS)
        $(LD) -r $(TASKS) -o $@
```

```
/* $Header: cbox.c,v 72.27 94/12/30 12:00:16 hmgr Exp $ */

/*****************
 * Include files *
 *****************/
#include <stdio.h>
#include <unistd.h>
#include <stdlib.h>
#include <string.h>
#include <sys/wait.h>
#include <errno.h>
#include <sys/stat.h>
#include <dirent.h>
#include "sam.h"
#include "fal_defs.h"
#include "fal_errmsg.h"
#include "cbox_actions.h"
#include "arch_util.h"
#include "dyn_array.h"

/***********
 * Defines *
 ***********/
#define VAR_BEGIN       '$'
#define VAR_BEGIN2      '('
#define VAR_END         ')'
#define WHITE_SPACE     " \t\n"
#define SHELL_ARGO      "sh"


/*****************************
 * Local variables/routines *
 *****************************/
char        *fal_strdup();
void        fal_set_command();
static int fal_init();

/* The following routines are named "cbox" for historical reasons.  It
 * refers to SAM 9.0's control box.  These names cannot be changed unless
 * the name of this file is changed.  They are used in cbox.tab.c, which
 * code generated by lex & yacc.
 */
void    cbox_do_action();
void    cbox_report();
void    cbox_error();

fal_area_tree_ptr fal_areas = NULL;
static fal_area_tree_ptr fal_curr_parent = NULL;
static fal_area_tree_ptr fal_curr_menuitem = NULL;

static int  file_type = CB_TYPE;
static char source[MIDLEN];
static char *fal_desc_file;
FILE        *fal_desc_fd;
int         fal_rule_report = 0;


/********************************
 * External variables/routines *
 ********************************/
extern int   fal_lex_line;
extern char  scan_str[];

extern void  fal_lex_line_reset();

/* These are used in cbox.tab.c, which is generated using lex & yacc.
 * These names cannot be changed without changing the name of this
 * file and makefiles.
 */
extern int      cbox_parse();
extern unsigned char cbox_text[];


/**************************** Begin-Specification ****************************
 *
 * Module: fal_read_files
 *
 * Author: Tammy Heiserman
 *
 * Description: This routine reads the FAL description files to build the
 *              fal_areas data structure.  All *cb, *ou & sam_custom.cu
 *              files are read.  If an error is encountered in any one of
 *              these files, an error message is generated and the rest
 *              of the file is ignored.  However, SAM will continue reading
 *              the other files.
 *
 * Parameters:
 *
 * Globals: fal_areas           data structure for all groups/utilities
 *                              listed in FAL
 *          fal_curr_parent     keeps track of the current parent
 *
 * Returns: int - always returns OKAY
 ****************************** End-Specification ****************************/
FUNCTION int fal_read_files()
{
    int         rc = 0;
    char        fal_data_file[MIDLEN];
    struct stat buf;
    dynap       dir_list;
    int         i, j,  num_entries;
    char        dirname[MAXLEN];
    char        filename[MAXLEN];
    char        lang_env_var[MAXLEN];
    struct dirent **namelist;
    struct dirent **list;
    int select_fn_cb();
    int select_fn_ou();

    if (fal_areas == NULL)
        /* set up root node of menus
         */
        fal_areas = fal_new_menuitem ((fal_area_tree_ptr) NULL);
    fal_curr_parent = fal_areas;

    file_type = CB_TYPE;
    com_use_samroot (fal_data_file, DATA_FILE);
    rc = fal_init (fal_data_file);
    if (rc)
    {
        ui_msg_err (FAL_ERR_PARSE_FAIL, fal_data_file, fal_lex_line, cbox_text);
        samlog (SAMLOG_ERROR, FAL_ERR_PARSE_FAIL, fal_data_file, fal_lex_line,
                cbox_text);
        fal_curr_parent = fal_areas;
    }

    /* Get the value of LANG environment variable. If it is not set assume
     * it to be C
     */
    strcpy (lang_env_var, getenv ("LANG"));
    if (strlen (lang_env_var) == 0)
        strcpy (lang_env_var,"C");
```

```
    /* Get the list of directories which containb *.ou and *.cb files
    */
    dir_list = arch_get_dirs();
    for ( i = 0; i < dyna_size (dir_list) ; ++i )
    {
        strcpy (dirname, (char *) dyna_get ( dir_list, i));
        if (strcmp (&dirname[strlen(dirname)-1], "/") != 0)
            strcat(dirname, "/");
        strcat(dirname, lang_env_var);
        strcat(dirname, "/");

        /* Read all *.cb files in this directory
         */
        samlog (SAMLOG_VERBOSE, FAL_LOGV_LOOK_CBFILES, dirname);
        num_entries = scandir(dirname, &namelist, select_fn_cb, NULL);
        if (num_entries > 0)
        {
            for ( j = 0, list=namelist ; j < num_entries ; j++ )
            {
                strcpy(filename, dirname);
                strcat (filename, (*list)->d_name ) ;
                free(*list);
                list++;

                if (strcmp(filename, fal_data_file) !=  0)
                {
                    rc = fal_init(filename);
                    if (rc)
                    {
                        ui_msg_err (FAL_ERR_PARSE_FAIL, filename,
                            fal_lex_line, cbox_text);
                        samlog (SAMLOG_ERROR, FAL_ERR_PARSE_FAIL,
                            filename, fal_lex_line, cbox_text);
                        fal_curr_parent = fal_areas;
                    } /* if */
                } /* if */
            } /* for */
            free(namelist);
        }

        /* Now read all *.ou files in this directory.
         */
        file_type = OU_TYPE;
        samlog (SAMLOG_VERBOSE, FAL_LOGV_LOOK_OUFILES, dirname);
        num_entries = scandir(dirname, &namelist, select_fn_ou, NULL);
        if (num_entries > 0)
        {
            for ( j = 0, list=namelist ; j < num_entries ; j++ )
            {
                strcpy(filename, dirname);
                strcat (filename, (*list)->d_name ) ;
                free(*list);
                list++;

                rc = fal_init(filename);
                if (rc)
                {
                    ui_msg_err (FAL_ERR_PARSE_FAIL, filename,
                    fal_lex_line, cbox_text);
                    samlog (SAMLOG_ERROR, FAL_ERR_PARSE_FAIL,
                        filename, fal_lex_line, cbox_text);
                    fal_curr_parent = fal_areas;
                } /* if */
            } /* for */
            free(namelist);
        }
    } /* for */

    /* Read the custom utilities (FAL_CUSTOM_FILE)
     */
    file_type = CU_TYPE;
    com_use_samroot (fal_data_file, FAL_CUSTOM_FILE);

    /* stat the file to make sure it exists.  If it doesn't, then
     * don't even try to read it.
     */
    if ((stat (fal_data_file, &buf) == 0) && (buf.st_size > 1))
    {
        rc = fal_init (fal_data_file);
        if (rc)
        {
            ui_msg_err (FAL_ERR_PARSE_FAIL, fal_data_file, fal_lex_line,
                        cbox_text);
            fal_curr_parent = fal_areas;
        }
    }

    dyna_destroy (dir_list);
    return (OKAY);
} /* fal_read_files */

/*************************** Begin-Specification *****************************
*
* Module: select_fn_cb
*
* Author: Anand Gupta
*
* Description: This function  takes a pointer of type struct dirent*
* and returns 1 if the filename associated with that directory entry
* (d_name field) ends with .cb, otherwise it returns 0. This function
* is passed as an argument to scandir.
*
* Parameters: struct dirent *
*
* Globals:  None.
*
* Returns: int : 1 or 0.
*****************************************************************************/

static int select_fn_cb(direntry)
struct dirent *direntry;
{
    char *str = strrstr(direntry->d_name, ".cb");

    if (str == NULL )
        return 0;
    else if (strlen(str) == strlen(".cb"))
        return 1;
    return 0;
}
/**************************** Begin-Specification *****************************
*
* Module: select_fn_ou
*
* Author: Anand Gupta
*
* Description: This function  takes a pointer of type struct dirent*
* and returns 1 if the filename associated with that directory entry
* (d_name field) ends with .ou, otherwise it returns 0. This function
* is passed as an argument to scandir.
*
```

```
 * Parameters: struct dirent *
 *
 * Globals:  None.
 *
 * Returns: int : 1 or 0.
 ********************************************************************************/

static int select_fn_ou(direntry)
struct dirent *direntry;
{
   char *str = strrstr(direntry->d_name, ".ou");

    if (str == NULL )
        return 0;
    else if (strlen(str) == strlen(".ou"))
        return 1;
    return 0;
}

/***************************** Begin-Specification *****************************
 *
 * Module: cbox_do_action
 *
 * Author: Tammy Heiserman
 *
 * Description: This routine loads the data structures by receiving tokens from
 *              the parser and storing them in the appropriate place.
 *
 * Parameters: fal_action - The type of token detected by the parser
 *
 * Globals:
 *         fal_curr_parent - the current parent menuitem we're adding to.
 *         fal_curr_menuitem - the current menuitem we're changing.
 *
 * Returns: void - None
 ****************************** End-Specification *****************************/
FUNCTION void cbox_do_action(fal_action)
int             fal_action;
{
  int           found;
  fal_area_tree_ptr ap;

  switch (fal_action)
  {
   case SOURCE:
     /* Set the source variable -- this gets added to the data structure
      * for all new items.  Ignore any source specifications in CB_TYPE
      * and CU_TYPE files.
      */
     if (file_type == OU_TYPE)
     {
         source[0] = '\0';
         strncat(source, scan_str, MIDLEN);
     }
     break;

   case LABEL:
     /* All labels must be unique -- only submenu labels can
      * be duplicated.  Therefore, allocate space for the new
      * menu item.  curr_alist should be set already at the
      * appropriate level.
      */
     ap = fal_new_menuitem(fal_curr_parent);
     ap->data.source = fal_strdup(source);
     ap->data.label = fal_strdup(scan_str);
     ap->data.filename = fal_strdup(fal_desc_file);
     ap->data.type = file_type;
     fal_curr_menuitem = ap;
     break;

   case ALLOW:
     /* Force the command to begin with "/" for FAL description files.
      * All *.ou & *.cb files should be tested in the SAM environment before
      * delivery.  The sam_custom.cu file will never contain a relative
      * path for a command.
      */
     if (scan_str[0] != '/')
     {
         ui_msg_err (FAL_ERR_CMD_NOT_GROUNDED, scan_str, fal_desc_file);
         samlog (SAMLOG_ERROR, FAL_ERR_CMD_NOT_GROUNDED, scan_str,
                 fal_desc_file);
         fclose(fal_desc_fd);
         ui_exit (1);
     }
     fal_curr_menuitem->data.allow_cmd = fal_strdup(scan_str);
     break;

   case EXECUTE_AS:
     /* This is the name of the user to execute this command as.  The
      * FAL code knows what to do with this parameter.
      */
     fal_curr_menuitem->data.execute_as = fal_strdup(scan_str);
     break;

   case ICON_PATH:
     /* This is the icon to be displayed for this object.  It can either
      * be a full path, or a file name.  If it is just a file name, the
      * icon should exist in the icon_search_path as specified in the
      * description file.
      */
     fal_curr_menuitem->data.icon_path = fal_strdup(scan_str);
     break;

   case ACCESS_TRUE:
     /* The command can be enabled in the Restricted SAM Builder.  Set
      * its promote_access flag to TRUE.
      */
     fal_curr_menuitem->data.promote_access = 1;
     break;

   case ACCESS_FALSE:
     /* The command cannot be enabled in the Restricted SAM Builder.  Set
      * its promote_access flag to FALSE.
      */
     fal_curr_menuitem->data.promote_access = 0;
     break;

   case PAUSE_TRUE:
     /* When the command ends, pause before returning to SAM.
      */
     fal_curr_menuitem->data.terminal_pause = 1;
     break;

   case PAUSE_FALSE:
     /* When the command ends, return to SAM immediately.
      */
     fal_curr_menuitem->data.terminal_pause = 0;
     break;

   case COMMAND:
     fal_set_command(scan_str, fal_curr_menuitem);
     fal_curr_menuitem->data.hpterm = 1;
```

```
      fal_curr_menuitem->data.gui_only = 0;
      break;

    case COMMAND_GUI:
      fal_set_command(scan_str, fal_curr_menuitem);
      fal_curr_menuitem->data.hpterm = 0;
      fal_curr_menuitem->data.gui_only = 0;
      break;

    case COMMAND_GUI_ONLY:
      fal_set_command(scan_str, fal_curr_menuitem);
      fal_curr_menuitem->data.hpterm = 0;
      fal_curr_menuitem->data.gui_only = 1;
      break;

    case HELP:
      fal_curr_menuitem->data.help = fal_strdup(scan_str);
      break;

    case SUBMENU_LABEL:
      /*
       * Search all items to see if scan_str is already defined.  Don't
       * forget to append PATHSEP to scan_str prior to checking...
       */
      found = 0;
      ap = fal_curr_parent->first_child;
      while (ap) {
         if (strcmp (scan_str, ap->data.label) == 0) {
            found = 1;
            break;
         }
         ap = ap->sibling;
      }

      /* Only allocate new space if we didn't find an item matching
       * scan_str
       */
      if (!found) {
         ap = fal_new_menuitem(fal_curr_parent);
         ap->data.source = fal_strdup(source);
         ap->data.filename = fal_strdup(fal_desc_file);
         ap->data.type = file_type;
         ap->data.label = fal_strdup(scan_str);
         ap->data.group = 1;
         ap->data.promote_access = 1;
         ap->data.terminal_pause = 1;
         ap->data.allow_cmd_results = FAL_UNKNOWN;
      }

      /*
       * Set fal_curr_parent to point to the new menu item since we're
       * going down a level
       */
      fal_curr_parent = ap;

      break;

     case SUBMENU_END :
        /* Back up to the previous level.  Reset the current menu item
         * to the parent so any help on the parent group is saved correctly.
         */
        fal_curr_menuitem = fal_curr_parent;
        if (fal_curr_parent)
           fal_curr_parent = fal_curr_parent->parent;

      break;

  } /* switch */

}    /* cbox_do_action */


/*************************** Begin-Specification *****************************
* Module: cbox_error
*
* Author: Tammy Heiserman
*
* Description: Prints a parser error message to standard out.
* Parameters: str - The error to be printed to stdout.
*
* Globals: None
*
* Returns: void - None
****************************** End-Specification *****************************/
FUNCTION void cbox_error(str)
char    *str;
{
    /* This is executed from cbox.tab.c, which is generated by lex and/or
     * yacc.  Not sure why we need it since it doesn't do anything.
     */
#ifdef NEVER
    printf(" %s\n", str);
#endif
}    /* cbox_error */


/*************************** Begin-Specification *****************************
*
* Module: fal_init
*
* Author: Tammy Heiserman
*
* Description: Reads the data in the given filename and stores it in the
*              FAL's data structure for use.
*
* Parameters: filename - The name of the data file to be parsed
*
* Globals: None.
*
* Returns: int - Whether or not we were successful
****************************** End-Specification *****************************/
FUNCTION static int fal_init (file_name)
char    *file_name;
{
    int rc;

    if ((fal_desc_fd = fopen(file_name, "r")) == NULL)
    {
        ui_msg_err(FAL_ERR_CANT_READ_FILE, file_name);
        return(1);
    }

    /* Reset the line number count -- this is used in parser error
     * messages.
     */
    fal_lex_line_reset();

    /* Save the name of the file we are currently processing.  cbox_do_action()
     * may need to print an error message with the file name in it.  This
     * global stores the file name.
     */
    fal_desc_file = file_name;
```

```
    /* TODO: Set source to either "SAM" (*.cb file) or "Custom" (*.ou file)
     *       once we know the type of file we are reading.
     */
    if (file_type == CB_TYPE)
        strcpy(source, FAL_HP_SAM);
    else if (file_type == CU_TYPE)
        strcpy(source, FAL_CUSTOM_ADDON);
    else
        strcpy(source, FAL_OTHER);

    if (cbox_parse())
        rc = 1;
    else
        rc = 0;

    fclose(fal_desc_fd);
    return(rc);
} /* fal_init */


/**************************** Begin-Specification *****************************
 *
 * Module: cbox_report
 *
 * Author: Tammy Heiserman
 *
 * Description: Prints a message when rules are detected. The one line in
 *              this routine is usually commented out. It is used primarily
 *              for debugging.
 *
 * Parameters: rule - A string containing the rule detected
 *             str - The value of scan_str when the rule was detected
 *             num - The value of scan_num when the rule was detected
 *
 * Globals: None
 *
 * Returns: void - None
 ****************************** End-Specification *****************************/
FUNCTION void cbox_report(rule, str, num)
char    *rule;
char    *str;
int          num;
{
#ifdef DEBUG
   if (fal_rule_report)
      printf("*** Rule: %s  scan_str: >%s<  scan_num %d\n",rule,str,num);
#endif
}    /* cbox_report */


/**************************** Begin-Specification **************************
 * NAME
 *
 * DESCRIPTION
 *
 * PARAMETERS
 *
 * GLOBALS
 *
 * RETURN
 **************************** End-Specification *****************************/
FUNCTION fal_area_tree_ptr fal_new_menuitem(parent)
   fal_area_tree_ptr parent;
{
   fal_area_tree_ptr ap;

   if ((ap = (fal_area_tree_ptr) calloc (1, sizeof(fal_area_tree))) == NULL)
   {
#ifdef BBA
#pragma BBA_IGNORE
#endif /* BBA */
      ui_msg_err (FAL_ERR_OUT_OF_MEMORY, "fal_new_menuitem");
      ui_exit(1);
   }

   if (parent) {
      /*
       * Link this node into the specified point
       */
      ap->parent = parent;
      if (parent->last_child)
         parent->last_child->sibling = ap;
      parent->last_child = ap;
      if (!parent->first_child)
         parent->first_child = ap;
      parent->data.group = 1;
   }

   return(ap);
} /* fal_new_menuitem */

/**************************** Begin-Specification **************************
 * NAME
 *
 * DESCRIPTION
 *
 * PARAMETERS
 *
 * GLOBALS
 *
 * RETURN
 **************************** End-Specification *****************************/
FUNCTION char *fal_strdup(s)
   char *s;
{
   char *t;

   if ((t = strdup(s)) == NULL) {
      ui_msg_err (FAL_ERR_OUT_OF_MEMORY, "fal_strdup");
      ui_exit (1);
   }
   return(t);

} /* fal_strdup */


/**************************** Begin-Specification **************************
 * NAME
 *
 * DESCRIPTION
 *
 * PARAMETERS
 *
 * GLOBALS
 *
 * RETURN
 **************************** End-Specification *****************************/
FUNCTION void fal_set_command(scan_string, menu_item)
char *scan_string;
fal_area_tree_ptr menu_item;
{
```

```
    /* Force the command to begin with "/" for FAL description files.
     * All *.ou & *.cb files should be tested in the SAM environment before
     * delivery.  The sam_custom.cu file will never contain a relative
     * path for a command.
     */
    if (scan_string[0] != '/')
    {
        ui_msg_err (FAL_ERR_CMD_NOT_GROUNDED, scan_string, fal_desc_file);
        samlog (SAMLOG_ERROR, FAL_ERR_CMD_NOT_GROUNDED, scan_string,
                fal_desc_file);
        fclose(fal_desc_fd);
        ui_exit (1);
    }
    menu_item->data.cmd = fal_strdup(scan_string);
} /* fal_set_command */
```

APPENDIX III

```
start           :   globals items T_eof
globals         :
                |   globals global
global          :   source
source          :   T_SOURCE T_string               #SOURCE
items           :   items item
                |   item
item            :   single
                |   submenu
submenu         :   submenu_label menu_entries submenu_end icon_spec help
menu_entries    :   items
                |
submenu_end     :   T_end                           #SUBMENU_END
single          :   label allow_cmd_spec access_spec icon_spec command_spec execu
allow_cmd_spec  :
                |   T_ALLOW T_string                #ALLOW
term_pause_spec :                                   #PAUSE_TRUE
                |   T_PAUSE T_TRUE                  #PAUSE_TRUE
                |   T_PAUSE T_FALSE                 #PAUSE_FALSE
access_spec     :                                   #ACCESS_TRUE
                |   T_ACCESS T_TRUE                 #ACCESS_TRUE
                |   T_ACCESS T_FALSE                #ACCESS_FALSE
command_spec    :   command
command         :   alpha
                |   motif
                |   motif_only
execute_as_spec :
                |   T_EXECUTE_AS T_string           #EXECUTE_AS
submenu_label   :   T_LABEL T_string T_begin        #SUBMENU_LABEL
label           :   T_LABEL T_string                #LABEL
alpha           :   T_COMMAND T_string              #COMMAND
motif           :   T_COMMAND T_GUI T_string        #COMMAND_GUI
motif_only      :   T_COMMAND T_GUI_ONLY T_string   #COMMAND_GUI_ONLY
icon_spec       :
                |   T_ICON T_string                 #ICON_PATH
help            :
                |   T_HELP T_string                 #HELP
```

```
#include <stdio.h>

extern FILE *fal_desc_fd;
int fal_lex_line = 1;
void fal_lex_line_reset();

input()
{
    int c;

    if ((c = fgetc(fal_desc_fd)) == EOF)
        c = 0;

    if (c == '\n')
        fal_lex_line++;

    return(c);
}

unput(c)
int c;
{

    if (c == '\n')
        fal_lex_line--;

    ungetc(c, fal_desc_fd);
}

void output(c)
   int c;
{
   return;   /* do nothing about bad chars */
} /* output */

void fal_lex_line_reset()
{
  fal_lex_line = 1;
}
```

```
%{
#include "cbox_parser.h"
#undef input
#undef unput
#undef output
extern int input(), unput();
extern void output();

#define PARSE_BUF_SIZE 1024

int  scan_num;
char scan_str[PARSE_BUF_SIZE];

#define yywrap() (1)

%}

white_space  [ \t\n\f]
token        [A-Za-z][A-Za-z0-9-_]*

%%

"source"        {
                        return(T_SOURCE);
                }

"label"         {
                        return(T_LABEL);
                }

"command"       {
                        return(T_COMMAND);
                }

"gui"           {
                        return(T_GUI);
                }

"gui_only"      {
                        return(T_GUI_ONLY);
                }

"pre-condition" {
                        return(T_ALLOW);
                }

"icon_path"     {
                        return(T_ICON);
                }

"promote_access" {
                        return(T_ACCESS);
                 }

"terminal_pause" {
                        return(T_PAUSE);
                 }

"execute_as"     {
                        return(T_EXECUTE_AS);
                 }

"true"          {
                        return(T_TRUE);
                }

"false"         {
                        return(T_FALSE);
                }

"help"          {
                        return(T_HELP);
                }

\"[^"\n]*   {  /* a quoted string was found in input */
               if (input() != '"') /* someone didn't terminate string with "'s */
                  fprintf(stderr, "sam: string must be terminated with a\"\n");

               scan_str[0] = '\0';

               /* copy in everything except the leading quote */
               if (yyleng > PARSE_BUF_SIZE)
                  (void) strncat(scan_str, yytext + 1, PARSE_BUF_SIZE-1);
               else
                  (void)strncat(scan_str, yytext + 1, yyleng-1);

               return(T_string);

            } /*end of lex rule*/

"{"     {
          return(T_begin);
        }

"}"     {
          return(T_end);
        }

"#".*\n         ; /* need to leave in # comments since cpp emits them */

{token}* {
            scan_str[0] = '\0';
            (void) strncat(scan_str, yytext, PARSE_BUF_SIZE-1);
            return(T_unknown);
         }

{white_space}*  ;

.        {
            scan_str[0] = '\0';
            (void)strncat(scan_str, yytext, PARSE_BUF_SIZE-1);
            return(T_unknown);
         }

%%
```

```c
/* @(#) $Header: fal_err.c,v 72.14 95/01/09 09:50:47 hmgr Exp $  */

/*****************/
/* include files */
/*****************/
#include <varargs.h>
#include <string.h>
#include "sam.h"
#include "da_yoda.h"
#include "fal_errors.h"
#include "fal_errmsg.h"
#include "fal_defs.h"

/******************/
/* global defines */
/******************/
extern void err_add_err_info();
extern void err_add_err_note();


/**************************** Begin-Specification *****************************
 *
 * Module: fal_err_handler
 *
 * Author: Tammy Heiserman
 *
 * Description: This is the error handler for the functional area launcher (FAL)
 *
 * Parameters: va_alist - There are a variable number of arguements to this
 *                        routine.
 *
 * Globals: None
 *
 * Returns: int - 0 if error is found, non-zero otherwise
 ****************************** End-Specification *****************************/
FUNCTION int fal_err_handler (va_alist)
va_dcl
{
    va_list     args;
    object_ptr  handle;
    char        buffer[MAXLEN];
    char        *msg_info[FAL_MAX_MSGSTRS];
    char        *null_str="";
    int         err_code;
    int         *context;
    int         num_strings;
    int         rc = 0;
    int         i;

    va_start (args);
    handle = va_arg(args, object_ptr);
    err_code = va_arg(args, int);
    context = va_arg(args, int *);
    num_strings = va_arg(args, int);

    for (i=0; i<num_strings; i++)
#ifdef BBA
#pragma BBA_IGNORE
#endif /* BBA */
        msg_info[i] = va_arg (args, char *);

    for (; i<FAL_MAX_MSGSTRS; i++)
        msg_info[i] = null_str;

    va_end (args);

switch (err_code)
{
  case FAL_CREATE_CUSTOM_SAM_CU_ERR:
    sprintf(buffer, FAL_ERR_CREATE_CUSTOM_SAM_CU, msg_info[0], msg_info[1]);
    err_add_err_info(handle, buffer);
    break;

  case FAL_EDIT_CUSTOM_SAM_CU_ERR:
    sprintf (buffer, FAL_ERR_EDIT_CUSTOM_SAM_CU, msg_info[0]);
    err_add_err_info(handle, buffer);
    break;

  case FAL_RM_OPEN_CUSTOM_SAM_CU_ERR:
    sprintf (buffer, FAL_ERR_RM_OPEN_CUSTOM_SAM_CU, msg_info[0]);
    err_add_err_info(handle, buffer);
    break;

  case FAL_MOD_OPEN_CUSTOM_SAM_ERR:
    sprintf (buffer, FAL_ERR_MOD_OPEN_CUSTOM_SAM, msg_info[0]);
    err_add_err_info(handle, buffer);
    break;

  case FAL_RM_CANT_FIND_PARENT_ERR:
    sprintf (buffer, FAL_ERR_RM_CANT_FIND_PARENT, msg_info[1], msg_info[0]);
    err_add_err_info(handle, buffer);
    break;

  case FAL_MOD_CANT_FIND_PARENT_ERR:
    sprintf(buffer, FAL_ERR_MOD_CANT_FIND_PARENT, msg_info[1], msg_info[0]);
    err_add_err_info(handle, buffer);
    break;

  case FAL_RM_CUSTOM_SAM_CU_ERR:
    sprintf (buffer, FAL_ERR_RM_CUSTOM_SAM_CU, msg_info[1], msg_info[0]);
    err_add_err_info(handle, buffer);
    break;

  case FAL_CMD_ENOENT_ERR:
    sprintf (buffer, FAL_ERR_CMD_ENOENT, msg_info[1]);
    err_add_err_info(handle, buffer);
    break;

  case FAL_FILE_REGULAR_ERR:
    switch (*context)
    {
        case ERR_FATAL:
          sprintf (buffer, FAL_ERR_FILE_REGULAR, msg_info[0]);
          err_add_err_info(handle, buffer);
          break;
        case ERR_NOTE:
          sprintf (buffer, FAL_CONF_USE_EXISTING_FILE, msg_info[0]);
          rc = ui_msg_confirm (buffer, FALSE);
          if (rc == 0)
              /* User doesn't want to use the given file.
               * Set context so that this is considered a
               * fatal error.
               */
              *context = ERR_FATAL;
          break;
    }
    break;


  case FAL_FILE_DIR_ERR:
    sprintf (buffer, FAL_ERR_FILE_DIR, msg_info[0]);
    err_add_err_info(handle, buffer);
```

```
        break;

    case FAL_USERFILE_NEXIST_ERR:
        sprintf (buffer, FAL_ERR_USERFILE_NEXIST, msg_info[0]);
        err_add_err_info(handle, buffer);
        break;

    case FAL_FILE_SPECIAL_ERR:
        sprintf (buffer, FAL_ERR_FILE_SPECIAL, msg_info[0]);
        err_add_err_info(handle, buffer);
        break;

    case FAL_FILENAME_ERR:
        sprintf (buffer, FAL_ERR_FILENAME, msg_info[0]);
        err_add_err_info(handle, buffer);
        break;

    case FAL_CONTROL_FILE_DIR_ERR:
        sprintf (buffer, FAL_ERR_CONTROL_FILE_DIR, msg_info[0], msg_info[1]);
        err_add_err_info (handle, buffer);
        break;

    case FAL_OPEN_CONTROL_FILE_ERR:
        sprintf (buffer, FAL_ERR_OPEN_CONTROL_FILE, msg_info[0], msg_info[1]);
        err_add_err_info (handle, buffer);
        break;

    case FAL_SAVE_CONTROL_FILE_ERR:
        sprintf (buffer, FAL_ERR_SAVE_CONTROL_FILE, msg_info[0]);
        err_add_err_info (handle, buffer);
        break;

    case FAL_READ_CONTROL_FILE_ERR:
        switch (*context)
        {
          case ERR_NOTE:
            /* If we were reading the default control file, we display
             * a different message than if we were reading a user specified
             * control file.
             */
            if (strcmp (msg_info[0], FAL_DEFAULT_CF) != 0)
                sprintf (buffer, FAL_INFO_READ_CONTROL_FILE, msg_info[0]);
            else
                sprintf (buffer, FAL_INFO_READ_DEFAULT_CF, msg_info[0]);
            err_add_err_note (handle, buffer);
            break;
          case ERR_FATAL:
            sprintf (buffer, FAL_ERR_READ_CONTROL_FILE, msg_info[0]);
            err_add_err_info (handle, buffer);
            break;
        }
        break;

    case FAL_RM_CONTROL_FILE_ERR:
        sprintf (buffer, FAL_ERR_RM_CONTROL_FILE, msg_info[0], msg_info[1]);
        err_add_err_info (handle, buffer);
        break;

    case FAL_CF_DIR_PERM_ERR:
        sprintf (buffer, FAL_ERR_CF_DIR_PERM, msg_info[0]);
        err_add_err_info (handle, buffer);
        break;

    case FAL_MUL_SAMS_ERR:
        sprintf (buffer, FAL_INFO_MULTIPLE_SAMS);
        err_add_err_note (handle, buffer);
        break;

    default:
        return (ERR_NOT_IN_CASE_STATEMENT);
  }

  if (rc != 0)
      *context = ERR_IGNORE;
  return(OKAY);
}   /* fal_err_handler */
```

```
/* @(#) $Header: fal_task_utils.c,v 72.1 93/12/30 15:51:58 hmgr Exp $   */

/*****************/
/* Include files */
/*****************/
#include "common/fedit/nc_defs.h"
#include "sam.h"

/************************************/
/* Functions defined in this file. */
/************************************/
long fal_search_for_line();

/**************************** Begin-Specification *****************************
*
* Module: fal_search_for_line
*
* Author: Tammy Heiserman
*
* Description: This routine searches for a line.  It creates the line by
*              indenting the string it is passed two spaces for every
*              parent.  This routine returns the return code from
*              search_forward:
*
*               0       if the string was not found
*               +number if the string was found (pointer to the string)
*               -number if an error occurs
*
* Parameters: num_parents  - The number of parents this string has
*             string       - The string to be searched for in the current file
*
* Globals: None
*
* Returns: int - 0 if success, non-zero otherwise
****************************** End-Specification *****************************/
FUNCTION long fal_search_for_line (num_parents, string)
int  num_parents;
char *string;
{
    char        line[MAXLEN];
    int         i;

    strcpy (line, "^");
    for (i=0; i<num_parents; i++)
        strcat (line, "  ");
    strcat (line, string);
    return (search_forward (line));
} /* fal_search_for_line */
```

```
# @(#) $Header: makefile,v 72.3 93/12/30 15:51:52 hmgr Exp $

FAROOT=..

include $(FAROOT)/defs.mk

OBJS1=          $(OBJDIR)/cbox_lex_io.o \
                $(OBJDIR)/fal_err.o \
                $(OBJDIR)/fal_task_utils.o \
                $(OBJDIR)/cbox.o

DEPENDS1=       $(FAROOT)/h/fal_defs.h \
                $(FAROOT)/h/fal_errors.h \
                $(FAROOT)/h/fal_errmsg.h \
                $(OBJDIR)/cbox_actions.h

FAINCS1=        -I$(OBJDIR) -I$(FAROOT)/h

FAFLAGS1=       $(PIC)

PARSE_O=        $(OBJDIR)/cbox_lex.o \
                $(OBJDIR)/cbox.tab.o

ALL= $(PARSE_O) $(OBJS1) $(OBJDIR)/fal_utils.o

include $(SAM)/make/rules.mk

$(OBJDIR)/fal_utils.o: $(OBJS1) $(PARSE_O)
        $(LD) -r $(OBJS1) $(PARSE_O) -o $@

$(OBJDIR)/cbox_lex.c:   cbox_scanner.l
        $(LEX) -t cbox_scanner.l | sed -e 's/yy/cbox_/g' -e 's/YY/CBOX_/g' > $@

$(OBJDIR)/cbox.tab.c:   $(OBJDIR)/cbox_parser.y
        $(YACC) -p cbox_ -b cbox $(OBJDIR)/cbox_parser.y
        $(MV) -f cbox.tab.c $(OBJDIR)/cbox.tab.c

$(OBJDIR)/cbox_parser.y:        cbox_grammar
        ./yacc_gen cbox

$(OBJDIR)/cbox.tab.o:   $(OBJDIR)/cbox.tab.c $(OBJDIR)/cbox_parser.y
        $(CC) -c $(CFLAGS) $(PIC) $(FAINCS1) $(FAFLAGS1) $(@D)/$(@F:.o=.c) -o $@

$(OBJDIR)/cbox_lex.o:   $(OBJDIR)/cbox_lex.c $(OBJDIR)/cbox_parser.y
        $(CC) -c $(CFLAGS) $(PIC) $(FAINCS1) $(FAFLAGS1) $(@D)/$(@F:.o=.c) -o $@
```

```
#  This script takes a grammar file (see "Prerequisites", below)
#  and creates the yacc parser input file, the token header file, and
#  the actions header file.
#  The token header file is used by both lex and yacc.
#
#  To invoke:
#
#       yacc_gen <prefix>
#
#  Prerequisites:
#       - grammar file, <prefix>_grammar, exists,  containing rules in
#         the following format:
#
#         nonterminal  <tab> :  T_terminals_or nonterminals  # ACTION_ID
#           or
#         nonterminal  <tab> :
#                            |  T_terminals_or nonterminals  # ACTION_ID
#         etc.
#
#         This script assumes that the first rule of the grammar has
#         "start" as the start symbol and the all non-terminals are
#         prefixed with "T_" (for token).  It also assumes that the
#         token for end-of-file is T_eof.
#
#         Tokens of the form T_lowercase are not treated as keywords.
#         Tokens of the form T_UPPERCASE are taken to be keywords.
#

#
# The files created will be placed in TMPDIR:
PATH=$(BEDIR)/bin:$(BEDIR)/usr/bin

TMPDIR=../$(MODEL)/

#
#

#  Create <prefix>_actions.h
#
#       Get sorted list of actions, sorting them in the temporary file,
#       <prefix>_actionlist.

awk '/#/ {printf "%s\n", substr($NF,2);}' $1_grammar | sort -d -u > $TMPDIR$1_actionl

#       Create the header file

awk '{ printf "#define  %30-s %d\n", $1, (0+NR);}' $TMPDIR$1_actionlist > $TMPDIR$1_a

#       Remove temporary file

rm $TMPDIR$1_actionlist

#  Get sorted list of unique terminal symbols, storing them in the
#  temporary file, <prefix>_tokenlist.
#       get one word per line
#       grep for T_
#       sort, uniq

awk '{for (i=1; i <= NF ; i++) { print $(i); }}' $1_grammar | \
   grep T_ | grep -v T_eof | grep -v "#" | sort -d -u > $TMPDIR$1_tokenlist


#  Generate parser file <prefix>_parser.y
#       include #include/extern stuff

echo "%{" > $TMPDIR$1_parser.y
echo "#include \"$1_actions.h\"" >> $TMPDIR$1_parser.y
echo "extern int scan_num;" >> $TMPDIR$1_parser.y
echo "extern char scan_str[];" >> $TMPDIR$1_parser.y
echo "extern void $1_report();" >> $TMPDIR$1_parser.y
echo "extern void $1_do_action();" >> $TMPDIR$1_parser.y
echo "%}" >> $TMPDIR$1_parser.y
echo >> $TMPDIR$1_parser.y
echo >> $TMPDIR$1_parser.y

#       list tokens--%token <token>     number
#
#       (note:  T_eof gets special handling--we want it to = 0)

echo "%start start" >> $TMPDIR$1_parser.y
echo >> $TMPDIR$1_parser.y
echo "%token  T_eof                       0" >> $TMPDIR$1_parser.y

awk '{ printf "%%token  %20-s %d\n", $1, (256+NR) ; }' $TMPDIR$1_tokenlist >> $TMPDIR

echo "%%" >> $TMPDIR$1_parser.y
echo >> $TMPDIR$1_parser.y


#      Copy rules, inserting report() and do_action()
#
#      algorithm:
#
#      if (we're on the first line of a rule)
#         for all except the first rule, print a semicolon by itself
#           (to terminate the previous rule)
#         save the lefthand side to use as a report() parameter
#         if it's there, save the #action constant
#         print the line, minus the #action constant
#         print the call to report()
#         if there was an action constant, print call to do_action function
#      else
#         if it's there, save the #action constant
#         print the line, minus the #action constant
#         print the call to report()
#         if there was an action constant, print call to do_action function
#      print final semicolon

awk -v prefix=$1 '{ if ($1 != "|") {
         if (rulecount == 0)
           rulecount++;
         else
           print "              ;";
         lhs = $1;
         subrule = 1;
         if (substr($NF,1,1) == "#") {
           action_name = substr($NF,2);
           printf "%16-s:\t", $1;
           if (NF > 3) {
             for (i=3; i <= (NF-1) ; i++) { printf "%s ",$(i));
           }
           printf "\n";
         }
         else {
           print $0;
           action_name = "-";
         }
       }
       else {
         subrule++;
         if (substr($NF,1,1) == "#") {
           action_name = substr($NF,2);
```

```
          printf "\t\t|\t";
          if (NF > 2) {
            for (i=2; i <= (NF-1) ; i++) { printf "%s ",$(i)};
          }
          printf "\n";
        }
        else {
          print $0;
          action_name = "-";
        }
      }
      printf "\t\t\t{\n\t\t\t  %s_report(\"%s %d\",scan_str,scan_num);\n", prefix, l
      if (action_name != "-") {
        printf "\t\t\t  %s_do_action(%s);\n", prefix, action_name;
      }
      printf "\t\t\t}\n";
    }' $1_grammar >> $TMPDIR$1_parser.y

echo "          ;" >> $TMPDIR$1_parser.y

#
#  Create header file <prefix>_parser.h
#
#      First, build the token #defines

echo "/* This file is generated automatically from a grammar file. */" > $TMPDIR$1_pa
echo "#define T_eof                    0" >> $TMPDIR$1_parser.h
awk '{ printf "#define %20-s %d\n", $1, (256+NR) ; } \
 END { printf "#define T_unknown            %d\n", (256+NR+1); }' $TMPDIR$1_tokenlist

#
#      Then, build keyword lookup table for lex

echo >> $TMPDIR$1_parser.h
echo >> $TMPDIR$1_parser.h
echo "struct tokens" >> $TMPDIR$1_parser.h
echo "{" >> $TMPDIR$1_parser.h
echo "    char *name;" >> $TMPDIR$1_parser.h
echo "    int value;" >> $TMPDIR$1_parser.h
echo "} $1_TOKENS[] =" >> $TMPDIR$1_parser.h
echo "{" >> $TMPDIR$1_parser.h

awk '$1 < "T_a" {
                keyword = tolower(substr($1,3));
                printf "  {\"%s\",%s},\n", keyword, $1;
              }'  $TMPDIR$1_tokenlist >> $TMPDIR$1_parser.h
echo "};">> $TMPDIR$1_parser.h

echo "static int num_tokens = (sizeof($1_TOKENS))/(sizeof(struct tokens));" >> $TMPDI

#  Remove temporary tokenlist file

rm $TMPDIR$1_tokenlist
```

```
/* @(#) $Header: fal_field.c,v 72.28 95/01/09 09:53:07 hmgr Exp $     */

/*****************/
/* include files */
/*****************/
#include <uilib.h>
#include <string.h>
#include <sys/stat.h>
#include "sam.h"
#include "da_yoda.h"
#include "fal_defs.h"
#include "fal_errmsg.h"
#include "fal_errors.h"
#include "common/h/com_defs.h"
#include "common/h/com_errors.h"
#include "ug_com.h"


/**************************** Begin-Specification *****************************
*
* Module: fal_logopts_sl_trimwhen_fx
*
* Author: Tammy Heiserman
*
* Description: This function adjusts the visibility of the log file size
*              text edit depending on if the user selected automatic log
*              file trimming.
*
* Parameters: field_name - The name of the field being validated
*             field_data - Any pertinent data values in the field
*
* Globals: None
*
* Returns: int - 0 for success, FAL_INVALID for failure
****************************** End-Specification *****************************/
FUNCTION int fal_logopts_sl_trimwhen_fx(field_name, field_data)
char    *field_name;
char    *field_data;
{

#ifdef lint
    /* This parameter is not used.  This makes lint happy.
     */
    field_data = field_data;
#endif

    if (ui_sel_item (field_name, 1, UILIB_TST) == TRUE)
        ui_normal (FAL_LOGOPTS_TE_SIZE);
    else
        ui_invisible (FAL_LOGOPTS_TE_SIZE);
    return(OKAY);
} /* fal_logopts_sl_trimwhen_fx */


/**************************** Begin-Specification *****************************
*
* Module: fal_logopts_te_size_val
*
* Author: Bill Gates
*
* Description: This function validates the range of the max size specified
*              for the SAM logfile.
*
* Parameters: field_name - The name of the field being validated
*             field_data - Any pertinent data values in the field
*
* Globals: None
*
* Returns: int - UILIB_SUCCESS for success, UILIB_FAILURE for failure
****************************** End-Specification *****************************/
FUNCTION int fal_logopts_te_size_val(field_name, field_data)
char    *field_name;
char    *field_data;
{
    int val;

#ifdef lint
    /* This parameter is not used.  This makes lint happy.
     */
    field_name = field_name;
#endif

    val = atoi(field_data);
    if(val < 10000) {
       ui_msg_err(LOG_TE_SIZE_VAL_INVALID);
       return(UILIB_FAILURE);
    }
    return(UILIB_SUCCESS);
} /* fal_logopts_te_size_val */


/**************************** Begin-Specification *****************************
*
* Module: fal_sl_id_fx
*
* Author: Tammy Heiserman
*
* Description: This function determines whether or not to display the
*              User's Login text edit.
*
* Parameters: field_name - The name of the field being validated
*             field_data - Any pertinent data values in the field
*
* Globals: None
*
* Returns: int - 0 for success, FAL_INVALID for failure
****************************** End-Specification *****************************/
FUNCTION int fal_sl_id_fx(field_name, field_data)
char    *field_name;
char    *field_data;
{
#ifdef lint
    /* This parameter is not used.  This makes lint happy.
     */
    field_data = field_data;
#endif

    if (ui_sel_item (field_name, 3, UILIB_TST) == TRUE)
    {
        /* Wants to specify a user to execute as.  Display the
         * text edit.
         */
        ui_normal (FAL_TE_ID);
    }
    else
    {
        /* Is either executing as root or the user's id.  Hide the
         * text edit.
         */
        ui_invisible (FAL_TE_ID);
    }
    return (OKAY);
```

```
} /* fal_sl_id_fx */


/***************************** Begin-Specification *****************************
*
* Module: fal_sl_users_fx
*
* Author: Tammy Heiserman
*
* Description: This function stores the selected user's comment in the
*              comment text edit.
*
* Parameters: field_name - The name of the field being validated
*             field_data - Any pertinent data values in the field
*
* Globals: None
*
* Returns: int - 0 for success, FAL_INVALID for failure
****************************** End-Specification *****************************/
FUNCTION int fal_sl_users_fx(field_name, field_data)
char    *field_name;
char    *field_data;
{
    char  buffer[MAXLEN];


#ifdef lint
    /* This parameter is not used.  This makes lint happy.
     */
    field_data = field_data;
#endif

    ui_first_sel (field_name);
    ui_get_sel_item_col (field_name, FAL_AT_COMMENT, buffer);
    ui_put_data (FAL_SAVE_TE_COMMENT, buffer);
    return (OKAY);
} /* fal_sl_users_fx */


/***************************** Begin-Specification *****************************
*
* Module: fal_te_cmd_fx
*
* Author: Tammy Heiserman
*
* Description: This function validates the command that the user is trying
*              to add to SAM.  This command must exist and be executable.
*              It must also not contain any quotes.
*
* Parameters: field_name - The name of the field being validated
*             field_data - Any pertinent data values in the field
*
* Globals: None
*
* Returns: int - 0 for success, FAL_INVALID for failure
****************************** End-Specification *****************************/
FUNCTION int fal_te_cmd_fx(field_name, field_data)
char    *field_name;
char    *field_data;
{
    object_ptr  handle = (object_ptr) NULL;
    char        mode[MIDLEN];


#ifdef lint
    /* This parameter is not used.  This makes lint happy.
     */
    field_name = field_name;
#endif

    /* Check for quotes in the command.
     */
    if ((strstr (field_data, "\"") != (char *) NULL) ||
        (strstr (field_data, "'") != (char *) NULL))
    {
        ui_msg_err (FAL_ERR_CMD_HAS_QUOTES);
        return (FAL_INVALID);
    }

    /* Make sure the command exists.  The common library error message
     * if it doesn't exist is not very clear.  Remap it to a more clear
     * message.  Be sure to only test the first "word" of the command --
     * don't pass back any options.
     */
    strtok (field_data, " ");
    if (field_data[0] != '/')
    {
        /* Commands must begin with "/".
         */
        ui_msg_err (FAL_ERR_CMD_BEGIN_SLASH, field_data);
        return (FAL_INVALID);
    }

    da_handle_create_and_puts (&handle, STRING_FILENAME, field_data);
    samlog (SAMLOG_VERBOSE, FAL_LOGV_VALIDATE_CMD, field_data);
    tmgr_exec (COM_STAT_FILE, handle, 0);
    err_obj_reset_code (handle, COM_STAT_ENOENT_ERR, FAL_CMD_ENOENT_ERR, "com", "fal"
    err_all_handler (&handle);

    /* The command exists.  Now make sure it is executable.
     */
    da_obj_gets (handle, STRING_FILEMODE, mode, MIDLEN);
    da_obj_destroy (&handle);

    if (S_ISDIR (atoi (mode)) == TRUE)
    {
        /* The command is a directory.
         */
        ui_msg_err (FAL_ERR_CMD_IS_DIR, field_data);
        return (FAL_INVALID);
    }

    if ((S_IXUSR & atoi(mode)) != S_IXUSR)
    {
        /* The command is not executable.
         */
        ui_msg_err (FAL_ERR_CMD_NOT_EXEC, field_data);
        return (FAL_INVALID);
    }
    return(OKAY);
} /* fal_te_cmd_fx */


/***************************** Begin-Specification *****************************
*
* Module: fal_te_icon_fx
*
* Author: Tammy Heiserman
*
* Description: This function validates the icon path specified for a
*              custom application or group.
*
```

```
 * Parameters: field_name - The name of the field being validated
 *             field_data - Any pertinent data values in the field
 *
 * Globals: None
 *
 * Returns: int - 0 for success, FAL_INVALID for failure
 ****************************** End-Specification ******************************/
FUNCTION int fal_te_icon_fx(field_name, field_data)
char    *field_name;
char    *field_data;
{
    int         rc;
    char        file_compress[MAXLEN];
    object_ptr  handle = (object_ptr) NULL;
    object_ptr  thandle = (object_ptr) NULL;

#ifdef lint
    /* This parameter is not used.  This makes lint happy.
     */
    field_name = field_name;
#endif

    /* First try validating the file specified.  If this file doesn't
     * exist, there may be a compressed version of it we can use.
     */
    da_handle_create_and_puts (&handle, STRING_ID, field_data);
    rc = tmgr_exec (FAL_VALIDATE_FILE, handle, 0);
    if (rc == FAL_FILE_REGULAR_ERR)
    {
        /* Found the file -- return OK
         */
        da_handle_destroy (&handle);
        return (OKAY);
    }

    if (rc == FAL_USERFILE_NEXIST_ERR)
    {
        /* See if a compressed version of the file exists -- ObAM is
         * capable of finding the filename if it ends in ".Z"
         */
        strcpy (file_compress, field_data);
        strcat (file_compress, ".Z");
        da_handle_create_and_puts (&thandle, STRING_ID, file_compress);
        rc = tmgr_exec (FAL_VALIDATE_FILE, thandle, 0);
        da_handle_destroy (&thandle);
        if (rc == FAL_FILE_REGULAR_ERR)
        {
            /* Found a compressed version -- return OK
             */
            da_handle_destroy (&handle);
            return (OKAY);
        }
    }

    /* If we get to here, the file isn't valid.  Display an error
     * message and return.  This routine should always return from
     * err_all_handler() -- the other code is mainly for closure and
     * should not be executed.
     */
    err_set_single_context (handle, ERR_IGNORE, FAL_FILE_REGULAR_ERR);
    err_add_err_info (handle, FAL_ERR_NEED_ICON_PATH);
    err_all_handler (&handle);
    da_handle_destroy (&handle);
    return (FAL_INVALID);
} /* fal_te_icon_fx */


/**************************** Begin-Specification *****************************
 *
 * Module: fal_te_id_fx
 *
 * Author: Tammy Heiserman
 *
 * Description: This function validates the login that was typed in the text
 *              edit.
 *
 * Parameters: field_name - The name of the field being validated
 *             field_data - Any pertinent data values in the field
 *
 * Globals: None
 *
 * Returns: int - 0 for success, FAL_INVALID for failure
 ****************************** End-Specification ******************************/
FUNCTION int fal_te_id_fx(field_name, field_data)
char    *field_name;
char    *field_data;
{
    object_ptr  handle = (object_ptr) NULL;


#ifdef lint
    /* This parameter is not used.  This makes lint happy.
     */
    field_name = field_name;
#endif

    /* Compare this user to all users in /etc/passwd.  If the user
     * appears in /etc/passwd, it is valid.  If the user doesn't,
     * an appropriate error message is displayed in the error handler.
     */
    da_handle_create_and_puts (&handle, STRING_ID, field_data);
    tmgr_exec (UG_VALIDATE_USER, handle, 0);
    err_all_handler (&handle);
    da_handle_destroy (&handle);
    return (OKAY);
} /* fal_te_id_fx */


/**************************** Begin-Specification *****************************
 *
 * Module: fal_te_label_fx
 *
 * Author: Tammy Heiserman
 *
 * Description: This function ensures that the label for a custom group
 *              or utility is unique within the group it is being added to.
 *
 * Parameters: field_name - The name of the field being validated
 *             field_data - Any pertinent data values in the field
 *
 * Globals: None
 *
 * Returns: int - 0 for success, FAL_INVALID for failure
 ****************************** End-Specification ******************************/
FUNCTION int fal_te_label_fx(field_name, field_data)
char    *field_name;
char    *field_data;
{
    char                label[MAXLEN];
    char                menu_item[MIDLEN];
    int                 num_items;
    int                 num_sel_item;
```

```
    int                 i;

#ifdef lint
    /* This parameter is not used.  This makes lint happy.
     */
    field_name = field_name;
#endif

    num_items = ui_num_object_items();
    ui_get_menuitem (menu_item);
    if ((strcmp (menu_item, FAL_ACT_ADD_GROUP) == 0) ||
        (strcmp (menu_item, FAL_ACT_ADD_UTILITY) == 0))
    {
        /* We are adding a new utility or group.  This label should not
         * match any other item on the OLE.
         */
        for (i=1; i<= num_items; i++)
        {
            ui_get_object_item (FAL_AT_LABEL, i, label);
            if (strcmp (label, field_data) == 0)
            {
                ui_msg_err (FAL_ERR_LABEL_ALREADY_USED, field_data);
                return (FAL_INVALID);
            }
        }
    }
    else
    {
        /* We are modifying a new utility or group.  This label should not
         * match any other item on the OLE except the selected item.  It's
         * OK for the user to change the label  and then change it back to
         * what it was before pressing OK.
         */
        num_sel_item = ui_first_object();
        for (i=1; i<= num_items; i++)
        {
            if (i != num_sel_item)
            {
                ui_get_object_item (FAL_AT_LABEL, i, label);
                if (strcmp (label, field_data) == 0)
                {
                    ui_msg_err (FAL_ERR_LABEL_ALREADY_USED, field_data);
                    return (FAL_INVALID);
                }
            }
        }
    }
    return(OKAY);
} /* fal_te_label_fx */


/**************************** Begin-Specification *****************************
*
* Module: fal_save_pb_unlisted_fx
*
* Author: Tammy Heiserman
*
* Description: This function displays the Save for Unlisted User task dialog.
*              If the task succeeds, it blows away the orginal save user
*              privileges task dialog.
*
* Parameters: field_name - The name of the field being validated
*             field_data - Any pertinent data values in the field
*
* Globals: None
*
* Returns: int - 0 for success, FAL_INVALID for failure
******************************* End-Specification *****************************/
FUNCTION int fal_save_pb_unlisted_fx(field_name, field_data)
char    *field_name;
char    *field_data;
{
#ifdef lint
    /* These parameters are not used.  This makes lint happy.
     */
    field_name = field_name;
    field_data = field_data;
#endif

    if (ui_invoke_dib (FAL_SAVE_UNLISTED_TD) == UILIB_OKAY)
        ui_exit_dib();

    return(OKAY);
} /* fal_save_pb_unlisted_fx */


/**************************** Begin-Specification *****************************
*
* Module: fal_save_te_user_fx
*
* Author: Tammy Heiserman
*
* Description: This function verifies that the login name is an unlisted
*              user.  If it is a known user, then the privileges should
*              be modified on the Save User Privileges task dialog.
*              It also verifies that the user isn't saving privileges
*              for the root user.
*
* Parameters: field_name - The name of the field being validated
*             field_data - Any pertinent data values in the field
*
* Globals: None
*
* Returns: int - 0 for success, FAL_INVALID for failure
****************************** End-Specification *****************************/
FUNCTION int fal_save_te_user_fx(field_name, field_data)
char    *field_name;
char    *field_data;
{
    char        buffer[MAXLEN];
    int         size;
    int         i;


#ifdef lint
    /* These parameters are not used.  This makes lint happy.
     */
    field_name = field_name;
    field_data = field_data;
#endif

    /* Make sure field_data isn't root.
     */
    if (strcmp (field_data, "root") == 0)
    {
        ui_msg_err (FAL_ERR_CANT_SAVE_ROOT);
        return (FAL_INVALID);
    }

    /* Make sure field_data does not exist on the Save User Privileges
     * task dialog.
```

```
     */
    size = ui_gl_num_items (FAL_SAVE_TD, FAL_SL_USERS);
    for (i=1; i<=size; i++)
    {
        ui_gl_get_item_col (FAL_SAVE_TD, FAL_SL_USERS, i, FAL_AT_LOGIN, buffer);
        if (strcmp (buffer, field_data) == 0)
        {
            ui_msg_err (FAL_ERR_KNOWN_USER, field_data);
            return (FAL_INVALID);
        }
    }

    return(OKAY);
} /* fal_save_te_user_fx */
```

```
/* @(#) $Header: fal_init.c,v 72.54 95/02/13 14:05:50 hmgr Exp $     */

/******************/
/* include files */
/******************/
#include <uilib.h>
#include <unistd.h>
#include <string.h>
#include <signal.h>
#include "sam.h"
#include "da_yoda.h"
#include "fal_defs.h"
#include "fal_errmsg.h"
#include "fal_errors.h"
#include "sam_pref.h"
#include "kc_com.h"
#include "kc/h/kc_cache.h"


/*************************************/
/* globals not defined in fal_init */
/*************************************/
extern fal_area_tree_ptr fal_areas;
extern int fal_read_files();
extern void fal_enable_control_file();
extern void fal_change_child_status();
extern void fal_check_parent_status();
extern int fal_check_promote_status();
extern int fal_check_pre_conditions();
extern char *sam_get_restricted_user();
extern char *sam_get_lock_file();


/*********************************/
/* globals defined in fal_init */
/*********************************/
fal_area_tree_ptr       fal_curr_parent = NULL;
char                    *fal_fa_name = "fal";


/**************************************/
/* globals defined only for fal_init */
/**************************************/
static int        fal_is_rsb;
static int        fal_is_control_file;
static char       fal_control_file[MAXLEN];


/****************************** Begin-Specification *****************************
*
* Module: fal_execute_me_first()
*
* Author: Tammy Heiserman
*
* Description: This is the first routine that gets executed in the SAM
*              functional area launcher.  It determines if SAM was executed
*              with a control file and sets up the menus appropriately.
*              The customization menu items are not available if SAM is
*              executed with a control file.  This routine also sets
*              the variable fal_is_rsb to 0 so the initialization routine
*              will know we are executing the FAL instead of the RSB.
*
*              This routine also ensures that the user has root
*              privileges and checks for multiple versions of SAM
*              executing at the same time.
*
* Parameters: NONE
*
* Globals: fal_control_file     contains the name of the control file that
*                               was passed into SAM.  This global is set
*                               in this routine.
*
* Returns: int - 0 if screen entry succeeds, otherwise 1
****************************** End-Specification *****************************/
FUNCTION int fal_execute_me_first()
{
    char        lock_file[MAXLEN];
    char        tmp_str[MAXLEN];
    char        *as;
    object_ptr  handle = (object_ptr) NULL;
    char        *putenv_var;

   /*
    * Set the LANG environment variable to "C".  Remove this
    * code when this functional area has been internationalized.
    */

    putenv_var = (char *) malloc( sizeof( LANG_C ) );
    strcpy( putenv_var, LANG_C );
    putenv( putenv_var );

    /* Check if the user is root.  If not, exit SAM.  Display the
     * user's real UID in the log message.
     */
    if (geteuid() != 0)
    {
        ui_msg_err (FAL_ERR_MUST_BE_ROOT);
        samlog (SAMLOG_ERROR, FAL_LOG_ERR_NOT_SUPERUSER, getuid());
        return (FAL_INVALID);
    }

    /* Keep track of how we are executed.
     */
    fal_is_rsb = 0;

    /* Determine if SAM was executed with a control file.  If so,
     * save the name of the file for later use.  Also turn off the
     * menu items (add/modify/remove) that don't apply.
     */
    strcpy (tmp_str, sam_get_restricted_user());
    if (strlen (tmp_str) > 0)
    {
        /* We are running a restricted version of SAM.  Turn off all
         * actions that do not apply.
         */
        fal_is_control_file = TRUE;
        ui_gl_invisible (FAL_OLE_NAME, FAL_ACT_MODIFY);
        ui_gl_invisible (FAL_OLE_NAME, FAL_ACT_REMOVE);
        ui_gl_invisible (FAL_OLE_NAME, FAL_ACT_ADD_GROUP);
        ui_gl_invisible (FAL_OLE_NAME, FAL_ACT_ADD_UTILITY);

        /* Now build the real name of the FAL control file.
         * sam_get_restricted_user() returns the login name that was passed
         * in.  We still need to generate the full control file path.
         */
        com_use_samroot (fal_control_file, FAL_CONTROL_FILE_DIR);
        strcat (fal_control_file, "/");
        strcat (fal_control_file, tmp_str);
        strcat (fal_control_file, ".cf");
    }
    else
        /* We are not running a restricted version of SAM.  Set the
```

```
         * fal_control_file to NULL.
         */
        strcpy (fal_control_file, "");


    /* See if the auto-start option is set, and if it is (and if we're not
     * using the terminal interface), kick one off.
     */

    as = get_sam_preference("log_autostart_viewer");
    if(strcmp(as, "yes") == 0 && !ui_on_terminal())
       (void)invoke_samlog_viewer();

    /* Now check for multiple SAM sessions.  If there are multiple
     * SAM sessions, display a warning.
     */
    strcpy (lock_file, sam_get_lock_file());
    da_handle_create_and_puts (&handle, STRING_ID, lock_file);
    tmgr_exec (FAL_IS_MUL_SAMS, handle, 0);
    err_all_handler (&handle);
    da_obj_destroy (&handle);

    /* Finally change the "Exit" in the File menu to say "Exit SAM".  This
     * is a usability improvement -- Exit in all other SAM FAs returns you
     * to the FAL.  Some users think Exit should return you to the previous
     * level in the hierarchy of SAM's areas.
     */
    ui_set_exit_label (FAL_OLE_NAME, FAL_EXIT_SAM_MNEMONIC, FAL_EXIT_SAM);

    return(OKAY);
} /* fal_execute_me_first */


/**************************** Begin-Specification *****************************
 *
 * Module: fal_rsb_execute_me_first()
 *
 * Author: Tammy Heiserman
 *
 * Description: This is the first routine that gets executed in the SAM
 *              restricted SAM builder.  It determines if SAM was executed
 *              with a control file.  This routine also sets the
 *              variable fal_is_rsb to 1 so the initialization routine
 *              will know we are executing the RSB instead of the FAL.
 *
 *              This routine also ensures that the user has root
 *              privileges.
 *
 * Parameters: NONE
 *
 * Globals: fal_control_file     contains the name of the control file that
 *                               was passed into SAM.  This global is set
 *                               in this routine.
 *
 *
 * Returns: int - 0 if screen entry succeeds, otherwise 1
 ****************************** End-Specification ******************************/
FUNCTION int fal_rsb_execute_me_first()
{
    char        tmp_str[MAXLEN];
    char        *putenv_var;

   /*
    * Set the LANG environment variable to "C".  Remove this
    * code when this functional area has been internationalized.
    */
    putenv_var = (char *) malloc( sizeof( LANG_C ) );
    strcpy( putenv_var, LANG_C );
    putenv( putenv_var );


    /* Check if the user is root.  If not, exit SAM.
     */
    if (geteuid() != 0)
    {
        ui_msg_err (FAL_ERR_MUST_BE_ROOT);
        samlog (SAMLOG_ERROR, FAL_LOG_ERR_NOT_SUPERUSER, getuid());
        return (FAL_INVALID);
    }

    /* Keep track of how we are executed.
     */
    fal_is_rsb = 1;

    /* Determine if SAM was executed with a control file.  If so,
     * save the name of the file for later use.
     */
    strcpy (tmp_str, sam_get_restricted_user());
    if (strlen (tmp_str) > 0)
    {
        /* Now build the real name of the FAL control file.
         * sam_get_restricted_user() returns the login name that was passed
         * in.  We still need to generate the full control file path.
         */
        com_use_samroot (fal_control_file, FAL_CONTROL_FILE_DIR);
        strcat (fal_control_file, "/");
        strcat (fal_control_file, tmp_str);
        strcat (fal_control_file, ".cf");
        fal_is_control_file = TRUE;
    }
    else
    {
        strcpy (fal_control_file, "");
    }

    /* Finally change the "Exit" in the File menu to say "Exit SAM".  This
     * is a usability improvement -- Exit in all other SAM FAs returns you
     * to the FAL.  Some users think Exit should return you to the previous
     * level in the hierarchy of SAM's areas.
     */
    ui_set_exit_label (FAL_OLE_NAME, FAL_EXIT_SAM_MNEMONIC, FAL_EXIT_SAM);

    return(OKAY);
} /* fal_rsb_execute_me_first */


/**************************** Begin-Specification *****************************
 *
 * Module: fal_entry_ole()
 *
 * Author: Tammy Heiserman
 *
 * Description: This routine is executed after fal_execute_me_first() or
 *              fal_rsb_execute_me_first() but prior to fal_ole_init().
 *              It is *NOT* called whenever the subarea is re-initialized.
 *              The routine reads all *.cb, *.cu & *.ou files that have
 *              been registered to SAM and loads the SAM areas into the
 *              global data structure.
 *
 *              If a SAM control file was specified on the command
 *              line, then this routine disables all areas except those
```

```
 *              defined in the control file.
 *
 * Parameters: NONE
 *
 * Globals: fal_control_file     Contains the name of the control file
 *                               that was passed into SAM.
 *
 * Returns: int - 0 if screen entry succeeds, otherwise 1
****************************** End-Specification *****************************/
FUNCTION int fal_entry_ole()
{
    object_ptr          handle = (object_ptr) NULL;
    char                user_login[MAXLEN];
    char                buffer[MAXLEN];
    int                 rc;
    int                 cf_already_read = FALSE;

    /* fal_read_files() displays it's own error messages.  If an error
     * is encountered that is so bad the FAL should exit, then ui_exit()
     * is called from the appropriate routine.
     */
    ui_msg_progress (FAL_PROG_OLE_INIT);
    (void) fal_read_files();

    /* If there is a control file, we need to read its contents and
     * set the status field of each item appropriately.
     */
    if ((fal_is_rsb == 1) && (fal_is_control_file == 0))
    {
        /* A control file hasn't been specified, so display the Load User
         * Privileges task dialog.  This will read in the control file for
         * the user that is selected.
         */
        rc = ui_invoke_dib (FAL_EDIT_TD);
        fal_is_control_file = 1;

        if (rc == UILIB_OKAY)
            cf_already_read = TRUE;
        else
            com_use_samroot (fal_control_file, FAL_DEFAULT_CF);
        com_use_samroot (buffer, FAL_DEFAULT_CF);
    }

    if ((fal_is_control_file == 1) && (cf_already_read == FALSE))
    {
        /* Read the control file and initialize the OLE to its
         * contents.
         */
        da_handle_create_and_puts (&handle, "FAL_CONTROL_FILE.STRING_ID",
                                   fal_control_file);
        tmgr_exec (FAL_READ_CONTROL_FILE, handle, 0);

        /* A read failure when running the FAL should be fatal!
         */
        if (fal_is_rsb == 0)
            err_set_single_context (handle, ERR_FATAL,
                                    FAL_READ_CONTROL_FILE_ERR);
        err_all_handler (&handle);

        /* Disable all items in the FAL.
         */
        fal_change_child_status (fal_areas->first_child, FAL_DISABLE_NUM);

        /* Enable only those items listed in the control file.
         */
        fal_enable_control_file (handle, fal_is_rsb);
        da_obj_destroy (&handle);

        /* If we are running the RSB, display the control file name
         * in the status area.  If the control file is FAL_DEFAULT_CF,
         * then don't change the status line.
         */
        com_use_samroot (buffer, FAL_DEFAULT_CF);
        if ((fal_is_rsb == 1) &&
            (strcmp (fal_control_file, buffer) != 0))
        {
            ui_put_status (FAL_STATUS_CHANGES, FAL_CAP_NO);
            (void) com_basename (user_login, fal_control_file, ".cf");
            ui_put_status (FAL_STATUS_USER, user_login);
        }
    }

    /* Check the promote_access of each command.  The promote_access
     * determines whether a non-superuser can gain access to this area
     * via SAM.  We don't want to check the promote_access if we are
     * running the FAL without a control file because the superuser has
     * access to all SAM areas.
     *
     * fal_check_promote_status() walks through all commands in the
     * hierarchy.  For each command with promote_access false, it sets
     * the access status to "Inaccessable".  This means the user of the
     * RSB cannot enable it and the user of the FAL cannot see it.
     * A group is marked inaccessable only if all items in the group are
     * inaccessable.
     */
    if ((fal_is_rsb == 1) || (fal_is_control_file == 1))
    {
        (void) fal_check_promote_status (fal_areas->first_child);
    }

    /* Execute each command's pre-condition.  We must do this here so
     * that we can make non-custom groups invisible if all their children
     * are invisible.  We don't care about pre-conditions when running
     * the restricted SAM builder.
     */
    if (fal_is_rsb == 0)
        (void) fal_check_pre_conditions (fal_areas->first_child);

    return (OKAY);
} /* fal_entry_ole */


/*************************** Begin-Specification *****************************
 *
 * Module: fal_ole_init
 *
 * Author: Tammy Heiserman
 *
 * Description: Object List Screen Initialization routine for the functional
 *              area launcher.  This routine reads the data structure and
 *              displays the SAM areas for the current level.
 *
 *              This routine behaves differently if entering the FAL or
 *              the Restricted SAM Builder (RSB).  The variable fal_is_rsb
 *              is set in the execute_me_first routine for both the FAL and
 *              the RSB.  If entering the FAL, then this routine will:
 *
 *               *) Display only applications that have passed their
 *                  pre-conditions
 *               *) On terminals, don't display gui_only applications
 *               *) Only display enabled applications and groups
 *
```

```
 *              If entering the RSB, then this routine will:
 *
 *              *) Display all applications regardless of pre-conditions
 *                 or gui_only on terminals
 *              *) Display all enabled & disabled applications & groups
 *
 * Parameters: char_list - A pointer to the list of strings to be returned
 *             refresh   - 0 if this was not triggered by a refresh from the
 *                         user; non-zero otherwise
 *             key_obj   - pointer to key attribute data for current container
 *                         object
 *             level_id  - level identifier for key_obj
 *
 * Globals: None
 *
 * Returns: int - 0 if screen entry succeeds, otherwise 1
******************************** End-Specification ******************************/
FUNCTION int fal_ole_init(char_list, refresh, key_obj, level_id)
ui_object_list_t *char_list;
int refresh;
char *key_obj, *level_id;
{
    ui_object_list_t    objlist = NULL;
    fal_area_tree_ptr   cur_obj, child;
    char                *obj_data[10];
    int                 attr_num = 0;
    char                *child_level_name;
    char                buffer[MINLEN];
    char                buffer2[MINLEN];


#ifdef lint
    /* These parameters to fal_ole_init() are not used.  This
     * makes lint happy.
     */
    level_id = level_id;
    refresh = refresh;
#endif


    (void) ui_objlist_create(FAL_OLE_NAME, FAL_LEVEL_NAME, &objlist);
    if ((cur_obj = (fal_area_tree_ptr) key_obj) == (fal_area_tree_ptr) NULL)
    {
        fal_curr_parent = fal_areas;
        child = fal_areas->first_child;
    }
    else
    {
        child = cur_obj->first_child;
        fal_curr_parent = cur_obj;
    }

    while(child)
    {
        if (fal_is_rsb == 0)
        {
            /* Retrieve the status of the pre-condition and determine whether
             * or not to display the item.
             */
            switch (child->data.allow_cmd_results)
            {
                case FAL_ALLOWED:
                    break;
                default:
                    child = child->sibling;
                    continue;
                    /* NOTREACHED */
                    break;
            }
        }

        /* Determine if this command is for graphical environments only.
         * If it is and we are running on a terminal, ignore this entry.
         * Only do this if we are entering the FAL instead of the RSB.
         */
        if ((fal_is_rsb == 0) && (child->data.gui_only == 1) &&
            (ui_on_terminal() == TRUE))
        {
            /* Skip this command -- don't display it on the OLE.
             */
            samlog (SAMLOG_VERBOSE, FAL_LOGV_GUI_ONLY, child->data.label);
            child = child->sibling;
            continue;
        }

        /* For the FAL, determine if this command/group is disabled or
         * inaccessable.  If so, ignore this entry.
         */
        if ((fal_is_rsb == 0) && ((child->data.status == FAL_DISABLE_NUM) ||
            (child->data.status == FAL_INACCESS_NUM)))
        {
            /* Skip this command -- don't display it on the OLE.
             */
            child = child->sibling;
            continue;
        }

        /* Start filling up the OLE columns with information.
         */
        attr_num = 0;
        obj_data[attr_num++] = child->data.source;

        obj_data[attr_num++] = child->data.label ?
                               child->data.label : "<no label>";

        /* An item can have one of four status states:
         *
         * 1)  Enabled      -> available
         * 2)  Disabled     -> unavailable
         * 3)  Partial      -> container object that has some enabled and
         *                     disabled subitems
         * 4)  Inaccessable -> not available in restricted sessions
         */
        switch (child->data.status)
        {
          case FAL_ENABLE_NUM:
            obj_data[attr_num++] = FAL_ENABLED;
            break;
          case FAL_DISABLE_NUM:
            obj_data[attr_num++] = FAL_DISABLED;
            break;
          case FAL_INACCESS_NUM:
            obj_data[attr_num++] = FAL_INACCESS;
            break;
          default:
            obj_data[attr_num++] = FAL_PARTIAL;
            break;
        }

        sprintf(buffer, "%d", child->data.group);
        obj_data[attr_num++] = buffer;
```

APPENDIX IV

```
        sprintf(buffer2, "%d", child->data.type);
        obj_data[attr_num++] = buffer2;

        /* This attribute determines the user id that the command is
         * executed with.
         */
        if (child->data.group == 1)
            obj_data[attr_num++] = FAL_NULL_STR;
        else if ((strlen (child->data.execute_as) == 0) ||
                 (strcmp (child->data.execute_as, FAL_ROOT) == 0))
            obj_data[attr_num++] = FAL_ROOT;
        else if (strcmp (child->data.execute_as, FAL__USER) == 0)
            obj_data[attr_num++] = FAL_CURRENT_USER;
        else
            obj_data[attr_num++] = child->data.execute_as;

        obj_data[attr_num++] = (char *) child;

        if (child->data.group)
           child_level_name = FAL_LEVEL_NAME;
        else
           child_level_name = (char *) NULL;

        /* Now add the item to the OLE.  If an icon is specified, we need
         * to add the item's icon path.
         */
        if (strlen (child->data.icon_path) > 0)
            (void) ui_objlist_addobj_icon (objlist, obj_data, (int) 0,
                                child_level_name, child->data.icon_path);
        else
            (void) ui_objlist_addobj (objlist, obj_data, (int) 0,
                                child_level_name);

        child = child->sibling;

    } /* while (cur_obj) */

    *char_list = objlist;

    return(OKAY);
} /* fal_ole_init */


/**************************** Begin-Specification *****************************
 *
 * Module: fal_rsb_exit_ole()
 *
 * Author: Tammy Heiserman
 *
 * Description: This routine is called prior to exiting the Restricted
 *              SAM Builder.  It sees if any changes are pending and
 *              warns the user prior to exiting.
 *
 * Parameters: NONE
 *
 * Globals: None
 *
 * Returns: int - 0 if screen entry succeeds, otherwise 1
 ****************************** End-Specification *****************************/
FUNCTION int fal_rsb_exit_ole()
{
    char        buffer[MIDLEN];


    /* Retrieve the status information for changes pending and determine
     * if the user will lose any changes.  If so, display a confirmation
     * message.
     */
    ui_get_status (FAL_STATUS_CHANGES, buffer);
    if (strcmp (buffer, FAL_CAP_YES) == 0)
    {
        if (ui_msg_confirm (FAL_CONF_EXIT, FALSE) == FALSE)
            return (UILIB_FAILURE);
    }
    return(OKAY);
} /* fal_rsb_exit_ole */


/**************************** Begin-Specification *****************************
 *
 * Module: fal_exit_ole()
 *
 * Description:  This routine is called prior to exiting the SAM FAL.
 *               It sees if any kernel changes are pending and warns
 *               the user prior to exiting.  It also removes session files.
 *
 * Parameters: NONE
 *
 * Globals: None
 *
 * Returns: int - 0 if screen entry succeeds, otherwise 1
 ****************************** End-Specification *****************************/
FUNCTION int
fal_exit_ole()
{
    char        ses_dir[MAXPATHLEN];
    char        filename[MAXPATHLEN];
    int         rc;
    int         options = 0;
    object_ptr  handle = (object_ptr)NULL;

   /*
    * Check to see if there are kernel changes pending, and rebuild the
    * kernel if so.  Deferring the kernel rebuild is not offered to the
    * user.  If the user wants to reboot, do that via kc_com_util_reboot().
    * This function also removes the kernel session files (and the SAM lock
    * file, since main won't get a chance to do that).
    */

    rc = kc_com_util_regen_2(0);

    if(rc == KC_REBOOT_DESIRED) {
        da_handle_create(&handle);
        options |= KC_SYSTEM_REBOOT;
        kc_com_util_reboot(handle, options, 0);     /* shouldn't return */
        err_all_handler(&handle);
        da_handle_destroy(&handle);
    }

   /*
    * If we didn't reboot, we still need to remove the KC session files (but
    * not the SAM lock file - main will do that).  No errors are returned by
    * this task.
    */

    da_handle_create(&handle);
    tmgr_exec(KC_CLEANUP_SESSION, handle, 0);
    da_handle_destroy(&handle);

    return(OKAY);

} /* fal_exit_ole */
```

```c
/* @(#) $Header: fal_screen.c,v 72.29 94/12/30 15:08:09 hmgr Exp $     */

/*****************/
/* include files */
/*****************/
#include <uilib.h>
#include <string.h>
#include "sam.h"
#include "da_yoda.h"
#include "fal_defs.h"
#include "fal_errmsg.h"
#include "sam_pref.h"
#include "ug_com.h"


/**************************** Begin-Specification *****************************
 *
 * Module: fal_remp_se
 *
 * Author: Tammy Heiserman
 *
 * Description: Screen entry function for the Remove User Privileges
 *              task dialog in the Restricted SAM Builder.  This function
 *              retrieves all users on the system that have restricted access
 *              and displays them in the selection list.
 *
 * Parameters: dib_name - String containing the name of the DiB.
 *             context - Reserved for future use.
 *
 * Globals: none
 *
 * Returns: int - 0 if screen entry succeeds, otherwise 1
 ****************************** End-Specification *****************************/
FUNCTION int fal_remp_se(dib_name, context)
char    *dib_name;
int     context;
{
    object_ptr  handle = (object_ptr) NULL;
    object_ptr  all_handle = (object_ptr) NULL;
    int         size = 1;
    int         psize;
    int         rc;
    int         rc2;
    int         i;
    char        buffer[MAXLEN];
    char        name[MAXLEN];
    char        login[MAXLEN];
    char        plogin[MAXLEN];
    char        comment[MAXLEN];


#ifdef lint
    /* These parameters are not used.  This makes lint happy.
     */
    dib_name = dib_name;
    context = context;
#endif

    /* Get the list of promoted users on the system.
     */
    samlog (SAMLOG_VERBOSE, FAL_LOGV_GET_PUSERS);
    da_handle_create (&handle);
    tmgr_exec (FAL_GET_PUSERS, handle, 0);
    err_all_handler (&handle);

    /* Get a list of all users on the system.  This retrieves their
     * real names
     */
samlog (SAMLOG_VERBOSE, FAL_LOGV_GET_USERS);
da_handle_create (&all_handle);
tmgr_exec (UG_GET_USERS, all_handle, 0);
err_all_handler (&all_handle);

/* Now walk through all users on all_handle and display those
 * that have restricted access to SAM.  There may be users that
 * have SAM privileges that are not returned by UG_GET_USERS (ie,
 * those with NIS logins).  Display these users as well.
 */
ui_invisible (FAL_SL_USERS);
for (rc = da_obj_set_list_first (all_handle, STRING_DATA);
     rc == OKAY;
     rc = da_obj_set_list_next (all_handle, STRING_DATA))
{
    da_obj_gets (all_handle, STRING_DATA, buffer, MAXLEN);
    strcpy (login, strtok (buffer, " "));
    strcpy (name, &buffer[10]);

    /* Make sure we don't display the "root" user.
     */
    if (strcmp (login, "root") == 0)
        continue;

    /* Now see if this user is restricted.  If login matches a login
     * on handle.  If so, then this user already has restriced access.
     */
    da_obj_list_size (handle, "FAL_USER.STRING_ID", &psize);
    if (psize > 0)
    {
        da_obj_set_list_first (handle, "FAL_USER.STRING_ID");
        da_obj_set_list_first (handle, "FAL_COMMENT.STRING_ID");
        for (i=1; i<=psize; i++)
        {
            da_obj_gets (handle, "FAL_USER.STRING_ID", plogin, MAXLEN);
            rc2 = strcmp (plogin, login);
            if (rc2 == 0)
            {
                /* This user has restricted access!
                 */
                ui_put_item_col (FAL_SL_USERS, size, FAL_AT_LOGIN, login);
                ui_put_item_col (FAL_SL_USERS, size, FAL_AT_NAME, name);

                da_obj_list_remove_curr (handle, "FAL_USER.STRING_ID");
                da_obj_gets (handle, "FAL_COMMENT.STRING_ID", comment,
                             MAXLEN);
                ui_put_item_col (FAL_SL_USERS, size, FAL_AT_COMMENT,
                                 comment);
                da_obj_list_remove_curr (handle, "FAL_COMMENT.STRING_ID");
                size++;
                break;
            }
            else if (rc2 < 0)
            {
                /* This item needs to be displayed before the one
                 * we are looking for.  It is an NIS login that does
                 * not exist in /etc/passwd.
                 */
                ui_put_item_col (FAL_SL_USERS, size, FAL_AT_LOGIN, plogin);
                ui_put_item_col (FAL_SL_USERS, size, FAL_AT_NAME, "");

                da_obj_list_remove_curr (handle, "FAL_USER.STRING_ID");
                da_obj_gets (handle, "FAL_COMMENT.STRING_ID", comment,
                             MAXLEN);
```

```
                ui_put_item_col (FAL_SL_USERS, size, FAL_AT_COMMENT,
                                 comment);
                da_obj_list_remove_curr (handle, "FAL_COMMENT.STRING_ID");
                size++;
            }
            else
            {
                /* There are more privileged users, but they all come
                 * alphabetically after the user we are looking for.
                 */
                break;
            }
        }
    }
    else
        /* All restricted users have been displayed.
         */
        break;
}

/* Display any remaining users that have SAM privileges but don't appear
 * in /etc/passwd.
 */
da_obj_list_size (handle, "FAL_USER.STRING_ID", &psize);
for (i=1; i<=psize; i++)
{
    da_obj_gets (handle, "FAL_USER.STRING_ID", plogin, MAXLEN);
    ui_put_item_col (FAL_SL_USERS, size, FAL_AT_LOGIN, plogin);
    ui_put_item_col (FAL_SL_USERS, size, FAL_AT_NAME, "");

    da_obj_list_remove_curr (handle, "FAL_USER.STRING_ID");
    da_obj_gets (handle, "FAL_COMMENT.STRING_ID", comment, MAXLEN);
    ui_put_item_col (FAL_SL_USERS, size, FAL_AT_COMMENT, comment);
    da_obj_list_remove_curr (handle, "FAL_COMMENT.STRING_ID");
    size++;
}

/* Now we have gathered all users with restricted SAM access. Go ahead
 * and show the selection list.
 */
ui_normal (FAL_SL_USERS);
da_obj_destroy (&handle);
da_obj_destroy (&all_handle);

/* If there are no users with restricted privileges, display an error
 * message and exit.
 */
if (size == 1)
{
    ui_msg_err (FAL_ERR_EDIT_NO_PUSERS);
    return (FAL_INVALID);
}

/* If there is a current user defined, select it in the list.
 */
ui_get_status (FAL_STATUS_USER, buffer);
if (strcmp (buffer, FAL_NONE) != 0)
    /* It's OK if the user doesn't have restricted access -- this
     * call silently fails and the first user on the list is selected.
     */
    ui_sel_item_name (FAL_SL_USERS, buffer, UILIB_SET);

return(OKAY);
} /* fal_remp_se */
```

```
/**************************** Begin-Specification *****************************
*
* Module: fal_save_edit_se
*
* Author: Tammy Heiserman
*
* Description: Screen entry function for the Save Restricted Access for
*              User and Load User task dialogs in the Restricted SAM
*              Builder.  This function retrieves all users on the system
*              and displays them in the selection list.  It marks the ones
*              that already have restricted access to SAM.
*
* Parameters: dib_name - String containing the name of the DiB.
*             context - Reserved for future use.
*
* Globals: none
*
* Returns: int - 0 if screen entry succeeds, otherwise 1
***************************** End-Specification ****************************/
FUNCTION int fal_save_edit_se(dib_name, context)
char    *dib_name;
int     context;
{
    object_ptr  handle = (object_ptr) NULL;
    object_ptr  all_handle = (object_ptr) NULL;
    int         size = 1;
    int         psize;
    int         rc;
    int         rc2;
    int         i;
    char        buffer[MAXLEN];
    char        buffer2[MAXLEN];
    char        name[MAXLEN];
    char        login[MAXLEN];
    char        plogin[MAXLEN];
    char        comment[MAXLEN];


#ifdef lint
    /* These parameters are not used.  This makes lint happy.
     */
    dib_name = dib_name;
    context = context;
#endif

    /* Get the list of promoted users on the system.  This will be used
     * for one of the columns in the selection list.
     */
    samlog (SAMLOG_VERBOSE, FAL_LOGV_GET_PUSERS);
    da_handle_create (&handle);
    tmgr_exec (FAL_GET_PUSERS, handle, 0);
    err_all_handler (&handle);

    /* Get a list of all users on the system.
     */
    samlog (SAMLOG_VERBOSE, FAL_LOGV_GET_USERS);
    da_handle_create (&all_handle);
    tmgr_exec (UG_GET_USERS, all_handle, 0);
    err_all_handler (&all_handle);

    /* Now walk through all users on all_handle and display them
     * in the list.  If the user also appears on handle, then the
     * user already has restricted access to SAM.
     */
    ui_invisible (FAL_SL_USERS);
    for (rc = da_obj_set_list_first (all_handle, STRING_DATA);
```

```
      rc == OKAY;
      rc = da_obj_set_list_next (all_handle, STRING_DATA))
   {
      da_obj_gets (all_handle, STRING_DATA, buffer, MAXLEN);
      strcpy (login, strtok (buffer, " "));
      strcpy (name, &buffer[10]);

      /* Make sure we don't display the "root" user.
       */
      if (strcmp (login, "root") == 0)
          continue;

      /* Now see if this user is restricted.  If login matches a login
       * on handle.  If so, then this user already has restriced access.
       */
      da_obj_list_size (handle, "FAL_USER.STRING_ID", &psize);
      if (psize > 0)
      {
          da_obj_set_list_first (handle, "FAL_USER.STRING_ID");
          da_obj_set_list_first (handle, "FAL_COMMENT.STRING_ID");
          for (i=1; i<=psize; i++)
          {
              da_obj_gets (handle, "FAL_USER.STRING_ID", plogin, MAXLEN);
              rc2 = strcmp (plogin, login);
              if (rc2 == 0)
              {
                  /* This user has restricted access!
                   */
                  ui_put_item_col (FAL_SL_USERS, size, FAL_AT_RESTRICTED,
                                   FAL_YES);
                  da_obj_list_remove_curr (handle, "FAL_USER.STRING_ID");
                  da_obj_gets (handle, "FAL_COMMENT.STRING_ID", comment,
                               MAXLEN);
                  ui_put_item_col (FAL_SL_USERS, size, FAL_AT_COMMENT,
                                   comment);
                  da_obj_list_remove_curr (handle, "FAL_COMMENT.STRING_ID");
                  break;
              }
              else if (rc2 < 0)
              {
                  /* This item needs to be displayed before the one
                   * we are looking for.  It is an NIS login that does
                   * not exist in /etc/passwd.
                   */
                  ui_put_item_col (FAL_SL_USERS, size, FAL_AT_LOGIN, plogin);
                  ui_put_item_col (FAL_SL_USERS, size, FAL_AT_RESTRICTED,
                                   FAL_YES);
                  ui_put_item_col (FAL_SL_USERS, size, FAL_AT_NAME, "");

                  da_obj_list_remove_curr (handle, "FAL_USER.STRING_ID");
                  da_obj_gets (handle, "FAL_COMMENT.STRING_ID", comment,
                               MAXLEN);
                  ui_put_item_col (FAL_SL_USERS, size, FAL_AT_COMMENT,
                                   comment);
                  da_obj_list_remove_curr (handle, "FAL_COMMENT.STRING_ID");
                  size++;
              }
              else
                  /* There are more privileged users, but they all come
                   * alphabetically after the user we are looking for.
                   */
                  break;
          }
      }

      ui_put_item_col (FAL_SL_USERS, size, FAL_AT_LOGIN, login);
      ui_put_item_col (FAL_SL_USERS, size, FAL_AT_NAME, name);
      ui_get_item_col (FAL_SL_USERS, size, FAL_AT_RESTRICTED, buffer2);
      if (strlen (buffer2) == 0)
          ui_put_item_col (FAL_SL_USERS, size, FAL_AT_RESTRICTED, FAL_NO);

      size++;
   }

   /* Display any remaining users that have SAM privileges but don't appear
    * in /etc/passwd.
    */
   da_obj_list_size (handle, "FAL_USER.STRING_ID", &psize);
   for (i=1; i<=psize; i++)
   {
      da_obj_gets (handle, "FAL_USER.STRING_ID", plogin, MAXLEN);
      ui_put_item_col (FAL_SL_USERS, size, FAL_AT_LOGIN, plogin);
      ui_put_item_col (FAL_SL_USERS, size, FAL_AT_RESTRICTED, FAL_YES);
      ui_put_item_col (FAL_SL_USERS, size, FAL_AT_NAME, "");

      da_obj_list_remove_curr (handle, "FAL_USER.STRING_ID");
      da_obj_gets (handle, "FAL_COMMENT.STRING_ID", comment, MAXLEN);
      ui_put_item_col (FAL_SL_USERS, size, FAL_AT_COMMENT, comment);
      da_obj_list_remove_curr (handle, "FAL_COMMENT.STRING_ID");
      size++;
   }

   /* Now we have gathered all users with restricted SAM access.  Go ahead
    * and show the selection list.
    */
   ui_normal (FAL_SL_USERS);
   da_obj_destroy (&handle);
   da_obj_destroy (&all_handle);

   /* If there is a current user defined, select it in the list.
    */
   ui_get_status (FAL_STATUS_USER, buffer);
   if (strcmp (buffer, FAL_NONE) != 0)
      ui_sel_item_name (FAL_SL_USERS, buffer, UILIB_SET);

   /* If we are on the save screen, store the comment column in the
    * comment text edit
    */
   ui_first_sel (FAL_SL_USERS);
   if (strcmp (dib_name, FAL_SAVE_TD) == 0)
   {
      ui_get_sel_item_col (FAL_SL_USERS, FAL_AT_COMMENT, buffer);
      ui_put_data (FAL_SAVE_TE_COMMENT, buffer);
   }

   /* Finally, return the cursor to the selection list.
    */
   ui_go_field (FAL_SL_USERS);

   return(OKAY);
} /* fal_save_edit_se */


/**************************** Begin-Specification ****************************
*
* Module: fal_opt_logopts_se
*
* Author: Bill Gates
*
* Description: Screen entry function for the Logging Options item in the
*              functional area launcher.  This function retrieves the
*              current logging options and displays them on the screen.
```

```
*
* Parameters: dib_name - String containing the name of the DiB.
*             context - Reserved for future use.
*
* Globals: none
*
* Returns: int - 0 if screen entry succeeds, otherwise 1
****************************** End-Specification *****************************/
FUNCTION int fal_opt_logopts_se(dib_name, context)
char    *dib_name;
int     context;
{
    char *ret;
    char autostart[5];
    char trimlog[5];
    int maxsize;
    int rc;


#ifdef lint
    /* These parameters are not used.  This makes lint happy.
     */
    dib_name = dib_name;
    context = context;
#endif

    /* Get current values of log options from preferences file.  If any of */
    /* these parms aren't found, then their defaults are used for the DiB  */
    /* and are entered into the preferences file as well.                  */

    if((ret = get_sam_preference("log_autostart_viewer")) == (char *)NULL) {
       rc = modify_sam_preference("log_autostart_viewer", "no");
       if(rc == PREF_MALLOCFAIL)
          return(UILIB_FAILURE);
       strcpy(autostart, "no");
    } else
       strcpy(autostart, ret);

    if((ret = get_sam_preference("log_trim_logfile")) == (char *)NULL) {
       rc = modify_sam_preference("log_trim_logfile", "yes");
       if(rc == PREF_MALLOCFAIL)
          return(UILIB_FAILURE);
       strcpy(trimlog, "yes");
    } else
       strcpy(trimlog, ret);

    if((ret = get_sam_preference("log_max_logfile_size")) == (char *)NULL) {
       rc = modify_sam_preference("log_max_logfile_size", "200000");
       if(rc == PREF_MALLOCFAIL)
          return(UILIB_FAILURE);
       maxsize = 200000;
    } else
       maxsize = atoi(ret);

    /* Initialize the initial trimming selection; if no trimming is desired, */
    /* then make the logfile size TE invisible.  If trimming is enabled, then*/
    /* initialize the size TE to the requested max size.                     */

    if(strcmp(trimlog, "yes") == 0) {
       ui_sel_item("fal_logopts_sl_trimwhen", 1, UILIB_SET);
       ui_put_data_value("fal_logopts_te_size", maxsize);
    } else {
       ui_sel_item("fal_logopts_sl_trimwhen", 2, UILIB_SET);
       ui_invisible("fal_logopts_te_size");
    }

    /* Initialize the "start logfile viewer" toggle. */

    if(strcmp(autostart, "yes") == 0)
       ui_sel_data("fal_logopts_tg_vlog", UILIB_SET);
    else
       ui_sel_data("fal_logopts_tg_vlog", UILIB_CLR);

    return(UILIB_SUCCESS);
} /* fal_opt_logopts_se */


/*************************** Begin-Specification ****************************
*
* Module: fal_modify_group_se
*
* Author: Tammy Heiserman
*
* Description: Screen entry function for the Modify Custom Group action.
*              This function fills in the fields on the task dialog with
*              the selected item's information.
*
* Parameters: dib_name - String containing the name of the DiB.
*             context - Reserved for future use.
*
* Globals: none
*
* Returns: int - 0 if screen entry succeeds, otherwise 1
****************************** End-Specification ****************************/
FUNCTION int fal_modify_group_se(dib_name, context)
char    *dib_name;
int     context;
{
    fal_area_tree_ptr   atp;


#ifdef lint
    /* These parameters are not used.  This makes lint happy.
     */
    dib_name = dib_name;
    context = context;
#endif

    (void) ui_first_object();
    ui_get_object_field(FAL_AT_KEY, (char *) &atp);
    if (atp->data.help)
        ui_put_data(FAL_TE_HELP, atp->data.help);

    if (atp->data.icon_path)
        ui_put_data(FAL_TE_ICON, atp->data.icon_path);

    return (OKAY);
} /* fal_modify_group_se */


/*************************** Begin-Specification ****************************
*
* Module: fal_modify_utility_se
*
* Author: Tammy Heiserman
*
* Description: Screen entry function for the Modify Custom Utility action.
*              This function fills in the fields on the task dialog with
*              the selected item's information.
*
* Parameters: dib_name - String containing the name of the DiB.
*             context - Reserved for future use.
```

```
/* @(#) $Header: fal_ui_utils.c,v 72.12.1.1 95/04/07 12:01:56 hmgr Exp $     */

/*****************/
/* include files */
/*****************/
#include <uilib.h>
#include <string.h>
#include <stdlib.h>
#include "sam.h"
#include "da_yoda.h"
#include "fal_defs.h"
#include "fal_errmsg.h"

/*************************************/
/* globals not defined in fal_xmit */
/*************************************/
extern fal_area_tree_ptr fal_areas;

/*********************************/
/* functions used in this file */
/*********************************/
void fal_change_child_status();
void fal_check_parent_status();
void fal_store_parent_info();
void fal_destroy_menuitem();
void fal_save_enabled_items();
void fal_enable_control_file();
int fal_check_promote_status();
int fal_check_pre_conditions();

static void fal_enable_control_file_err();

/**************************** Begin-Specification *****************************
 *
 * Module: fal_change_child_status
 *
 * Author: Tammy Heiserman
 *
 * Description: Changes the status of all menu items in a group to the requested
 *              status.  This routine is recursive -- if a menu item is a
 *              group, then this routine is called again to change the status
 *              of the group's children.
 *
 *              Note that no inaccessable menu items are changed.
 *              We silently fail to change them since the user has
 *              already been told that only accessable menu items will
 *              be changed.
 *
 * Parameters:  child           pointer to the first child to change
 *              new_status      the new status of the children
 *
 * Globals: none
 *
 * Returns: int - returns the status for the parent of child
 ******************************* End-Specification ****************************/
FUNCTION void fal_change_child_status(child, new_status)
fal_area_tree_ptr       child;
int                     new_status;
{
    while (child != (fal_area_tree_ptr) NULL)
    {
        if (child->data.status != FAL_INACCESS_NUM)
        {
            if (child->data.group == 0)
                child->data.status = new_status;
            else
            {
                fal_change_child_status (child->first_child, new_status);
                child->data.status = new_status;
            }
        }

        child = child->sibling;
    }
    return;
} /* fal_change_child_status */

/*************************** Begin-Specification *****************************
 *
 * Module: fal_check_promote_status
 *
 * Author: Tammy Heiserman
 *
 * Description: Checks the promote_access status of all menu items in a group.
 *              All items having a promote_access of false are set to an access
 *              state of inaccessable.  Groups are only marked inaccessable
 *              if all items within the group are inaccessable.
 *
 *              This routine is recursive -- if a menu item is a group, then
 *              this routine is called again to check the promote_access of
 *              the group's children.
 *
 *               NOTE:  This routine should only be called from the top of
 *                      the hierarchy.  Otherwise, the child's parent groups
 *                      may have the incorrect status.
 *
 * Parameters:  child           pointer to the first child to check
 *
 * Globals: none
 *
 * Returns: int -- returns the new status for the parent group
 ***************************** End-Specification *****************************/
FUNCTION int fal_check_promote_status(child)
fal_area_tree_ptr       child;
{
    boolean     parent_inaccess = TRUE;
    int         parent_cur_status;


    /* Keep track of the parent's current status.  If it doesn't
     * change, we will return this value.
     */
    parent_cur_status = child->parent->data.status;

    while (child != (fal_area_tree_ptr) NULL)
    {
        /* Determine the status of this child item.
         */
        if (child->data.group == 0)
        {
            if (child->data.promote_access == 0)
                child->data.status = FAL_INACCESS_NUM;
        }
        else
            child->data.status = fal_check_promote_status (child->first_child);

        /* Now determine if the parent is still inaccessable.  If not,
         * set the flag to false.
         */
        if ((parent_inaccess == TRUE) &&
            (child->data.status != FAL_INACCESS_NUM))
```

```
            parent_inaccess = FALSE;

        child = child->sibling;
    }

    /* Now return the status of the parent.  It remains the same unless
     * all children are inaccessable.
     */
    if (parent_inaccess == TRUE)
        return (FAL_INACCESS_NUM);

    return (parent_cur_status);
} /* fal_check_promote_status */

/**************************** Begin-Specification *****************************
 *
 * Module: fal_check_pre_conditions
 *
 * Author: Tammy Heiserman
 *
 * Description: Checks the pre-conditions of all menu items in SAM.
 *              If an item has a pre-condition, it is executed.  If
 *              the pre-condition command returns non-zero, the item
 *              is not displayed in SAM.  If all children of a non-custom
 *              group have pre-conditions that are not met, then the
 *              non-custom group is not displayed either.
 *
 *              This routine is recursive -- if a menu item is a group, then
 *              this routine is called again to check the pre-conditions of
 *              the group's children.
 *
 *               NOTE:  This routine should only be called from the top of
 *                      the hierarchy.  Otherwise, the child's parent groups
 *                      may have the incorrect status.
 *
 * Parameters:  child           pointer to the first child to check
 *
 * Globals: none
 *
 * Returns: void -- returns the pre-condition of the children
******************************* End-Specification *****************************/
FUNCTION int fal_check_pre_conditions(child)
fal_area_tree_ptr       child;
{
    boolean     parent_access = FAL_NOT_ALLOWED;
    int         rc;
    object_ptr  handle = (object_ptr) NULL;


    while (child != (fal_area_tree_ptr) NULL)
    {
        /* Determine if this is a group or a child.
         */
        if (child->data.group == 0)
        {
            /* This is child -- execute the child's pre-condition, if
             * it exists.
             */
            if (strlen (child->data.allow_cmd) != 0)
            {
                    da_handle_create_and_puts(&handle, "FAL_COMMAND.STRING_ID",
                                              child->data.allow_cmd);
                    da_handle_create_and_puts(&handle, "FAL_APP.STRING_ID",
                                              child->data.label);
                    tmgr_exec (FAL_EXEC_PRE_CONDITION, handle, 0);
                    rc = err_handler (handle);
                    if (rc != 0)
                    {
                        /* Skip this command -- don't display it on the OLE.
                         */
                        child->data.allow_cmd_results = FAL_NOT_ALLOWED;
                        samlog (SAMLOG_VERBOSE, FAL_LOGV_PRE_CONDITION_FAIL,
                                child->data.label);
                    }
                    else
                        child->data.allow_cmd_results = FAL_ALLOWED;

                    da_handle_destroy (&handle);
            }
            else
                /* This child doesn't have a pre-condition, so allow it.
                 */
                child->data.allow_cmd_results = FAL_ALLOWED;
        }
        else
        {
            /* This is a group.  Check the pre-conditions of all children.
             * If this is a non-custom utility group, disable it if the
             * children are all disabled.  Custom groups are always allowed.
             */
            rc = fal_check_pre_conditions (child->first_child);
            if (child->data.type != CU_TYPE)
                child->data.allow_cmd_results = rc;
            else
                child->data.allow_cmd_results = FAL_ALLOWED;
        }

        /* Now determine if the parent is inaccessable because all children
         * are inaccessible.
         */
        if ((parent_access == FAL_NOT_ALLOWED) &&
            (child->data.allow_cmd_results != FAL_NOT_ALLOWED))
            parent_access = FAL_ALLOWED;

        child = child->sibling;
    }

    /* Now return the status of the parent.  It remains the same unless
     * all children are inaccessable.
     */
    return (parent_access);
} /* fal_check_pre_conditions */


/**************************** Begin-Specification *****************************
 *
 * Module: fal_check_parent_status
 *
 * Author: Tammy Heiserman
 *
 * Description: Changes the status of the parent item to match the
 *              status of its children.  If all children are enabled,
 *              the parent is enabled.  If all children are disabled,
 *              the parent is disabled.  If some children are enabled
 *              and some are disabled, the parent's status is set to
 *              partial.  If the parent status changes, then this routine
 *              is called recursively to check the status of the parent's
 *              parent.
 *
 * Parameters:  parent          pointer to the parent to change
 *
```

```
* Globals: none
*
* Returns: int - always returns OKAY
****************************** End-Specification ****************************/
FUNCTION void fal_check_parent_status(parent)
fal_area_tree_ptr       parent;
{
    fal_area_tree_ptr   child;
    boolean             parent_status_known = FALSE;
    int                 parent_status = 100;

    /* Look at the status of all the children to determine the status
     * of the parent.  At the end of this loop, parent_status will
     * be set to what the parent's status should be.
     */
    child = parent->first_child;
    while ((child != (fal_area_tree_ptr) NULL) &&(parent_status_known == FALSE))
    {
        if (parent_status == 100)
            parent_status = child->data.status;

        if ((child->data.status != FAL_INACCESS_NUM) &&
            (parent_status != child->data.status))
        {
            /* This parent has both enabled & disabled children.  Set
             * the parent status to partial.
             */
            parent_status = FAL_PARTIAL_NUM;
            parent_status_known = TRUE;
        }
        child = child->sibling;
    }

    /* Now determine if the parent's status needs to be changed.
     * If it does, we need to check the parent's parent status also
     * because it may have changed.
     */
    if (parent->data.status != parent_status)
    {
        /* We need to change the parent's status and check the
         * parent's parent status.
         */
        parent->data.status = parent_status;
        if (parent->parent != (fal_area_tree_ptr) NULL)
            fal_check_parent_status (parent->parent);
    }

    return;
} /* fal_check_parent_status */

/**************************** Begin-Specification *****************************
*
* Module: fal_store_parent_info
*
* Author: Tammy Heiserman
*
* Description: This routine recursively walks up the list of parent
*              groups and stores the label in a string on the
*              handle.  We need this information when adding new
*              utilities and/or groups so we know where to add the
*              entries in the menu hierarchy.  The strings are added
*              to the handle beginning with the top-most label.
*
* Parameters: handle            handle that contains the list of strings
*
*             parent            pointer to the parent whose information
*                               needs to be stored on the handle
*
* Globals: none
*
* Returns: void - returns nothing
****************************** End-Specification ****************************/
FUNCTION void fal_store_parent_info(handle, parent_ptr)
object_ptr              handle;
fal_area_tree_ptr       parent_ptr;
{


    /* Check if we are at the top level.  If not recursively call this
     * function until we are at the top level.
     */
    if (parent_ptr->parent->data.label != (char *) NULL)
        fal_store_parent_info(handle, parent_ptr->parent);

    /* Now add the label information to the handle and return.
     */
    da_obj_puts (handle, STRING_DATA, parent_ptr->data.label);
    da_obj_set_list_next (handle, STRING_DATA);

    return;
} /* fal_store_parent_info */

/**************************** Begin-Specification *****************************
*
* Module: fal_destroy_menuitem
*
* Author: Tammy Heiserman
*
* Description: This routine destroys the menuitem in the FAL
*              data structures.
*
* Parameters: atp               pointer to the item to be destroyed
*
* Globals: none
*
* Returns: void - returns nothing
****************************** End-Specification ****************************/
FUNCTION void fal_destroy_menuitem(atp)
fal_area_tree_ptr       atp;
{
    fal_area_tree_ptr   prev;

    /* Free all character pointers.  All non-pointer items in atp->data
     * are freed when atp is freed.
     */
    if (atp->data.source) free((void *) atp->data.source);
    if (atp->data.label) free((void *) atp->data.label);
    if (atp->data.cmd) free((void *) atp->data.cmd);
    if (atp->data.allow_cmd) free((void *) atp->data.allow_cmd);
    if (atp->data.filename) free((void *) atp->data.filename);
    if (atp->data.help) free((void *) atp->data.help);

    /* Clean up the tree that lists the functional areas.  We need to
     * remove the selected item from its parent's list of children.  We
     * may also need to reset the parent's first_child or last_child if
     * the selected item is one of these.
     */
    if (atp->parent)
    {
        prev = atp->parent->first_child;
```

```
        if ((prev == atp) && (atp->sibling == NULL))
            /* The item to be removed is the only child of the
             * parent.
             */
            atp->parent->first_child = NULL;
        else
        {
            /* Find the selected item in the list of children for
             * the parent.  We need to know the previous item so
             * we can reset the list of children correctly.
             */
            while (prev && (prev->sibling != atp))
                prev = prev->sibling;

            /* Skip the selected item in the list of siblings.
             */
            if (prev && (prev->sibling == atp))
                prev->sibling = atp->sibling;

            /* Reset the parent's first_child pointer to the next
             * child if the selected item was the first_child.
             */
            if (atp->parent->first_child == atp)
                atp->parent->first_child = atp->sibling;

            /* Reset the parent's last_child pointer to the previous
             * child if the selected item was the last_child.
             */
            if (atp->parent->last_child == atp)
                atp->parent->last_child = prev;
        }
    }

    if (fal_areas == atp)
        fal_areas = NULL;
    free((void *) atp);

    return;
} /* fal_destroy_menuitem */

/*************************** Begin-Specification ****************************
*
* Module: fal_save_enabled_items
*
* Author: Tammy Heiserman
*
* Description: This routine walks this SAM menu hierarchy looking for
*              enabled groups/applications.  For each item it finds,
*              it creates an entry in the list of FAL_CONTROLs on
*              the handle.  This entry contains the following information:
*
*               *)  The label of the enabled item
*               *)  A string of "->" separated parents of the item
*               *)  The name of the FAL description file for this item
*
* Parameters: handle           contains a list of FAL_CONTROLs
*             item_ptr         ptr to the item that needs to be checked
*             parent_labels    string containing "->" separated list of
*                              any parents to item_ptr
*
* Globals: none
*
* Returns: void - returns nothing
****************************** End-Specification *****************************/
FUNCTION void fal_save_enabled_items(handle, item_ptr, parent_labels)
object_ptr            handle;
fal_area_tree_ptr     item_ptr;
char                  *parent_labels;
{
    char       new_labels[MAXLEN];

    /* Check the state of this item.  If it is disabled, then we don't
     * need to add it or any of its children to the list.
     */
    if (item_ptr->data.status == FAL_ENABLE_NUM)
    {
        /* This item needs to be added to the list.  We are already at
         * the right place in the list.  It is not necessary to check
         * any child items.
         */
        da_obj_puts (handle, FAL_CONTROL_LABEL, item_ptr->data.label);
        da_obj_puts (handle, FAL_CONTROL_PARENTS, parent_labels);
        da_obj_puts (handle, FAL_CONTROL_DESC_FILE, item_ptr->data.filename);
        da_obj_set_list_next (handle, FAL_CONTROL);
    }
    else if (item_ptr->data.status == FAL_PARTIAL_NUM)
    {
        /* This item does not need to be added to the list.  However,
         * one or more of its children do.  Attach the label of this
         * item to parent_labels and start checking the children.
         */
        strcpy (new_labels, parent_labels);
        if (strlen (new_labels) > 0)
            strcat (new_labels, "->");
        strcat (new_labels, item_ptr->data.label);
        fal_save_enabled_items (handle, item_ptr->first_child, new_labels);
    }

    /* This item and all of its children have been searched.  Now search
     * the next item, if it exists.
     */
    if (item_ptr->sibling != (fal_area_tree_ptr) NULL)
        fal_save_enabled_items (handle, item_ptr->sibling, parent_labels);
    return;
} /* fal_save_enabled_items */

/*************************** Begin-Specification ****************************
*
* Module: fal_enable_control_file
*
* Author: Tammy Heiserman
*
* Description: This routine takes the list of FAL_CONTROL items on the
*              handle, searches the menu hierarchy data structure for these
*              items and enables them.  It then sets the status of their
*              parent groups appropriately.
*
*              If any problems are encountered while searching for an item,
*              then the modification time of the FAL description file is
*              compared against the saved modification time in the
*              FAL_CONTROL object.  If the file has been modified since
*              the control file was saved, then a warning message
*              is given.
*
* Parameters:   handle  -- Contains a list of FAL_CONTROL objects.
*                          Each object represents one item to be enabled
*                          on the FAL.
*               is_rsb  -- Indicates whether we are running the Restricted
*                          SAM Builder or the FAL.  We handle errors
```

```
 *                          differently depending on which version we
 *                          are running.
 *
 * Globals: None
 *
 * Returns: void
****************************** End-Specification ****************************/
FUNCTION void fal_enable_control_file(handle, is_rsb)
object_ptr              handle;
int                     is_rsb;
{
    int                 rc;
    int                 parent_end;
    char                control_label[MAXLEN];
    char                control_parents[MAXLEN];
    char                buffer[MAXLEN];
    char                parent[MAXLEN];
    fal_area_tree_ptr   atp;
    boolean             found;
    boolean             parent_ok;


    /* Walk the list of FAL_CONTROL objects on the handle.  For each
     * item, locate it in the menu hierarchy data structure.
     */
    for (rc = da_obj_set_list_first (handle, FAL_CONTROL);
         rc == OKAY;
         rc = da_obj_set_list_next (handle, FAL_CONTROL))
    {
        parent_ok = TRUE;
        found = FALSE;
        atp = fal_areas->first_child;
        da_obj_gets (handle, FAL_CONTROL_PARENTS, control_parents, MAXLEN);
        da_obj_gets (handle, FAL_CONTROL_LABEL, control_label, MAXLEN);

        while (strlen (control_parents) > 0)
        {
            /* There are still  parents we must find in the SAM menu hierarchy.
             */
            strcpy (buffer, strstr (control_parents, "->"));
            if (strlen (buffer) > 0)
            {
                /* Get the parent we are searching for and reset control_parents
                 * accordingly.
                 */
                parent_end = strlen (control_parents) - strlen (buffer);
                strncpy (parent, control_parents, (size_t) parent_end);
                parent[parent_end] = '\0';
                strcpy (control_parents, &buffer[2]);
            }
            else
            {
                /* There is only one parent we are searching for.  Reset
                 * control_parents to an empty string.
                 */
                strcpy (parent, control_parents);
                strcpy (control_parents, "");
            }

            /* Now search atp for this parent.
             */
            while ((atp != (fal_area_tree_ptr) NULL) && (found == FALSE))
            {
                if (strcmp (atp->data.label, parent) == 0)
                    found = TRUE;
                else
                    atp = atp->sibling;
            }

            if (found == TRUE)
            {
                /* We found the parent but we didn't find the item.
                 * Reset found and search for either the next parent
                 * (if control_parents is not NULL) or the item.
                 */
                found = FALSE;
                atp = atp->first_child;
            }
            else
            {
                /* If we get to here, we didn't find the item in the file.
                 * See if the FAL description file has changed.  If so, issue
                 * the appropriate error message.
                 */
                fal_enable_control_file_err (handle, is_rsb);

                /* No sense in checking any other parents, so zero
                 * control_parents.  Also set a flag so we can skip
                 * this item when we exit the while loop.
                 */
                parent_ok = FALSE;
                strcpy (control_parents, "");
            }
        }

        /* If we had trouble finding any parents, skip this item.
         */
        if (parent_ok == FALSE)
            continue;

        /* atp is now pointing to the first child in the group the item
         * we are looking for belongs to.
         */
        while ((atp != (fal_area_tree_ptr) NULL) && (found == FALSE))
        {
            if (strcmp (atp->data.label, control_label) == 0)
                found = TRUE;
            else
                atp = atp->sibling;
        }

        if (found == TRUE)
        {
            /* We found the item we need to enable.  Call the routine
             * that will enable all children of this item.
             */
            if ((atp->data.group == 1) &&
                (atp->first_child != (fal_area_tree_ptr) NULL))
                fal_change_child_status (atp->first_child, FAL_ENABLE_NUM);

            /* Change the status of this item.
             */
            atp->data.status = FAL_ENABLE_NUM;

            /* Now check & change the status of any parent items.
             */
            if (atp->parent != (fal_area_tree_ptr) NULL)
                fal_check_parent_status (atp->parent);
        }
        else
            /* If we get to here, we didn't find the item in the file.
             * See if the FAL description file has changed.  If so, issue
```

```
            * the appropriate warning.
            */
           fal_enable_control_file_err (handle, is_rsb);
    }
    return;
} /* fal_enable_control_file */


/***************************** Begin-Specification *****************************
*
* Module: fal_enable_control_file_err
*
* Author: Tammy Heiserman
*
* Description: This routine handles the errors that are encountered in
*              fal_enable_control_file.
*
* Parameters:   handle  -- Contains a list of FAL_CONTROL objects.
*                          Each object represents one item to be enabled
*                          on the FAL.  The item we had trouble with is
*                          the current object.
*               is_rsb  -- Indicates whether we are running the Restricted
*                          SAM Builder or the FAL.  We handle errors
*                          differently depending on which version we
*                          are running.
*
* Globals: None
*
* Returns: void
******************************* End-Specification *****************************/
FUNCTION static void fal_enable_control_file_err(handle, is_rsb)
object_ptr              handle;
int                     is_rsb;
{
    char                sam_area[MAXLEN];
    char                buffer[MAXLEN];
    char                modtime[MAXLEN];
    char                file_modtime[MAXLEN];
    char                descfile[MAXLEN];
    object_ptr          thandle = (object_ptr) NULL;


    /* If we get to here, we didn't find the item in the file.
     * Get the information we need off the handle to handle the error.
     */
    da_obj_gets (handle, FAL_CONTROL_DESC_FILE, descfile, MAXLEN);
    da_obj_gets (handle, FAL_CONTROL_MODTIME, modtime, MAXLEN);
    da_obj_gets (handle, FAL_CONTROL_PARENTS, sam_area, MAXLEN);
    da_obj_gets (handle, FAL_CONTROL_LABEL, buffer, MAXLEN);
    if (strlen (sam_area) > 0)
    {
        strcat (sam_area, "->");
        strcat (sam_area, buffer);
    }
    else
        strcpy (sam_area, buffer);

    /* Now retrieve the modification time on the FAL description file.
     * The message FAL_GET_MODTIME does not put any errors on the handle,
     * so there is no need to call the error handler.
     */
    da_handle_create_and_puts (&thandle, STRING_ID, descfile);
    samlog (SAMLOG_VERBOSE, FAL_LOGV_MODTIME, descfile);
    tmgr_exec (FAL_GET_MODTIME, thandle, 0);

    /* Compare the modification time of the description file & to the
     * saved modification time.
     */
    da_obj_gets (thandle, STRING_ID, file_modtime, MAXLEN);
    da_obj_destroy (&thandle);
    if (atol (modtime) < atol (file_modtime))
    {
        /* The FAL description file has been updated since
         * the control file was saved.  This may explain
         * why we can't find the area in SAM.
         */
        if (is_rsb)
        {
            samlog (SAMLOG_NOTE, FAL_INFO_RSB_DESC_UPDATED, sam_area, descfile);
            ui_msg_info (FAL_INFO_RSB_DESC_UPDATED, sam_area, descfile);
        }
        else
        {
            samlog (SAMLOG_NOTE, FAL_INFO_FAL_DESC_UPDATED, sam_area, descfile);
            ui_msg_info (FAL_INFO_FAL_DESC_UPDATED, sam_area, descfile);
        }
    }
    else
    {
        /* We can't find an item in the SAM hierarchy
         * and we aren't sure why.  The FAL description file
         * may have been removed from the system.  Display
         * a generic error message.
         */
        samlog (SAMLOG_NOTE, FAL_INFO_COULDNT_FIND_AREA, sam_area, descfile);
        ui_msg_info (FAL_INFO_COULDNT_FIND_AREA, sam_area, descfile);
    }

    return;
} /* fal_enable_control_file_err */
```

APPENDIX IV

```
/* @(#) $Header: fal_xmit.c,v 72.63 95/02/17 13:54:48 hmgr Exp $     */

/******************/
/* include files */
/******************/
#include <uilib.h>
#include <string.h>
#include <stdlib.h>
#include <unistd.h>
#include "sam.h"
#include "da_yoda.h"
#include "sam_pref.h"
#include "fal_defs.h"
#include "fal_errmsg.h"

/**************************************/
/* globals not defined in fal_xmit */
/**************************************/
extern fal_area_tree_ptr fal_areas;
extern fal_area_tree_ptr fal_curr_parent;
extern int Sam_Id;

extern char *fal_strdup();
extern void fal_change_child_status();
extern void fal_check_parent_status();
extern void fal_store_parent_info();
extern void fal_destroy_menuitem();
extern void fal_save_enabled_items();
extern void ignore_cmd_event();
extern void fal_enable_control_file();
extern int  sec_sam_setuids();


/**************************** Begin-Specification *****************************
*
* Module: fal_add_group_xmit
*
* Author: Tammy Heiserman
*
* Description: Adds a customer group to the SAM functional area
*              launcher.  This is a two-step process.  First, we must
*              create the *.cu entry for the new group.  Second, we
*              must update our internal data structures so the new group
*              will appear in the FAL in the existing SAM session.
*
* Parameters: NONE
*
* Globals: none
*
* Returns: int - returns OKAY if the group is successfully added.  Otherwise
*                it returns FAL_INVALID.
****************************** End-Specification *****************************/
FUNCTION int fal_add_group_xmit()
{
    char                buffer[MAXLEN];
    char                group_path[MAXLEN];
    fal_area_tree_ptr   atp;
    object_ptr          handle = (object_ptr) NULL;
    int                 rc;


    /* Create a new item in the internal data structure; also create
     * the handle that will contain the information about the new
     * item.
     */
    atp = fal_new_menuitem(fal_curr_parent);
```

```
da_handle_create_add(&handle, FAL_CU);

/* It is not necessary to add a "source" line in the sam_custom.cu file.
 * It will automatically default to a source of FAL_CUSTOM_ADDON
 * when it is read into the FAL.
 */
atp->data.source = FAL_CUSTOM_ADDON;

/* Store the label that will appear in the FAL.
 */
ui_get_data(FAL_TE_LABEL, buffer);
atp->data.label = fal_strdup(buffer);
da_obj_puts(handle, FAL_CU_LABEL, buffer);

/* Store the help file for the item.  This help is displayed when
 * the user navigates to this item in the FAL and presses F1.
 */
ui_get_data(FAL_TE_HELP, buffer);
if (strcmp("", buffer) != 0)
    atp->data.help = fal_strdup(buffer);
da_obj_puts(handle, FAL_CU_HELP, buffer);

/* Store the icon path for the item.  This icon is displayed in the
 * FAL.
 */
ui_get_data(FAL_TE_ICON, buffer);
if (buffer[0] != CHNULL)
    atp->data.icon_path = fal_strdup(buffer);
da_obj_puts(handle, FAL_CU_ICON, buffer);

/* Set the flag that indicates this item is a group.
 */
atp->data.group = 1;
da_obj_puts(handle, FAL_CU_HASSUBMENUS, "1");

/* We need to know where in the menu hierarchy to add this item.
 * Create a list of strings on the handle and store each parent
 * group label beginning at the highest level.
 *
 * If we are adding this item to SAM's top level, then there are
 * no strings added to the handle.
 */
strcpy (group_path, "");
da_handle_create_add_list (&handle, STRING_DATA);
da_obj_set_list_first (handle, STRING_DATA);
if (atp->parent->data.label != (char *) NULL)
{
    /* This group is not being added to SAM's top level -- store
     * all parent group information on the handle.
     */
    fal_store_parent_info (handle, atp->parent);
    for (rc = da_obj_set_list_first (handle, STRING_ID);
         rc == OKAY;
         rc = da_obj_set_list_next (handle, STRING_ID))
    {
        da_obj_gets (handle, STRING_ID, buffer, MAXLEN);
        strcat (group_path, buffer);
        strcat (group_path, "->");
    }
}
strcat (group_path, atp->data.label);

/* There is no allow command for custom utilities.  Set the allow
 * command results field so that the custom utility is allowed in
 * SAM.  Otherwise it will not be displayed on the FAL OLE.
 */
```

```
    atp->data.allow_cmd_results = FAL_ALLOWED;

    /* Set the type to a custom group -- this will ensure the correct
     * icon is displayed.
     */
    atp->data.type = CU_TYPE;

    /* Add the utility to sam_custom.cu.
     */
    samlog (SAMLOG_SUMMARY, FAL_LOGS_START_ADD_GROUP, group_path);
    ui_msg_progress (FAL_PROG_ADD, atp->data.label);
    tmgr_exec (FAL_ADD_CU, handle, 0);
    rc = err_handler (handle);
    if (rc == ERR_FATAL)
    {
        /* The item was not added to FAL_CUSTOM_FILE -- remove it
         * from the FAL data structures so it won't appear on SAM's
         * menu.
         */
        err_display (handle, rc);
        da_obj_destroy (&handle);
        samlog (SAMLOG_SUMMARY, FAL_LOGS_FAIL_ADD_GROUP, group_path);
        fal_destroy_menuitem (atp);
        return (FAL_INVALID);
    }
    else if (rc == ERR_NOTE)
        /* Only received a warning message, go ahead and pass it on
         * to the user.
         */
        err_display (handle, rc);

    samlog (SAMLOG_SUMMARY, FAL_LOGS_SUCC_ADD_GROUP, group_path);
    da_obj_destroy(&handle);
    return(OKAY);
} /* fal_add_group_xmit */


/**************************** Begin-Specification *****************************
*
* Module: fal_add_utility_xmit
*
* Author: Tammy Heiserman
*
* Description: Adds a customer utility to the SAM functional area
*              launcher.  This is a two-step process.  First, we must
*              create the *.cu entry for the new utility.  Second, we
*              must update our internal data structures so the new item
*              will appear in the FAL in the existing SAM session.
*
* Parameters: NONE
*
* Globals: none
*
* Returns: int - returns OKAY if the utility is successfully added.  Otherwise
*                it returns FAL_INVALID.
****************************** End-Specification *****************************/
FUNCTION int fal_add_utility_xmit()
{
    char                buffer[MAXLEN];
    char                util_path[MAXLEN];
    fal_area_tree_ptr   atp;
    object_ptr          handle = (object_ptr) NULL;
    int                 rc;


    /* Create a new item in the internal data structure; also create
     * the handle that will contain the information about the new
     * item.
     */
    atp = fal_new_menuitem(fal_curr_parent);
    da_handle_create_add(&handle, FAL_CU);

    /* It is not necessary to add a "source" line in the sam_custom.cu file.
     * It will automatically default to a source of FAL_CUSTOM_ADDON
     * when it is read into the FAL.
     */
    atp->data.source = FAL_CUSTOM_ADDON;

    /* Store the label that will appear in the FAL.
     */
    ui_get_data(FAL_TE_LABEL, buffer);
    atp->data.label = fal_strdup(buffer);
    da_obj_puts(handle, FAL_CU_LABEL, buffer);

    /* Store the help file for the item.  This help is displayed when
     * the user navigates to this item in the FAL and presses F1.
     */
    ui_get_data(FAL_TE_HELP, buffer);
    if (buffer[0] != CHNULL)
        atp->data.help = fal_strdup(buffer);
    da_obj_puts(handle, FAL_CU_HELP, buffer);

    /* Store the icon path for the item.  This is the icon displayed
     * in the FAL.
     */
    ui_get_data(FAL_TE_ICON, buffer);
    if (buffer[0] != CHNULL)
        atp->data.icon_path = fal_strdup(buffer);
    da_obj_puts(handle, FAL_CU_ICON, buffer);

    /* Store the command to be executed.
     */
    ui_get_data(FAL_TE_CMD, buffer);
    atp->data.cmd = fal_strdup(buffer);
    da_obj_puts(handle, FAL_CU_CMD, buffer);

    /* If the command should be executed by someone other than root,
     * store the user name on the handle.
     */
    if (ui_sel_item (FAL_SL_ID, 1, UILIB_TST) == FALSE)
    {
        if (ui_sel_item (FAL_SL_ID, 2, UILIB_TST) == TRUE)
        {
            atp->data.execute_as = fal_strdup(FAL__USER);
            da_obj_puts (handle, FAL_CU_EXEC_AS, FAL__USER);
        }
        else
        {
            ui_get_data (FAL_TE_ID, buffer);
            atp->data.execute_as = fal_strdup(buffer);
            da_obj_puts (handle, FAL_CU_EXEC_AS, buffer);
        }
    }

    /* Set the flag that indicates this item is a utility.
     */
    atp->data.group = 0;
    da_obj_puts(handle, FAL_CU_HASSUBMENUS, "0");

    /* Also set the terminal pause flag.
     */
    atp->data.terminal_pause = 1;
```

```
/* Since FAL_SL_GUI is a required field, we are guaranteed
 * that the user  selected either graphical, terminal, or
 * both.
 */
if (ui_sel_item(FAL_SL_GUI, 1, UILIB_TST) == 1)
{
    /* The command has a graphical user interface. Don't
     * execute the command in an hpterm.
     */
    atp->data.hpterm = 0;
    da_obj_puts(handle, FAL_CU_HPTERM, "0");
}
else
{
    /* The command does not have a graphical user interface.
     * Execute the command in an hpterm.
     */
    atp->data.hpterm = 1;
    da_obj_puts(handle, FAL_CU_HPTERM, "1");
}

if (ui_sel_item(FAL_SL_GUI, 2, UILIB_TST) == 1)
{
    /* The command has a terminal user interface.  Don't mark
     * the command as graphical only.
     */
    atp->data.gui_only = 0;
    da_obj_puts(handle, FAL_CU_GUI_ONLY, "0");
}
else
{
    /* The command has does not have a terminal user interface.  Mark
     * the command as graphical only.
     */
    atp->data.gui_only = 1;
    da_obj_puts(handle, FAL_CU_GUI_ONLY, "1");
}

/* We need to know where in the menu hierarchy to add this item.
 * Create a list of strings on the handle and store each parent
 * group beginning at the highest level.
 *
 * If we are adding this item to SAM's top level, then there are
 * no strings added to the handle.
 */
strcpy (util_path, "");
da_handle_create_add_list (&handle, STRING_DATA);
da_obj_set_list_first (handle, STRING_DATA);
if (atp->parent->data.label != (char *) NULL)
{
    /* This utility is not being added to SAM's top level -- store
     * all parent group information on the handle.
     */
    fal_store_parent_info (handle, atp->parent);
    for (rc = da_obj_set_list_first (handle, STRING_ID);
         rc == OKAY;
         rc = da_obj_set_list_next (handle, STRING_ID))
    {
        da_obj_gets (handle, STRING_ID, buffer, MAXLEN);
        strcat (util_path, buffer);
        strcat (util_path, "->");
    }
}
strcat (util_path, atp->data.label);

    /* There is no allow command for custom utilities.  Set the allow
     * command results field so that the custom utility is allowed in
     * SAM.  Otherwise it will not be displayed on the FAL OLE.
     * Also define the type to be CU_TYPE.
     */
    atp->data.allow_cmd_results = FAL_ALLOWED;
    atp->data.type = CU_TYPE;

    /* Add the utility to sam_custom.cu.
     */
    ui_msg_progress (FAL_PROG_ADD, atp->data.label);
    samlog (SAMLOG_SUMMARY, FAL_LOGS_START_ADD_UTIL, util_path);
    tmgr_exec (FAL_ADD_CU, handle, 0);
    rc = err_handler (handle);
    if (rc == ERR_FATAL)
    {
        /* The item was not added to FAL_CUSTOM_FILE -- remove it
         * from the FAL data structures so it won't appear on SAM's
         * menu.
         */
        err_display (handle, rc);
        da_obj_destroy (&handle);
        samlog (SAMLOG_SUMMARY, FAL_LOGS_FAIL_ADD_UTIL, util_path);
        fal_destroy_menuitem (atp);
        return (FAL_INVALID);
    }
    else if (rc == ERR_NOTE)
        /* Only received a warning message, go ahead and pass it on
         * to the user.
         */
        err_display (handle, rc);

    samlog (SAMLOG_SUMMARY, FAL_LOGS_SUCC_ADD_UTIL, util_path);
    da_obj_destroy(&handle);
    return(OKAY);
}

/**************************** Begin-Specification *****************************
 *
 * Module: fal_disable_xmit
 *
 * Author: Tammy Heiserman
 *
 * Description: Disables the selected application or group.  If disabling
 *              a group, all subitems in the group are disabled.  SAM
 *              confirms with the user before disabling groups.
 *
 * Parameters: NONE
 *
 * Globals: none
 *
 * Returns: int - always returns OKAY
 ****************************** End-Specification ******************************/
FUNCTION int fal_disable_xmit()
{
    int                 i;
    fal_area_tree_ptr   atp;


    /* Loop through the selected items on the OLE.
     */
    i = ui_first_object();
    while (i > 0)
    {
        ui_get_object_field(FAL_AT_KEY, (char *) &atp);
```

```
        /* If this is a group, we need to disable all subitems in the
         * group before disabling the group.
         */
        if ((atp->data.group == 1) && (atp->data.status != FAL_DISABLE_NUM) &&
            (atp->data.status != FAL_INACCESS_NUM))
            fal_change_child_status (atp->first_child, FAL_DISABLE_NUM);

        /* Disable this item and move on to the next selected item.  If
         * the selected item is an inaccessable application or group, give
         * an error message and go on to the next entry.
         */
        if (atp->data.status == FAL_INACCESS_NUM)
            ui_msg_err (FAL_ERR_NO_DISABLE_AREA, atp->data.label);
        else
            atp->data.status = FAL_DISABLE_NUM;
        i = ui_next_object();
    }

    /* The parent status may need to change as well.  Since all
     * the selected items have already been updated, we only need
     * to check if the parent status is correct.
     */
    if (atp->parent != (fal_area_tree_ptr) NULL)
        fal_check_parent_status (atp->parent);

    /* Set the changes pending status line accordingly.
     */
    ui_put_status (FAL_STATUS_CHANGES, FAL_CAP_YES);

    return(OKAY);
} /* fal_disable_xmit */


/**************************** Begin-Specification ****************************
*
* Module: fal_enable_xmit
*
* Author: Tammy Heiserman
*
* Description: Sets the selected functional areas and/or other utilities
*              to be visible.  This routine will not change the status of
*              any areas that have a promoted_access of false.  If it runs
*              into an item like this, then it displays an error message.
*              All other selected items are changed.
*
* Parameters: NONE
*
* Globals: none
*
* Returns: int - always returns OKAY
****************************** End-Specification ****************************/
FUNCTION int fal_enable_xmit()
{
    int                 i;
    fal_area_tree_ptr   atp;


    /* Loop through the selected items on the OLE.
     */
    i = ui_first_object();
    while (i > 0)
    {
        ui_get_object_field(FAL_AT_KEY, (char *) &atp);

        /* If this is a group, we need to enable all subitems in the
         * group before enabling the group.
         */
        if ((atp->data.group == 1) && (atp->data.status != FAL_ENABLE_NUM) &&
            (atp->data.status != FAL_INACCESS_NUM))
                fal_change_child_status (atp->first_child, FAL_ENABLE_NUM);

        /* Enable this item and move on to the next selected item.  If the
         * selected item is an inaccessable application or group,  give an
         * error message and go on to the next entry.
         */
        if (atp->data.status == FAL_INACCESS_NUM)
            ui_msg_err (FAL_ERR_NO_ENABLE_AREA, atp->data.label);
        else
            atp->data.status = FAL_ENABLE_NUM;
        i = ui_next_object();
    }

    /* The parent status may need to change as well.  Since all
     * the selected items have already been updated, we only need
     * to check if the parent status is correct.
     */
    if (atp->parent != (fal_area_tree_ptr) NULL)
        fal_check_parent_status (atp->parent);

    /* Set the changes pending status line accordingly.
     */
    ui_put_status (FAL_STATUS_CHANGES, FAL_CAP_YES);

    return(OKAY);
} /* fal_enable_xmit */

/**************************** Begin-Specification ****************************
*
* Module: fal_exec_xmit
*
* Author: Tammy Heiserman
*
* Description: Executes the selected functional area or other utility.
*
* Parameters: NONE
*
* Globals: none
*
* Returns: int - always returns OKAY
****************************** End-Specification ****************************/
FUNCTION int fal_exec_xmit()
{
    fal_area_tree_ptr   cur_obj;
    char                buffer[MAXLEN];
    char                user_name[MAXLEN];
    int                 changed_id = FALSE;
    int                 uid;
    int                 rc;
    object_ptr          handle = (object_ptr) NULL;


    ui_first_object();
    ui_get_object_field(FAL_AT_KEY, (char *) &cur_obj);

    /* Determine if we need to execute this application as another user.
     * If so, change our effective UID and set a flag to change it back
     * when the application is finished.
     */
    if ((strlen (cur_obj->data.execute_as) > 0) &&
        (strcmp (cur_obj->data.execute_as, FAL_ROOT) != 0))
```

```
{
    if (strcmp (cur_obj->data.execute_as, FAL__USER) == 0)
    {
        /* Use the effective user id of the restricted user.
         */
        strcpy (user_name, sam_get_restricted_user());
        if (strlen (user_name) > 0)
            changed_id = TRUE;
    }
    else
    {
        /* Get the effective UID of the user defined as execute_as.
         */
        strcpy (user_name, cur_obj->data.execute_as);
        changed_id = TRUE;
    }

    if (changed_id == TRUE)
    {
        /* Get the UID of "user_name"
         */
        da_handle_create_and_puts (&handle, "FAL_USER_NAME.STRING_ID",
                                   user_name);
        da_handle_create_and_puts (&handle, "FAL_USER_ID.STRING_ID", "");
        rc = tmgr_exec (FAL_GET_UID, handle, 0);
        da_obj_gets (handle, "FAL_USER_ID.STRING_ID", buffer, MAXLEN);
        da_handle_destroy (&handle);
        if ((rc != 0) || (strlen (buffer) == 0))
        {
            /* Failed to get the UID of the user.  Display an
             * error message and exit.
             */
            ui_msg_err (FAL_ERR_GET_UID, user_name);
            return (FAL_INVALID);
        }

        /* Change the effective user id to the specified user.
         */
        uid = (uid_t) atoi (buffer);
        sec_sam_setuids (uid, uid, 0, uid);
    }
}


if (ui_on_terminal() == TRUE)
{
    /* We are executing on a terminal.  The only applications listed
     * in the FAL on terminals are ones that can be executed on a
     * terminal.
     *
     * If this is a SAM FA, then we need to pass in the Sam_Id.  SAM
     * FAs are executed with ui_system() so we aren't prompted to
     * "press return to continue".  We also want to surpress the
     * logging from ui_system() -- when the FA starts & exits,
     * it will do its own logging.
     */
    if (cur_obj->data.type == CB_TYPE)
    {
        sprintf (buffer, cur_obj->data.cmd, Sam_Id);
        ignore_cmd_event();
        ui_system (buffer);
        resume_cmd_event();
    }
    else
    {
        /* Determine whether or not we should pause after the terminal
         * version.  Some applications need the "press return to continue"
         * message so that users can see the results of the command.
         */
        samlog (SAMLOG_SUMMARY2, FAL_LOGS_START_EXEC_NONSAM_APP,
                cur_obj->data.label);

        if (cur_obj->data.terminal_pause == TRUE)
            ui_exec_command (cur_obj->data.cmd);
        else
            ui_system (cur_obj->data.cmd);

        samlog (SAMLOG_SUMMARY2, FAL_LOGS_SUCC_EXEC_NONSAM_APP,
                cur_obj->data.label);
    }
}
else
{
    /* We are executing in a graphical environment.  First, build the
     * command line to be executed.  We only pass Sam_Id into SAM FAs.
     * We also want to surpress any ui_exec_command() or ui_system()
     * logging since the FA will do its own logging when it starts
     * and exits.
     */
    if (cur_obj->data.type == CB_TYPE)
    {
        sprintf(buffer, cur_obj->data.cmd, Sam_Id);
        ignore_cmd_event();

        /* Determine if we need to execute this in an hpterm.  If we do,
         * use ui_exec_command() instead of ui_system().
         */
        if (cur_obj->data.hpterm == 0)
            ui_system (buffer);
        else
            ui_exec_command (buffer);

        resume_cmd_event();
    }
    else
    {
        strcpy (buffer, cur_obj->data.cmd);

        /* Determine if we need to execute this in an hpterm.  If we do,
         * use ui_exec_command() instead of ui_system().  If we don't
         * want to pause before returning to SAM, use
         * ui_exec_command_nopause().
         */
        samlog (SAMLOG_SUMMARY2, FAL_LOGS_START_EXEC_NONSAM_APP,
                cur_obj->data.label);

        if (cur_obj->data.hpterm == 0)
            ui_system (buffer);
        else if (cur_obj->data.terminal_pause == TRUE)
            ui_exec_command (buffer);
        else
            ui_exec_command_nopause (buffer);

        samlog (SAMLOG_SUMMARY2, FAL_LOGS_SUCC_EXEC_NONSAM_APP,
                cur_obj->data.label);
    }
}

/* If we changed the user's effective UID, change it back.
 */
if (changed_id == TRUE)
    sec_sam_setuids (0, 0, 0, 0);
```

APPENDIX IV

```
    return (OKAY);
} /* fal_exec_xmit */


/***************************** Begin-Specification *****************************
*
* Module: fal_enableall_xmit
*
* Author: Tammy Heiserman
*
* Description: Enables all accessible applications in SAM's hierarchy.
*              SAM confirms this action with the user prior to making
*              any changes.
*
* Parameters: NONE
*
* Globals: none
*
* Returns: int - always returns OKAY
****************************** End-Specification *****************************/
FUNCTION int fal_enableall_xmit()
{
    fal_area_tree_ptr   atp;
    boolean             changes_made = FALSE;


    /* Go to the top level.
     */
    ui_refresh_ole(FAL_OLE_NAME, RESET_HIERARCHY);

    /* Enable each item (and its children) on the OLE.
     */
    atp = fal_areas->first_child;
    while (atp != (fal_area_tree_ptr) NULL)
    {
        /* If the parent item is not "enabled", then we must
         * enable it and all of its children.
         */
        if ((atp->data.status != FAL_ENABLE_NUM) &&
            (atp->data.status != FAL_INACCESS_NUM))
        {
            changes_made = TRUE;
            atp->data.status = FAL_ENABLE_NUM;
            fal_change_child_status (atp->first_child, FAL_ENABLE_NUM);
        }
        atp = atp->sibling;
    }

    /* Now reset the status line if changes were made.
     */
    if (changes_made == TRUE)
        ui_put_status (FAL_STATUS_CHANGES, FAL_CAP_YES);

    return(OKAY);
} /* fal_enableall_xmit */


/***************************** Begin-Specification *****************************
*
* Module: fal_edit_xmit
*
* Author: Tammy Heiserman
*
* Description: Reads the specified user's control file and resets the
*              Restricted SAM Builder to contain this user's data so
*              it can be edited.
*
* Parameters: NONE
*
* Globals: none
*
* Returns: int - always returns OKAY
****************************** End-Specification *****************************/
FUNCTION int fal_edit_xmit()
{
    char        user_login[MAXLEN];
    char        control_file[MAXLEN];
    char        buffer[MAXLEN];
    object_ptr  handle = (object_ptr) NULL;
    int         use_default = FALSE;


    /* Retrieve the user's log in name and build the control file name.
     * Determine if this user already has SAM privileges.  If not, display
     * the default permissions and tell the system administrator that this
     * user does not have SAM permissions.
     */
    ui_first_sel (FAL_SL_USERS);
    ui_get_sel_item_col (FAL_SL_USERS, FAL_AT_RESTRICTED, buffer);
    ui_get_sel_item_col (FAL_SL_USERS, FAL_AT_LOGIN, user_login);
    if (strcmp (buffer, FAL_NO) == OKAY)
    {
        com_use_samroot (control_file, FAL_DEFAULT_CF);
        use_default = TRUE;
    }
    else
    {
        com_use_samroot (buffer, FAL_CONTROL_FILE_DIR);
        sprintf (control_file, "%s/%s.cf", buffer, user_login);
    }

    /* Read the new control file.
     */
    samlog (SAMLOG_SUMMARY, FAL_LOGS_START_GET_CF, user_login);
    da_handle_create_and_puts (&handle, "FAL_CONTROL_FILE.STRING_ID",
                               control_file);
    tmgr_exec (FAL_READ_CONTROL_FILE, handle, 0);
    err_all_handler (&handle);
    samlog (SAMLOG_SUMMARY, FAL_LOGS_SUCC_GET_CF, user_login);

    /* Disable all items in the FAL.
     */
    fal_change_child_status (fal_areas->first_child, FAL_DISABLE_NUM);

    /* Enable only those items listed in the control file.  The "1"
     * parameter tells the routine we are being executed from the
     * Remote SAM Builder, which is important for error handling.
     */
    fal_enable_control_file (handle, 1);
    da_obj_destroy (&handle);

    /* Display the user's login name in the status area.
     */
    ui_put_status (FAL_STATUS_USER, user_login);

    if (use_default == TRUE)
    {
        ui_msg_info (FAL_INFO_LOAD_DEFAULT_FOR_USER, user_login);
        ui_put_status (FAL_STATUS_CHANGES, FAL_CAP_YES);
    }
    else
        ui_put_status (FAL_STATUS_CHANGES, FAL_CAP_NO);
```

```
    return(OKAY);
} /* fal_edit_xmit */


/**************************** Begin-Specification *****************************
 *
 * Module: fal_help_xmit
 *
 * Author: Tammy Heiserman
 *
 * Description: Gets the help tag or help file to be displayed.  The user
 *              has selected an item in the OLE and hit F1.  We are
 *              determining which help to display for the selected item.
 *
 *
 * Parameters: ole_name         Name of the OLE
 *             subarea_name     Name of the subarea
 *
 * Globals: none
 *
 * Returns: int - always returns OKAY
 ****************************** End-Specification *****************************/
FUNCTION char *fal_help_xmit(ole_name, subarea_name)
char    *ole_name;
char    *subarea_name;
{
    int                 i;
    static char         helptag[MAXLEN];
    fal_area_tree_ptr   atp;


#ifdef lint
    /* These parameters are not used.  This makes lint happy.
     */
    ole_name = ole_name;
    subarea_name = subarea_name;
#endif

    i = ui_first_object();
    if (i == 0)
    {
        /* The user selected "Go up..." -- show them the help for this
         * item.
         */
        strcpy (helptag, FAL_OBAM_HELP_CLOSE);
        return (helptag);
    }

    ui_get_object_field(FAL_AT_KEY, (char *) &atp);
    strcpy (helptag, atp->data.help);
    if (strlen (helptag) == 0)
    {
        /* There is no help associated with this item.  Display a generic
         * help message.
         */
        sprintf (helptag, FAL_INFO_NO_HELP_AVAIL, atp->data.label);
    }
    return (helptag);
} /* fal_help_xmit */


/**************************** Begin-Specification *****************************
 *
 * Module: fal_save_unlisted_xmit
 *
 * Author: Tammy Heiserman
 *
 * Description: Saves the existing SAM configuration to the specified user's
 *              control file.
 *
 * Parameters: NONE
 *
 * Globals: none
 *
 * Returns: int - always returns OKAY
 ****************************** End-Specification *****************************/
FUNCTION int fal_save_unlisted_xmit()
{
    object_ptr          handle = (object_ptr) NULL;
    fal_area_tree_ptr   atp;
    char                buffer[MAXLEN];
    char                user_login[MAXLEN];
    char                control_file[MAXLEN];
    int                 size;


    /* Call a utility routine to build the list of enabled groups/applications
     * on the handle.
     */
    da_handle_create_add_list (&handle, FAL_CONTROL);
    da_obj_set_list_first (handle, FAL_CONTROL);
    atp = fal_areas->first_child;
    strcpy (buffer, "");
    fal_save_enabled_items (handle, atp, buffer);

    /* Retrieve the user's log in name and build the control file name.
     */
    ui_get_data (FAL_SAVE_TE_USER, user_login);
    sprintf (control_file, "%s.cf", user_login);
    da_handle_create_and_puts (&handle, "FAL_CONTROL_FILE.STRING_ID",
                               control_file);

    /* Determine if all of SAM has been disabled.  If so, warn the user
     * that saving this configuration will result in the control file being
     * removed from the system.  If the user doesn't have any privileges
     * to begin with, give an informational message and return.
     */
    (void) da_obj_list_size (handle, FAL_CONTROL, &size);
    if (size == 0)
    {
        /* The user doesn't have any privileges anyway -- all users with
         * SAM privileges are already listed in the selection list.  Give a
         * message and return.
         */
        ui_msg_info (FAL_INFO_NO_AREAS_ENABLED, user_login);
        da_handle_destroy (&handle);
        return (FAL_INVALID);
    }
    samlog (SAMLOG_SUMMARY, FAL_LOGS_START_SAVE_CF, user_login);

    /* If the user specified a comment, store it on the handle.  Otherwise,
     * add an empty string to the handle.
     */
    ui_get_data (FAL_SAVE_TE_COMMENT, buffer);
    if (strlen (buffer) > 0)
        da_handle_create_and_puts (&handle, "FAL_COMMENT.STRING_ID", buffer);
    else
        da_handle_create_and_puts (&handle, "FAL_COMMENT.STRING_ID", "");

    /* Save the items to the control file.
     */
    tmgr_exec (FAL_SAVE_CONTROL_FILE, handle, 0);
```

```
    err_all_handler (&handle);
    da_handle_destroy (&handle);

    /* Give the user some feedback that the task succeeded.  Otherwise, this
     * is only subtly reflected on the OLE.  Change the user name in the
     * status line.
     */
    ui_put_status (FAL_STATUS_USER, user_login);
    ui_msg_info (FAL_INFO_SAVE_SUCCEEDED, user_login);
    samlog (SAMLOG_SUMMARY, FAL_LOGS_SUCC_SAVE_CF, user_login);
    ui_put_status (FAL_STATUS_CHANGES, FAL_CAP_NO);

    return (OKAY);
} /* fal_save_unlisted_xmit */


/**************************** Begin-Specification *****************************
 *
 * Module: fal_save_xmit
 *
 * Author: Tammy Heiserman
 *
 * Description: Saves the existing SAM configuration to the specified user's
 *              control file.
 *
 * Parameters: NONE
 *
 * Globals: none
 *
 * Returns: int - always returns OKAY
 ******************************* End-Specification ****************************/
FUNCTION int fal_save_xmit()
{
    object_ptr          handle = (object_ptr) NULL;
    fal_area_tree_ptr   atp;
    char                buffer[MAXLEN];
    char                user_login[MAXLEN];
    char                control_file[MAXLEN];
    int                 size;
    int                 i;
    int                 count;
    boolean             remove_control_file = FALSE;


    /* Call a utility routine to build the list of enabled groups/applications
     * on the handle.
     */
    da_handle_create_add_list (&handle, FAL_CONTROL);
    da_obj_set_list_first (handle, FAL_CONTROL);
    atp = fal_areas->first_child;
    strcpy (buffer, "");
    fal_save_enabled_items (handle, atp, buffer);

    /* Determine if all of SAM has been disabled.  If so, warn the user
     * that saving this configuration will result in the control file being
     * removed from the system.
     */
    (void) da_obj_list_size (handle, FAL_CONTROL, &size);
    if (size == 0)
    {
        if (ui_msg_confirm (FAL_CONF_GENERIC_NO_AREAS_ENABLED, FALSE) == FALSE)
        {
            da_handle_destroy (&handle);
            return (FAL_INVALID);
        }
        remove_control_file = TRUE;
    }

    /* If the user specified a comment, store it on the handle.  Otherwise,
     * add an empty string to the handle.
     */
    ui_get_data (FAL_SAVE_TE_COMMENT, buffer);
    if (strlen (buffer) > 0)
        da_handle_create_and_puts (&handle, "FAL_COMMENT.STRING_ID", buffer);
    else
        da_handle_create_and_puts (&handle, "FAL_COMMENT.STRING_ID", "");

    /* Modify each selected user one at a time.
     */
    count = ui_sel_num_items (FAL_SL_USERS);
    ui_first_sel (FAL_SL_USERS);
    da_handle_create_and_puts (&handle, "FAL_CONTROL_FILE.STRING_ID", "");
    for (i=1; i<=count; i++)
    {
        /* Retrieve the user's log in name and build the control file name.
         */
        ui_get_sel_item_col (FAL_SL_USERS, FAL_AT_LOGIN, user_login);
        sprintf (control_file, "%s.cf", user_login);
        da_obj_puts (handle, "FAL_CONTROL_FILE.STRING_ID", control_file);

        if (remove_control_file == TRUE)
        {
            ui_get_sel_item_col (FAL_SL_USERS, FAL_AT_RESTRICTED, buffer);
            if (strcmp (buffer, FAL_NO) == 0)
            {
                /* This user doesn't have any SAM privileges to remove.
                 * Ignore this user and continue.
                 */
                ui_next_sel (FAL_SL_USERS);
                continue;
            }
            else
                samlog (SAMLOG_SUMMARY, FAL_LOGS_START_RM_CF, user_login);
        }
        else
            samlog (SAMLOG_SUMMARY, FAL_LOGS_START_SAVE_CF, user_login);

        /* Save the items to the control file.
         */
        tmgr_exec (FAL_SAVE_CONTROL_FILE, handle, 0);
        err_all_handler (&handle);
        ui_next_sel (FAL_SL_USERS);

        if (remove_control_file == TRUE)
            samlog (SAMLOG_SUMMARY, FAL_LOGS_SUCC_RM_CF, user_login);
        else
            samlog (SAMLOG_SUMMARY, FAL_LOGS_SUCC_SAVE_CF, user_login);
    }
    da_handle_destroy (&handle);

    /* Give the user some feedback that the task succeeded.  Otherwise, this
     * is only subtly reflected on the OLE.  Change the user name in the
     * status line.
     */
    if (remove_control_file == FALSE)
    {
        ui_put_status (FAL_STATUS_USER, user_login);
        ui_msg_info (FAL_INFO_GENERIC_SAVE_SUCCEEDED);
    }
    else
        ui_msg_info (FAL_INFO_GENERIC_REMOVE_SUCCEEDED);
```

```
    ui_put_status (FAL_STATUS_CHANGES, FAL_CAP_NO);

    return (OKAY);
} /* fal_save_xmit */

/**************************** Begin-Specification *****************************
 *
 * Module: fal_modify_xmit
 *
 * Author: Tammy Heiserman
 *
 * Description: Determines whether the user is modifying a custom utility
 *              or group and starts the correct task dialog.
 *
 * Parameters: NONE
 *
 * Globals: none
 *
 * Returns: int - always returns OKAY
 ****************************** End-Specification *****************************/
FUNCTION int fal_modify_xmit()
{
    int                 rc;
    fal_area_tree_ptr   atp;

    ui_first_object();
    ui_get_object_field(FAL_AT_KEY, (char *) &atp);

    if (atp->data.group == 0)
        rc = ui_invoke_dib (FAL_MODIFY_UTILITY_TD);
    else
        rc = ui_invoke_dib (FAL_MODIFY_GROUP_TD);

    return (rc);
} /* fal_modify_xmit */

/**************************** Begin-Specification *****************************
 *
 * Module: fal_modify_group_xmit
 *
 * Author: Tammy Heiserman
 *
 * Description: Modifies a custom group already listed in the SAM functional
 *              area launcher.  This is a two-step process.  First the file
 *              FAL_CUSTOM_FILE needs to be changed for this item.  Next,
 *              the FAL data structures need to be updated.
 *
 * Parameters: NONE
 *
 * Globals: none
 *
 * Returns: int - returns OKAY if the group is successfully modified.
 *                Otherwise it returns FAL_INVALID.
 ****************************** End-Specification *****************************/
FUNCTION int fal_modify_group_xmit()
{
    char                label[MAXLEN];
    char                help[MAXLEN];
    char                icon[MAXLEN];
    char                buffer[MAXLEN];
    char                group_path[MAXLEN];
    fal_area_tree_ptr   atp;
    object_ptr          handle = (object_ptr) NULL;
    int                 rc;

    /* Create the handle where we will store the information needed
     * by the backend to make the changes.  Store the old label for
     * the group on the appropriate field in the handle.  We need this
     * to find the item in FAL_CUSTOM_FILE.
     */
    da_handle_create_add (&handle, FAL_CU);
    ui_first_object();
    ui_get_object_field(FAL_AT_KEY, (char *) &atp);
    da_obj_puts (handle, FAL_CU_OLD_LABEL, atp->data.label);
    da_obj_puts (handle, FAL_CU_HASSUBMENUS, "1");

    /* Store the label, help and icon on the handle.  The FAL data
     * structure will be updated once FAL_CUSTOM_FILE has been modified.
     */
    ui_get_data(FAL_TE_LABEL, label);
    da_obj_puts (handle, FAL_CU_LABEL, label);

    ui_get_data(FAL_TE_HELP, help);
    da_obj_puts (handle, FAL_CU_HELP, help);

    ui_get_data(FAL_TE_ICON, icon);
    da_obj_puts (handle, FAL_CU_ICON, icon);

    /* If nothing has changed, issue an error message and return.
     */
    if ((SAMSTREQ (label, atp->data.label)) &&
        (SAMSTREQ (help, atp->data.help)) &&
        (SAMSTREQ (icon, atp->data.icon_path)))
    {
        ui_msg_err (FAL_ERR_MOD_NO_CHANGES);
        da_obj_destroy (&handle);
        return (FAL_INVALID);
    }

    /* We need to know where in the menu hierarchy this item exists
     * so we can modify the right item.  Create a list of strings on the
     * handle and store each parent group label beginning at the highest level.
     *
     * If we are modifying this item on SAM's top level, then there are
     * no strings added to the handle.
     */
    strcpy (group_path, "");
    da_handle_create_add_list (&handle, STRING_DATA);
    da_obj_set_list_first (handle, STRING_DATA);
    if (atp->parent->data.label != (char *) NULL)
    {
        /* This group is not on SAM's top level -- store
         * all parent group information on the handle.
         */
        fal_store_parent_info (handle, atp->parent);
        for (rc = da_obj_set_list_first (handle, STRING_ID);
             rc == OKAY;
             rc = da_obj_set_list_next (handle, STRING_ID))
        {
            da_obj_gets (handle, STRING_ID, buffer, MAXLEN);
            strcat (group_path, buffer);
            strcat (group_path, "->");
        }
    }
    strcat (group_path, label);

    /* Modify the group.
     */
```

```
    samlog (SAMLOG_SUMMARY, FAL_LOGS_START_MOD_GROUP, group_path);
    tmgr_exec (FAL_MODIFY_CU, handle, 0);
    err_all_handler (&handle);
    samlog (SAMLOG_SUMMARY, FAL_LOGS_SUCC_MOD_GROUP, group_path);
    da_obj_destroy (&handle);

    /* If we get to here, the item was successfully modified by the
     * backend.  Go ahead and update the FAL data structures.
     */
    if (strcmp(label, atp->data.label) != 0)
    {
        if (atp->data.label)
            free((void *) atp->data.label);
        atp->data.label = fal_strdup(label);
    }

    if (strcmp(help, atp->data.help) != 0)
    {
        if (atp->data.help)
            free((void *) atp->data.help);
        atp->data.help = fal_strdup(help);
    }

    if (strcmp(icon, atp->data.icon_path) != 0)
    {
        if (atp->data.icon_path)
            free((void *) atp->data.icon_path);
        atp->data.icon_path = fal_strdup(icon);
    }
    return(OKAY);
} /* fal_modify_group_xmit */


/**************************** Begin-Specification ****************************
 *
 * Module: fal_modify_utility_xmit
 *
 * Author: Tammy Heiserman
 *
 * Description: Modifies a custom utility already listed in the SAM functional
 *              area launcher.  This is a two-step process.  First the file
 *              FAL_CUSTOM_FILE needs to be changed for this item.  Next,
 *              the FAL data structures need to be updated.
 *
 * Parameters: NONE
 *
 * Globals: none
 *
 * Returns: int - returns OKAY if the utility is successfully modified.
 *                Otherwise it returns FAL_INVALID.
 ****************************** End-Specification *****************************/
FUNCTION int fal_modify_utility_xmit()
{
    char                label[MAXLEN];
    char                help[MAXLEN];
    char                icon[MAXLEN];
    char                command[MAXLEN];
    char                exec_as[MAXLEN];
    char                buffer[MAXLEN];
    char                util_path[MAXLEN];
    fal_area_tree_ptr   atp;
    object_ptr          handle = (object_ptr) NULL;
    int                 hpterm;
    int                 gui_only;
    int                 rc;

    /* Create the handle where we will store the information needed
     * by the backend to make the changes.  Store the old label for
     * the utility on the appropriate field in the handle.  We need this
     * to find the item in FAL_CUSTOM_FILE.
     */
    da_handle_create_add (&handle, FAL_CU);
    ui_first_object();
    ui_get_object_field(FAL_AT_KEY, (char *) &atp);
    da_obj_puts (handle, FAL_CU_OLD_LABEL, atp->data.label);
    da_obj_puts (handle, FAL_CU_HASSUBMENUS, "0");


    /* Store the changed label, command and help on the handle.  The FAL
     * data structure will be updated once FAL_CUSTOM_FILE has been
     * modified.
     */
    ui_get_data(FAL_TE_LABEL, label);
    da_obj_puts (handle, FAL_CU_LABEL, label);

    ui_get_data(FAL_TE_HELP, help);
    da_obj_puts (handle, FAL_CU_HELP, help);

    ui_get_data(FAL_TE_ICON, icon);
    da_obj_puts (handle, FAL_CU_ICON, icon);

    ui_get_data(FAL_TE_CMD, command);
    da_obj_puts (handle, FAL_CU_CMD, command);

    /* Save the user to execute the command as on the handle.
     */
    if (ui_sel_item (FAL_SL_ID, 1, UILIB_TST) == FALSE)
    {
        if (ui_sel_item (FAL_SL_ID, 2, UILIB_TST) == TRUE)
        {
            strcpy (exec_as, FAL__USER);
            da_obj_puts (handle, FAL_CU_EXEC_AS, exec_as);
        }
        else
        {
            ui_get_data (FAL_TE_ID, exec_as);
            da_obj_puts (handle, FAL_CU_EXEC_AS, exec_as);
        }
    }
    else
        strcpy (exec_as, "");


    /* Since FAL_SL_GUI is a required field, we are guaranteed
     * that the user selected either graphical, terminal, or both.
     */
    if (ui_sel_item(FAL_SL_GUI, 1, UILIB_TST) == 1)
        hpterm = 0;
    else
        hpterm = 1;
    da_obj_puti (handle, FAL_CU_HPTERM, hpterm);

    if (ui_sel_item(FAL_SL_GUI, 2, UILIB_TST) == 1)
        gui_only = 0;
    else
        gui_only = 1;
    da_obj_puti (handle, FAL_CU_GUI_ONLY, gui_only);


    /* If nothing has changed, issue an error message and return.
     */
```

```
    if ((strcmp (label, atp->data.label) == 0) &&
        (strcmp (help, atp->data.help) == 0) &&
        (strcmp (command, atp->data.cmd) == 0) &&
        (strcmp (exec_as, atp->data.execute_as) == 0) &&
        (atp->data.hpterm == hpterm) && (atp->data.gui_only == gui_only) &&
        (strcmp (icon, atp->data.icon_path) == 0))
    {
        ui_msg_err (FAL_ERR_MOD_NO_CHANGES);
        da_obj_destroy (&handle);
        return (FAL_INVALID);
    }

    /* We need to know where in the menu hierarchy this item exists
     * so we can modify the right item.  Create a list of strings on the
     * handle and store each parent group label beginning at the highest level.
     *
     * If we are modifying this item on SAM's top level, then there are
     * no strings added to the handle.
     */
    strcpy (util_path, "");
    da_handle_create_add_list (&handle, STRING_DATA);
    da_obj_set_list_first (handle, STRING_DATA);
    if (atp->parent->data.label != (char *) NULL)
    {
        /* This group is not on SAM's top level -- store
         * all parent group information on the handle.
         */
        fal_store_parent_info (handle, atp->parent);
        for (rc = da_obj_set_list_first (handle, STRING_ID);
             rc == OKAY;
             rc = da_obj_set_list_next (handle, STRING_ID))
        {
            da_obj_gets (handle, STRING_ID, buffer, MAXLEN);
            strcat (util_path, buffer);
            strcat (util_path, "->");
        }
    }
    strcat (util_path, label);

    /* Modify the utility.
     */
    samlog (SAMLOG_SUMMARY, FAL_LOGS_START_MOD_UTIL, util_path);
    tmgr_exec (FAL_MODIFY_CU, handle, 0);
    err_all_handler (&handle);
    samlog (SAMLOG_SUMMARY, FAL_LOGS_SUCC_MOD_UTIL, util_path);
    da_obj_destroy (&handle);

    /* If we get to here, the item was successfully modified by the
     * backend.  Go ahead and update the FAL data structures.
     */
    if (strcmp(label, atp->data.label) != 0)
    {
        if (atp->data.label)
            free((void *) atp->data.label);
        atp->data.label = fal_strdup(label);
    }

    if (strcmp(help, atp->data.help) != 0)
    {
        if (atp->data.help)
            free((void *) atp->data.help);
        atp->data.help = fal_strdup(help);
    }

    if (strcmp(icon, atp->data.icon_path) != 0)
    {
        if (atp->data.icon_path)
            free((void *) atp->data.icon_path);
        atp->data.icon_path = fal_strdup(icon);
    }

    if (strcmp(command, atp->data.cmd) != 0)
    {
        if (atp->data.cmd)
            free((void *) atp->data.cmd);
        atp->data.cmd = fal_strdup(command);
    }

    if (strcmp(exec_as, atp->data.execute_as) != 0)
    {
        if (atp->data.execute_as)
            free((void *) atp->data.execute_as);
        atp->data.execute_as = fal_strdup(exec_as);
    }
    atp->data.hpterm = hpterm;
    atp->data.gui_only = gui_only;

    return(OKAY);
} /* fal_modify_utility_xmit */


/**************************** Begin-Specification *****************************
*
* Module: fal_opt_logopts_xmit
*
* Author: Bill Gates
*
* Description: Saves the logging option settings in the in-core version of
*              the SAM preferences file.  These will be written out to the
*              actual preferences file upon completion of an FA.
*
* Parameters: NONE
*
* Globals: none
*
* Returns: int - UILIB_SUCCESS if ok, UILIB_FAILURE if malloc() fails in
*                preferences routines.
***************************** End-Specification *****************************/
FUNCTION int fal_opt_logopts_xmit()
{
    int rc, maxsize;
    int i = 0;
    char ms[50];

    /* Get logfile trimming choice.  If enabled, then save that choice and */
    /* the max logfile size in in-code preferences.  If disabled, save only*/
    /* that fact in preferences.                                          */

    rc = ui_first_sel("fal_logopts_sl_trimwhen");
    if(rc == 1) {
       i += modify_sam_preference("log_trim_logfile", "yes");
       maxsize = ui_get_data_value("fal_logopts_te_size");
       sprintf(ms, "%d", maxsize);
       i += modify_sam_preference("log_max_logfile_size", ms);
    } else if(rc == 2) {
       i += modify_sam_preference("log_trim_logfile", "no");
    }

    /* Get autostart choice.  Save choice in in-core preferences. */

    if(ui_sel_data("fal_logopts_tg_vlog", UILIB_TST))
       i += modify_sam_preference("log_autostart_viewer", "yes");
```

```
    else
       i += modify_sam_preference("log_autostart_viewer", "no");

    /* If any of the modify_sam_preferences() calls failed, display an error */
    /* and return an error.                                                   */

    if(i != 0) {
       ui_msg_err(LOGOPTS_XMIT_MODPREF_FAILED);
       return(UILIB_FAILURE);
    }

    return(UILIB_SUCCESS);
} /* fal_opt_logopts_xmit */


/**************************** Begin-Specification *****************************
*
* Module: fal_remove_xmit
*
* Author: Tammy Heiserman
*
* Description: Removes a customer utility or group already listed in the
*              SAM functional area launcher.  The "Remove" action item
*              is only allowed on non-SAM applications -- ObAM's dynamic
*              menus ensures this.
*
*              Removing the item is a two-step process.  First, we remove
*              it from sam_custom.cu so it won't appear the next time SAM
*              is run.  If that succeeds, we remove it from the FAL's
*              data structures so it won't appear in the main menu.
*
* Parameters: NONE
*
* Globals: none
*
* Returns: int - returns OKAY if successfully removed the item.  Otherwise
*                returns UILIB_CANCEL
***************************** End-Specification ******************************/
FUNCTION int fal_remove_xmit()
{
    fal_area_tree_ptr   atp;
    object_ptr          handle = (object_ptr) NULL;
    char                buffer[MAXLEN];
    char                buffer2[MINLEN];
    char                msg[MAXLEN];
    char                entry_path[MAXLEN];
    int                 is_parent_custom = 0;
    int                 rc;


    ui_first_object();
    ui_get_object_field(FAL_AT_KEY, (char *) &atp);

    /* First check if this item is a group.  If so, ensure it is empty.
     */
    if ((atp->data.group == 1) &&
        (atp->first_child != (fal_area_tree_ptr) NULL))
    {
        ui_msg_err (FAL_ERR_CANT_REMOVE_NONEMPTY_GROUPS, atp->data.label);
        return (UILIB_CANCEL);
    }

    /* Now confirm that the user really wants to remove the selected
     * item.
     */
    if (atp->data.group == 1)
        sprintf (msg, FAL_CONF_REMOVE_GROUP, atp->data.label);
    else
        sprintf (msg, FAL_CONF_REMOVE_UTILITY, atp->data.label);

    if (ui_msg_confirm (msg, FALSE) == FALSE)
        return (UILIB_CANCEL);

    /* Create a handle that contains all the information about the item
     * to be removed.
     */
    da_handle_create_add(&handle, FAL_CU);
    da_obj_puts(handle, FAL_CU_LABEL, atp->data.label);
    da_obj_puts(handle, FAL_CU_HELP, atp->data.help);
    da_obj_puts(handle, FAL_CU_ICON, atp->data.icon_path);

    if (atp->data.group == 1)
        da_obj_puts(handle, FAL_CU_HASSUBMENUS, "1");
    else
        da_obj_puts(handle, FAL_CU_HASSUBMENUS, "0");

    /* If the user to execute as is defined and not root, pass it back
     * on the handle.  We will need to delete the execute_as line from
     * the file.  Custom utilities *NEVER* have an "execute_as root"
     * line in them.
     */
    if ((strlen (atp->data.execute_as) > 0) &&
        (strcmp (atp->data.execute_as, FAL_ROOT) != 0))
        da_obj_puts (handle, FAL_CU_EXEC_AS, atp->data.execute_as);

    /* We need to know where in the menu hierarchy to remove this item.
     * Create a list of strings on the handle and store each parent
     * group label beginning at the highest level.
     *
     * If we are removing this item from SAM's top level, then there are
     * no strings added to the handle.
     */
    strcpy (entry_path, "");
    da_handle_create_add_list (&handle, STRING_DATA);
    da_obj_set_list_first (handle, STRING_DATA);
    if (atp->parent->data.label != (char *) NULL)
    {
        /* This group is not being removed from SAM's top level -- store
         * all parent group information on the handle.
         */
        fal_store_parent_info (handle, atp->parent);
        for (rc = da_obj_set_list_first (handle, STRING_ID);
             rc == OKAY;
             rc = da_obj_set_list_next (handle, STRING_ID))
        {
            da_obj_gets (handle, STRING_ID, buffer, MAXLEN);
            strcat (entry_path, buffer);
            strcat (entry_path, "->");
        }
    }
    strcat (entry_path, atp->data.label);

    /* We need to pass the backend whether or not the first parent group
     * is a custom group.  If it isn't, we may need to remove empty parent
     * groups from FAL_CUSTOM_FILE.  If the first parent group is not a
     * custom group, then none of the parent groups are custom groups.
     * If the first parent group is a custom group, then the user must
     * explicitly remove it or it will remain an empty group.
     */
    if (strcmp (atp->parent->data.source, FAL_CUSTOM_ADDON) == 0)
        is_parent_custom = 1;
    sprintf (buffer, "%s.%s", FAL_NN_IS_PARENT_CUSTOM, STRING_DATA);
```

```
    sprintf (buffer2, "%d", is_parent_custom);
    da_handle_create_and_puts (&handle, buffer, buffer2);

    /* Remove the utility from sam_custom.cu.  If this succeeds, we remove
     * it from the FAL data structures.
     */
    ui_msg_progress (FAL_PROG_REMOVE, atp->data.label);
    samlog (SAMLOG_SUMMARY, FAL_LOGS_START_REMOVE, entry_path);
    tmgr_exec (FAL_REMOVE_CU, handle, 0);
    err_all_handler(&handle);
    samlog (SAMLOG_SUMMARY, FAL_LOGS_SUCC_REMOVE, entry_path);
    da_obj_destroy(&handle);

    /* Remove the menu item from the FAL data structures.
     */
    fal_destroy_menuitem (atp);

    return(OKAY);
}


/**************************** Begin-Specification *****************************
 *
 * Module: fal_remp_xmit
 *
 * Author: Tammy Heiserman
 *
 * Description: Removes all privileges for the specified user
 *
 * Parameters: NONE
 *
 * Globals: none
 *
 * Returns: int - always returns OKAY
 ***************************** End-Specification *****************************/
FUNCTION int fal_remp_xmit()
{
    object_ptr          handle = (object_ptr) NULL;
    char                buffer[MAXLEN];
    char                user_login[MAXLEN];
    char                control_file[MAXLEN];
    int                 count;
    int                 i;


    /* Warn the user that all privileges are being revoked.
     */
    count = ui_sel_num_items (FAL_SL_USERS);
    ui_first_sel (FAL_SL_USERS);
    if (count > 1)
        strcpy (buffer, FAL_CONF_GENERIC_REM_USER_PRIV);
    else
    {
        ui_get_sel_item_col (FAL_SL_USERS, FAL_AT_LOGIN, user_login);
        sprintf (buffer, FAL_CONF_REM_USER_PRIV, user_login);
    }
    if (ui_msg_confirm (buffer, FALSE) == FALSE)
        return (FAL_INVALID);

    /* Create an empty list of FAL_CONTROLs on the handle.  This signals
     * the backend that all privileges are being revoked.
     */
    da_handle_create_add_list (&handle, FAL_CONTROL);
    da_handle_create_and_puts (&handle, "FAL_CONTROL_FILE.STRING_ID", "");
    da_handle_create_and_puts (&handle, "FAL_COMMENT.STRING_ID", "");

    /* Retrieve the user's login name and build the control file name.
     */
    for (i=1; i<=count; i++)
    {
        ui_get_sel_item_col (FAL_SL_USERS, FAL_AT_LOGIN, user_login);
        sprintf (control_file, "%s.cf", user_login);
        da_obj_puts (handle, "FAL_CONTROL_FILE.STRING_ID", control_file);

        /* Save the items to the control file.
         */
        samlog (SAMLOG_SUMMARY, FAL_LOGS_START_RM_CF, user_login);
        tmgr_exec (FAL_SAVE_CONTROL_FILE, handle, 0);
        err_all_handler (&handle);
        samlog (SAMLOG_SUMMARY, FAL_LOGS_SUCC_RM_CF, user_login);
        ui_next_sel (FAL_SL_USERS);
    }
    da_handle_destroy (&handle);

    /* Disable all items on OLE
     */
    fal_change_child_status (fal_areas->first_child, FAL_DISABLE_NUM);

    /* Give the user some feedback that the task succeeded.  Otherwise, this
     * is only subtly reflected on the OLE.  Change the user name in the
     * status line.
     */
    ui_msg_info (FAL_INFO_GENERIC_REMOVE_SUCCEEDED);
    ui_put_status (FAL_STATUS_USER, user_login);
    ui_put_status (FAL_STATUS_CHANGES, FAL_CAP_NO);

    return (OKAY);
} /* fal_remp_xmit */


/**************************** Begin-Specification *****************************
 *
 * Module: fal_top_xmit
 *
 * Author: Tammy Heiserman
 *
 * Description: If users select "Go to Top Level", this routine is executed.
 *              It displays the top SAM menu items in the OLE.
 *
 * Parameters: NONE
 *
 * Globals: none
 *
 * Returns: int - always returns OKAY
 ***************************** End-Specification *****************************/
FUNCTION int fal_top_xmit()
{
    ui_refresh_ole(FAL_OLE_NAME, RESET_HIERARCHY);
    return(OKAY);
} /* fal_top_xmit() */


/**************************** Begin-Specification *****************************
 *
 * Module: fal_whats_new_xmit
 *
 * Author: Tammy Heiserman
 *
 * Description: This routine displays the help screen describing what's
 *              new in SAM.
 *
 * Parameters: NONE
```

```
 *
 * Globals: none
 *
 * Returns: int - always returns OKAY
******************************** End-Specification ******************************/
FUNCTION int fal_whats_new_xmit()
{
    (void) ui_show_help ("fal/fal.hv:FAL-MAIN+OVERVIEW+WhatsNew", 0);
    return(OKAY);
} /* fal_whats_new_xmit() */
```

```
# @(#) $Header: makefile,v 72.6 94/01/18 08:59:18 hmgr Exp $

FAROOT=..

include $(FAROOT)/defs.mk

OBJS1=          $(OBJDIR)/fal_init.o \
                $(OBJDIR)/fal_screen.o \
                $(OBJDIR)/fal_field.o \
                $(OBJDIR)/fal_xmit.o \
                $(OBJDIR)/fal_ui_utils.o

DEPENDS1=       $(FAROOT)/h/fal_defs.h \
                $(FAROOT)/h/fal_errmsg.h \
                $(FAROOT)/h/fal_errors.h \
                /usr/obam/include/uilib.h

DMDEFS=         -DSYSV -DMOTIF -DHP9800 -DHPUX

FAINCS1=        -I../h -I$(SAM)/tool/DM/$(MODEL) $(DMDEFS)
FAFLAGS1=       $(PIC)

ALL= $(OBJS1) $(OBJDIR)/fal_ui.o

include $(SAM)/make/rules.mk

$(OBJDIR)/fal_ui.o: $(OBJS1)
        $(LD) -r $(OBJS1) -o $@
```

```
# @(#) $Header: makefile,v 72.6 94/01/18 08:59:18 hmgr Exp $

FAROOT=..

include $(FAROOT)/defs.mk

OBJS1=          $(OBJDIR)/fal_init.o \
                $(OBJDIR)/fal_screen.o \
                $(OBJDIR)/fal_field.o \
                $(OBJDIR)/fal_xmit.o \
                $(OBJDIR)/fal_ui_utils.o

DEPENDS1=       $(FAROOT)/h/fal_defs.h \
                $(FAROOT)/h/fal_errmsg.h \
                $(FAROOT)/h/fal_errors.h \
                /usr/obam/include/uilib.h

DMDEFS=         -DSYSV -DMOTIF -DHP9800 -DHPUX

FAINCS1=        -I../h -I$(SAM)/tool/DM/$(MODEL) $(DMDEFS)
FAFLAGS1=       $(PIC)

ALL= $(OBJS1) $(OBJDIR)/fal_ui.o

include $(SAM)/make/rules.mk

$(OBJDIR)/fal_ui.o: $(OBJS1)
        $(LD) -r $(OBJS1) -o $@
```

We claim:

1. A method of allowing a computer system super user of unlimited privileges to grant to an ordinary user of the computer system graded restricted access to a specified collection of activities registered to a System Administration Manager program and performed by software installed in the computer system, the method comprising the steps of:

(a) storing in a first collection of one or more files related by a first naming convention, a formatted indication of all the activities that can be performed by using the System Administration Manager program, including names of activities, icons associated with each activity and commands for executing each software program whose execution corresponds to an activity;

(b) storing in a second collection of one or more files related by a second naming convention, and accessible only by the super user, a formatted indication of the activities that are to be the specified collection and the ordinary user that is to have graded restricted access to the specified collection; and (c) executing the System Administration Manager program at the request of an arbitrary user, such executing including the steps of:

(d) temporarily promoting the arbitrary user to super user for the duration of steps (e) through (h);

(e) subsequent to step (d), inspecting the second collection to determine if the arbitrary user is an ordinary user named therein; and (f) if the arbitrary user is an ordinary user named in the second collection, then performing steps (g) and (h) recited below, elsewise ending the temporary promotion of step (d) and declining to perform steps (g) and (h):

(g) displaying a menu of the specified activities, and only those activities; and (h) executing from the menu of specified activities one or more activities thereof selected by the promoted user.

* * * * *